(12) United States Patent
Choi

(10) Patent No.: US 7,892,132 B2
(45) Date of Patent: Feb. 22, 2011

(54) CONTINUOUSLY VARIABLE TRANSMISSION

(76) Inventor: Tae Soo Choi, 946-8 Madu-dong, Ilsandong-gu, Goyang-si Gyeonggi-do (KR) 410-350

( * ) Notice: Subject to any disclaimer, the term of this patent is extended or adjusted under 35 U.S.C. 154(b) by 0 days.

(21) Appl. No.: 12/668,873

(22) PCT Filed: Mar. 17, 2009

(86) PCT No.: PCT/KR2009/001311

§ 371 (c)(1), (2), (4) Date: Jan. 22, 2010

(87) PCT Pub. No.: WO2009/116770

PCT Pub. Date: Sep. 24, 2009

(65) Prior Publication Data

US 2010/0160106 A1 Jun. 24, 2010

(30) Foreign Application Priority Data

Mar. 18, 2008 (KR) .................. 10-2008-0025075

(51) Int. Cl.
*F16H 9/26* (2006.01)
*F16H 37/02* (2006.01)
*F16H 57/08* (2006.01)

(52) U.S. Cl. .................. 475/182; 475/213; 475/338
(58) Field of Classification Search ................ 475/167, 475/169, 182, 207, 210, 213, 219, 269, 903, 475/323, 325, 338, 341, 342; 474/72
See application file for complete search history.

(56) References Cited

U.S. PATENT DOCUMENTS 489,112 A * 1/1893 Wright .................. 475/325
4,449,423 A * 5/1984 Carriere .................. 475/52
5,074,829 A * 12/1991 Menge, Sr. ............... 475/182
5,360,380 A * 11/1994 Nottle ..................... 475/182
5,409,425 A * 4/1995 Shibahata ................ 475/5

FOREIGN PATENT DOCUMENTS

| JP | 04-203648 | 7/1992 |
| JP | 09-104384 | 4/1997 |
| JP | 2007-225103 | 9/2007 |
| KR | 2004-0033092 | 4/2004 |

* cited by examiner

*Primary Examiner*—Roger Pang
(74) *Attorney, Agent, or Firm*—Merchant & Gould P.C.

(57) ABSTRACT

This invention relates to a transmission system for transmitting a driving force from a driving unit D to a driven unit F, a transmission adjustment system for adjusting the transmission system to obtain a continuous shift ratio, a guide cone system for maintaining a concentric circle of a rotation radius when a transmission element such as a chain is rotated, a guide cone/transmission adjustment system and a continuously variable transmission system which are made by combination of the above systems. The transmission system includes the transmission element with a tooth portion for transmitting the driving force from the driving unit D to the driven unit F. A transmission adjustment method in the transmission adjustment system is varied depending upon rotation or stop of a carrier. The guide cone system includes a guide cone having a portion of which comes in contact with the transmission element is formed in a shape of a cone having a constant slope. A coupling method of the above systems and an input/output method are selected in the continuously variable transmission system. With the above construction, this invention can be applied without being restricted to the output capacity of the engine, have a simple construction, and transmit a rotation force to an output shaft from an input shaft with high efficiency to reduce energy. Particularly, this invention is widely applied to an industrial machinery as well as a transportation machinery.

6 Claims, 95 Drawing Sheets

[Fig. 1]
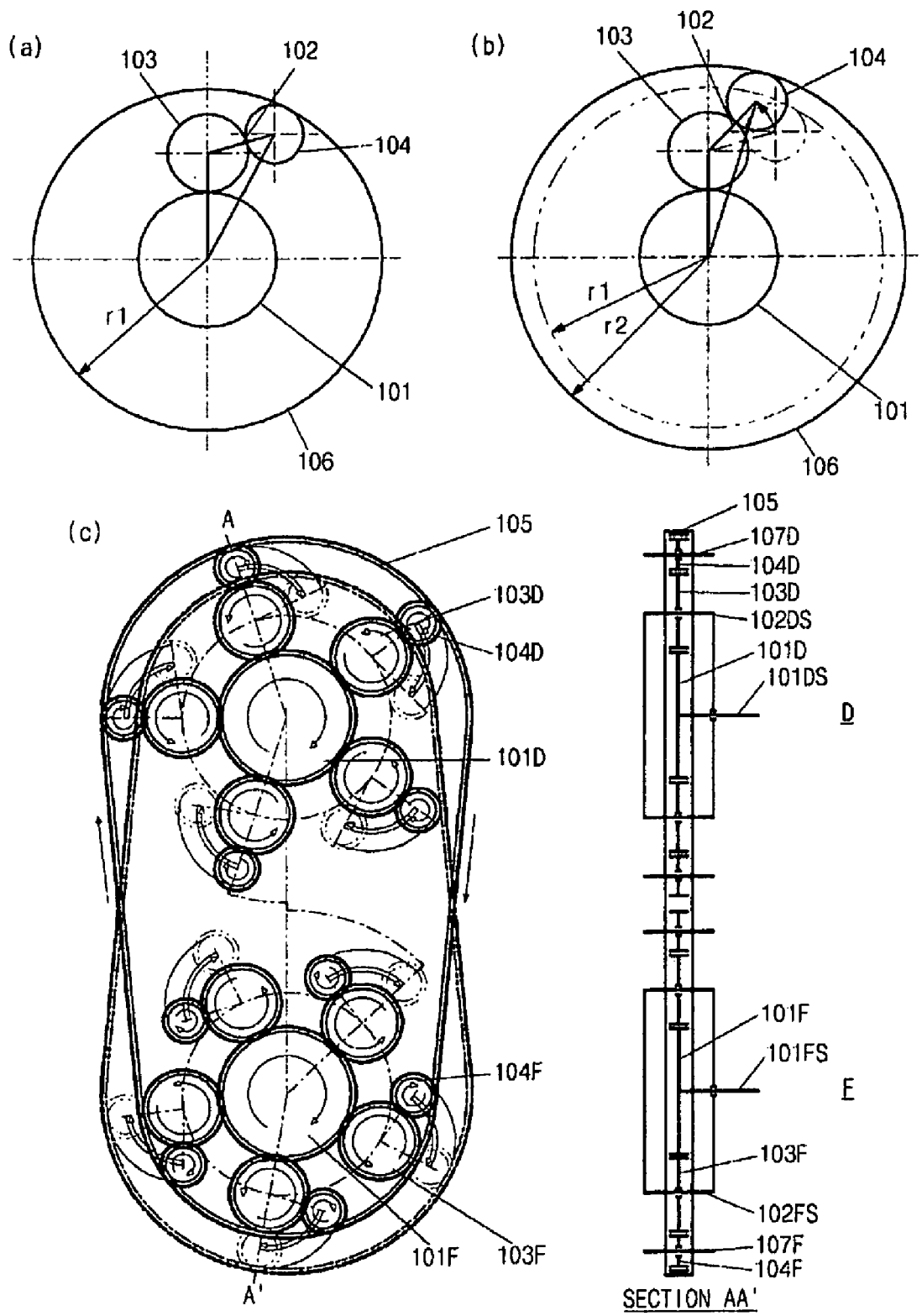

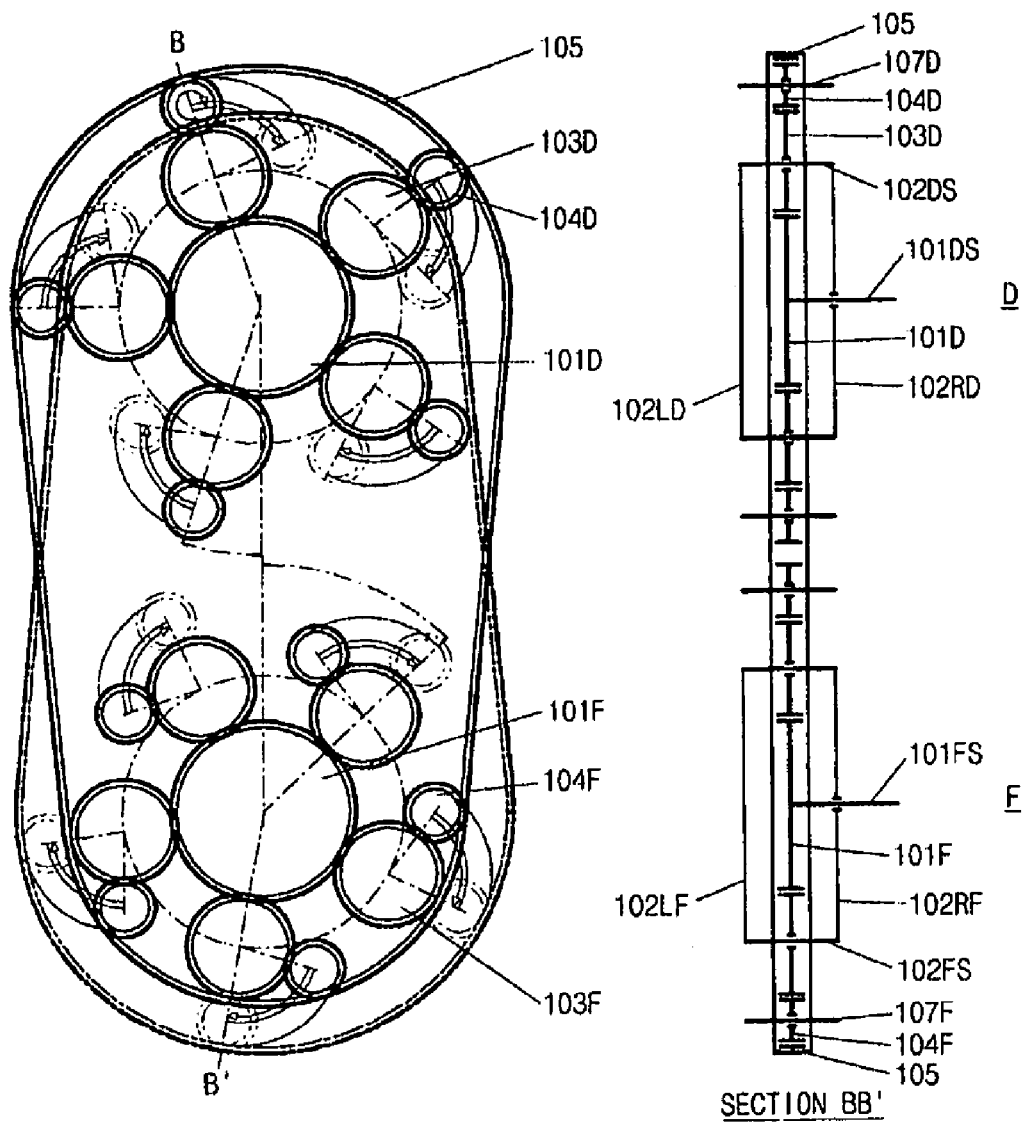
[Fig. 2]
[TRANSMISSION SYSTEM I]

[Fig. 3]
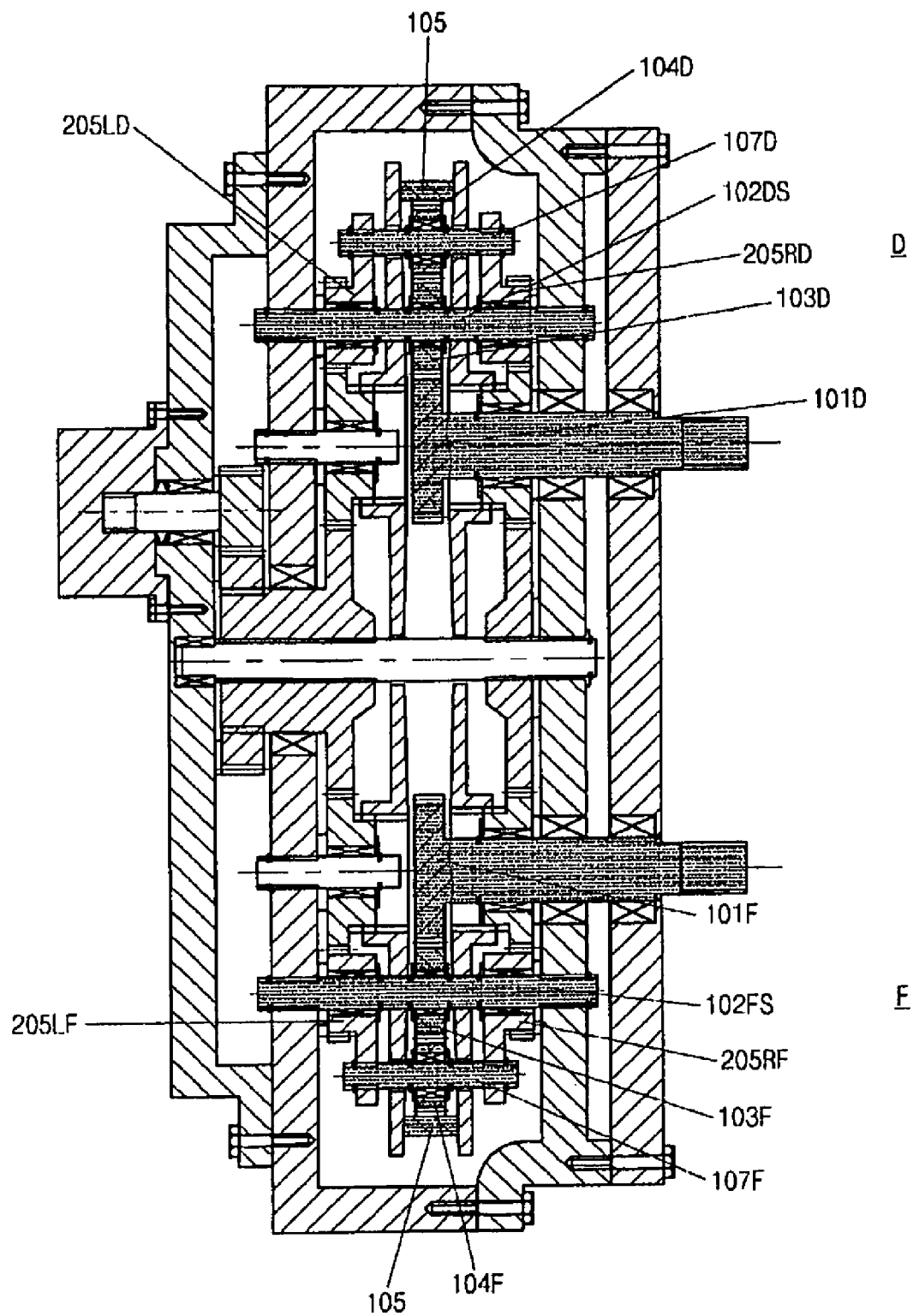

[Fig. 4]
[TRANSMISSION SYSTEM II]
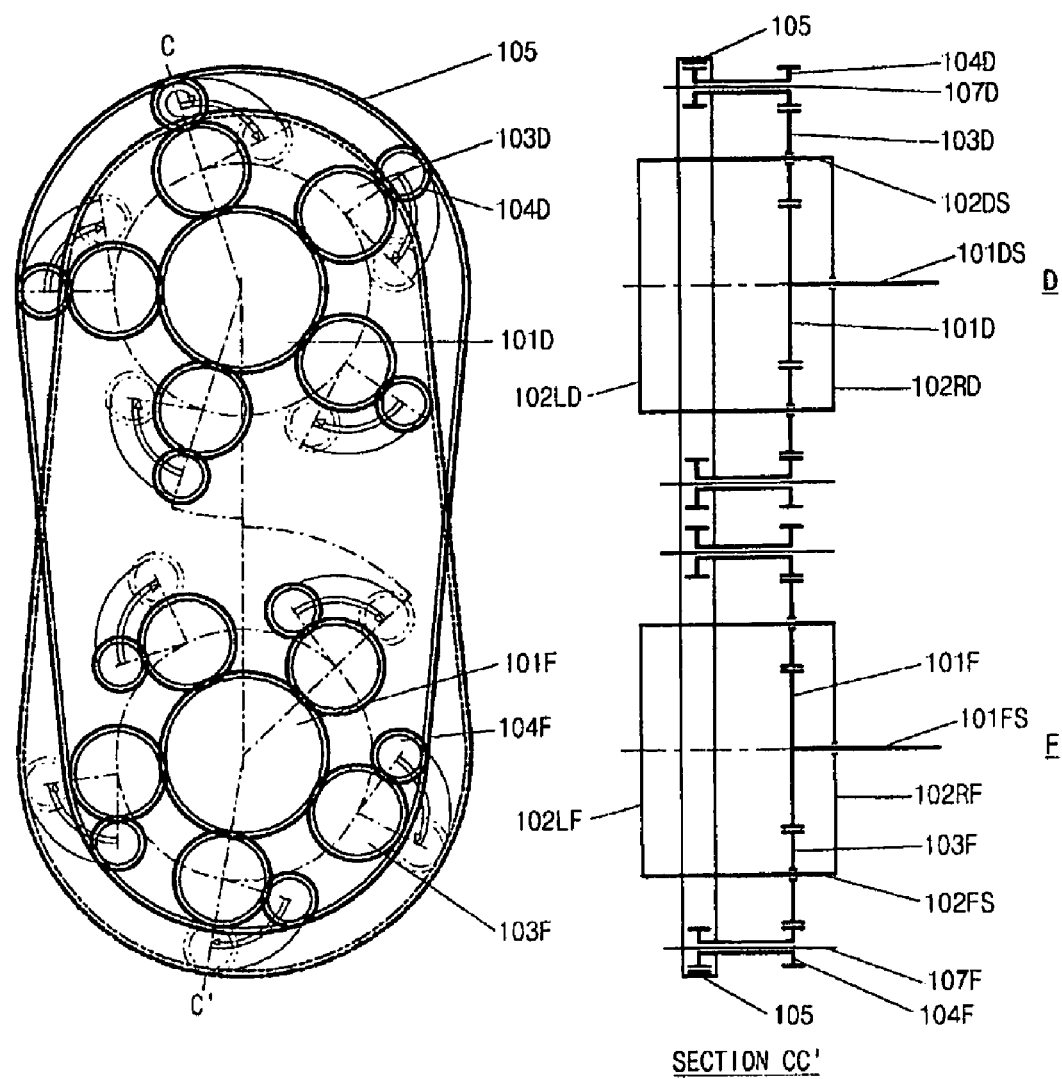
SECTION CC'

[Fig. 5]
[TRANSMISSION SYSTEM III]
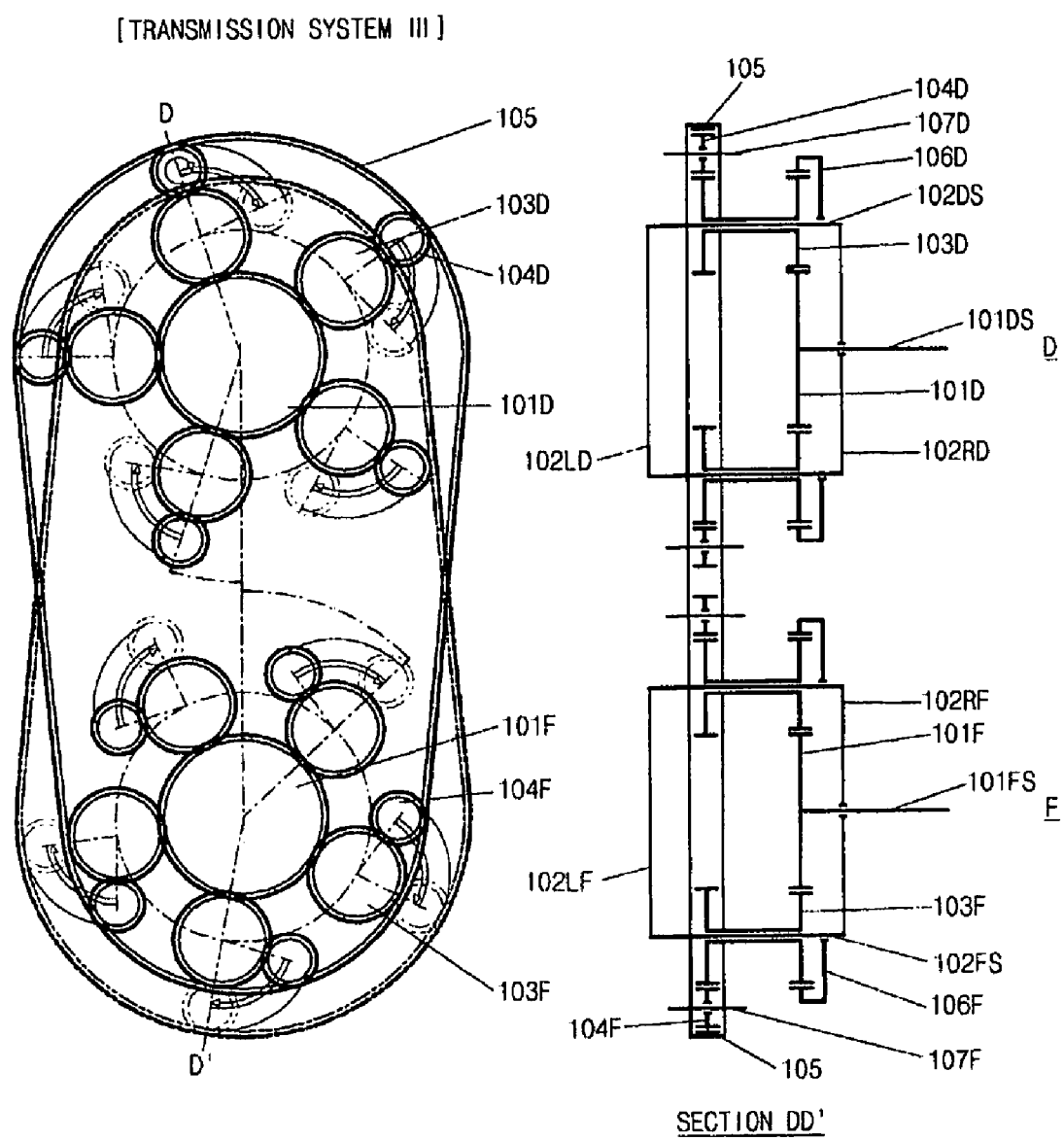
SECTION DD'

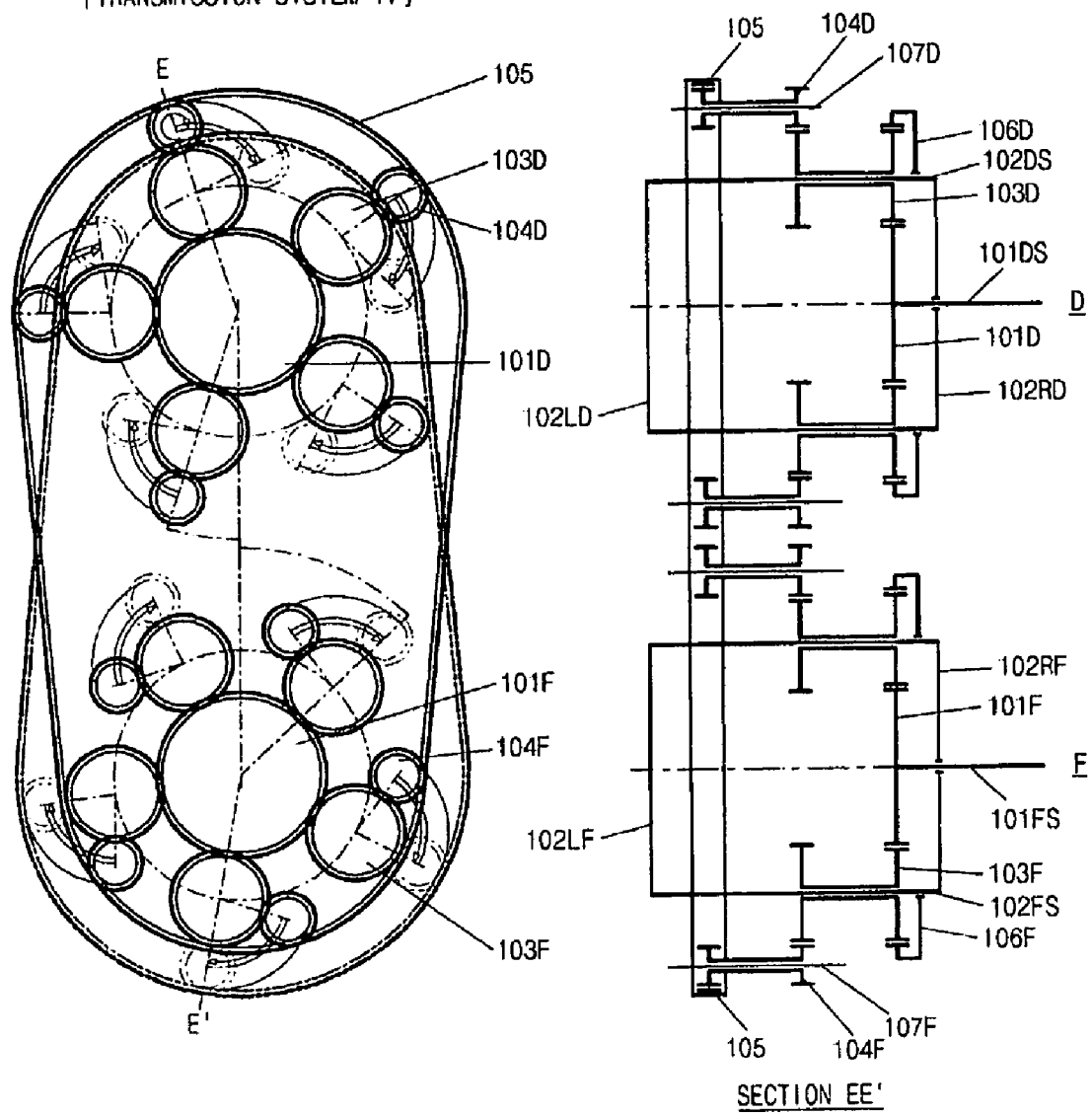

[Fig. 7]
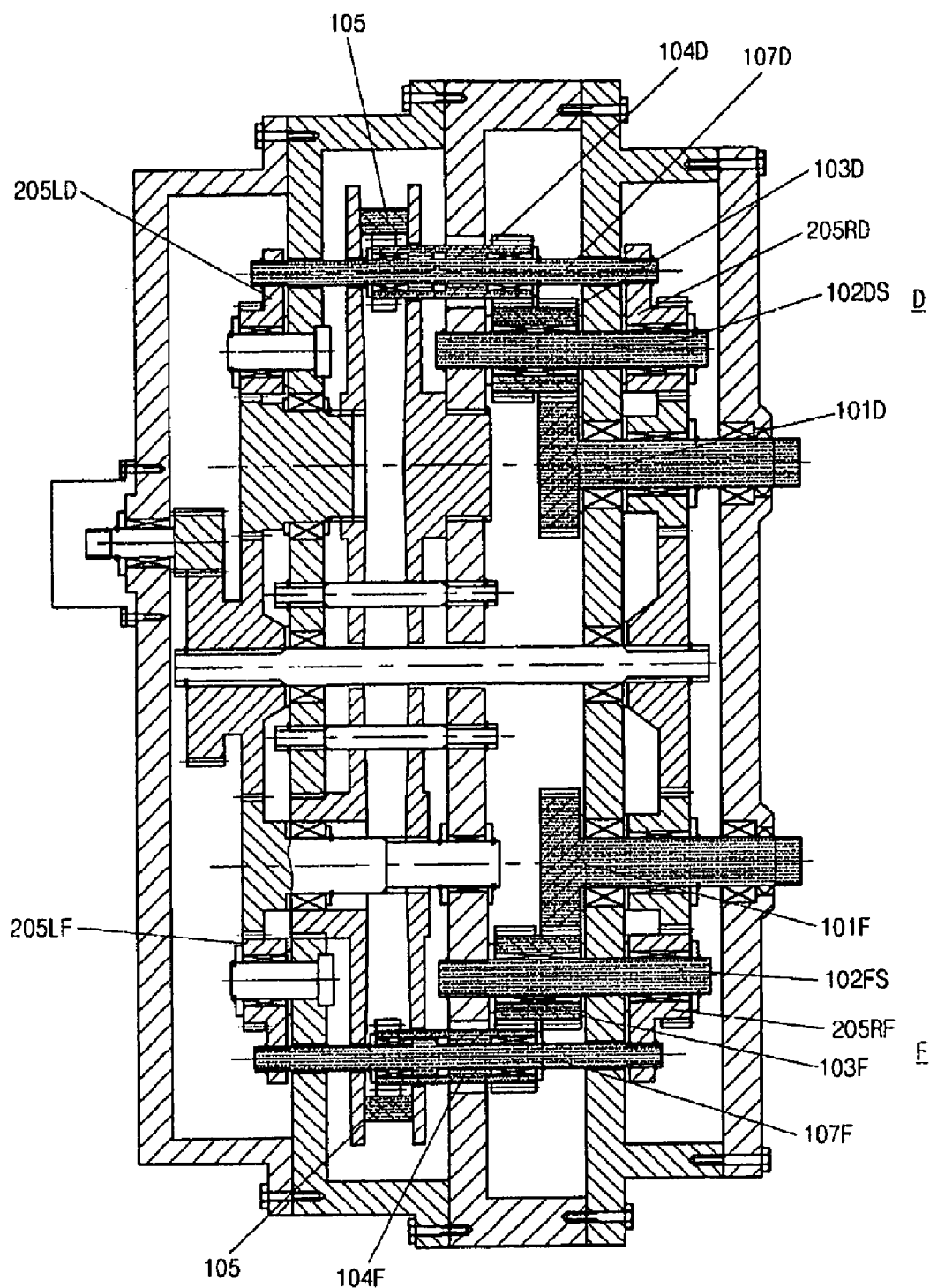

[Fig. 8]
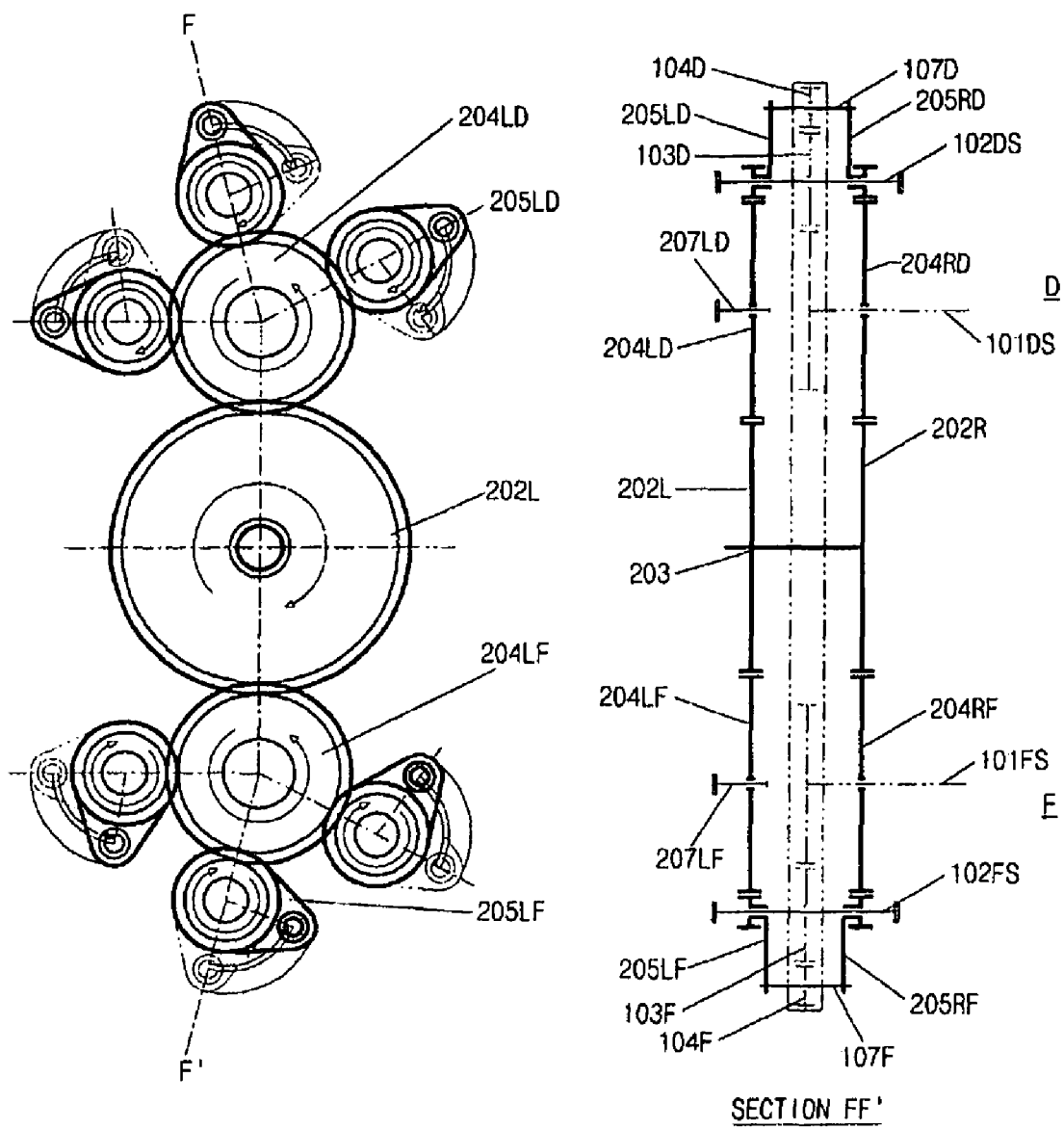

[Fig. 9]
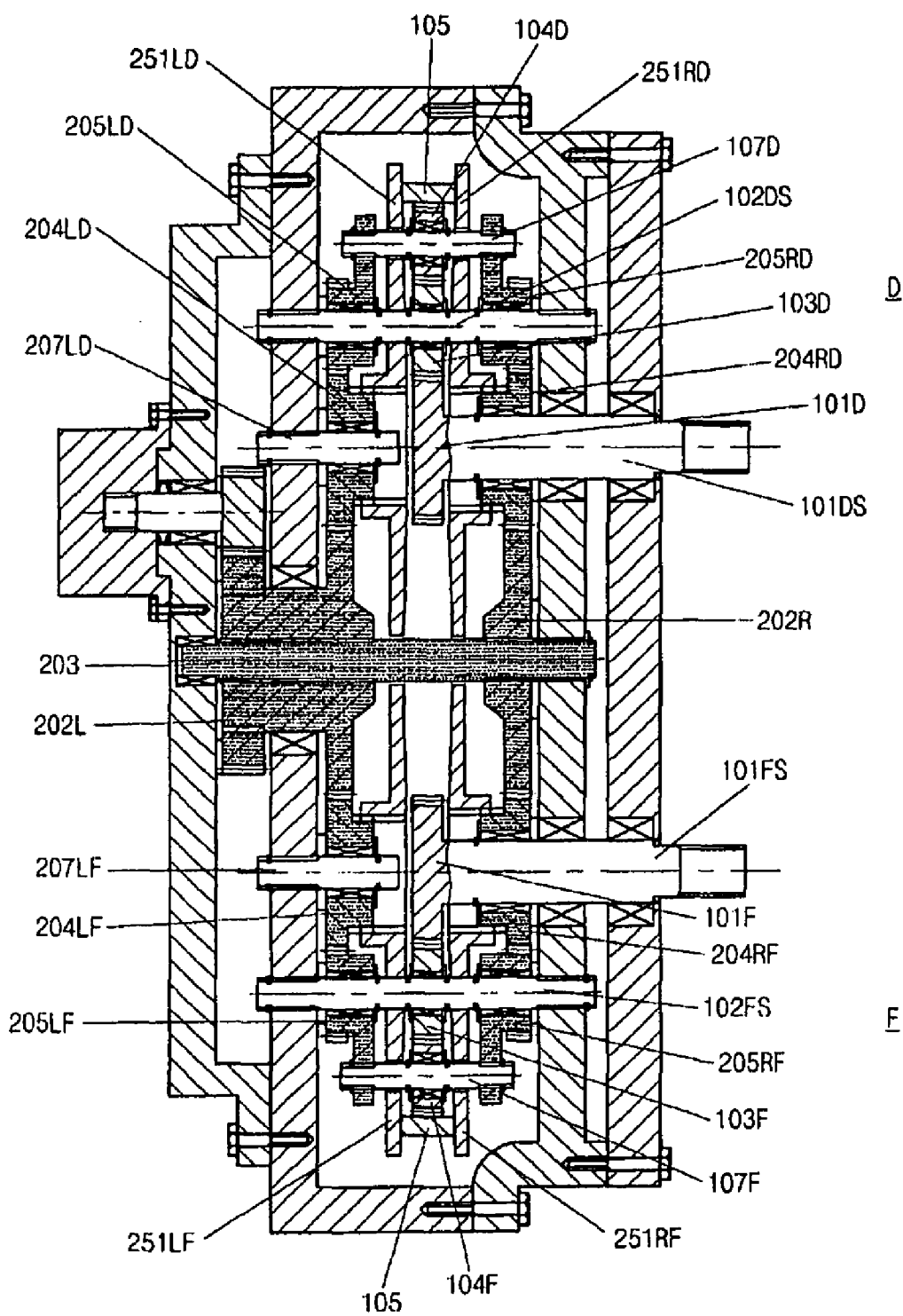

[Fig. 10]
[TRANSMISSION ADJUSTMENT SYSTEM P2]
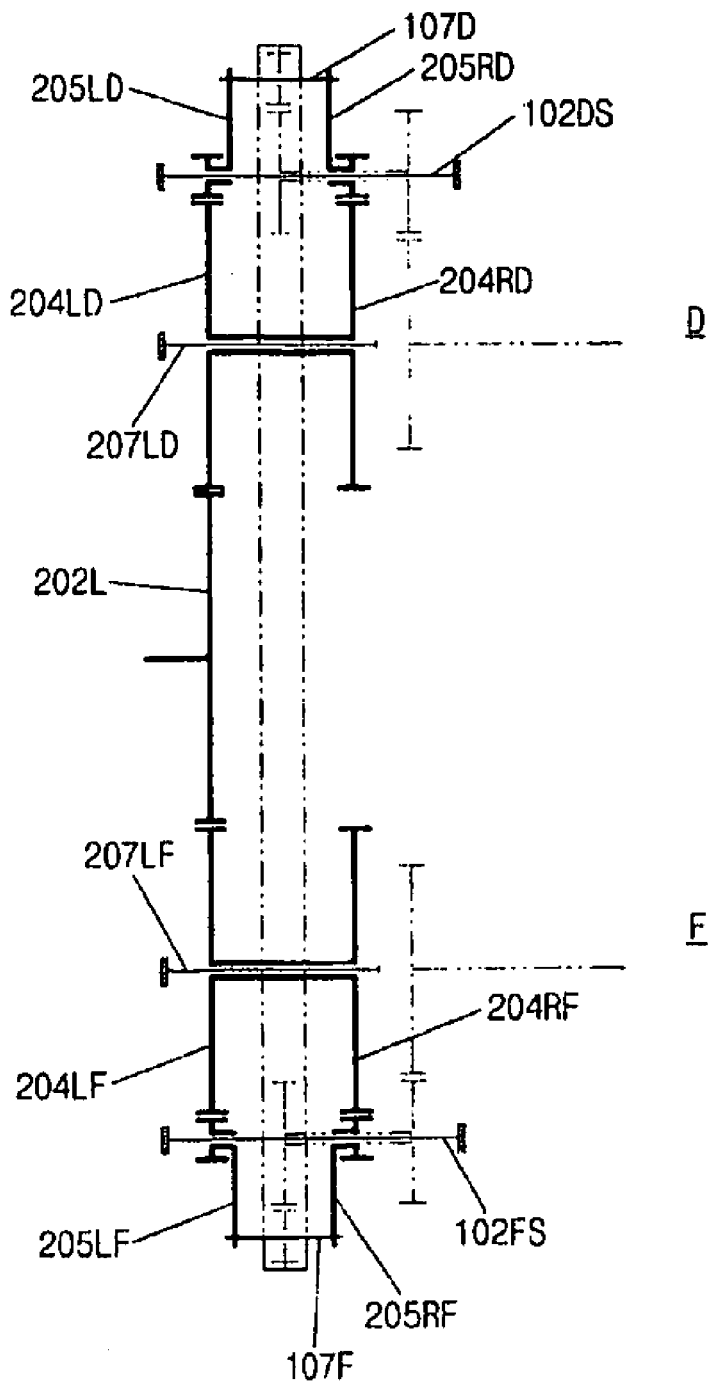

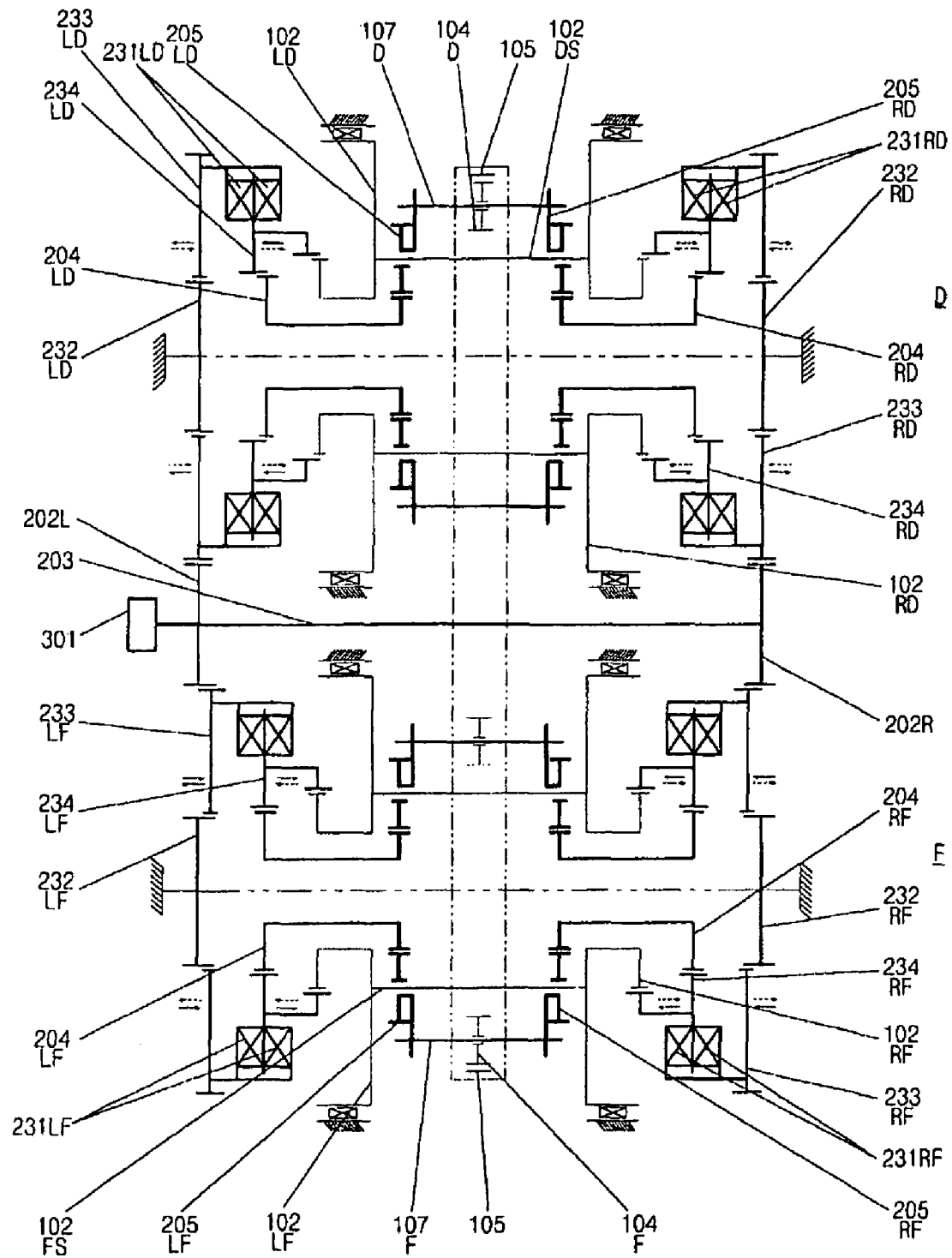
[Fig. 11]
[TRANSMISSION ADJUSTMENT SYSTEM Q1]

[Fig. 12]
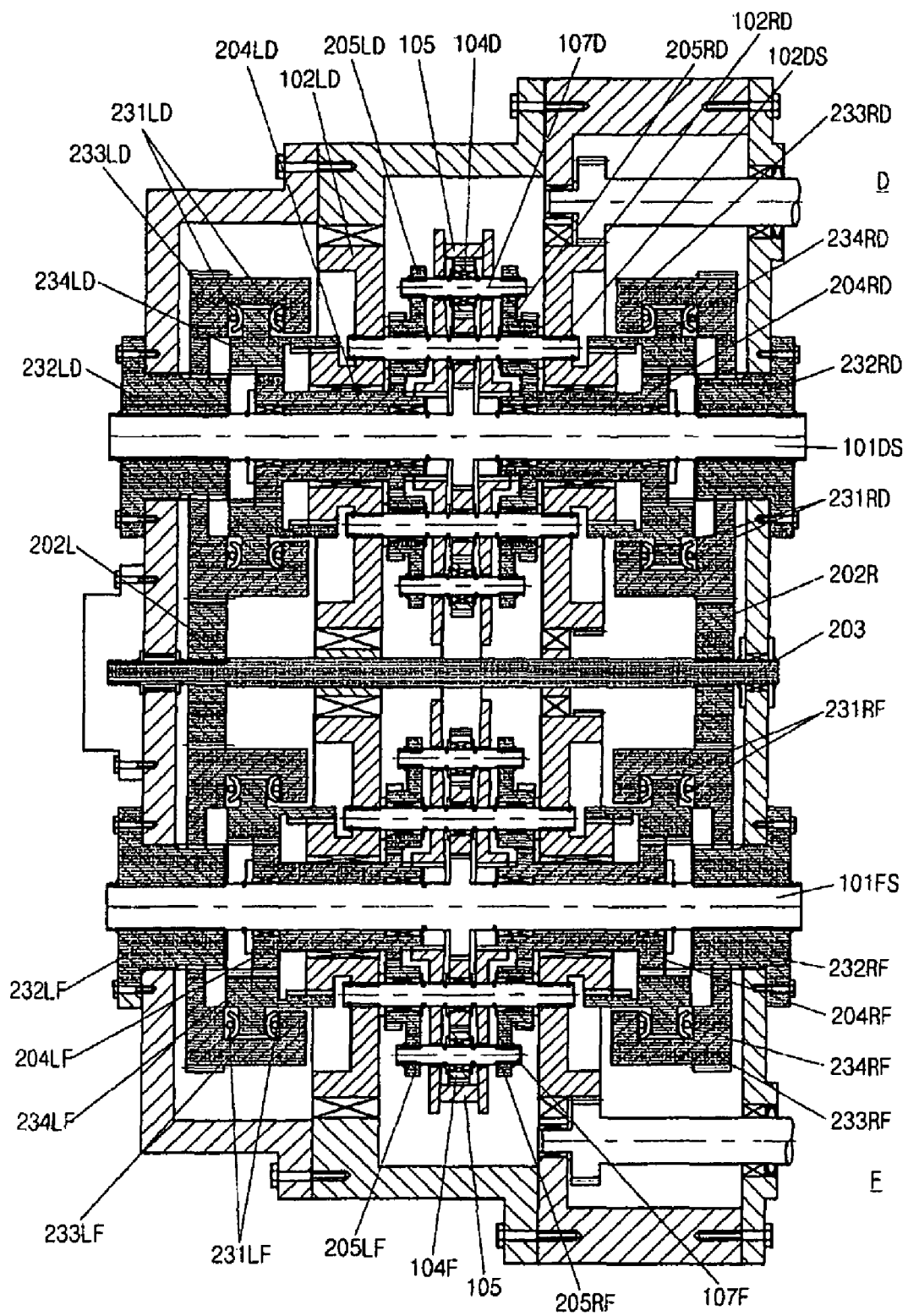

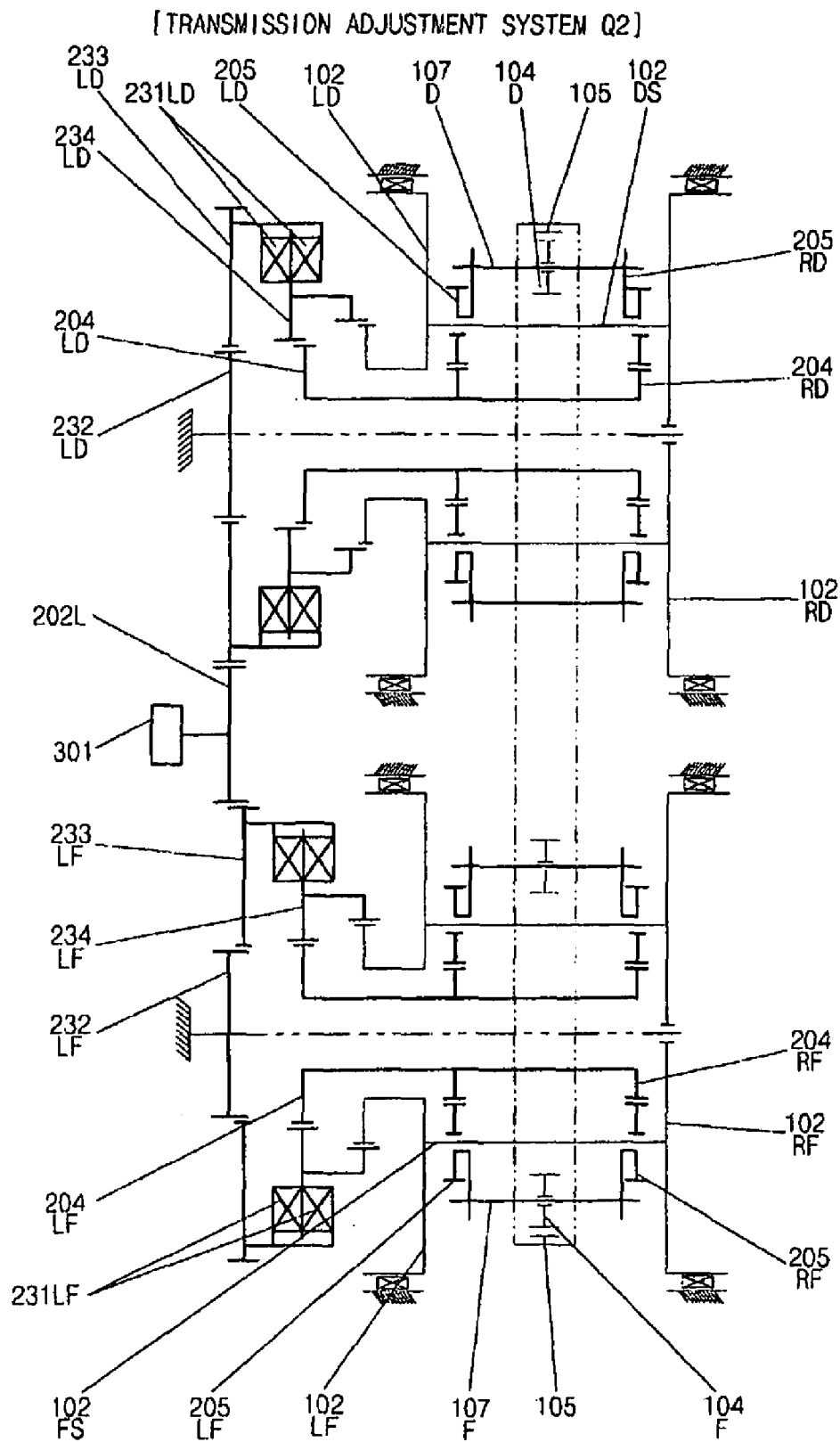
[Fig. 13]

[Fig. 14]
[TRANSMISSION ADJUSTMENT SYSTEM R1]
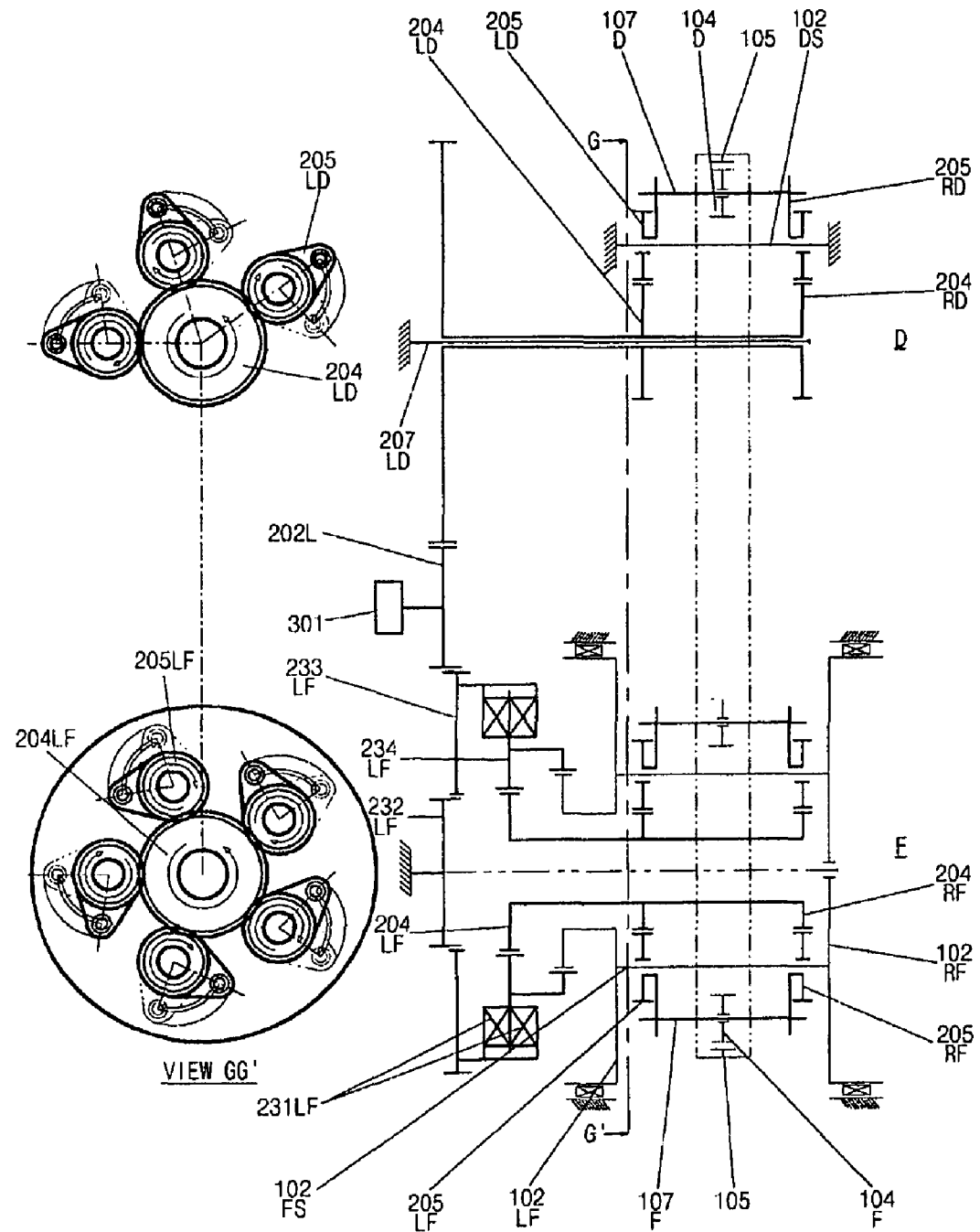

[Fig. 15]
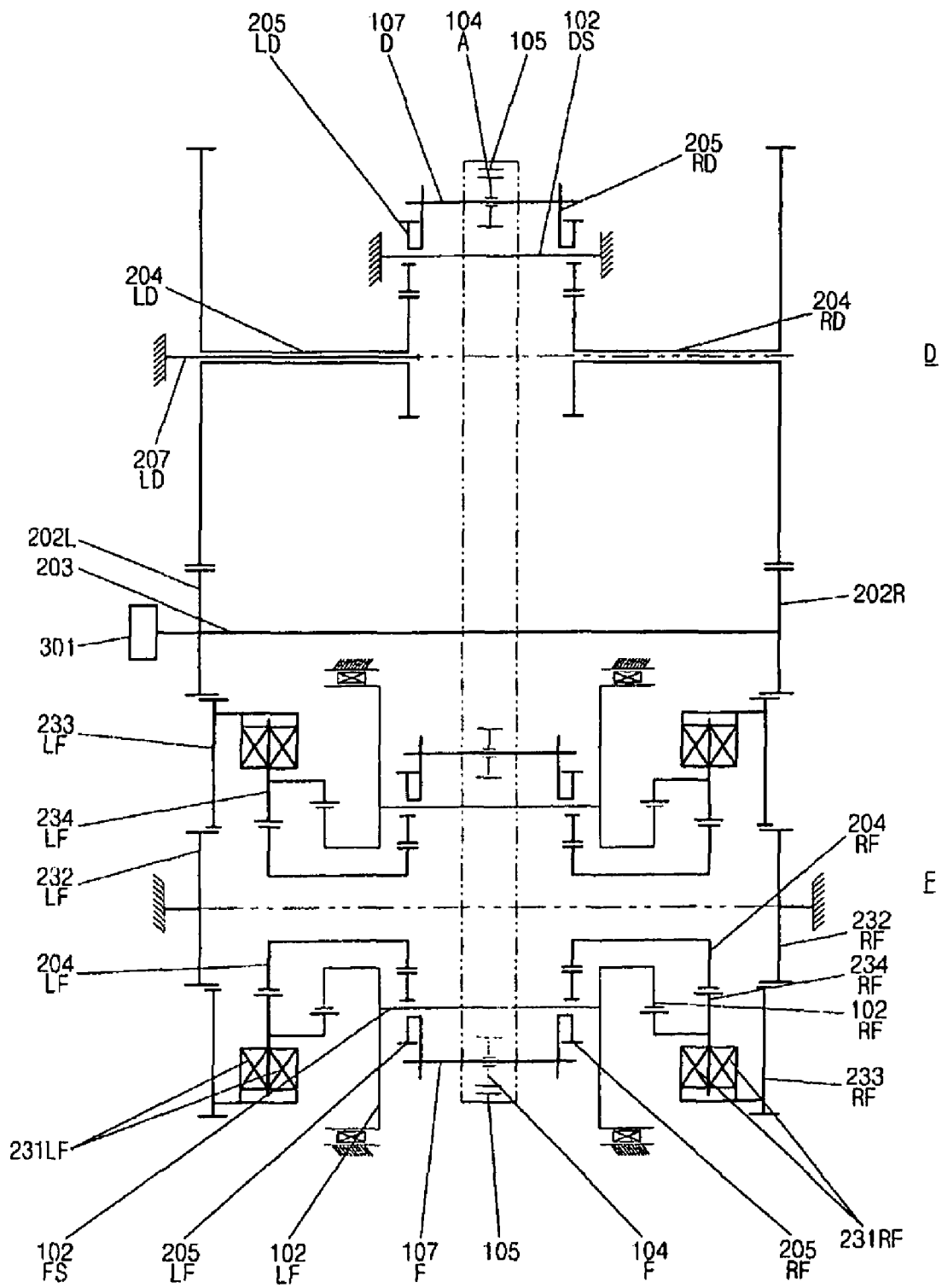

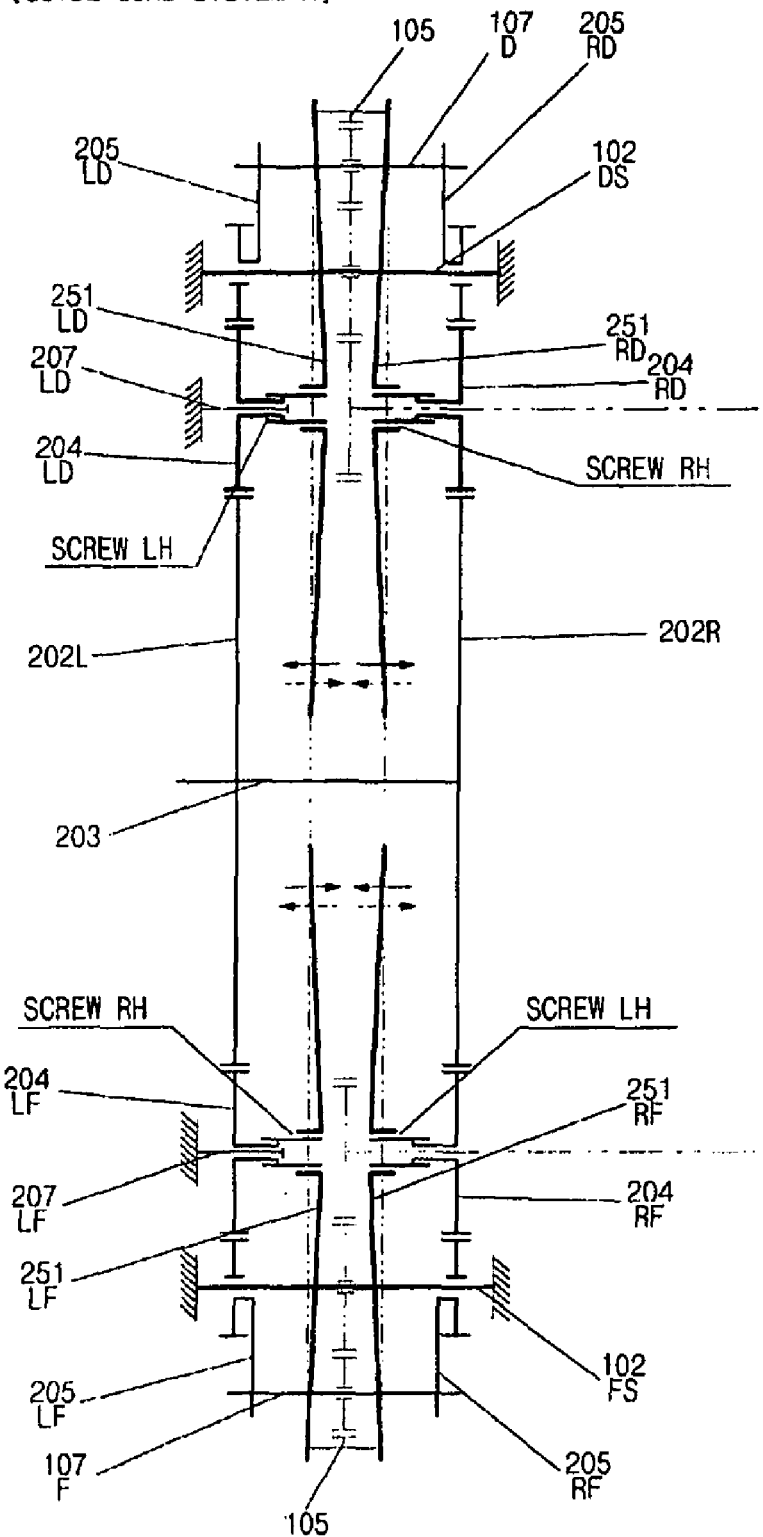
[Fig. 16]
[GUIDE CONE SYSTEM A]

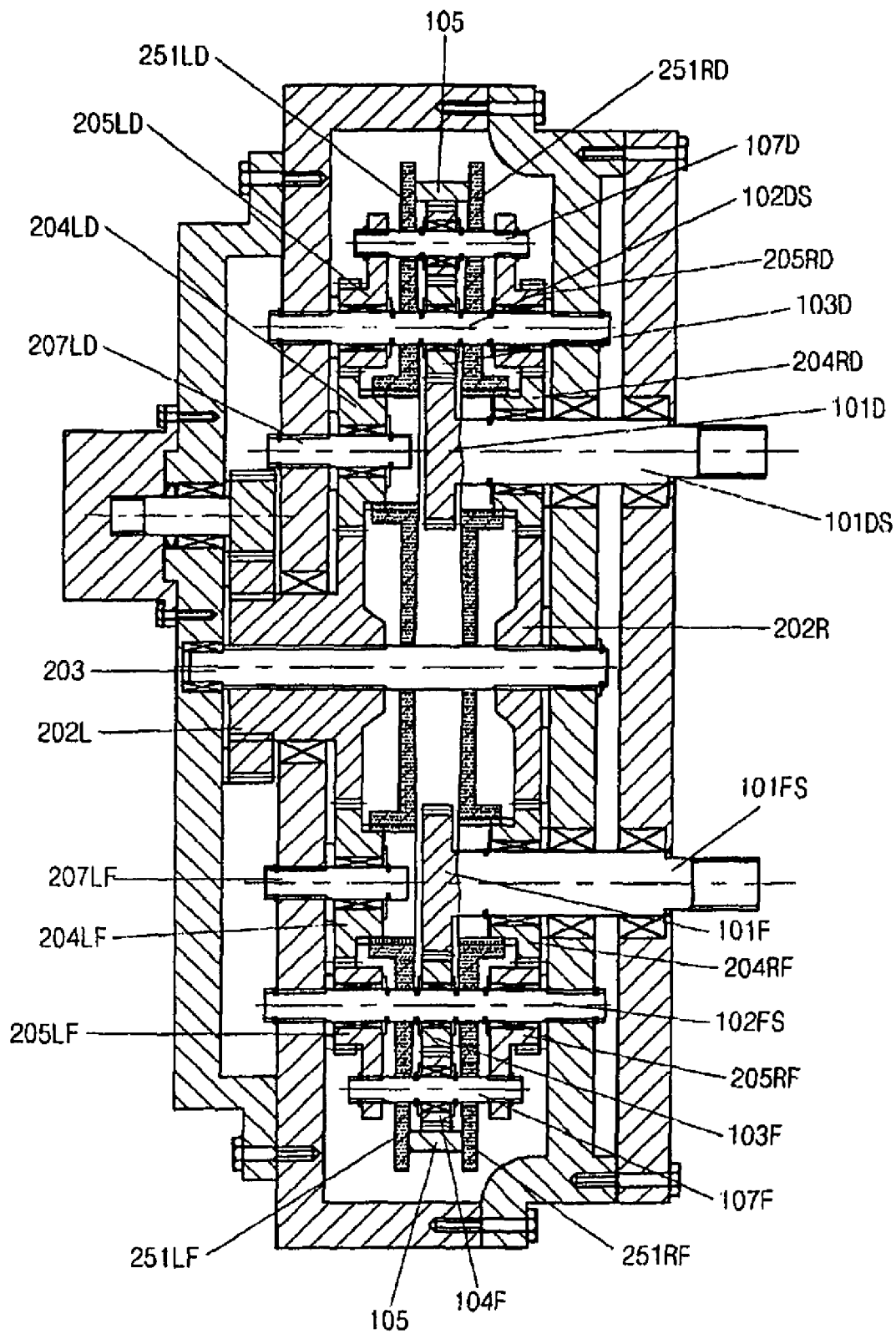
[Fig. 17]

[Fig. 18]
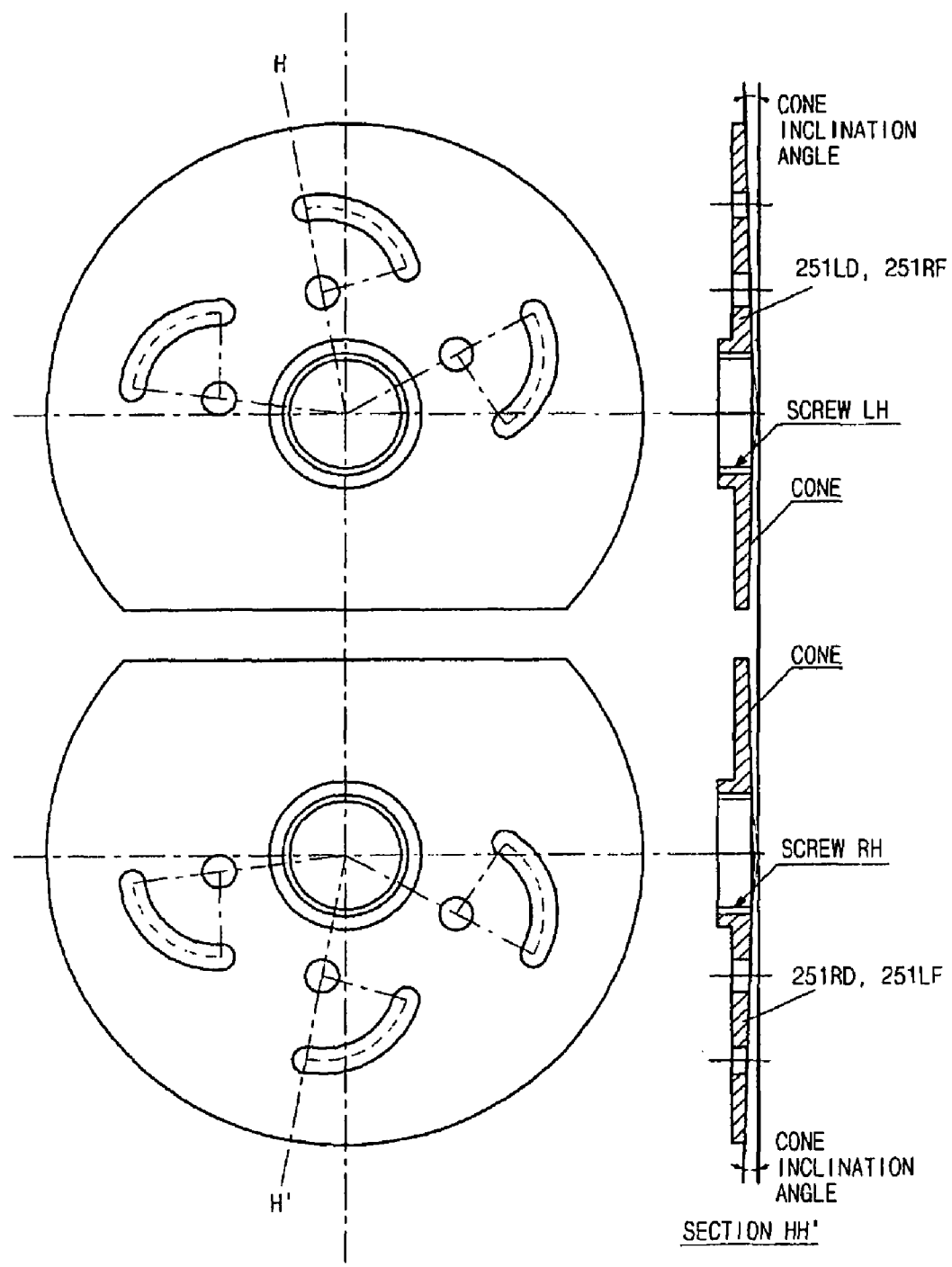

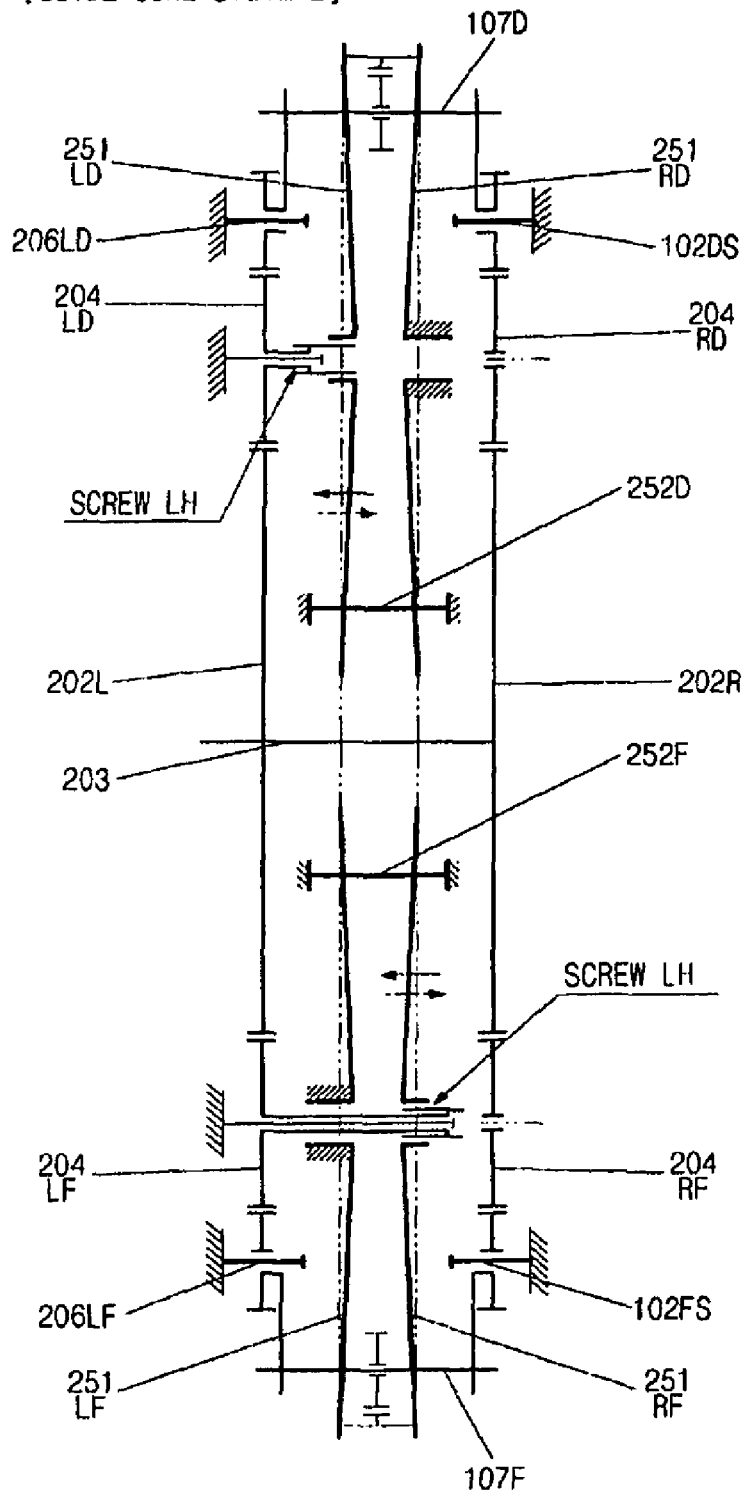
[Fig. 19]

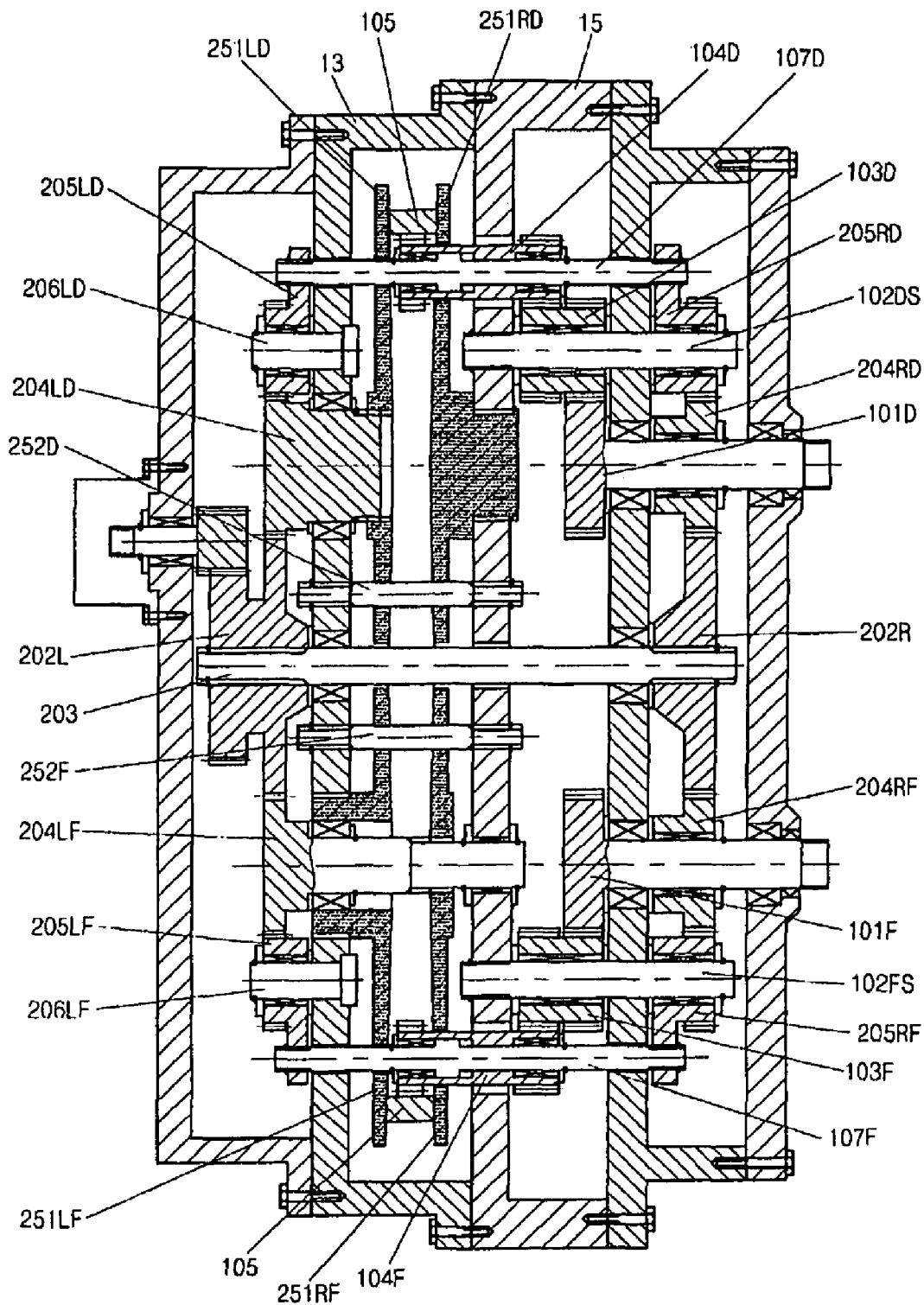
[Fig. 20]

[Fig. 21]
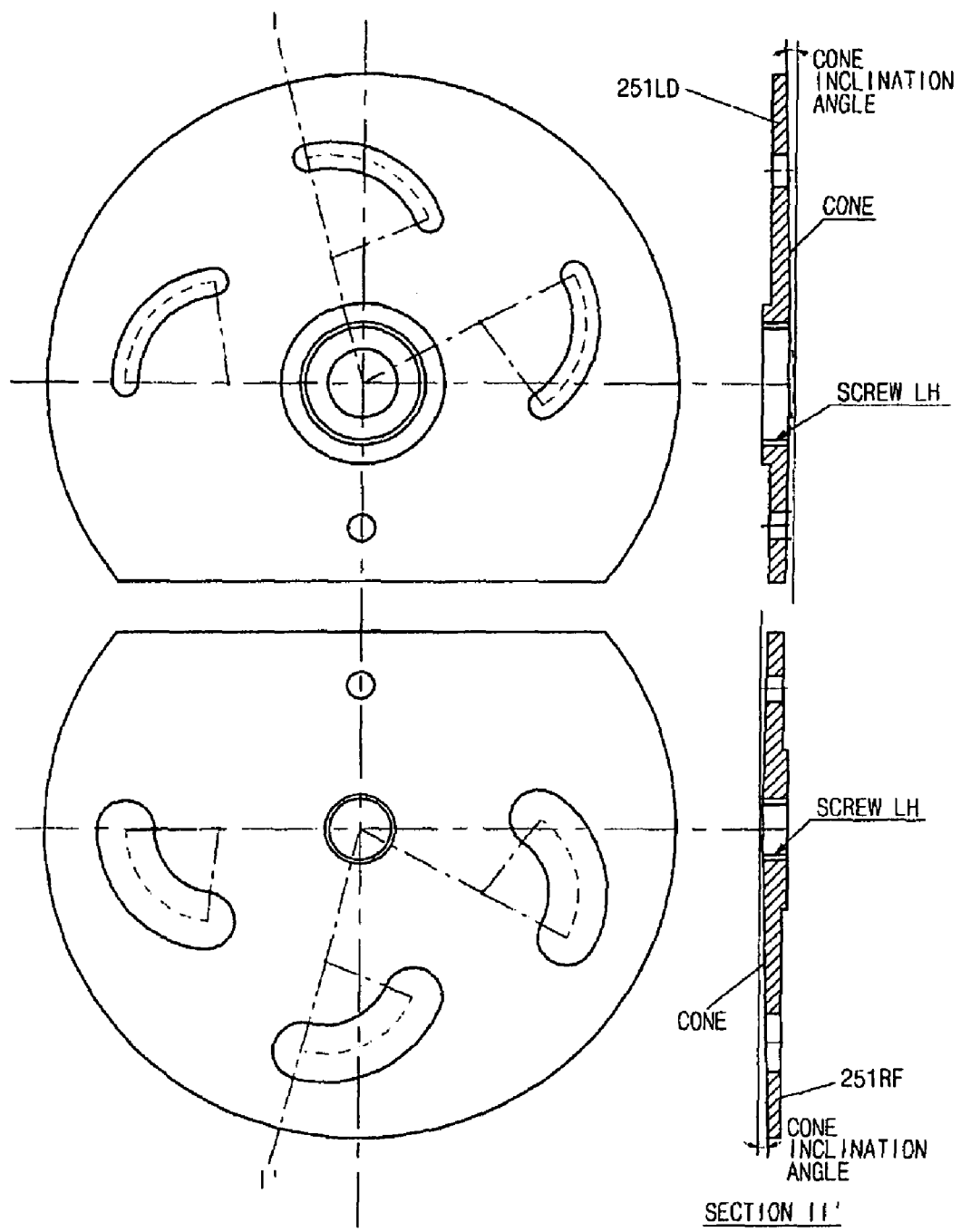

[Fig. 22]
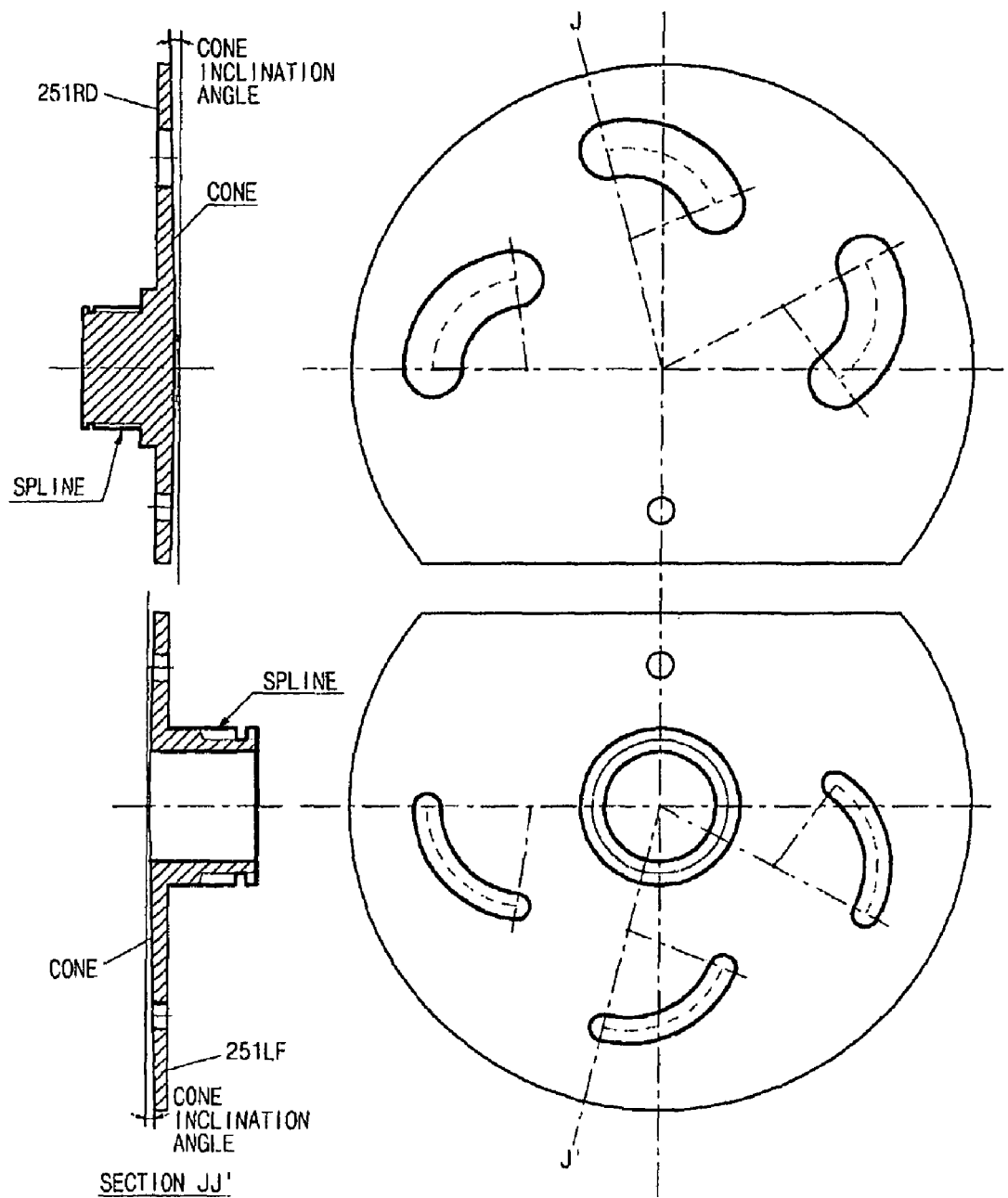

[Fig. 23]
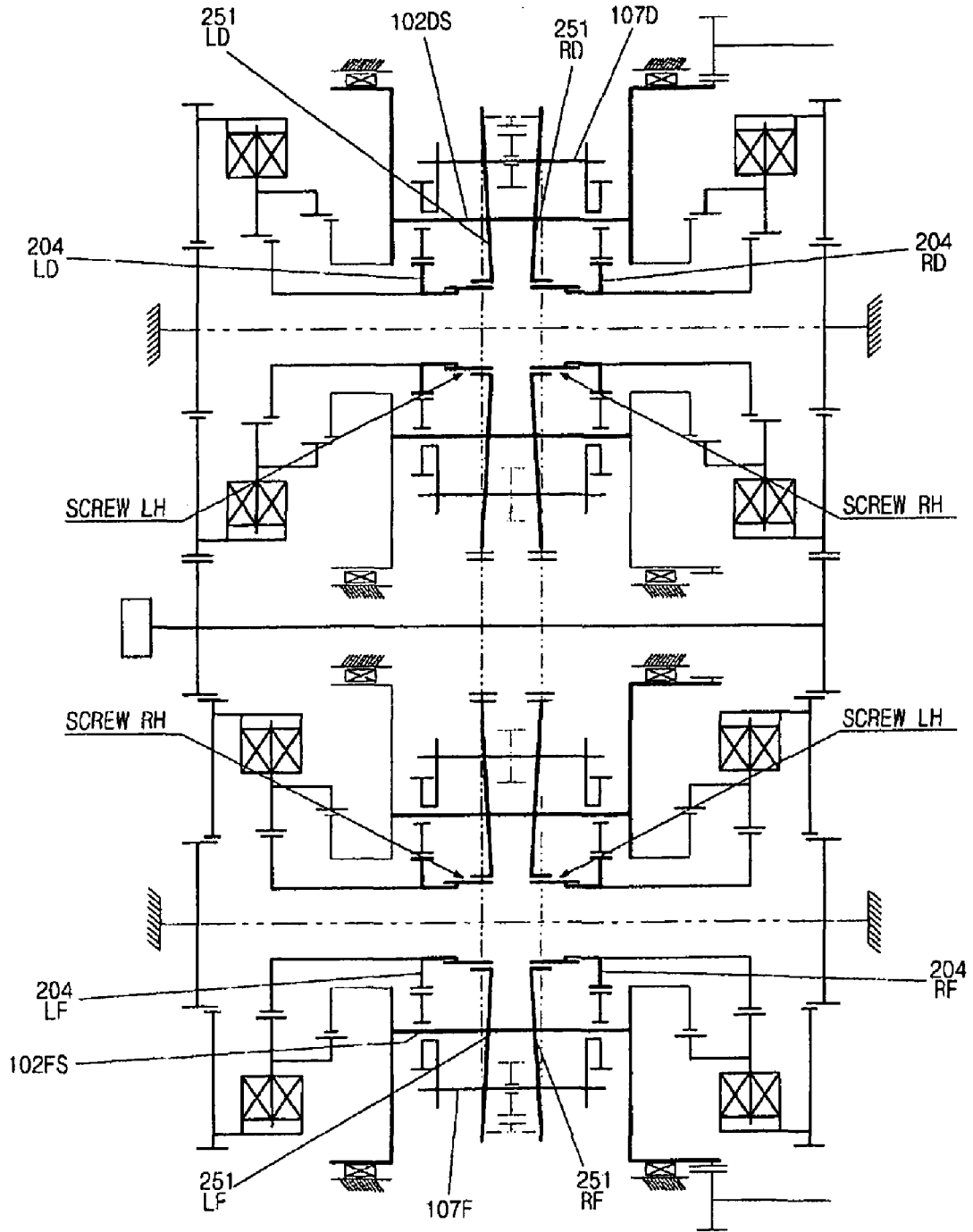

[Fig. 24]
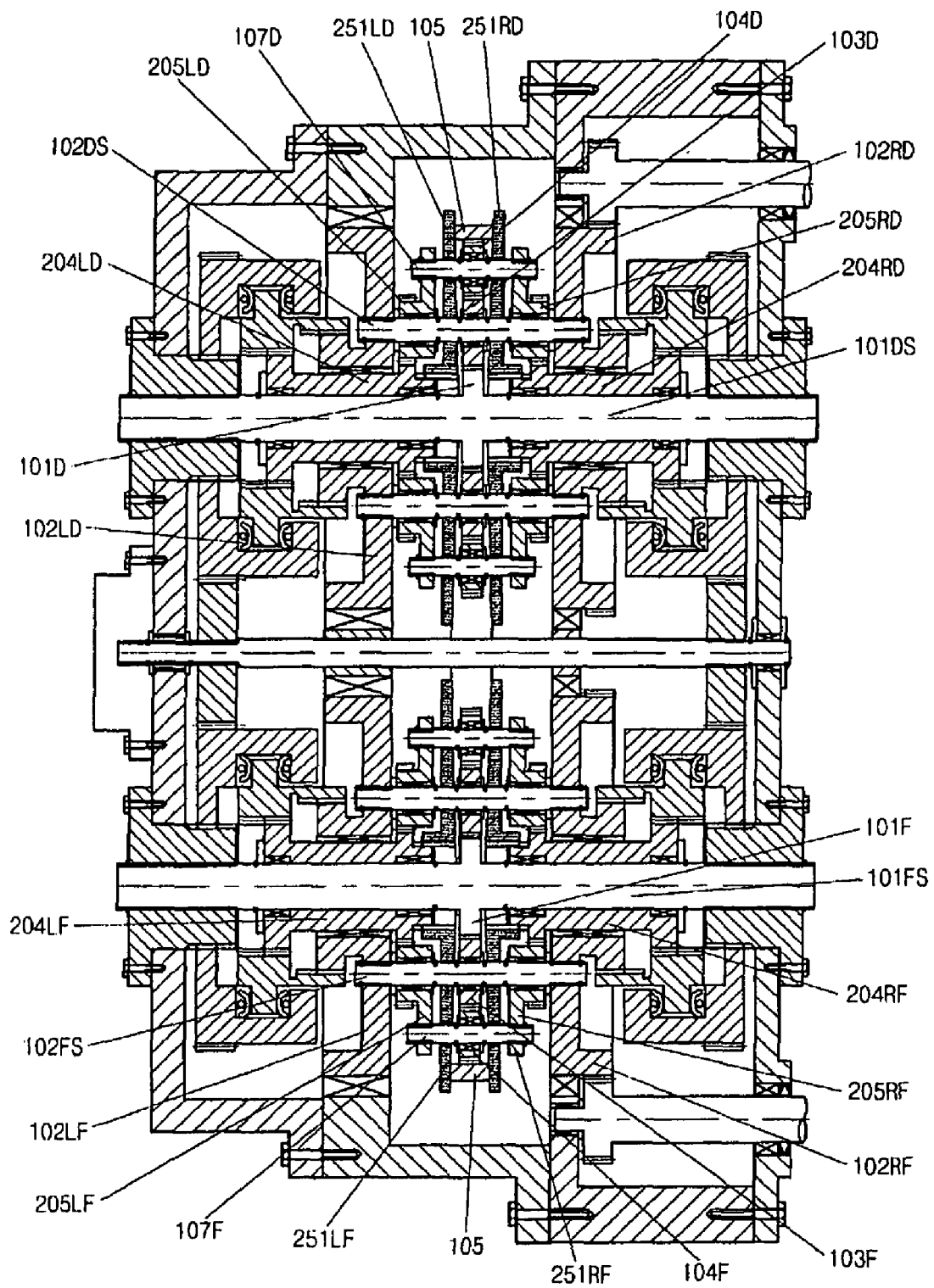

[Fig. 25]
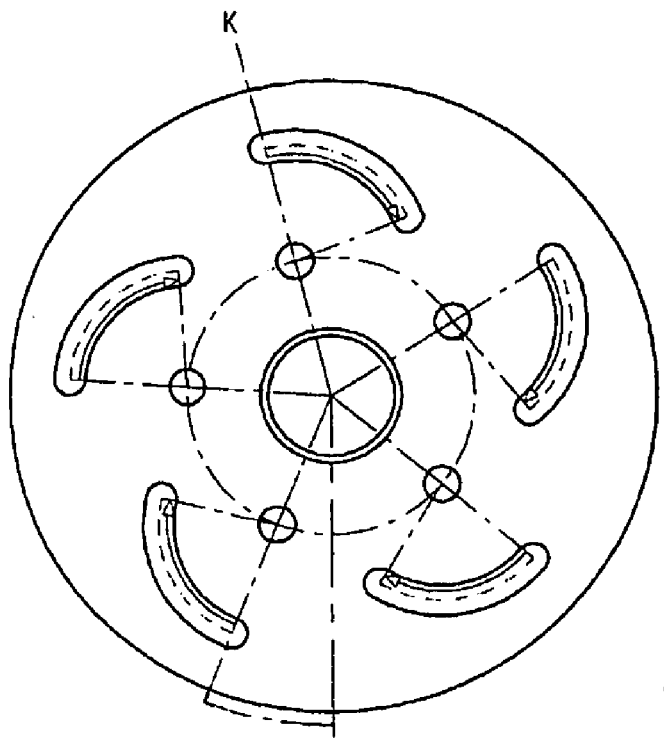
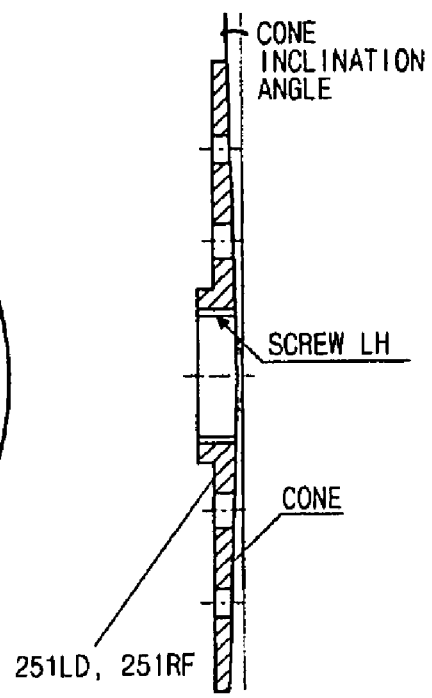
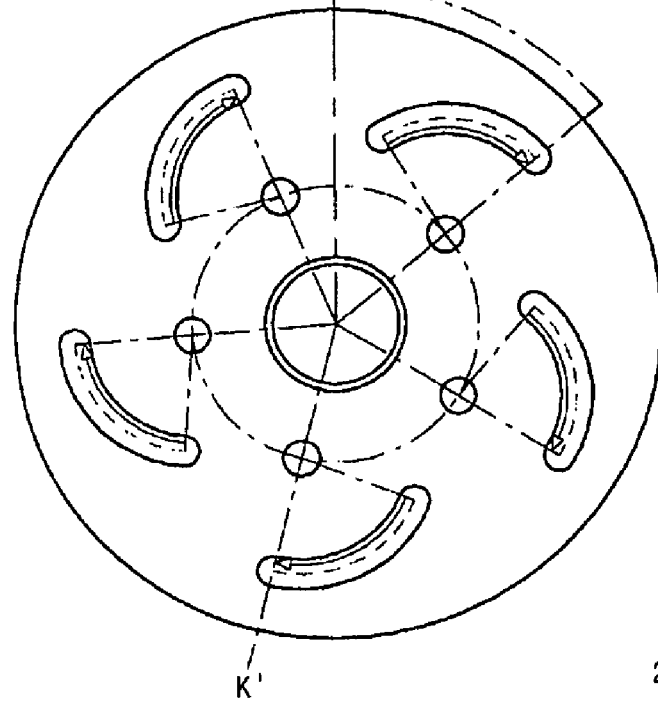
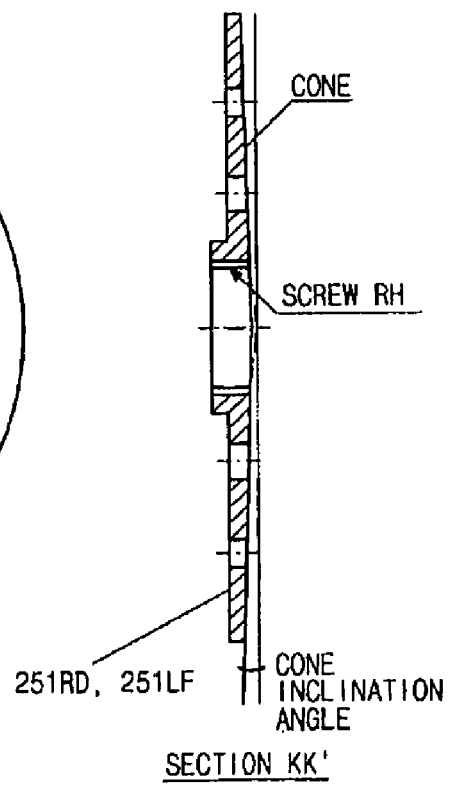
SECTION KK'

[Fig. 26]
[GUIDE CONE / TRANSMISSION ADJUSTMENT SYSTEM P1A-1]
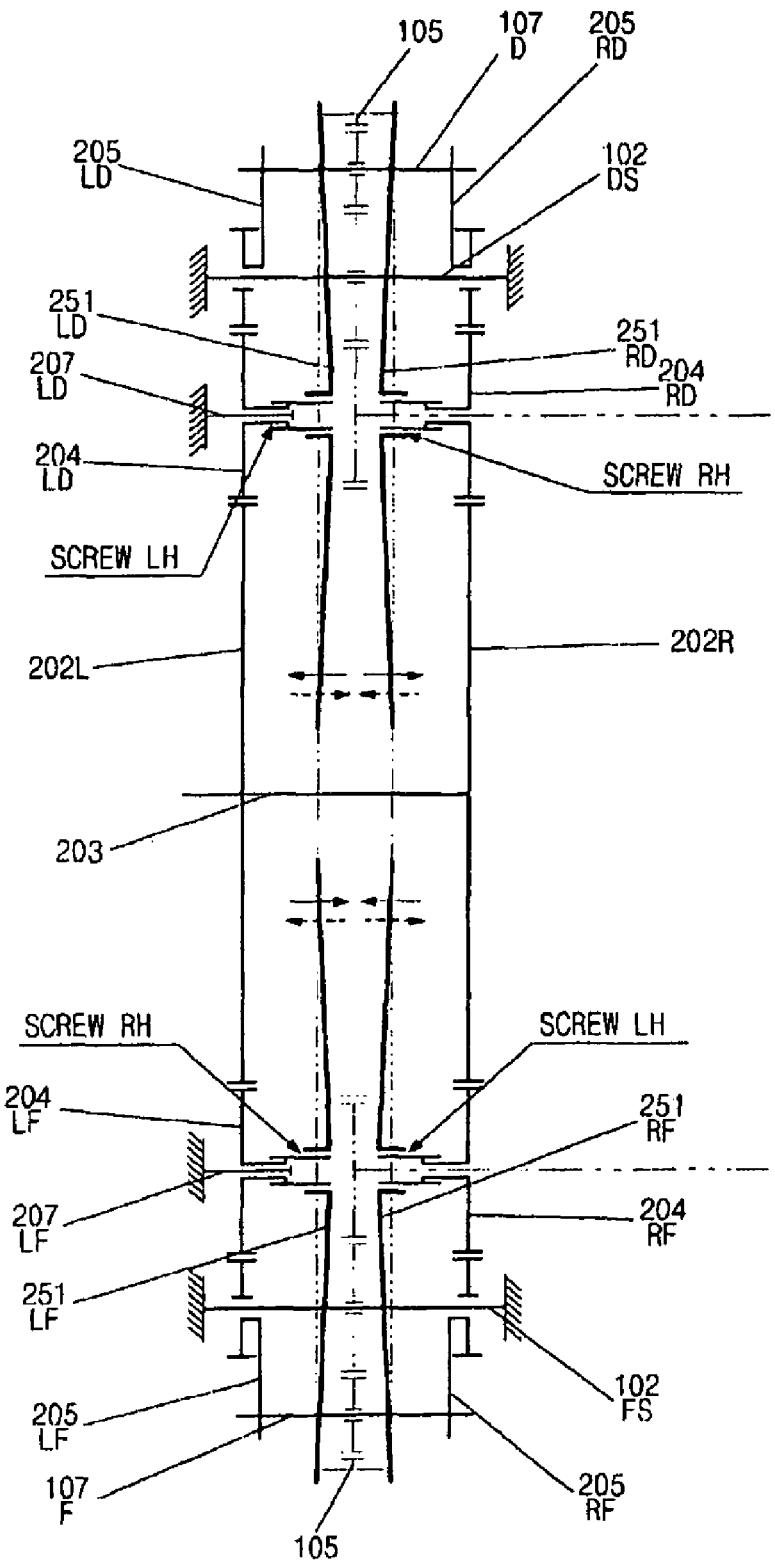

[Fig. 27]
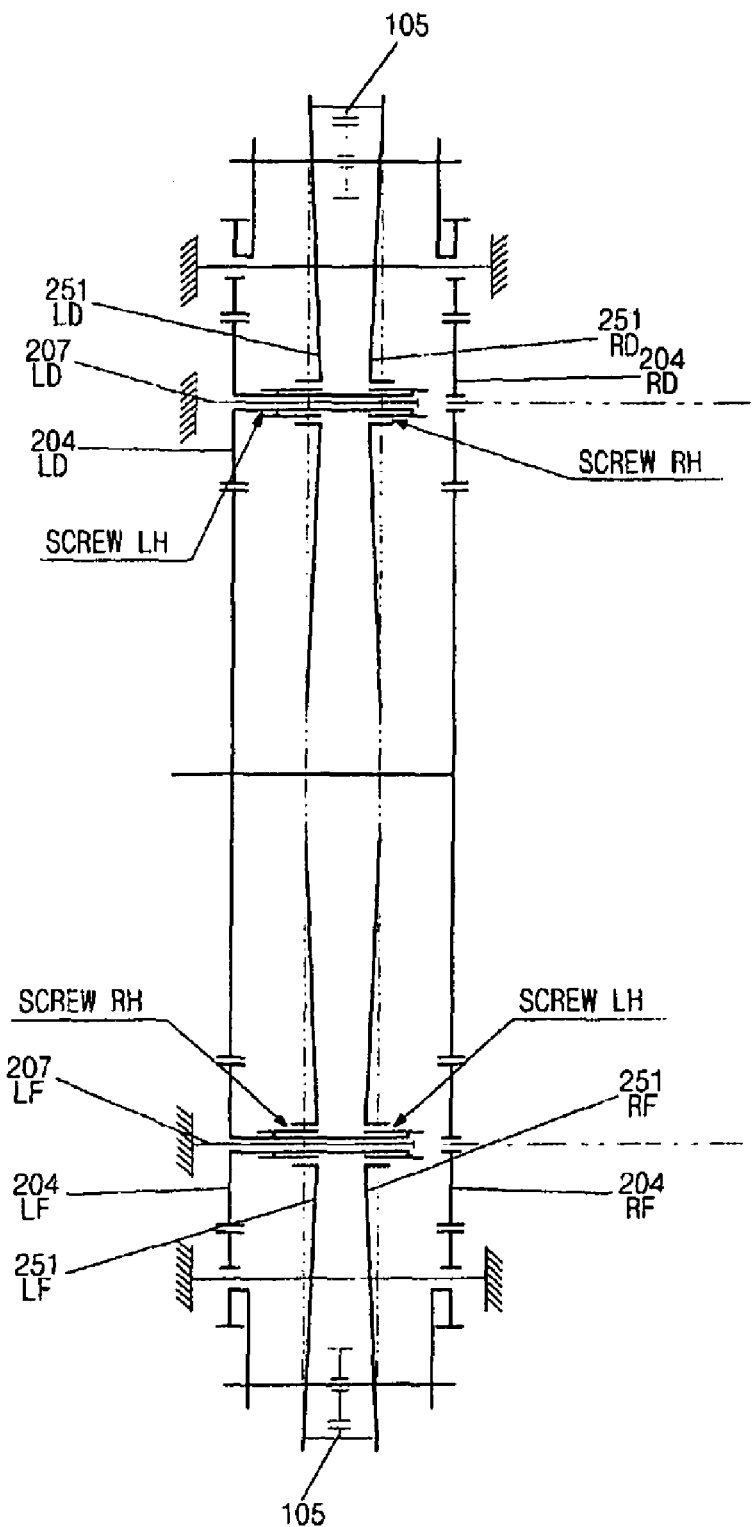

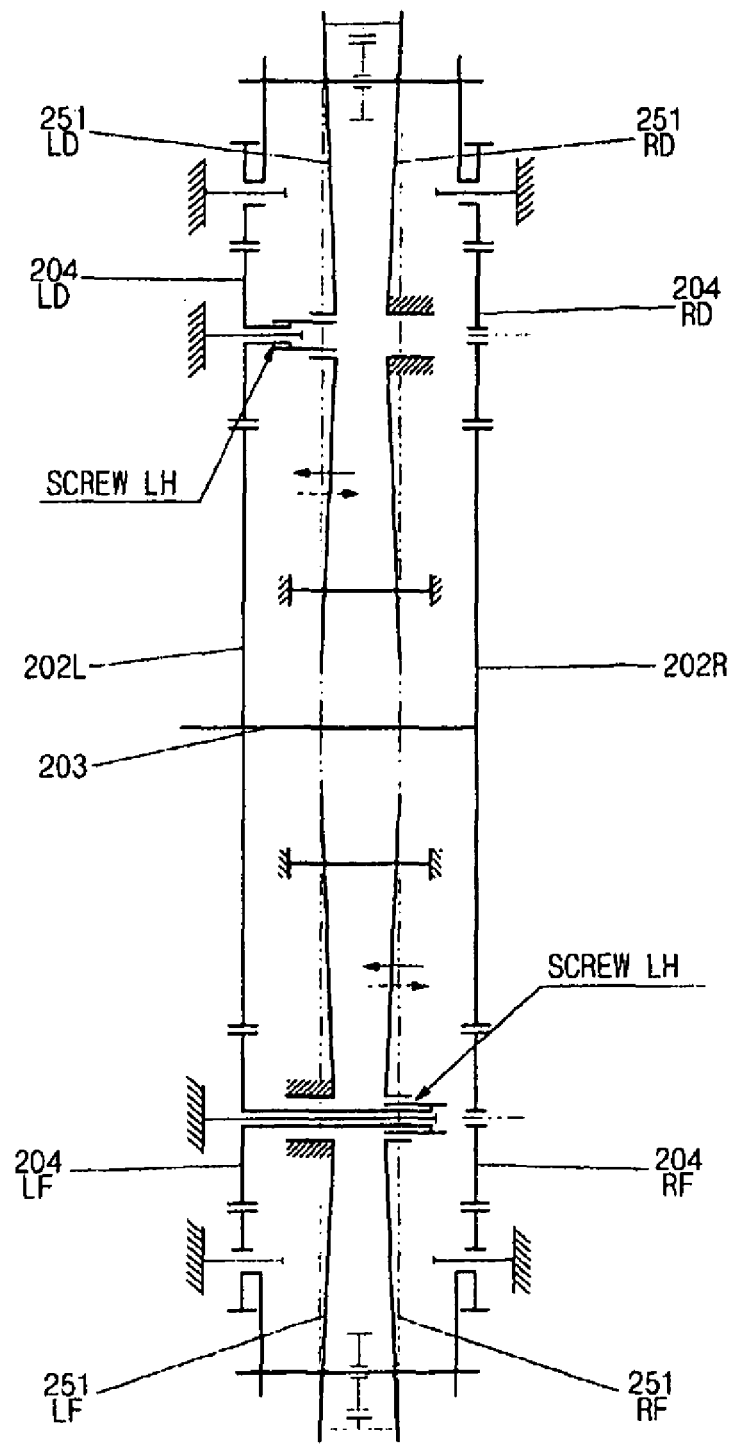
[Fig. 28]
[GUIDE CONE / TRANSMISSION ADJUSTMENT SYSTEM P1B]

[Fig. 29]
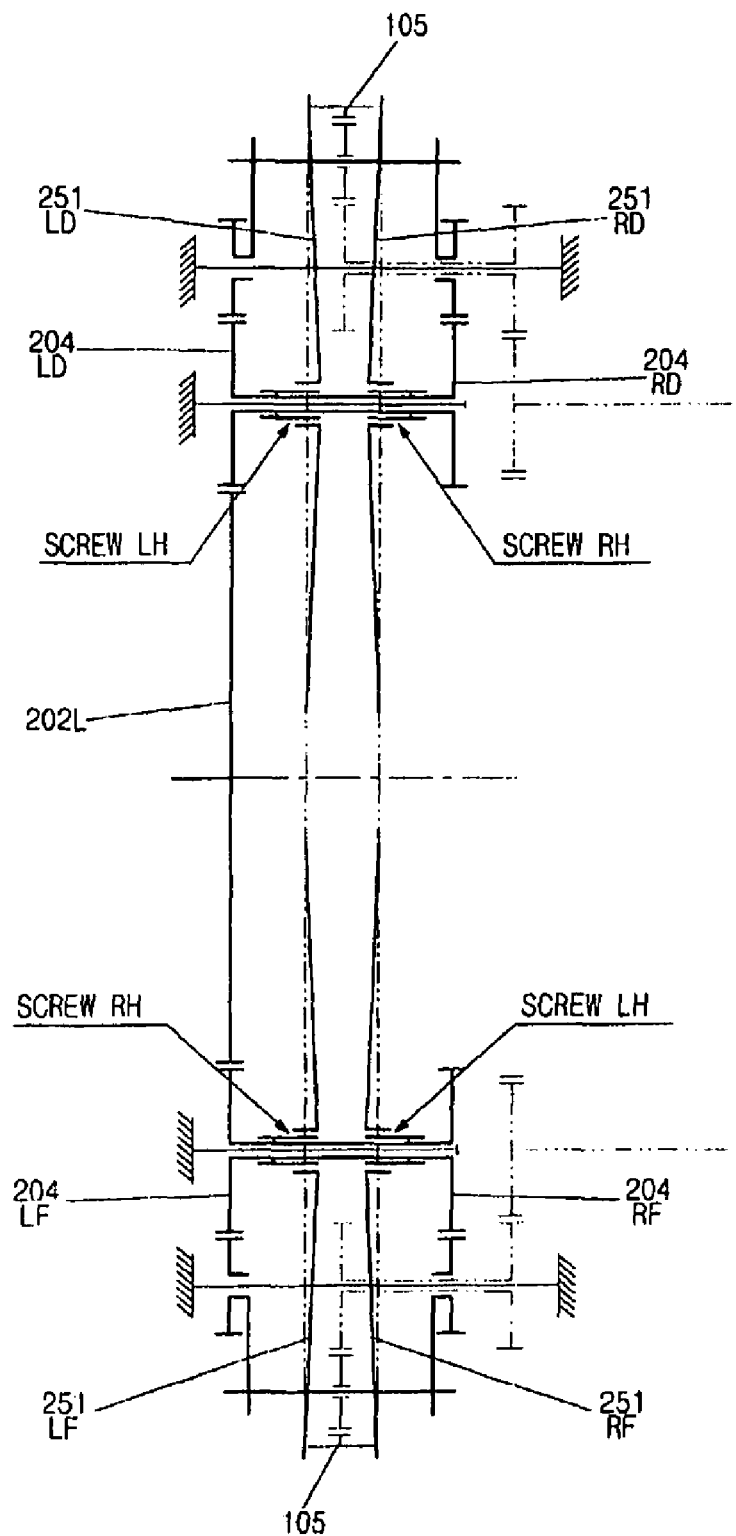

[Fig. 30]
[GUIDE CONE / TRANSMISSION ADJUSTMENT SYSTEM Q1C-1]
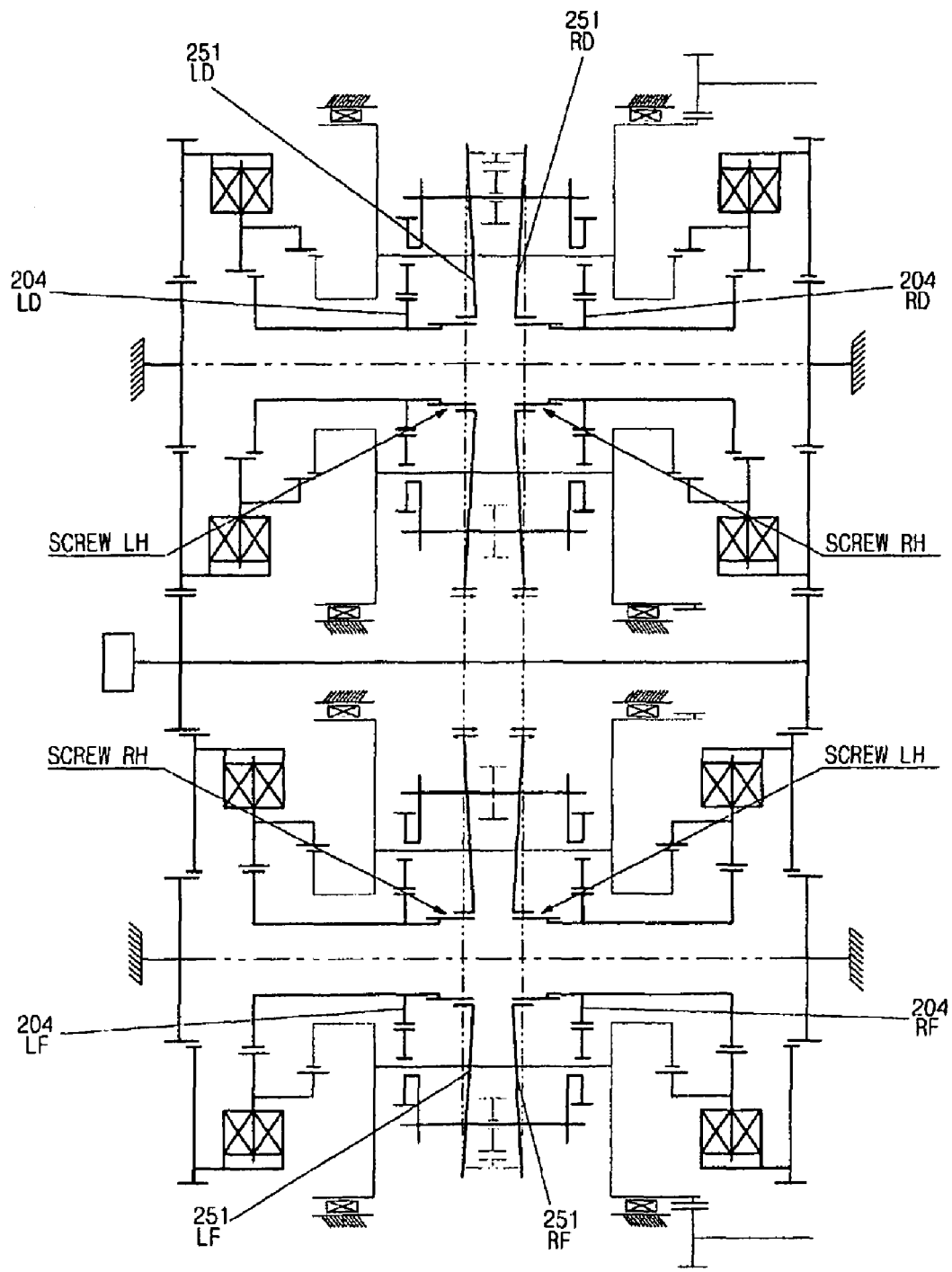

[Fig. 31]
[GUIDE CONE / TRANSMISSION ADJUSTMENT SYSTEM Q1C-2]
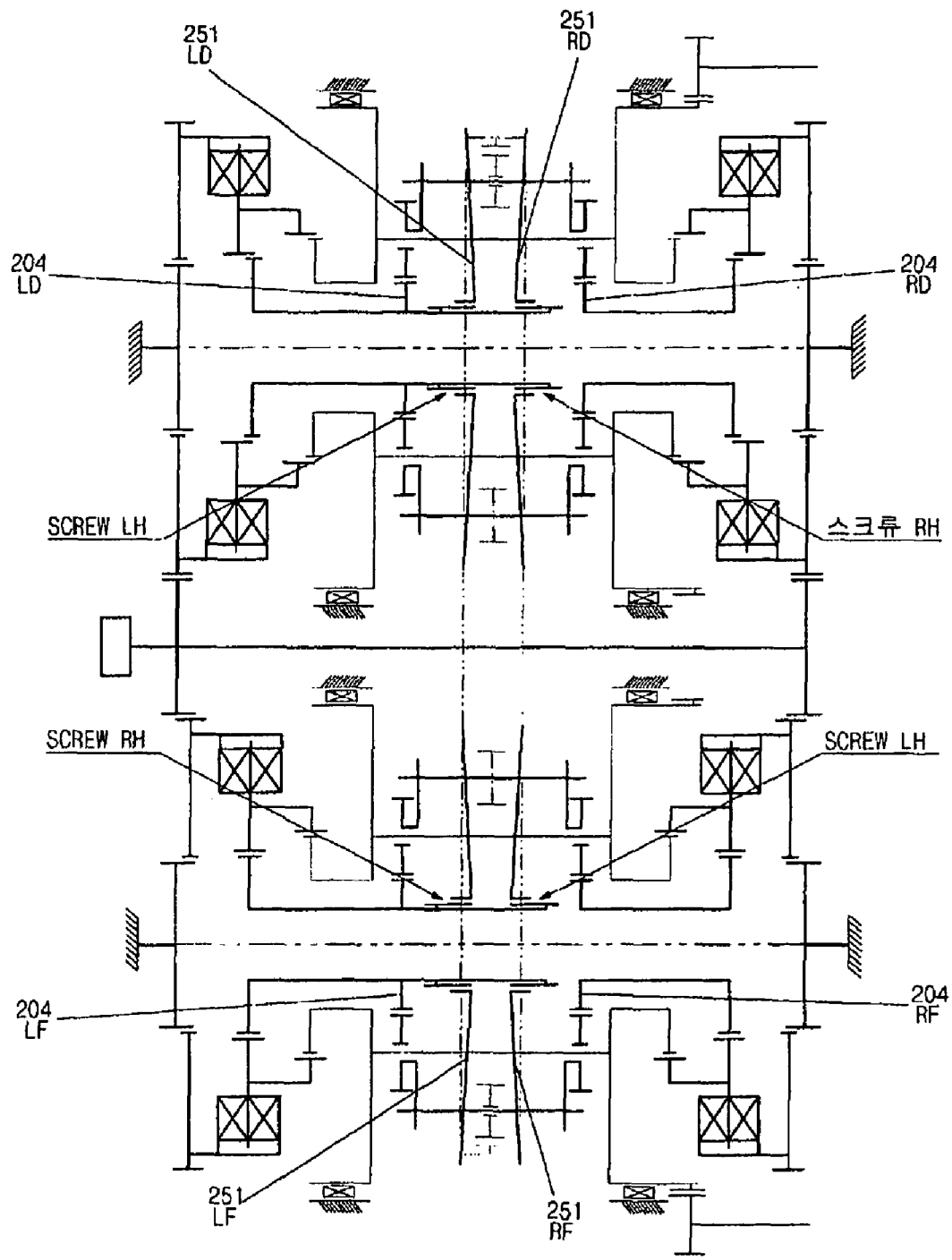

[Fig. 32]
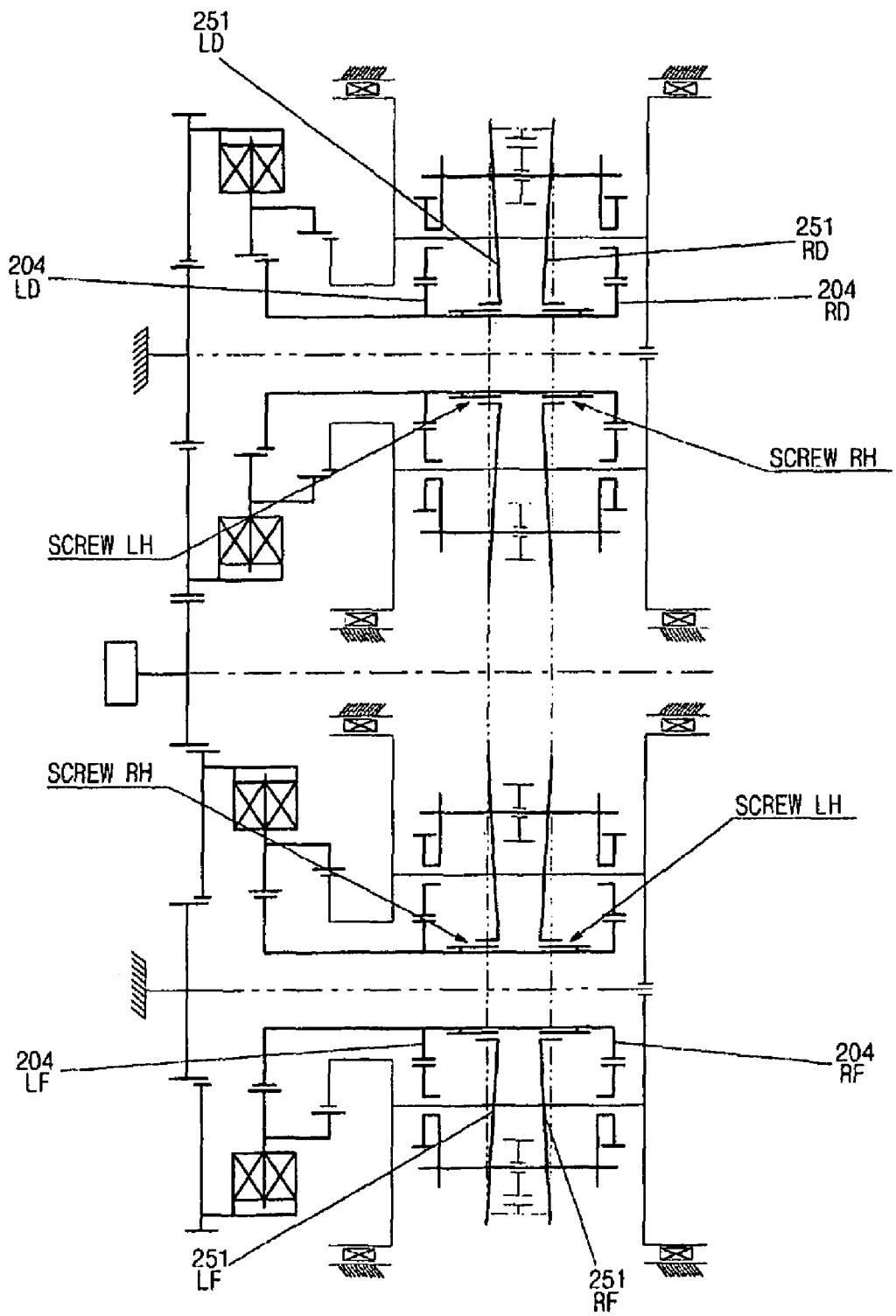

[Fig. 33]
[GUIDE CONE / TRANSMISSION ADJUSTMENT SYSTEM R1AC]
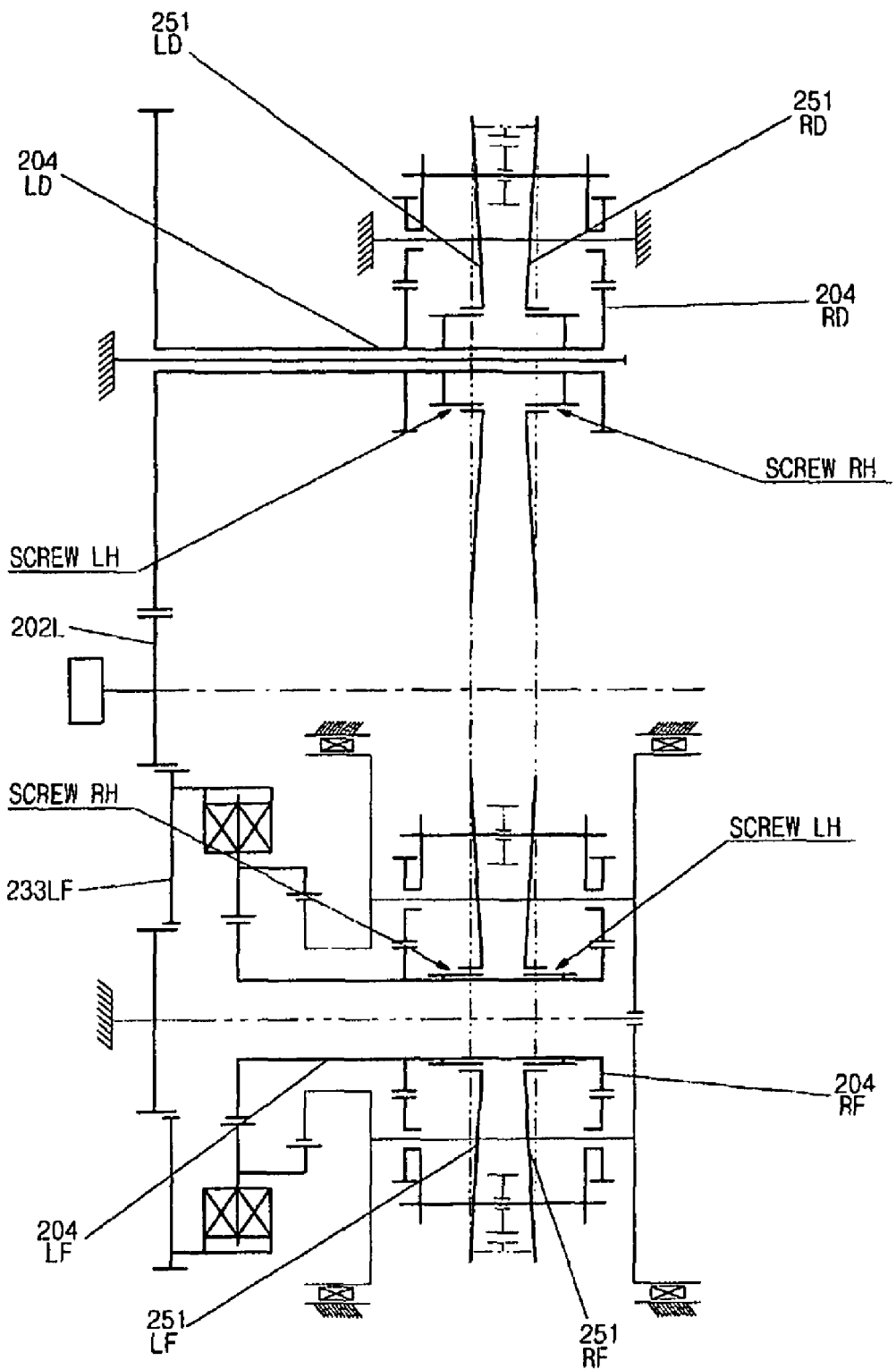

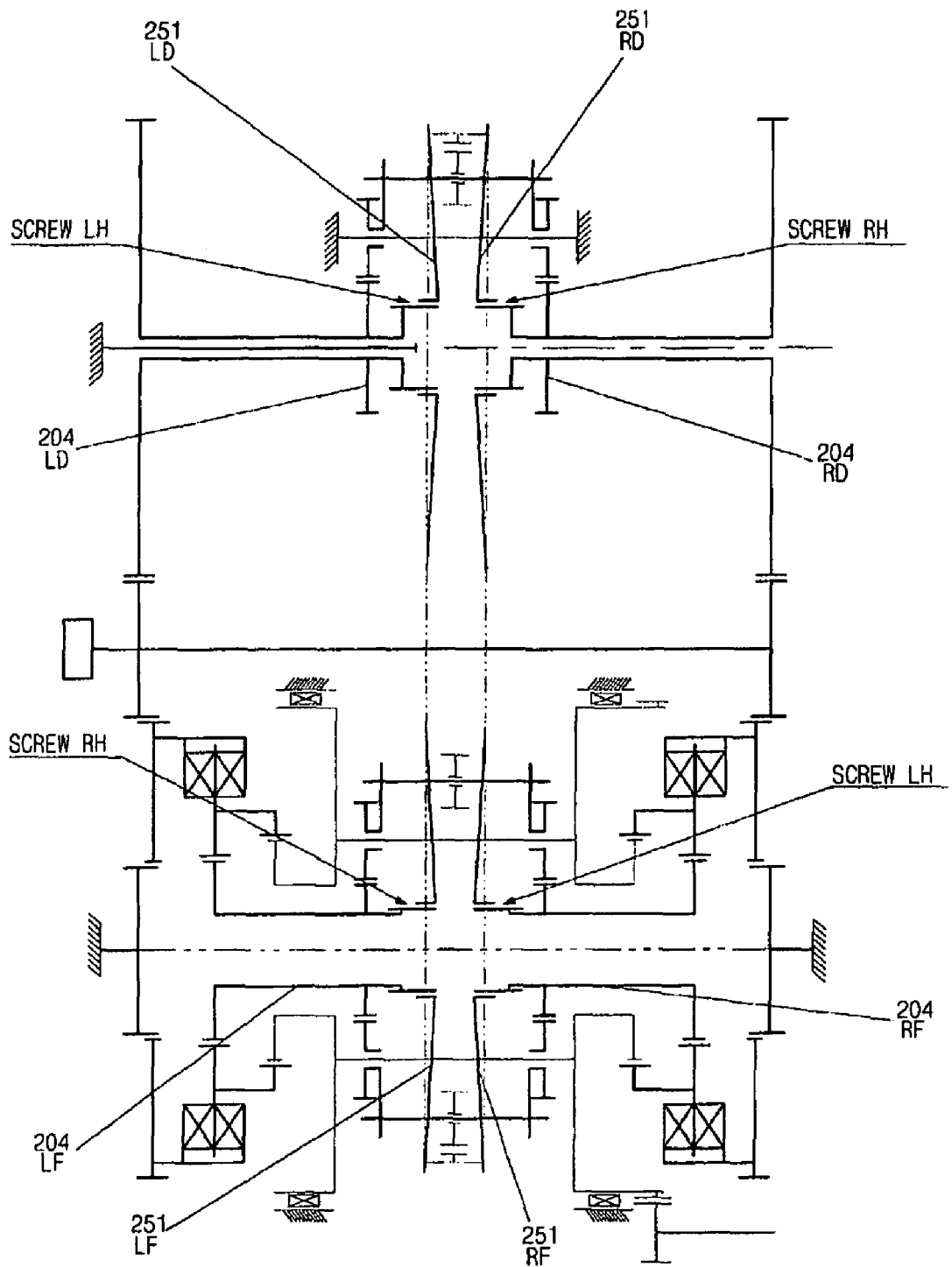
[Fig. 34]

[Fig. 35]
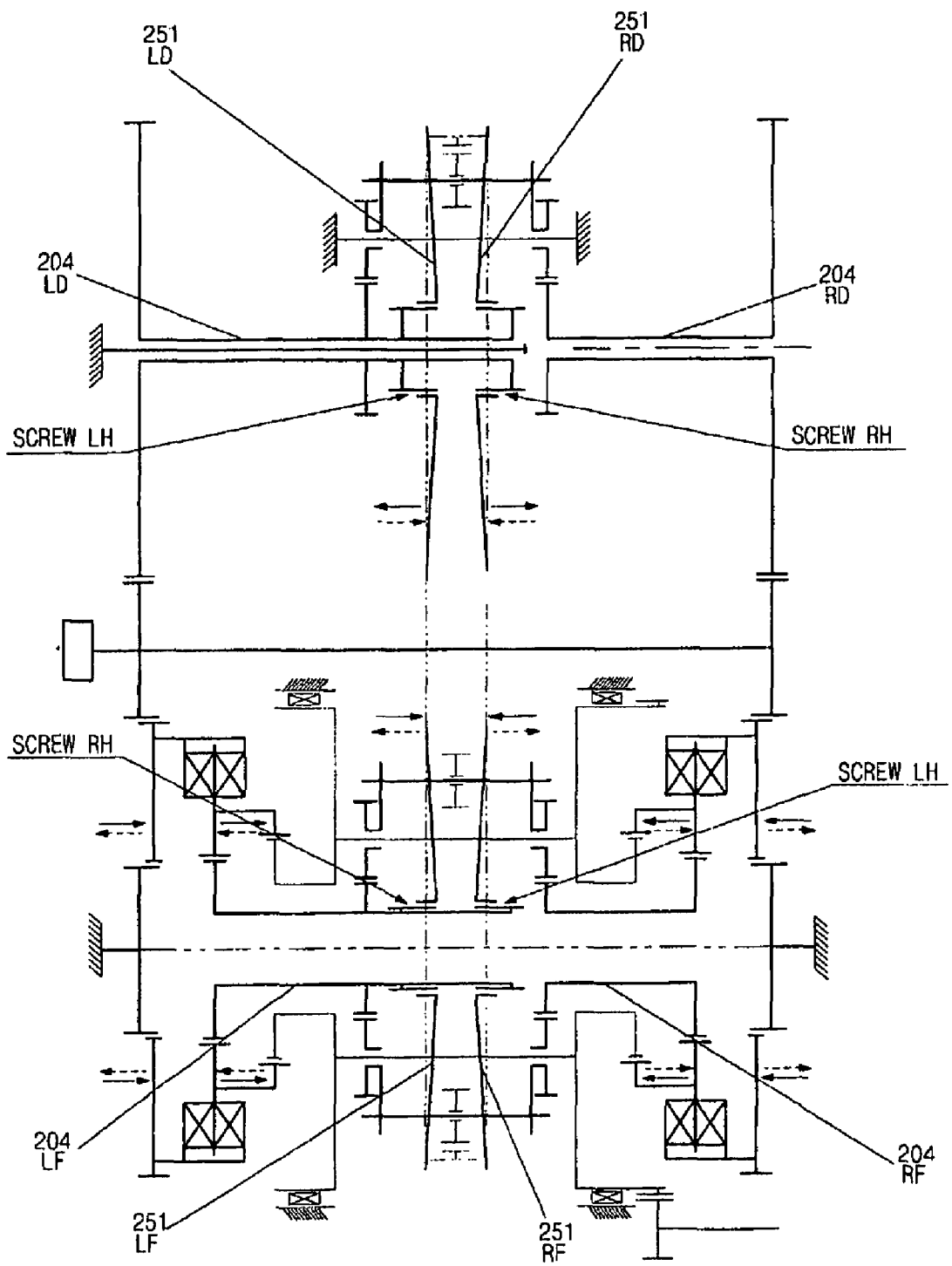

[Fig. 36]
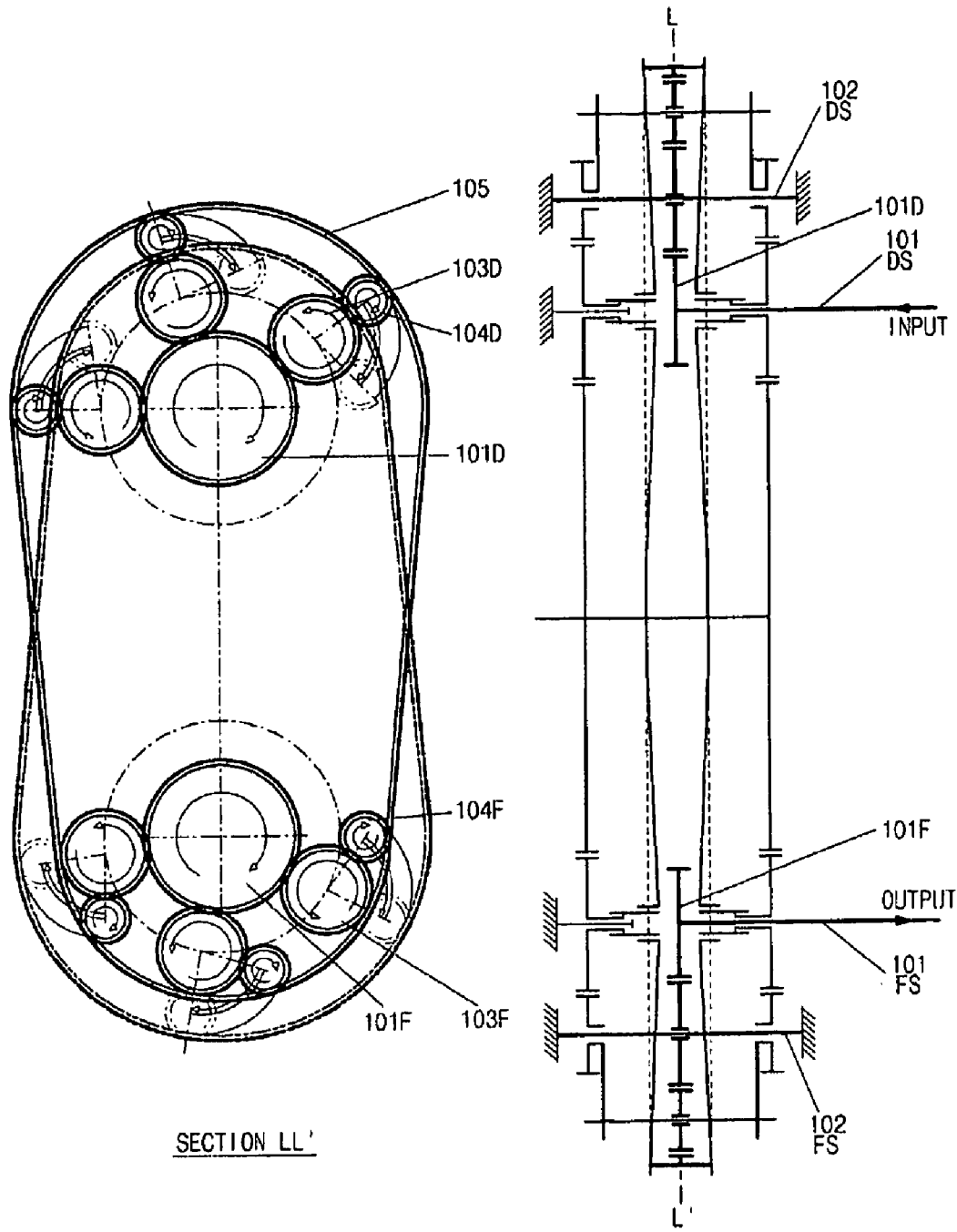
SECTION LL'

[Fig. 37]
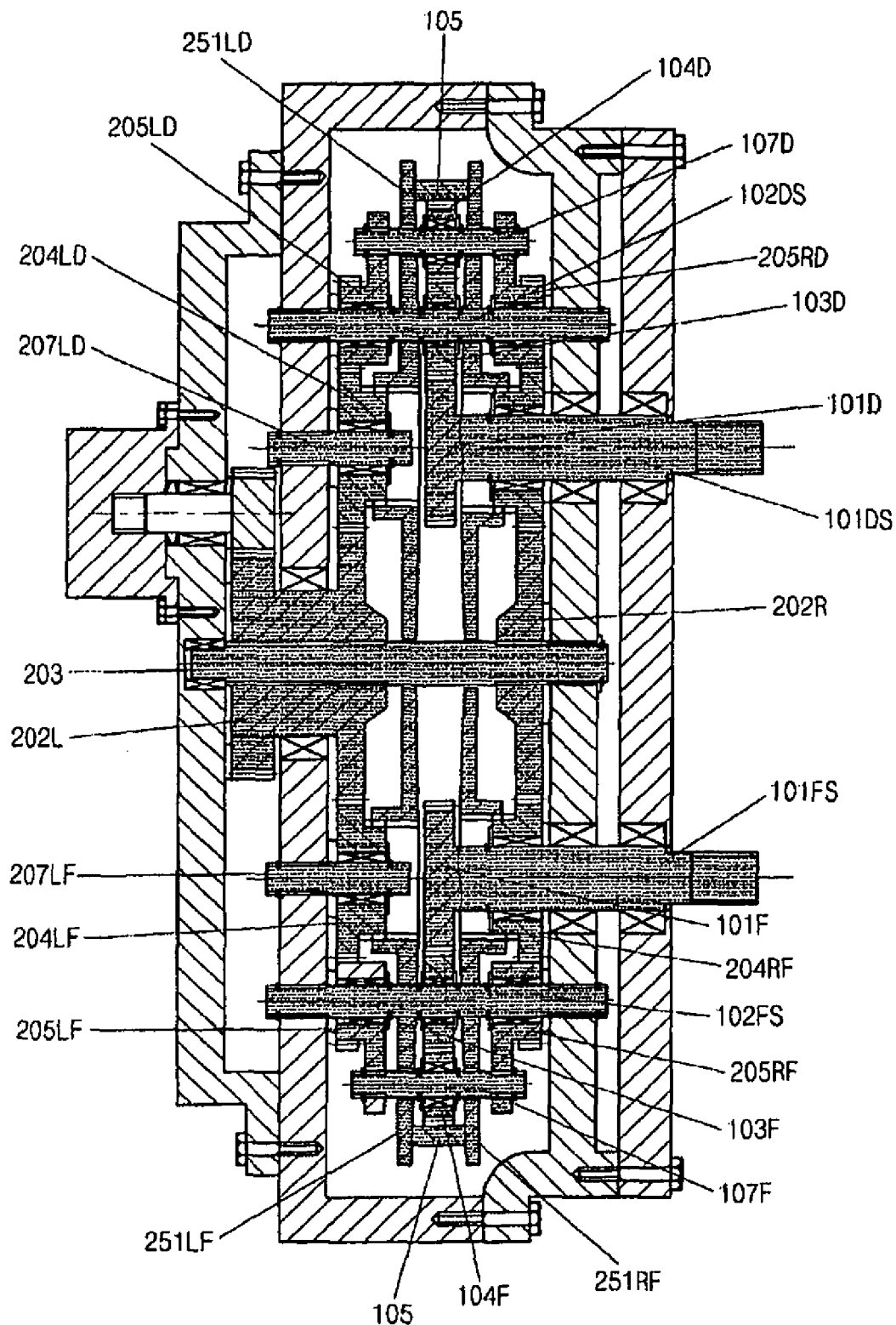

[Fig. 38]
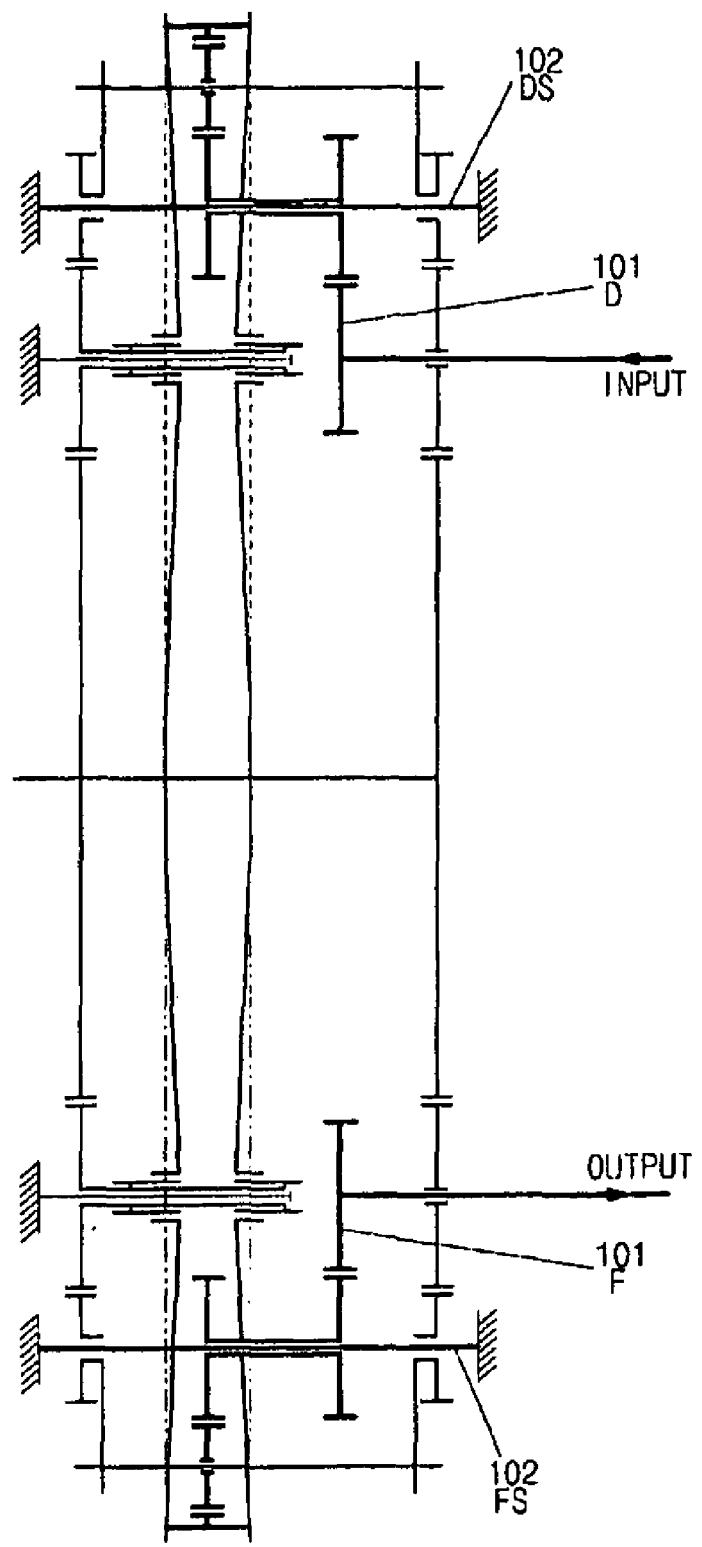

[Fig. 39]
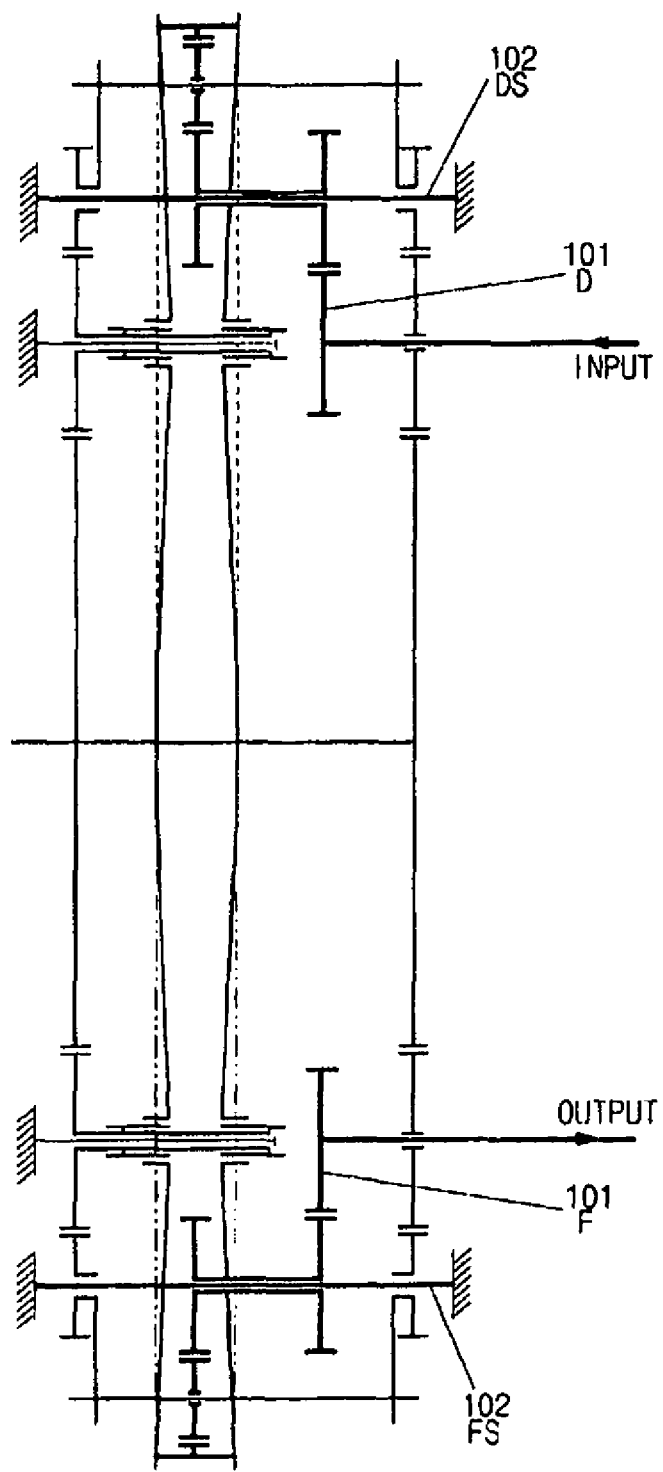

[Fig. 40]
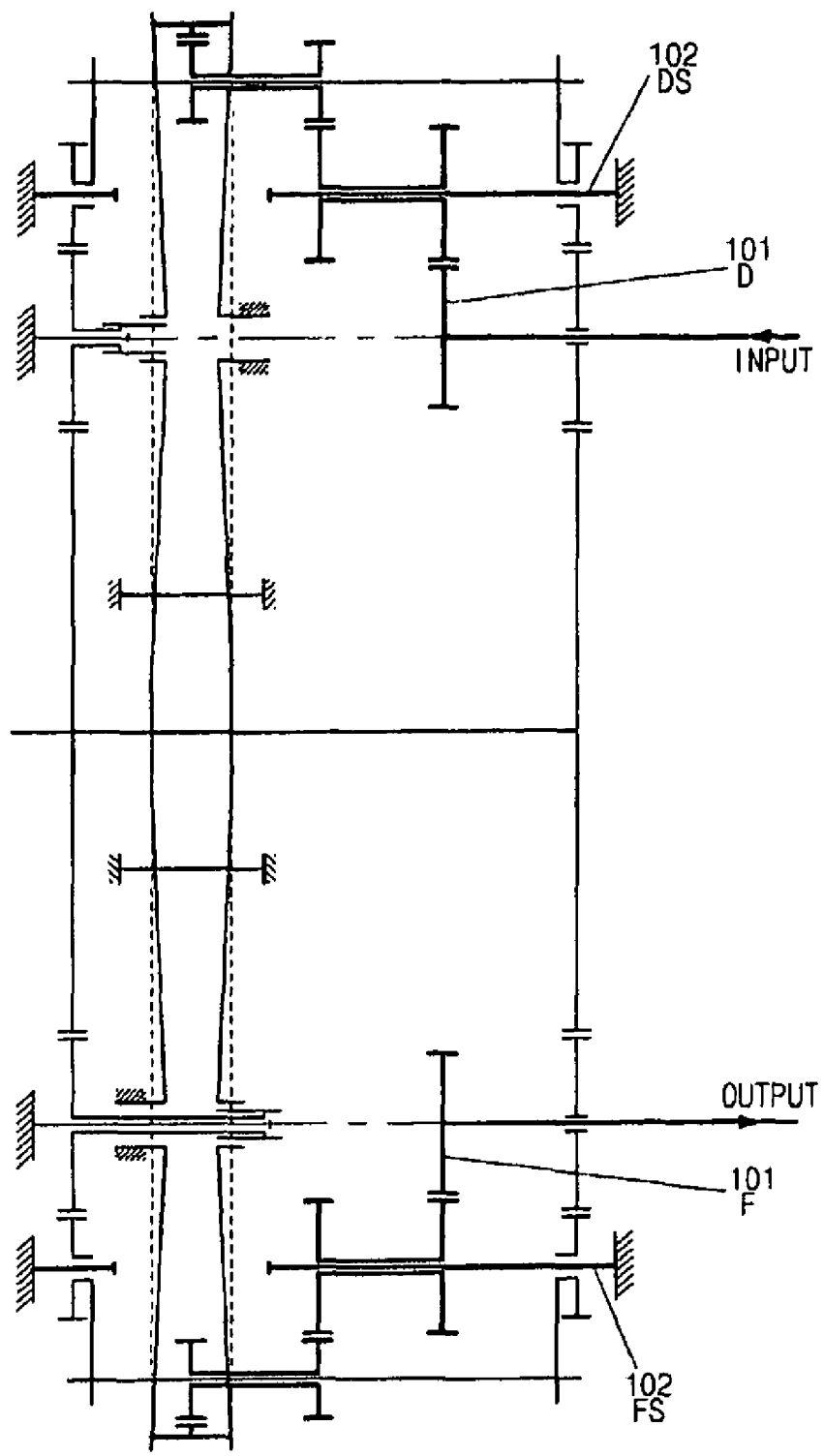

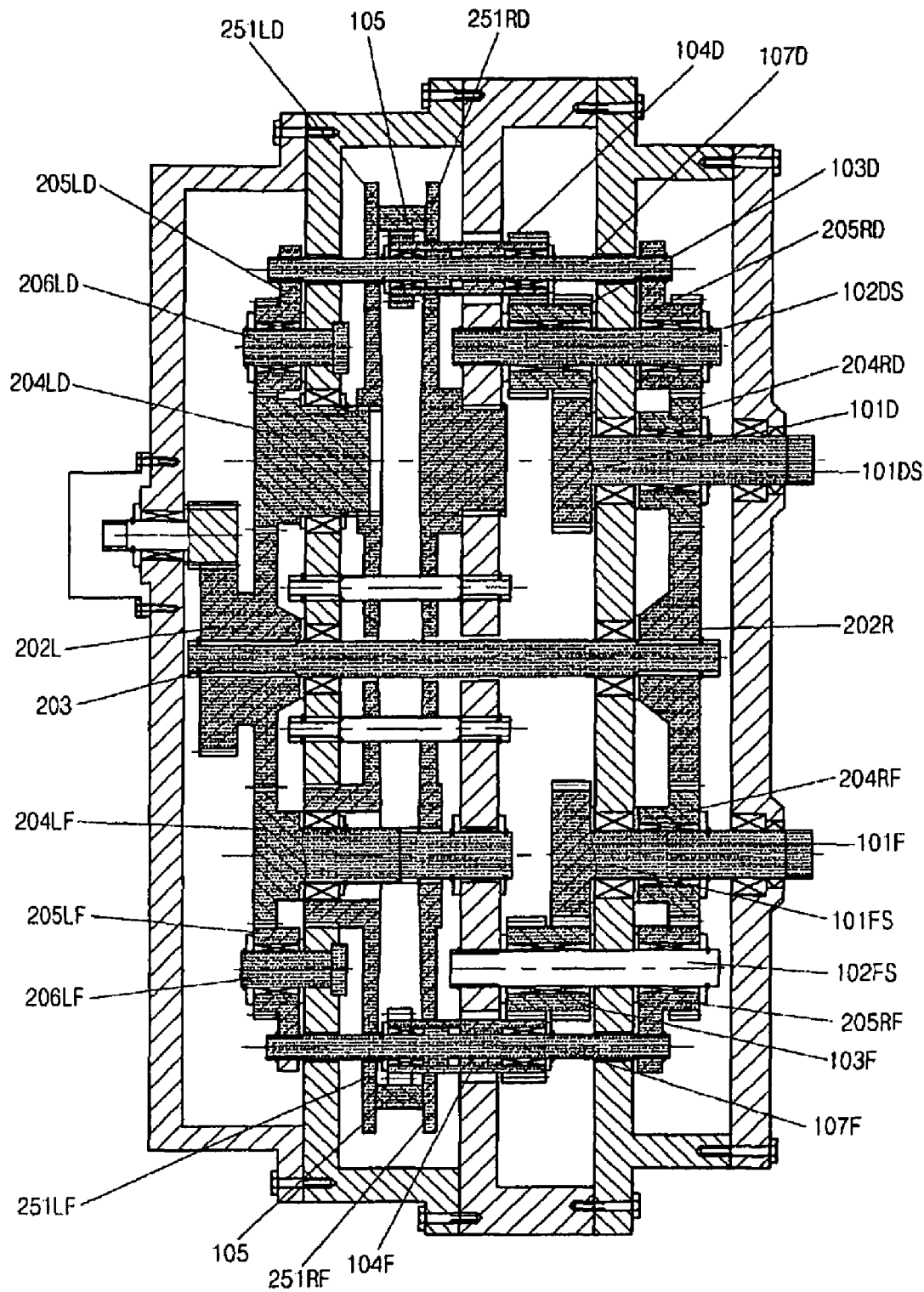
[Fig. 41]

[Fig. 42]
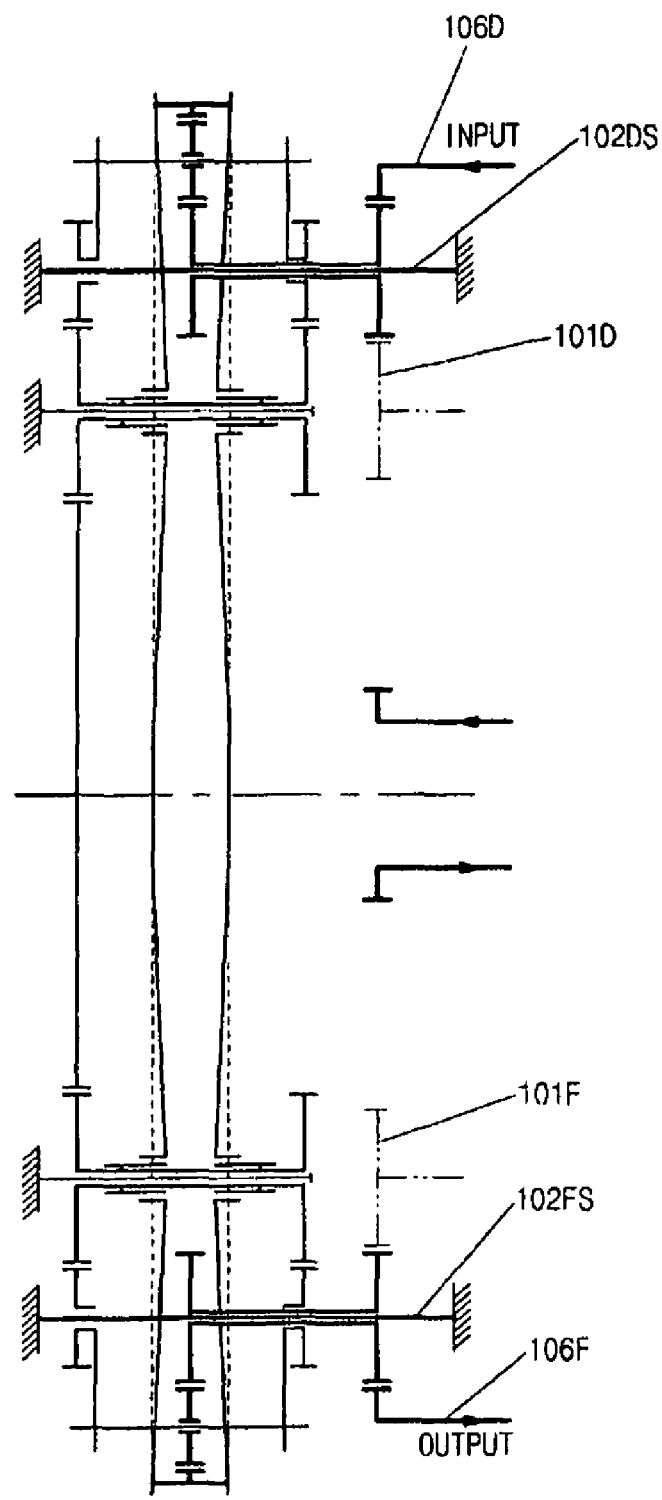

[Fig. 43]
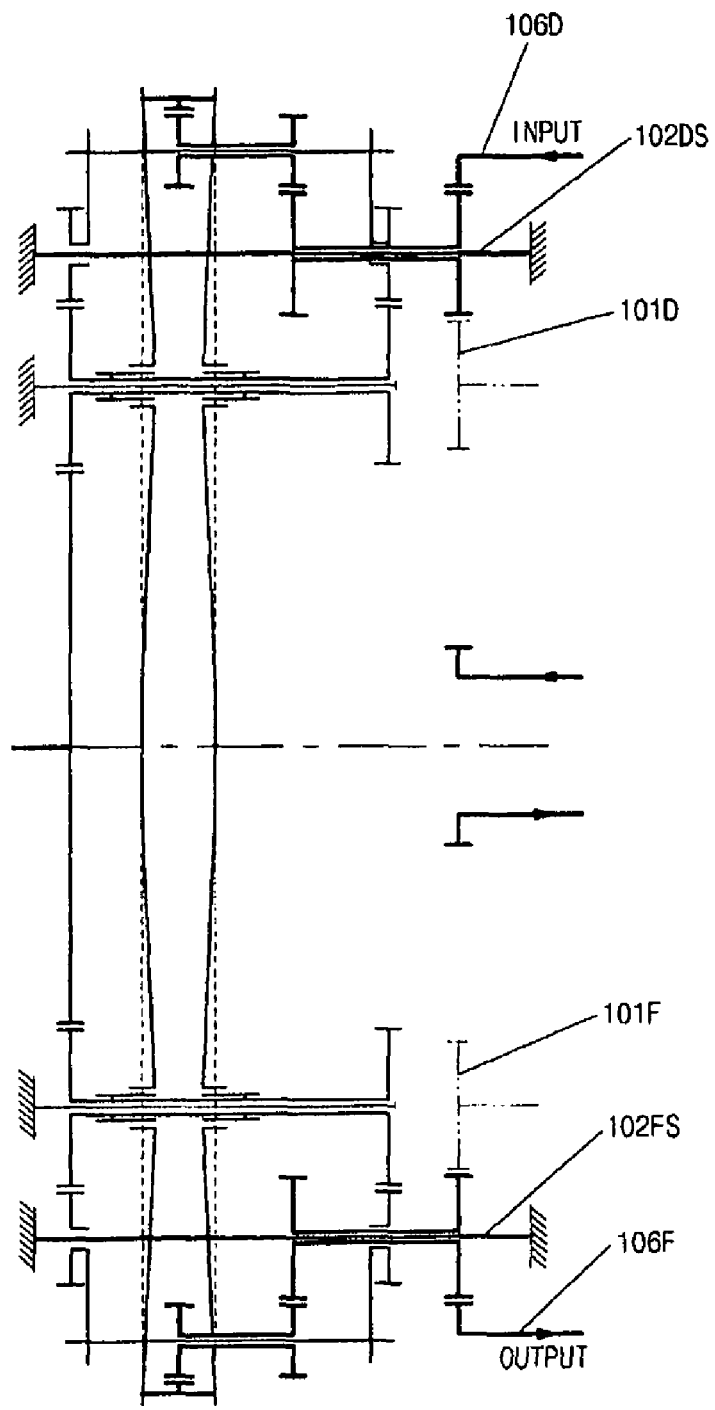

[Fig. 44]
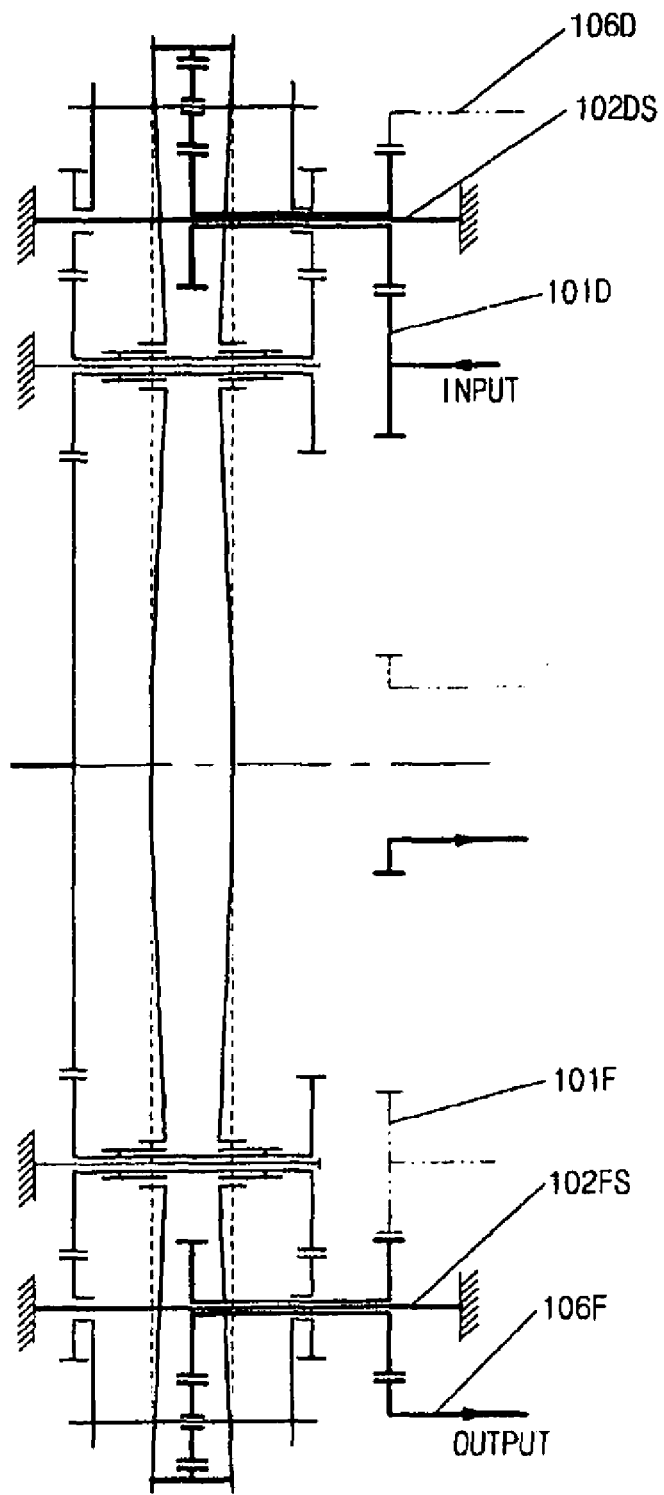

[Fig. 45]
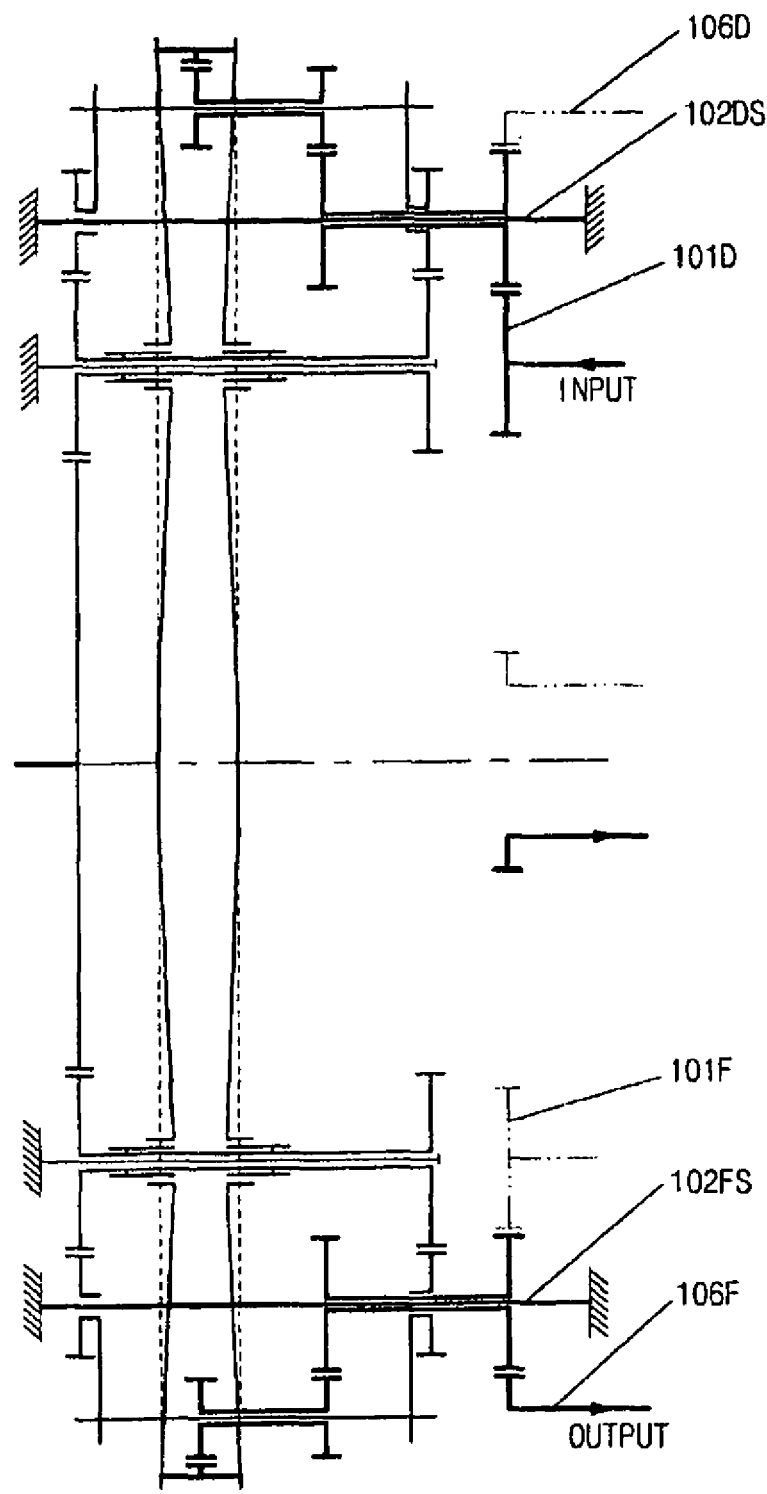

[Fig. 46]
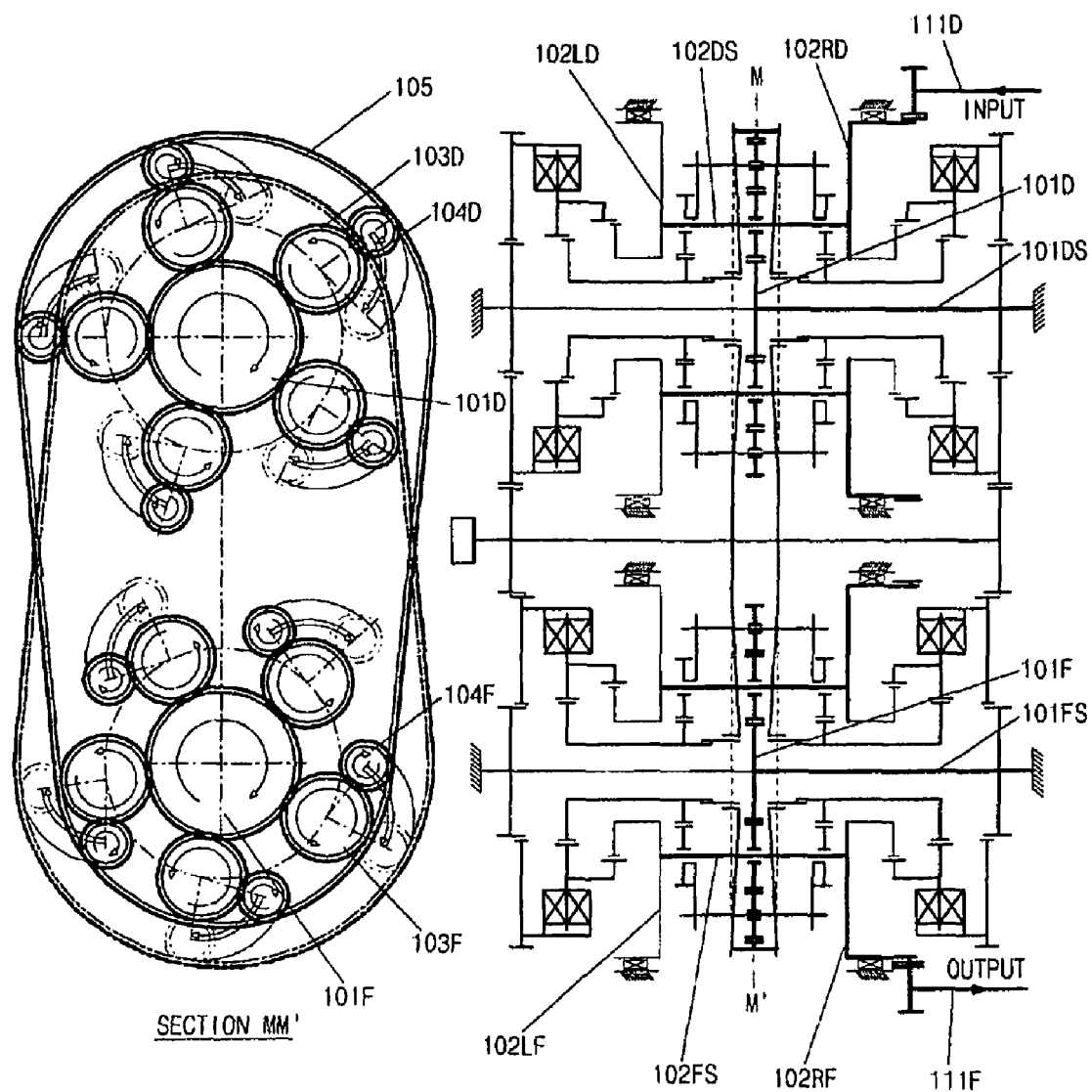
SECTION MM'

[Fig. 47]
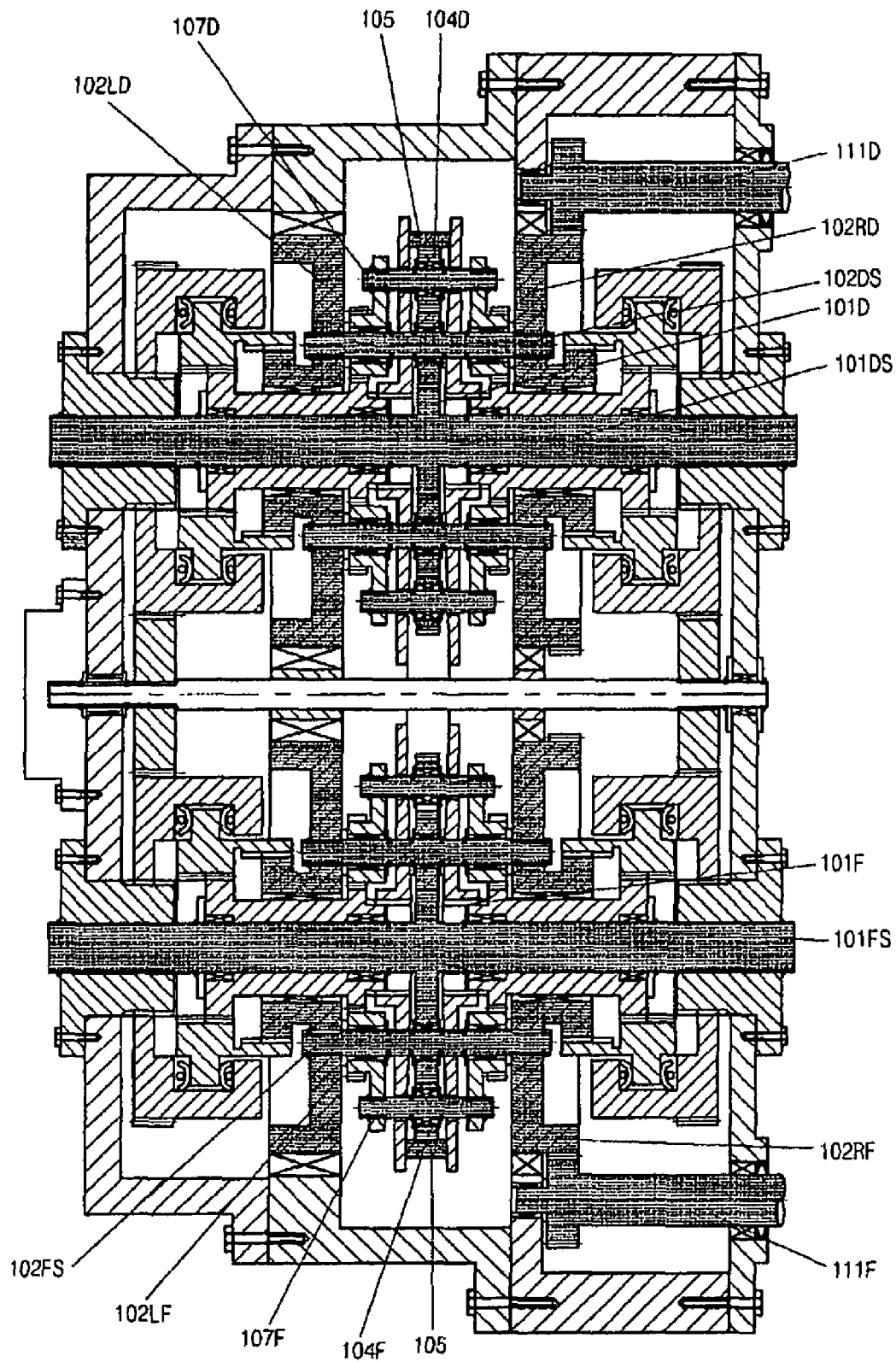

[Fig. 48]
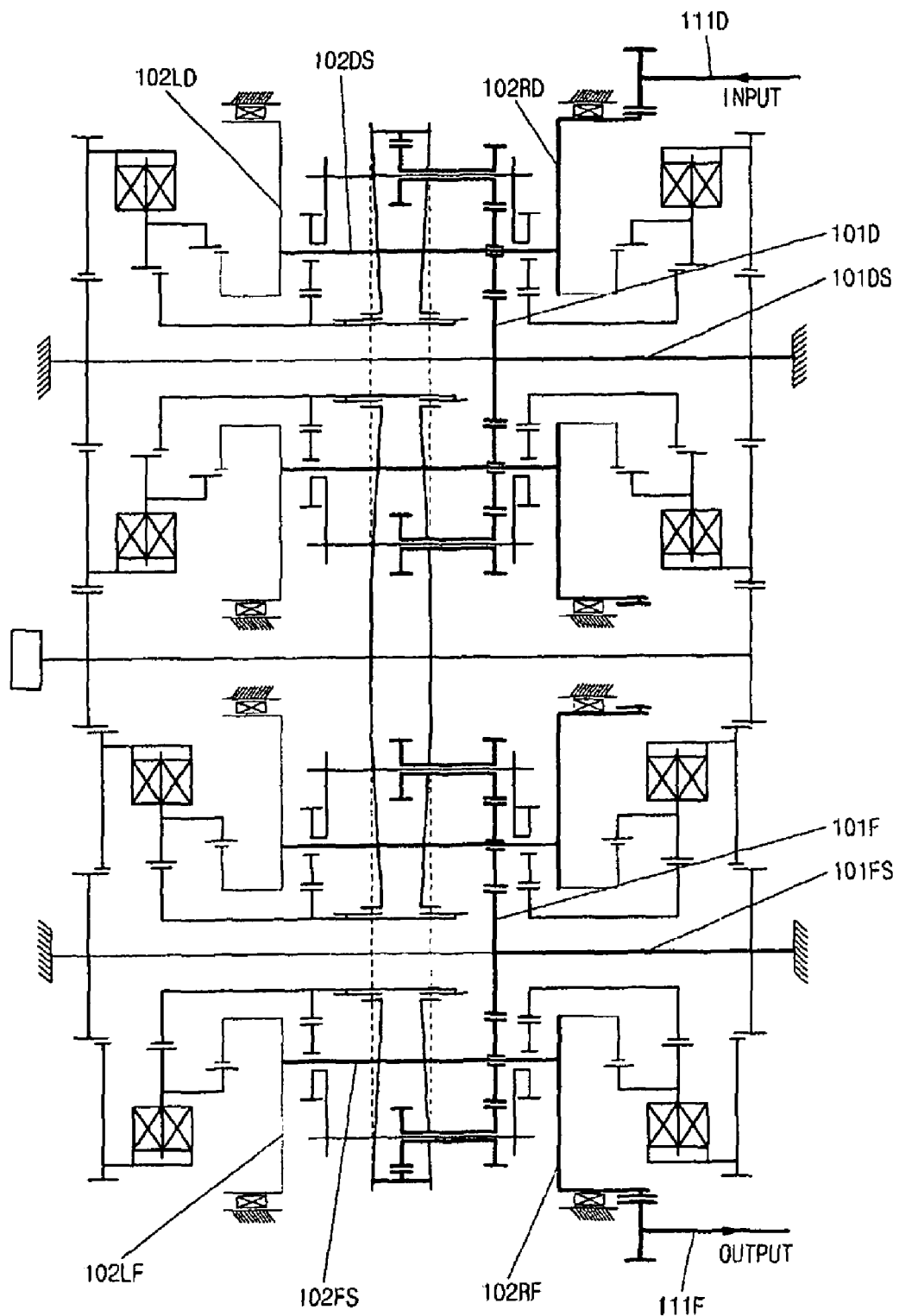

[Fig. 49]
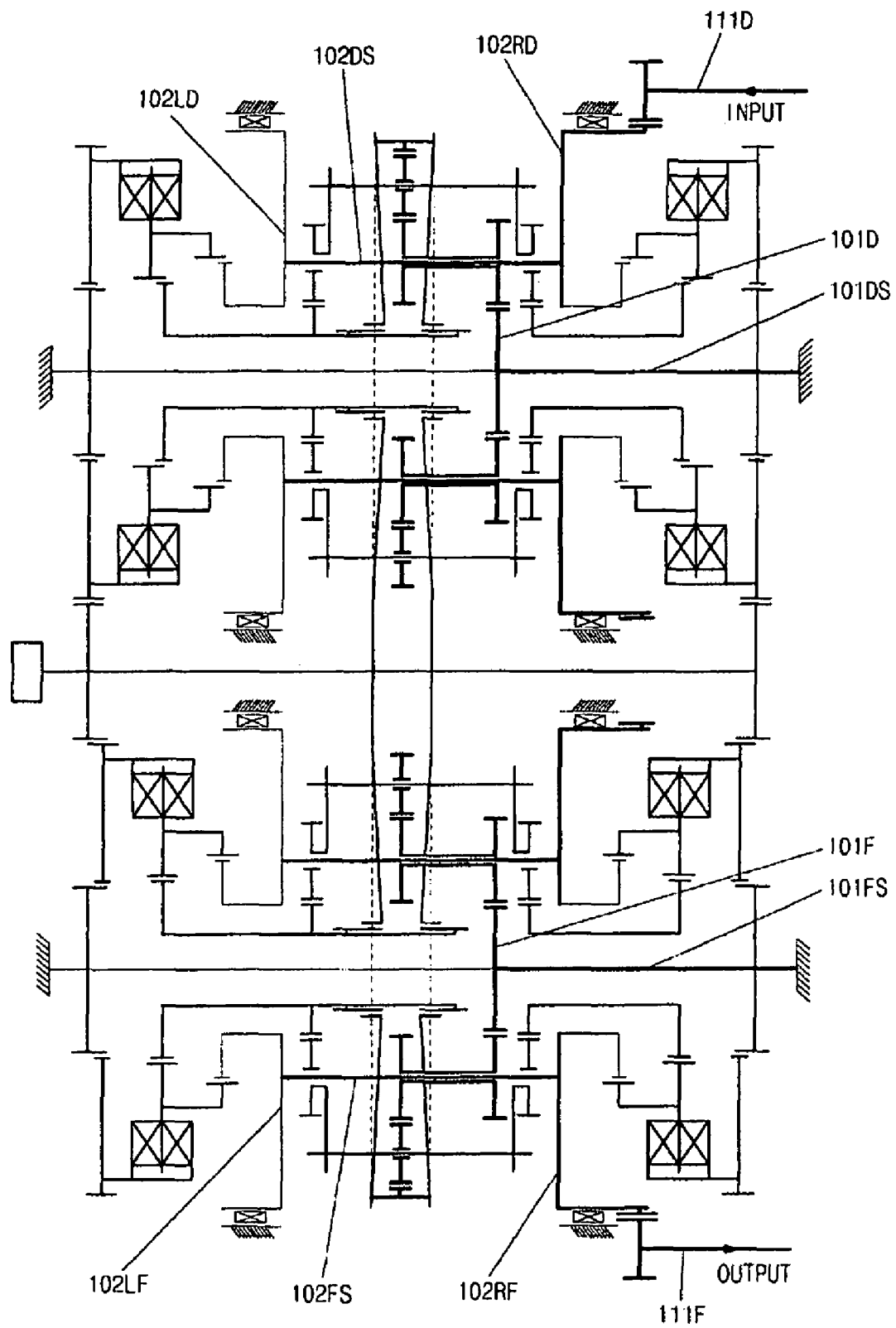

[Fig. 50]
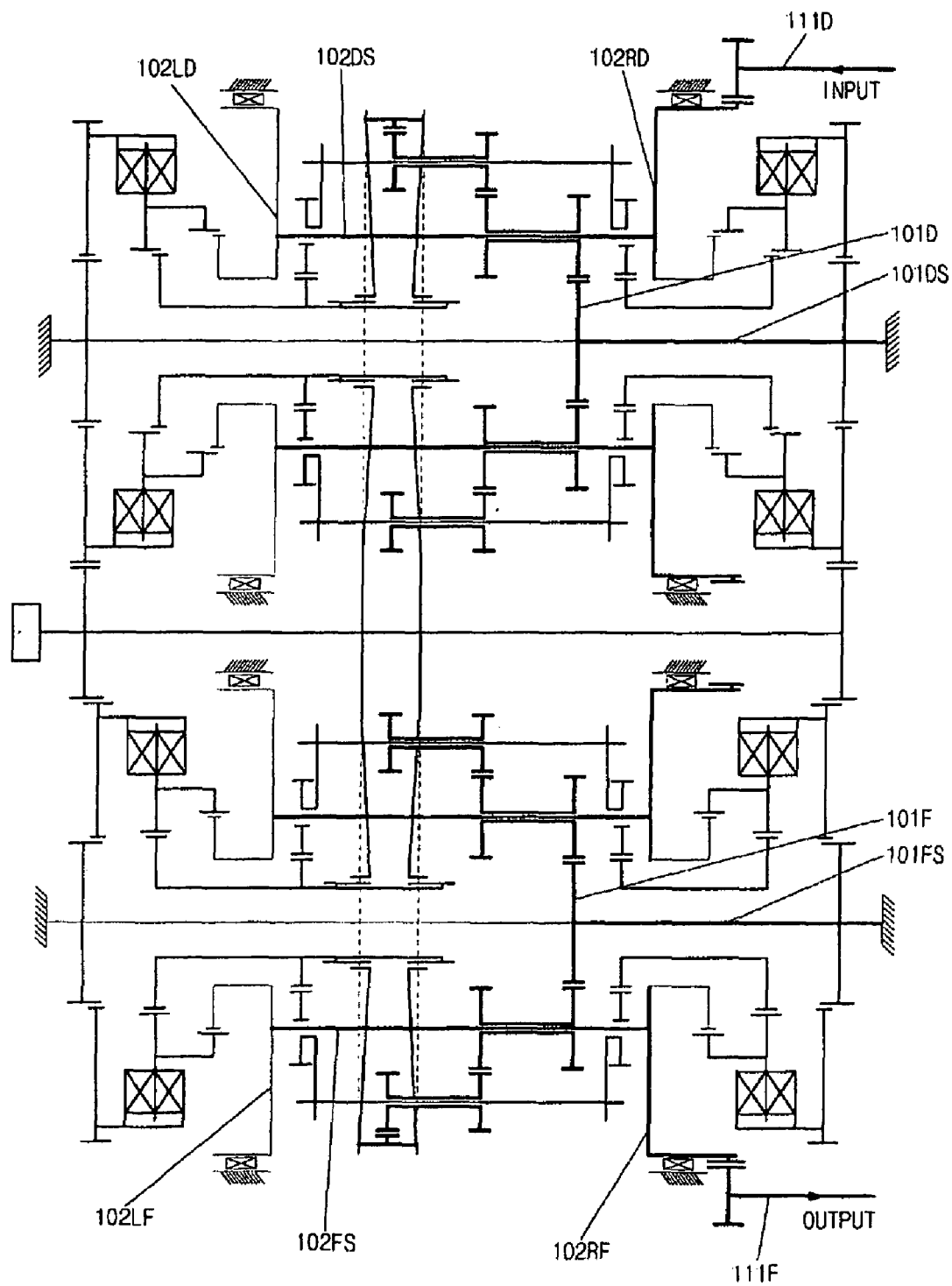

[Fig. 51]
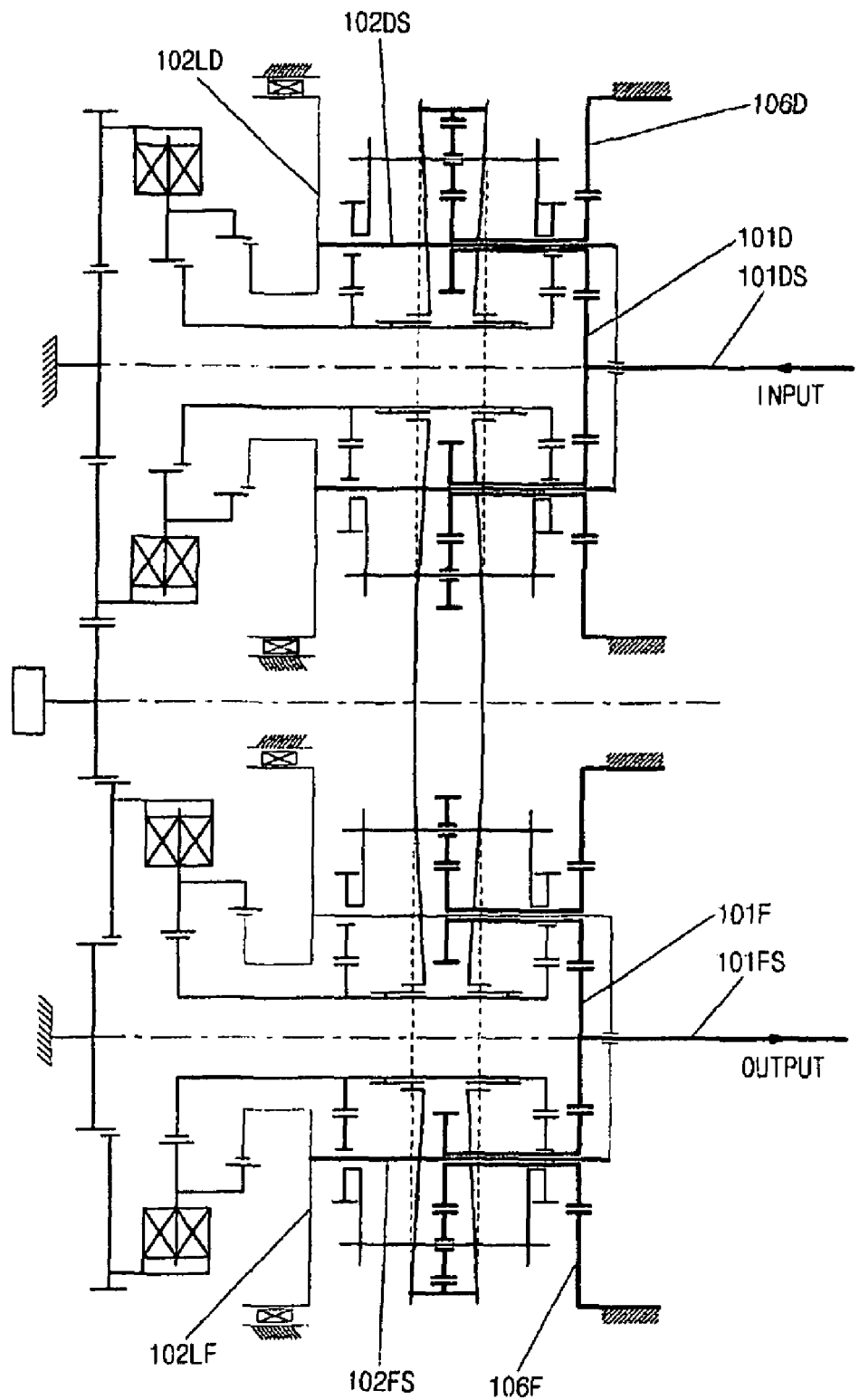

[Fig. 52]
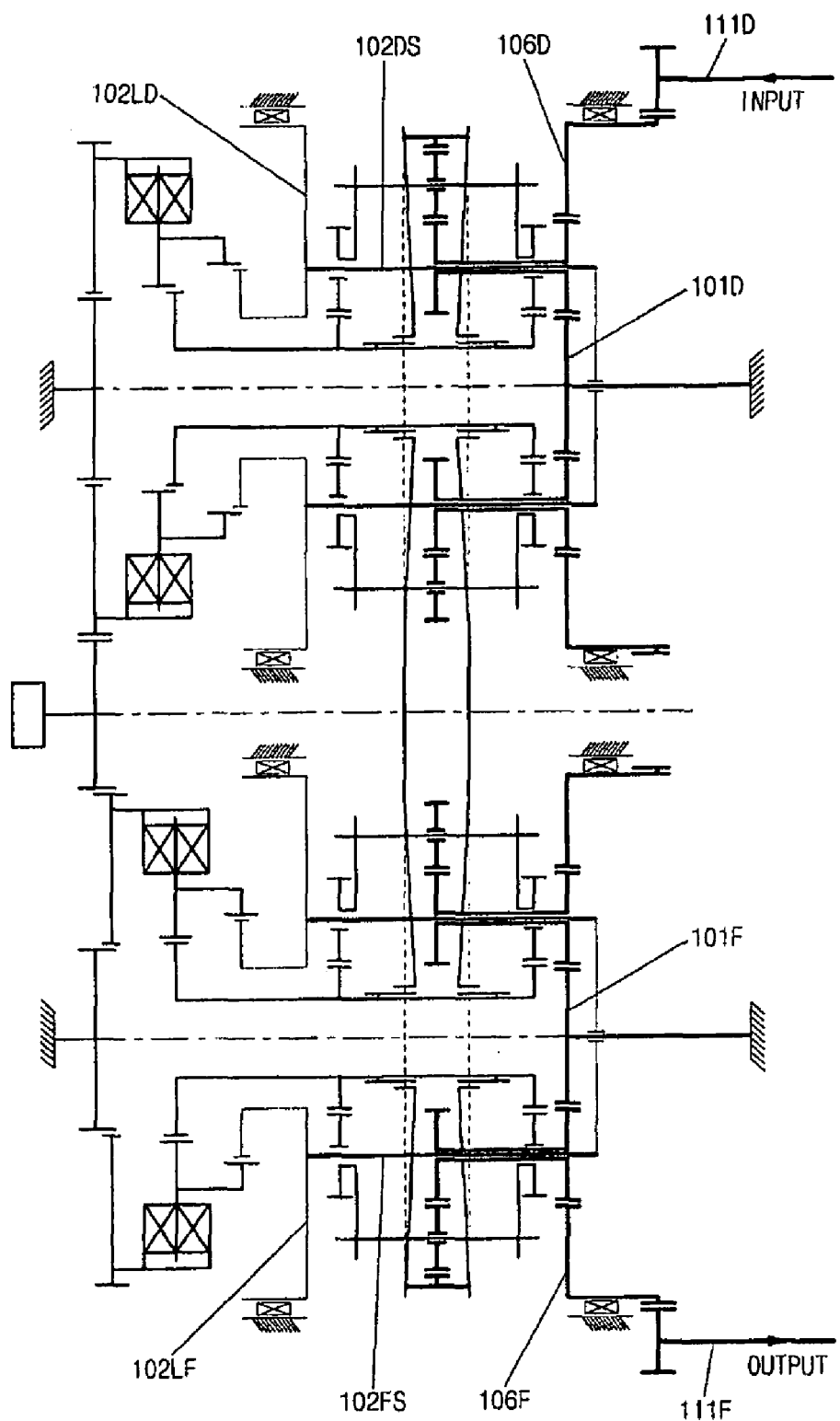

[Fig. 53]
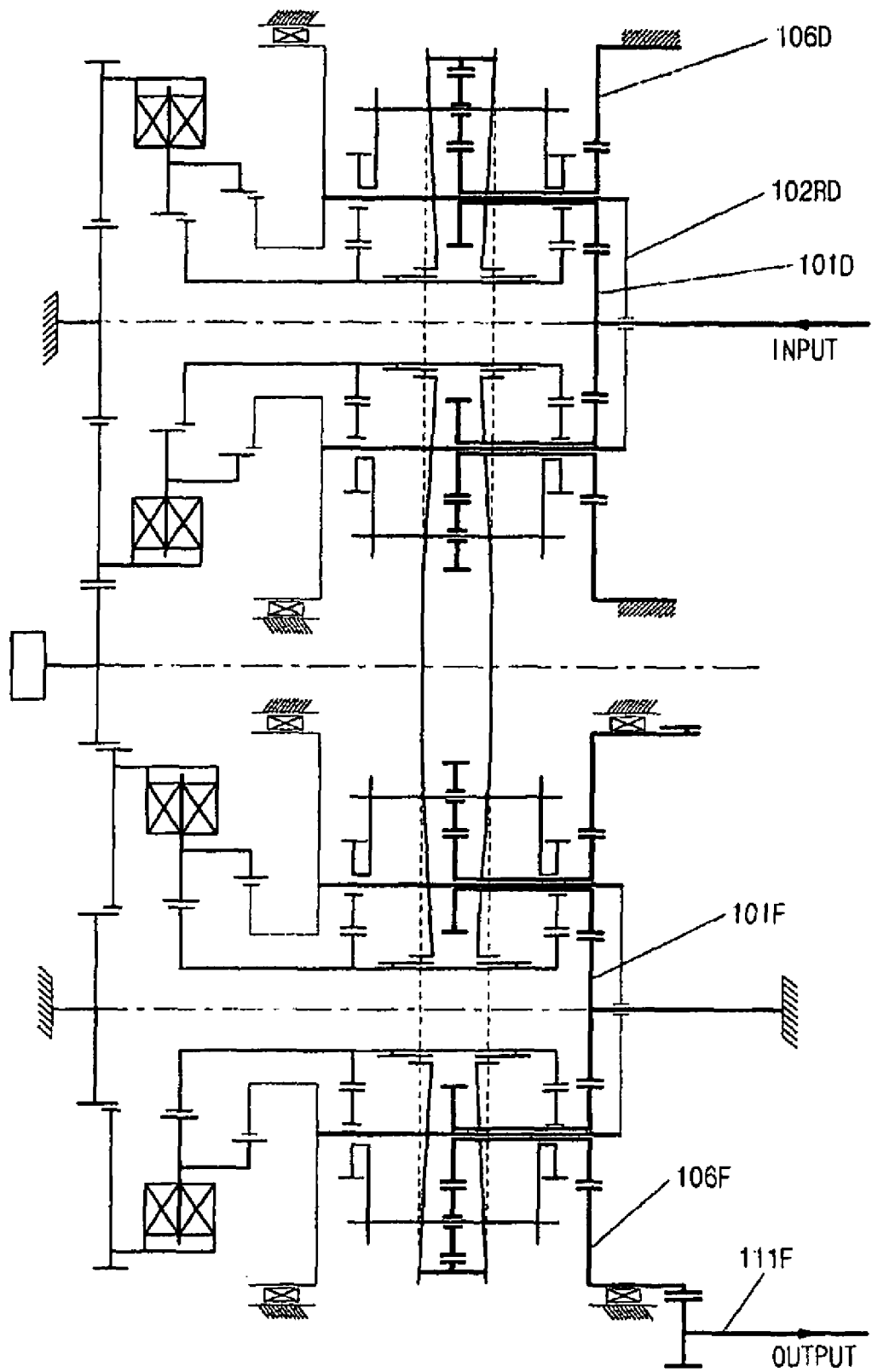

[Fig. 54]
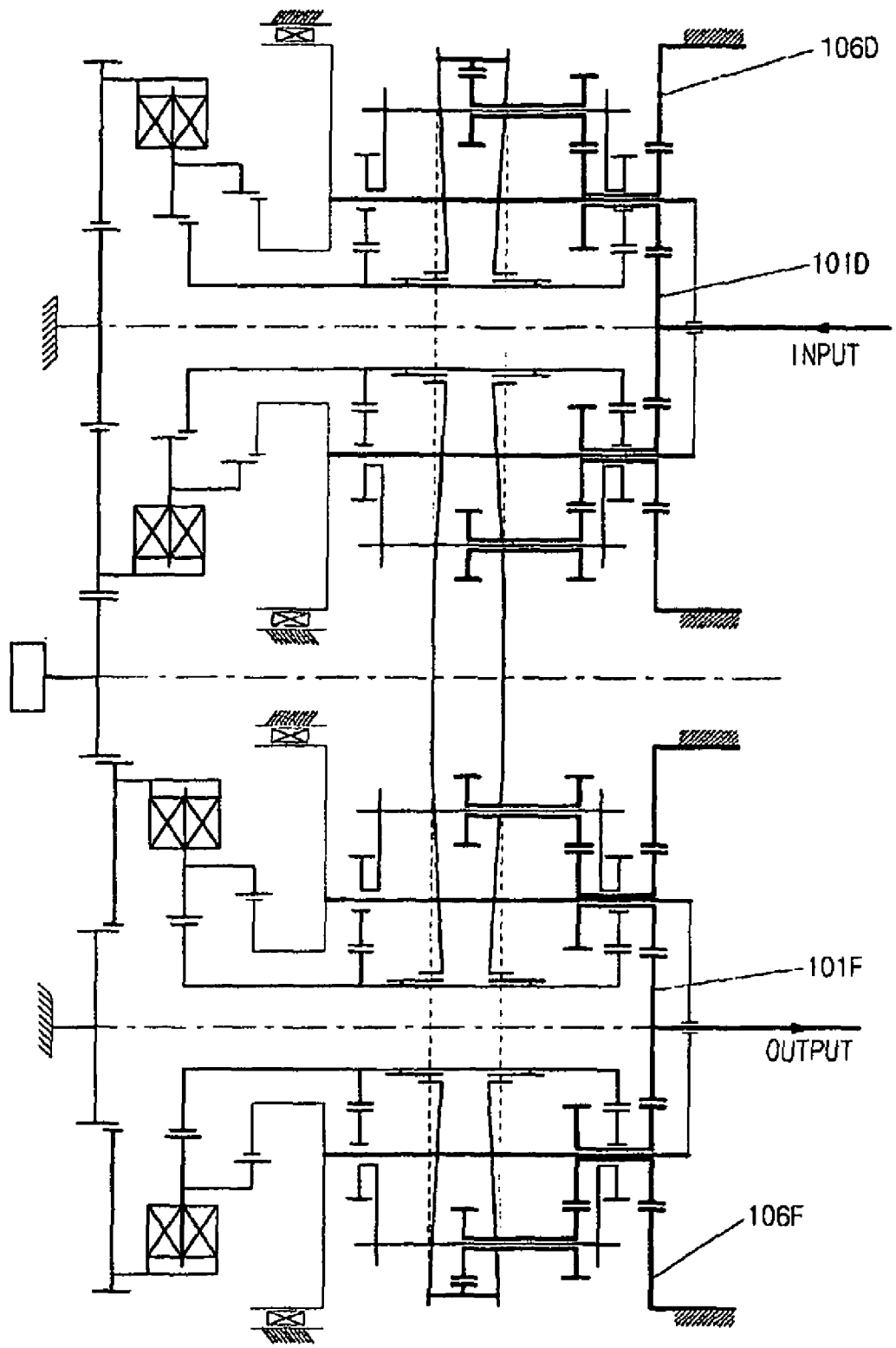

[Fig. 55]
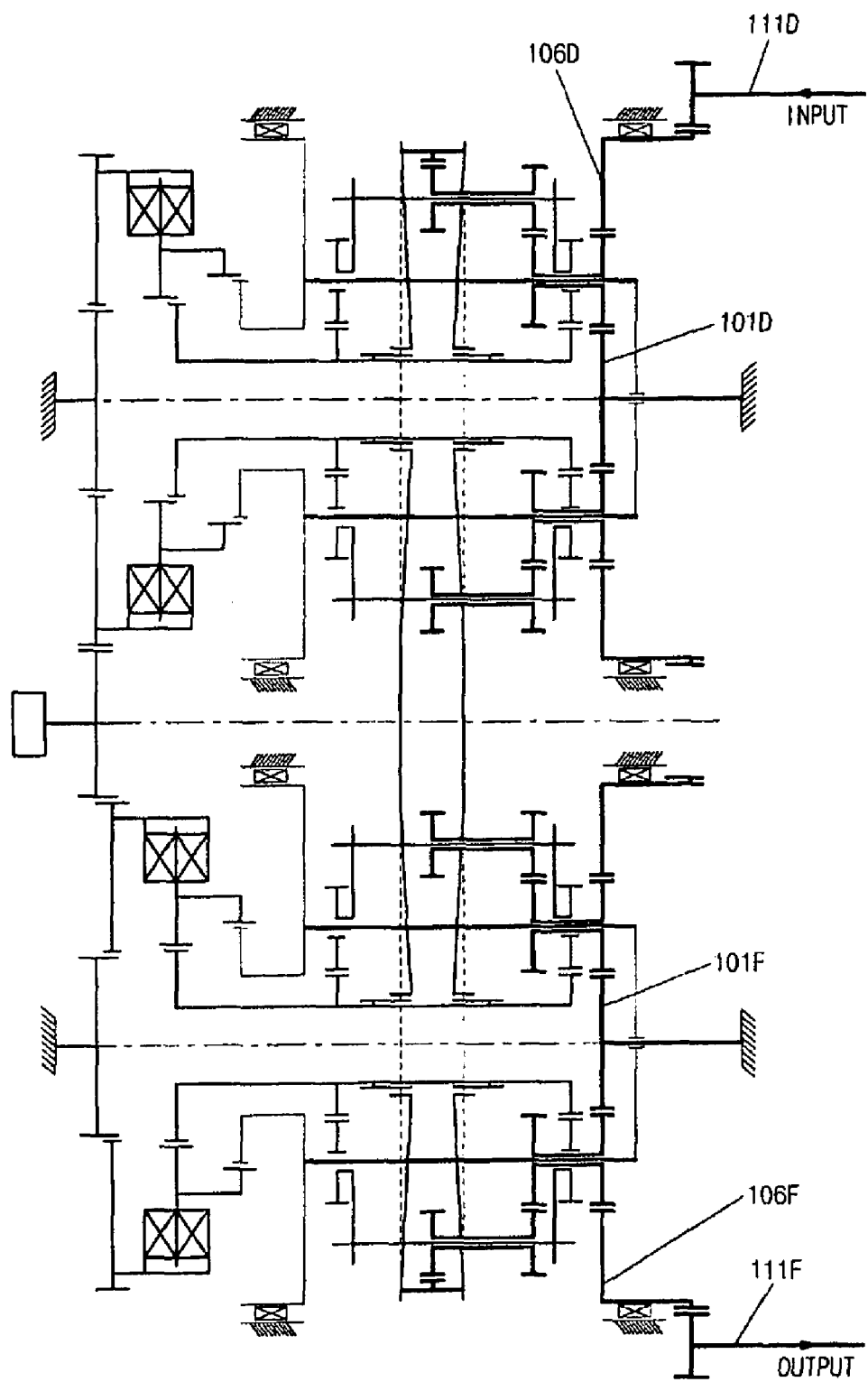

[Fig. 56]
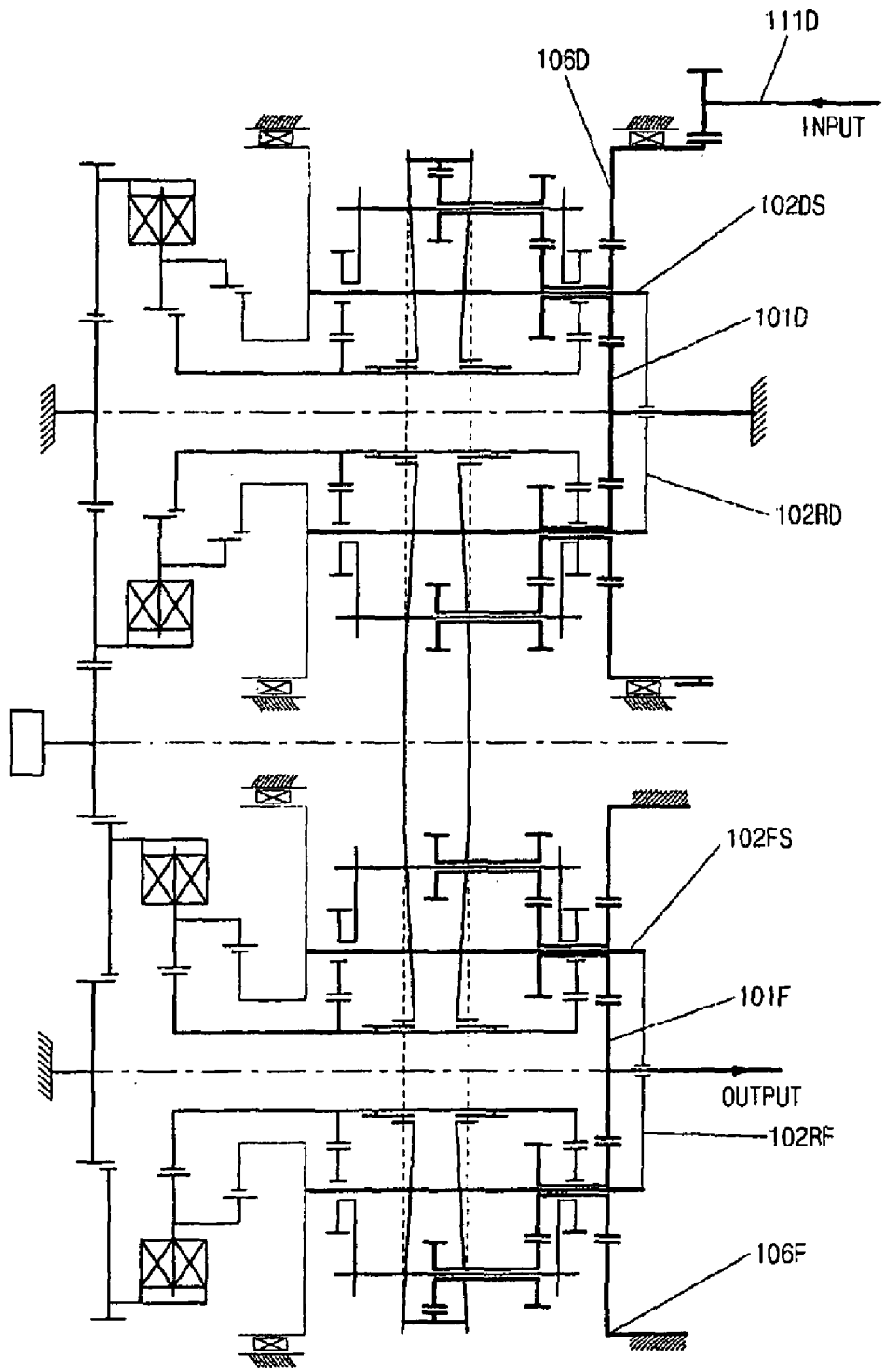

[Fig. 57]
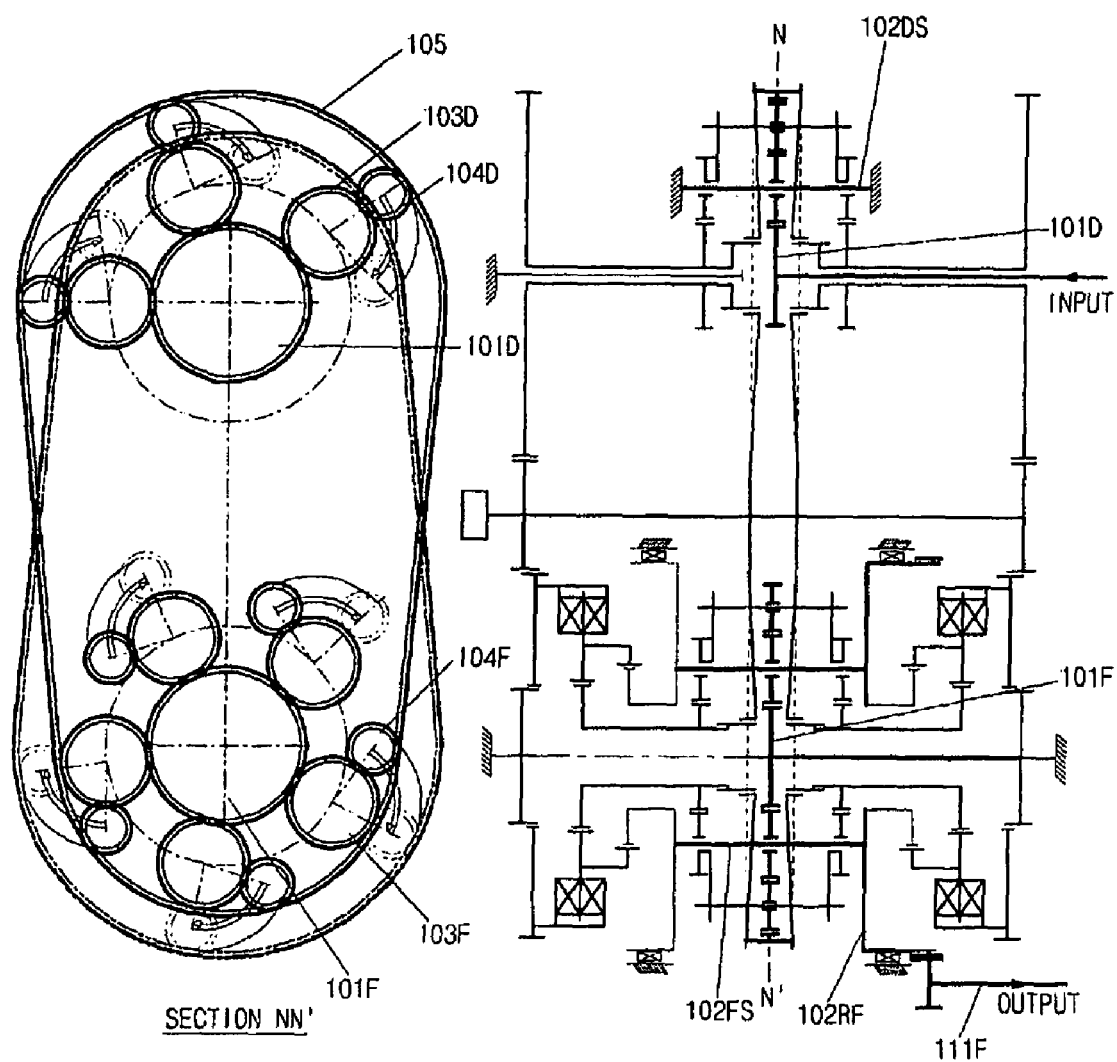

[Fig. 58]
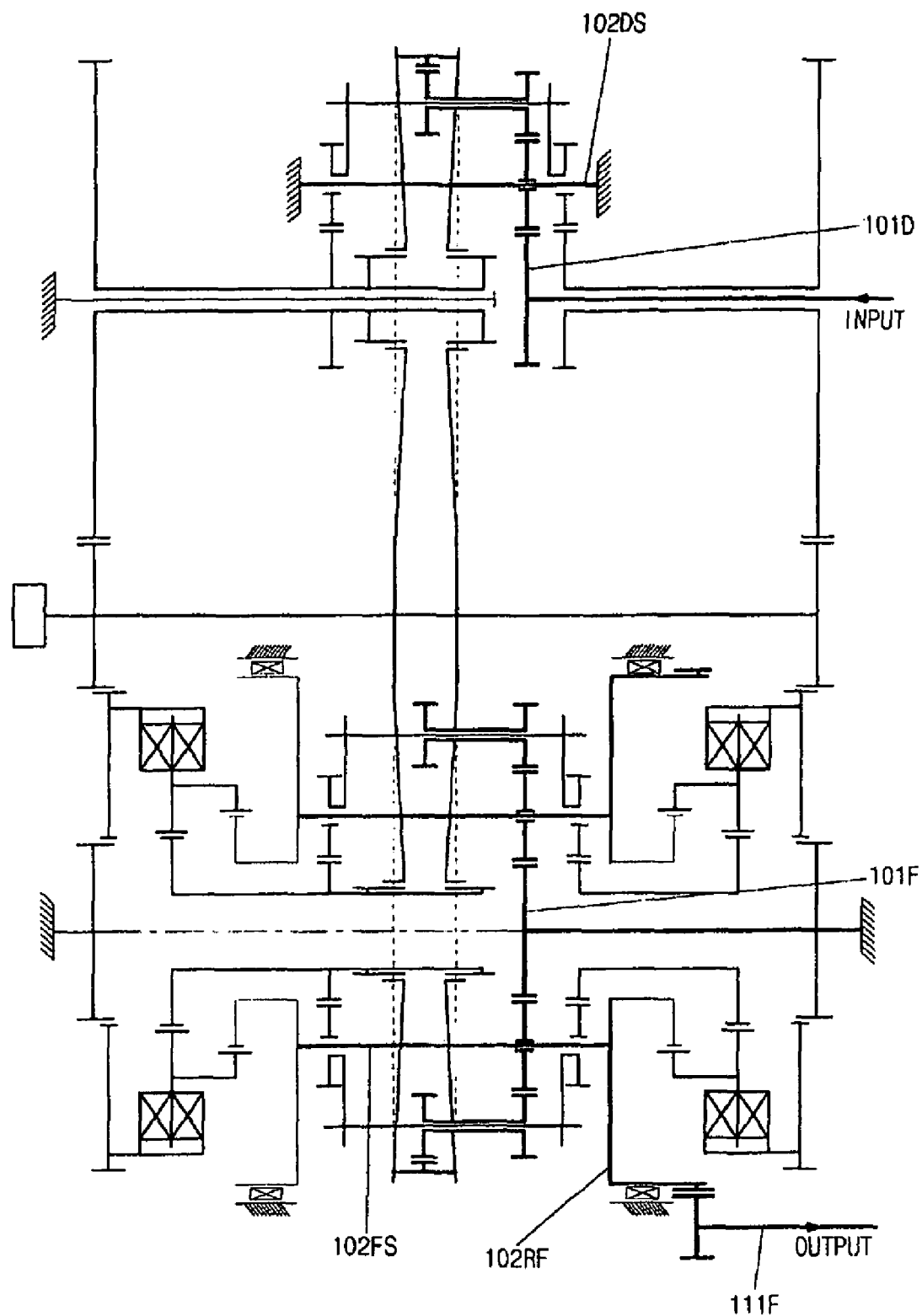

[Fig. 59]
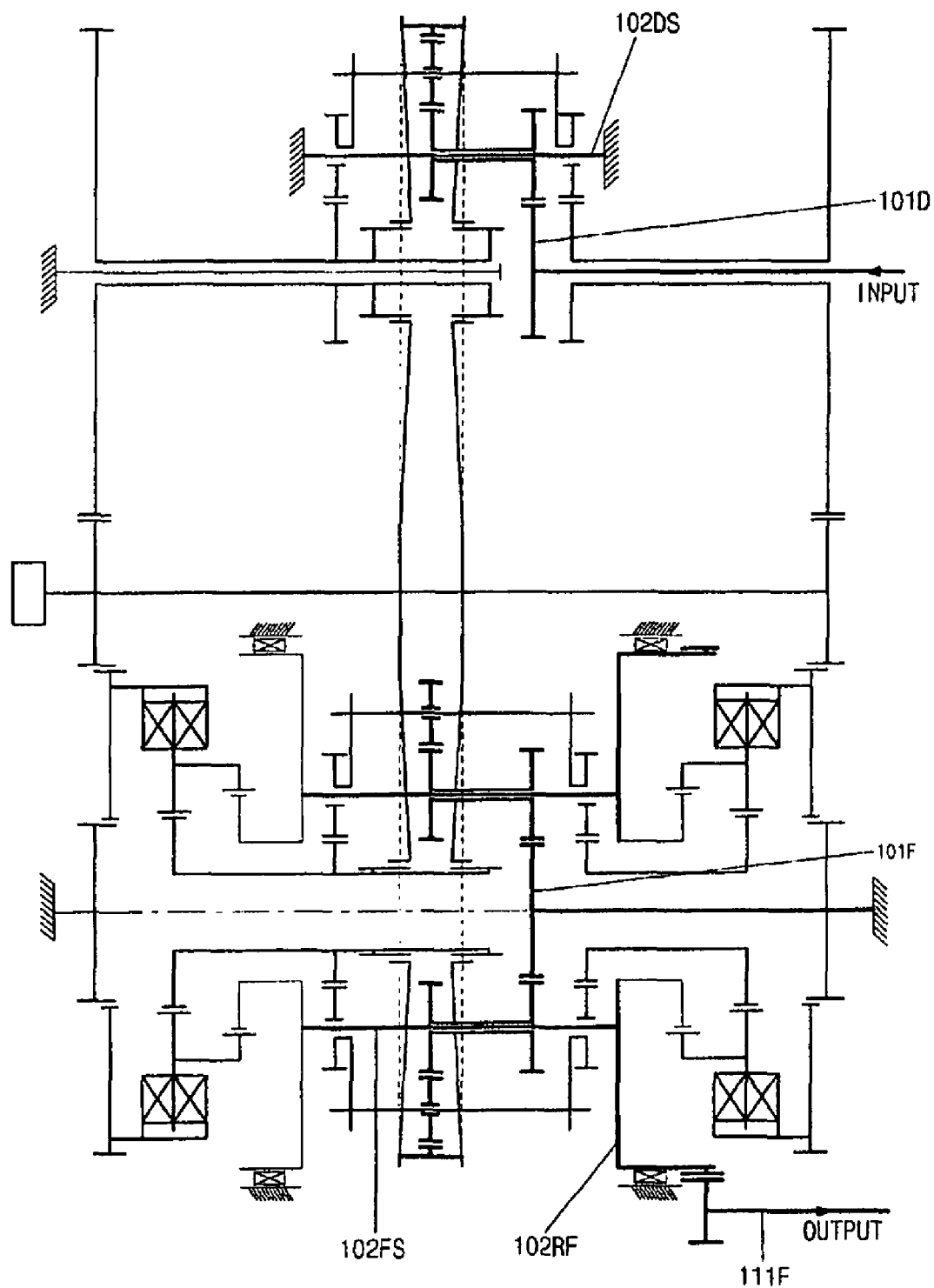

[Fig. 60]
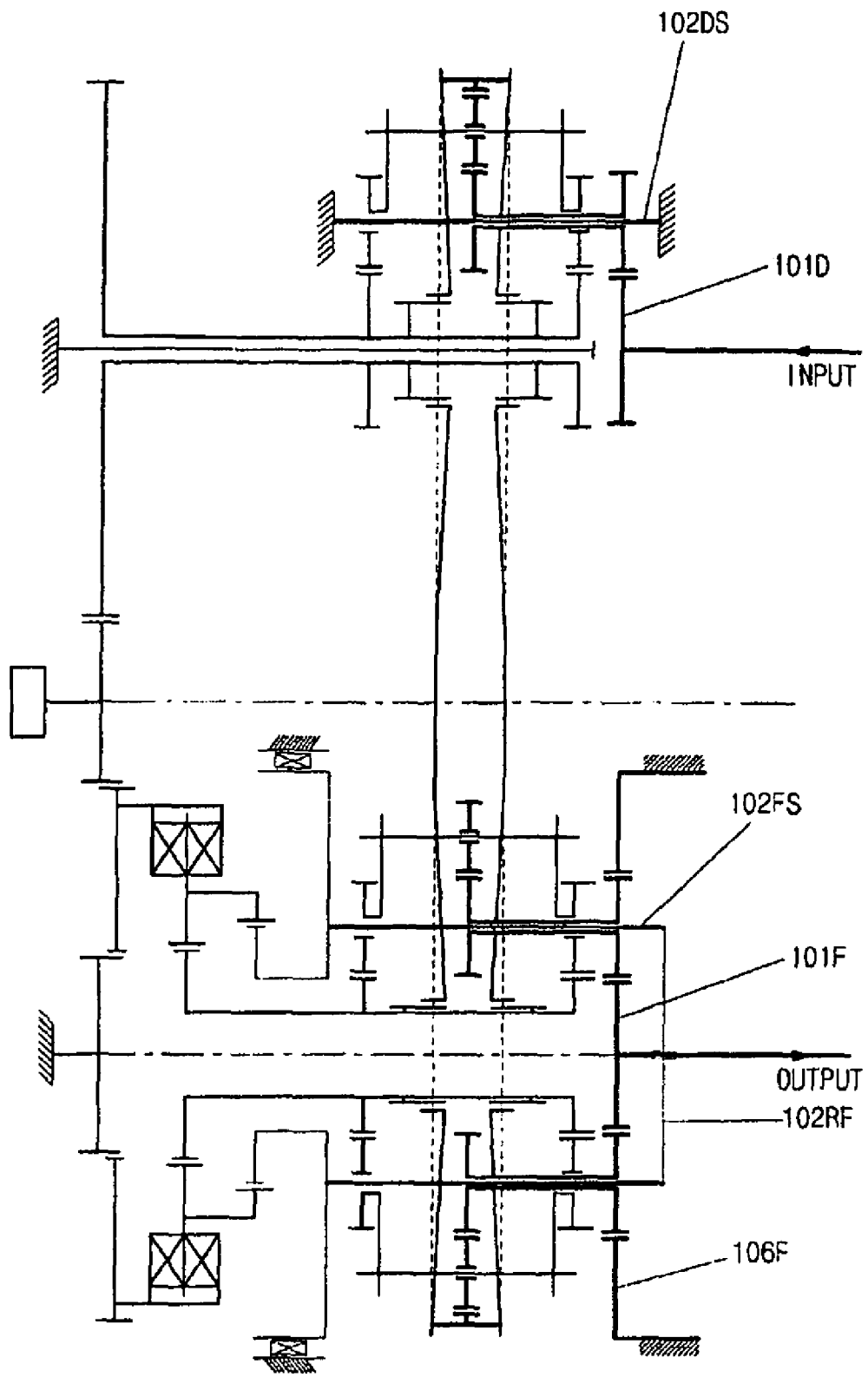

[Fig. 61]
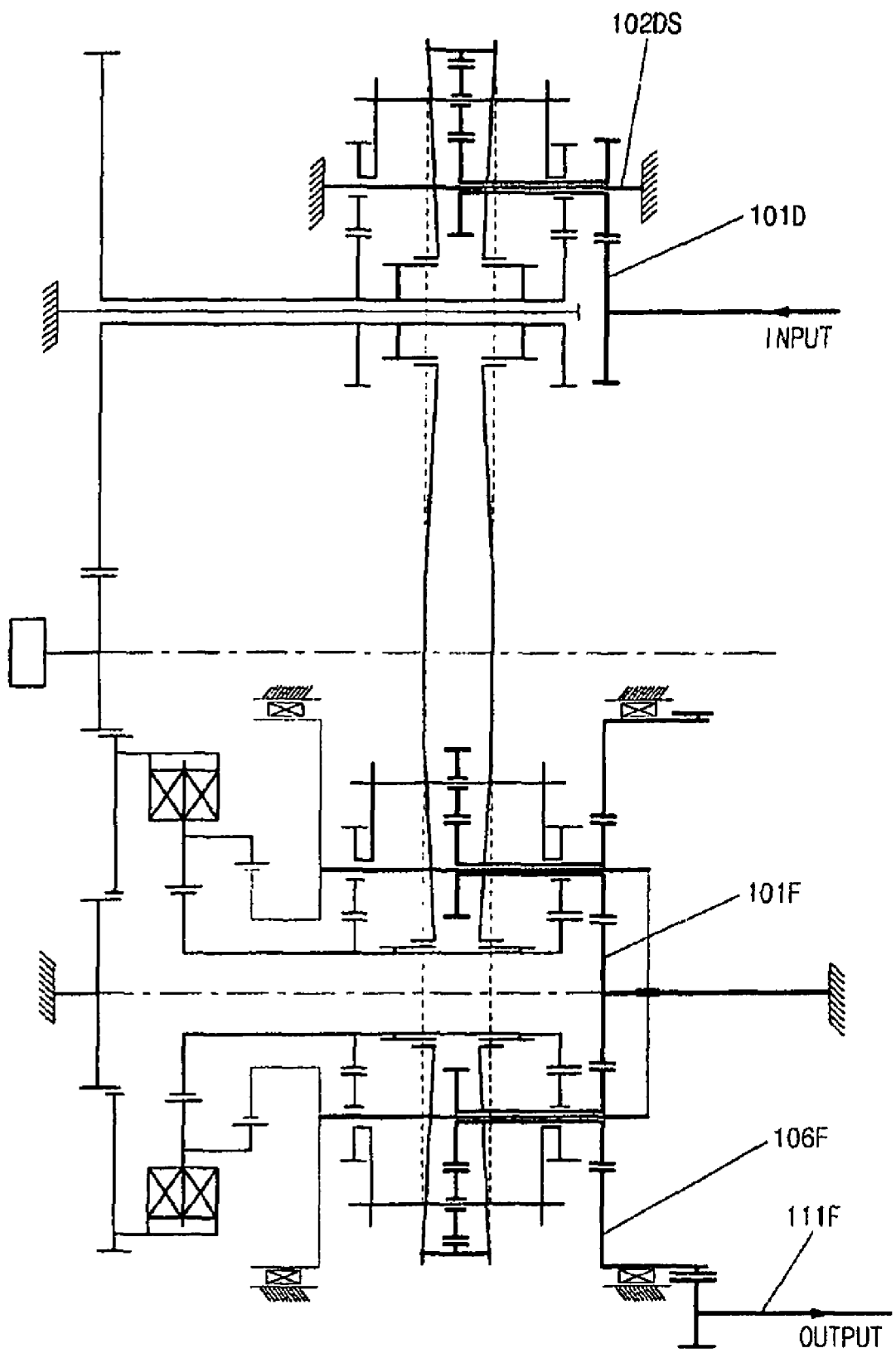

[Fig. 62]
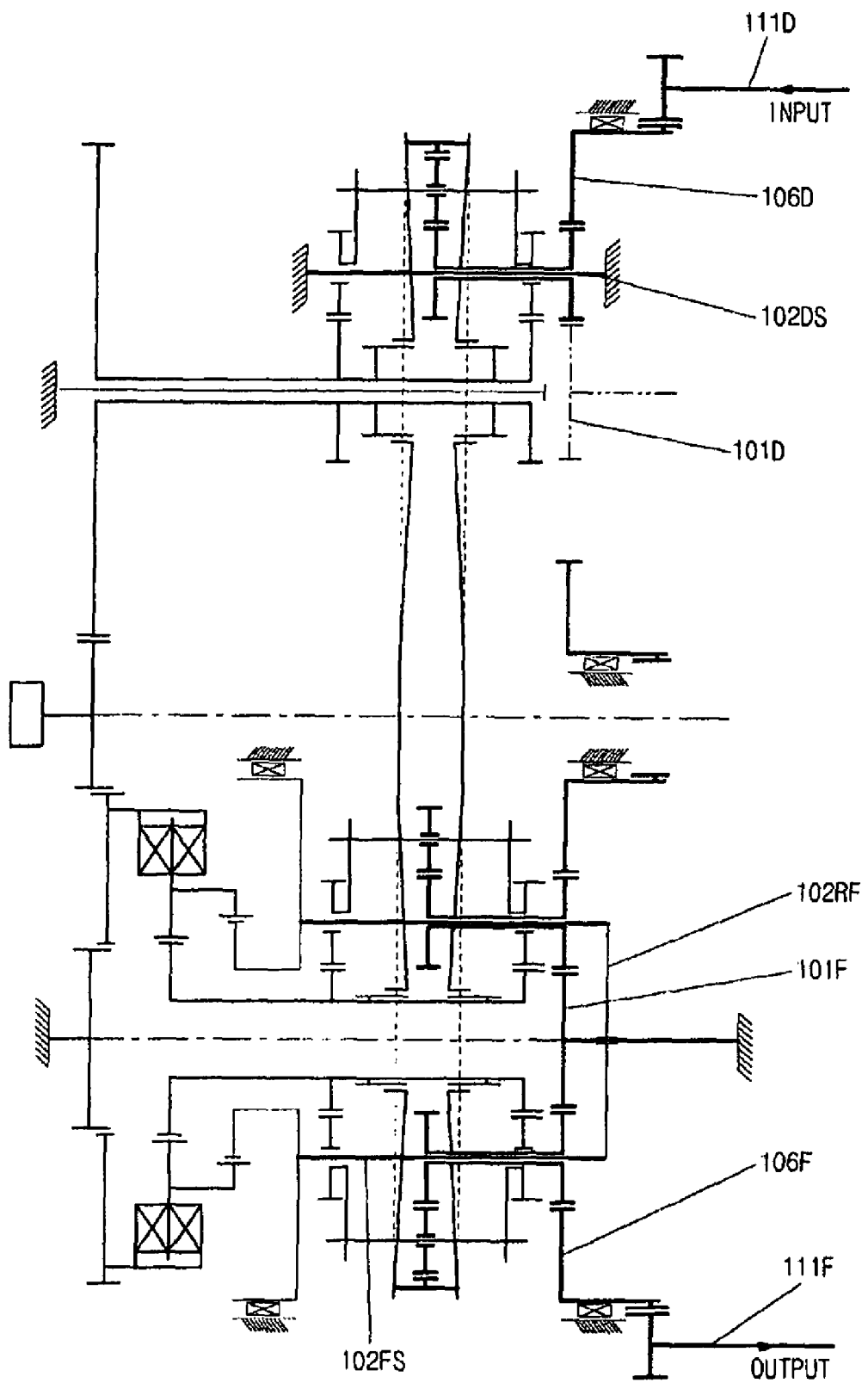

[Fig. 63]
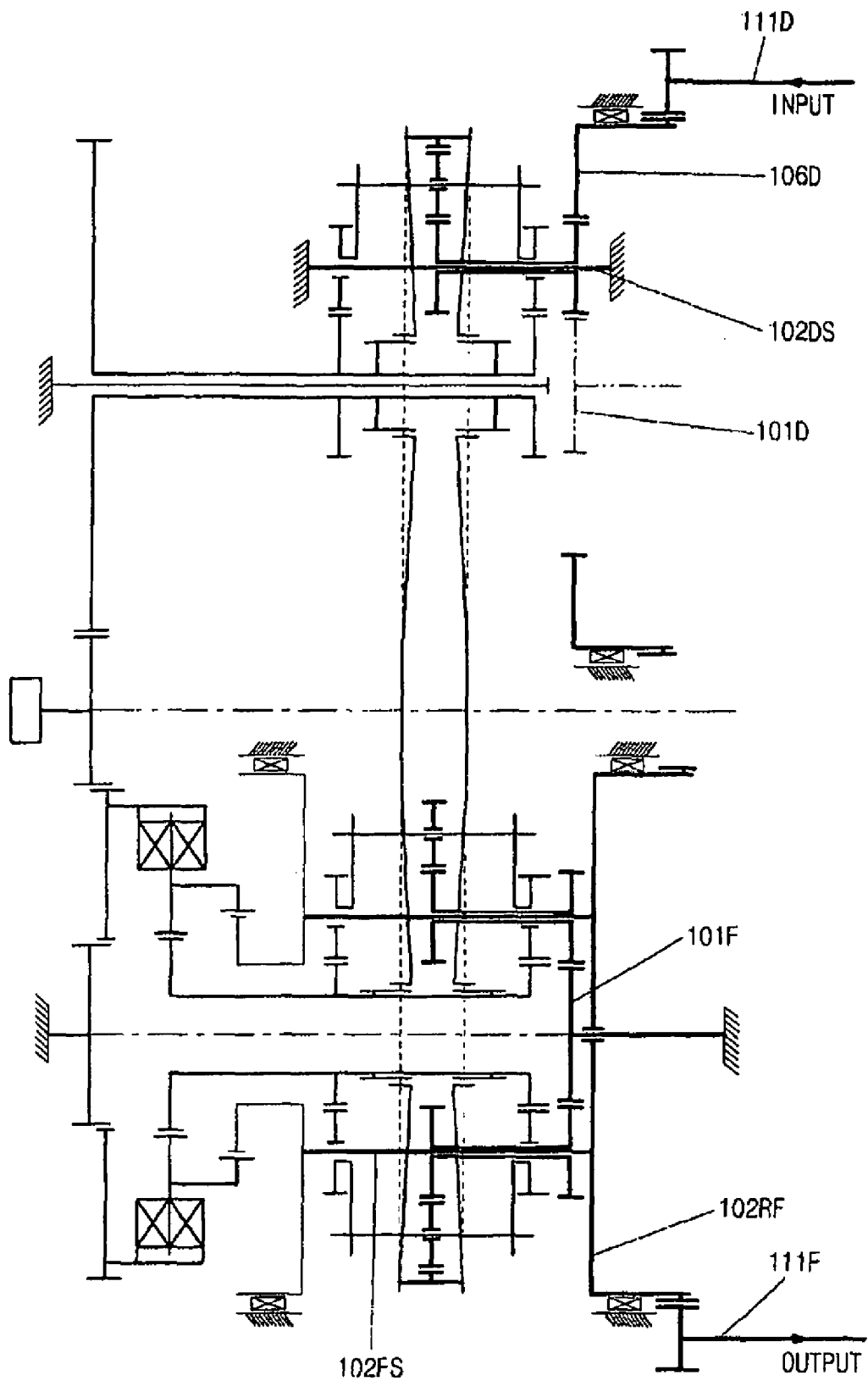

[Fig. 64]
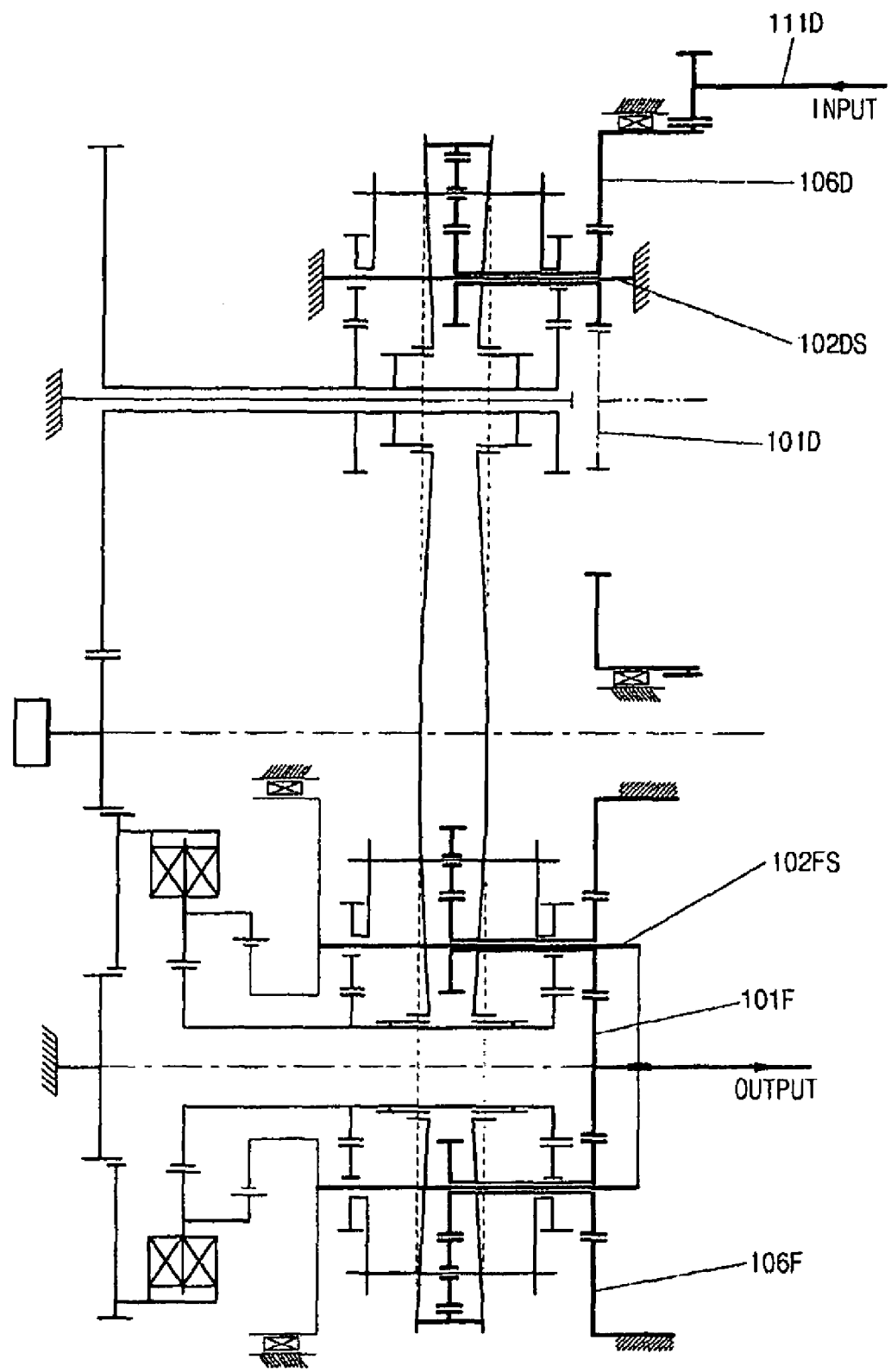

[Fig. 65]
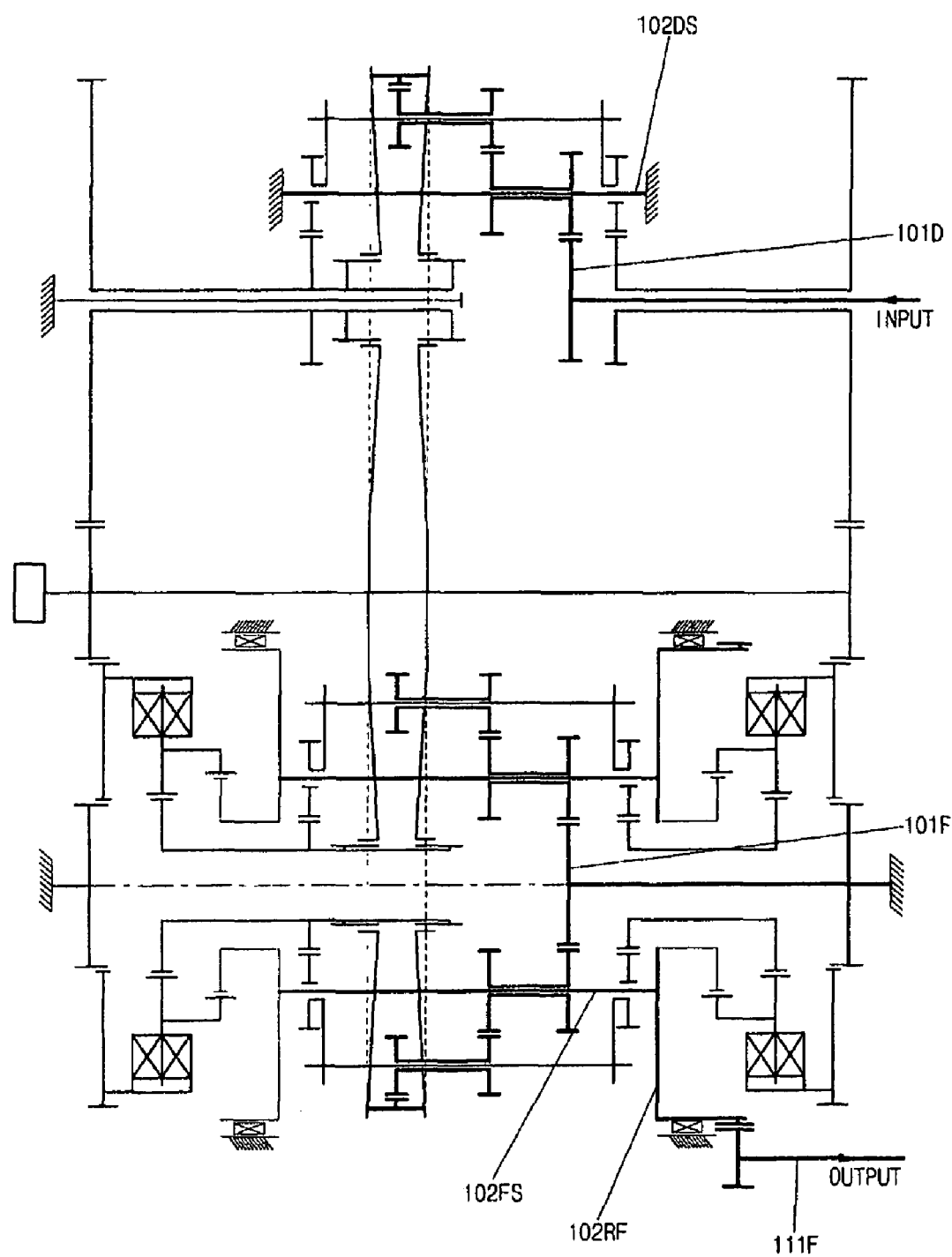

[Fig. 66]
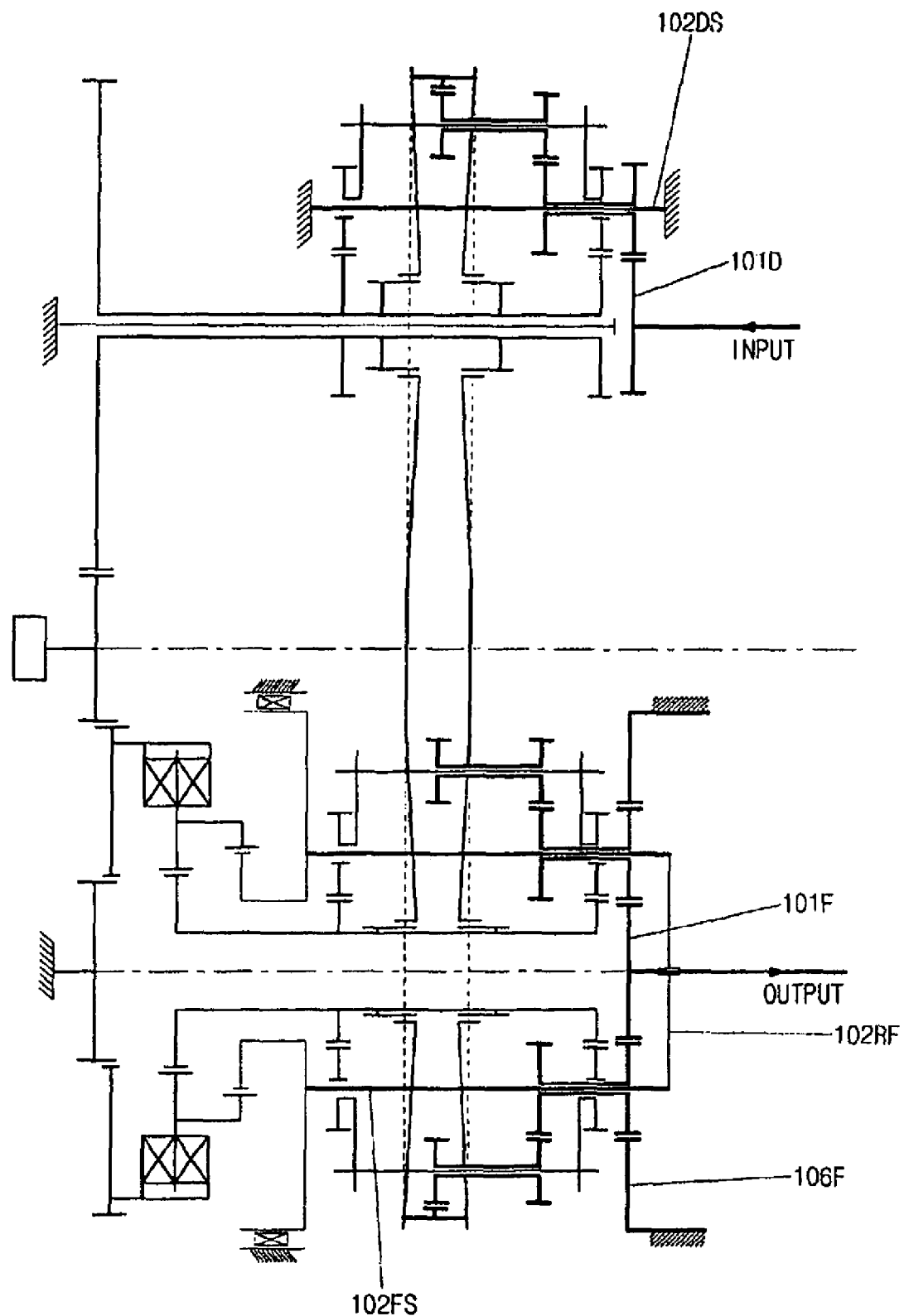

[Fig. 67]
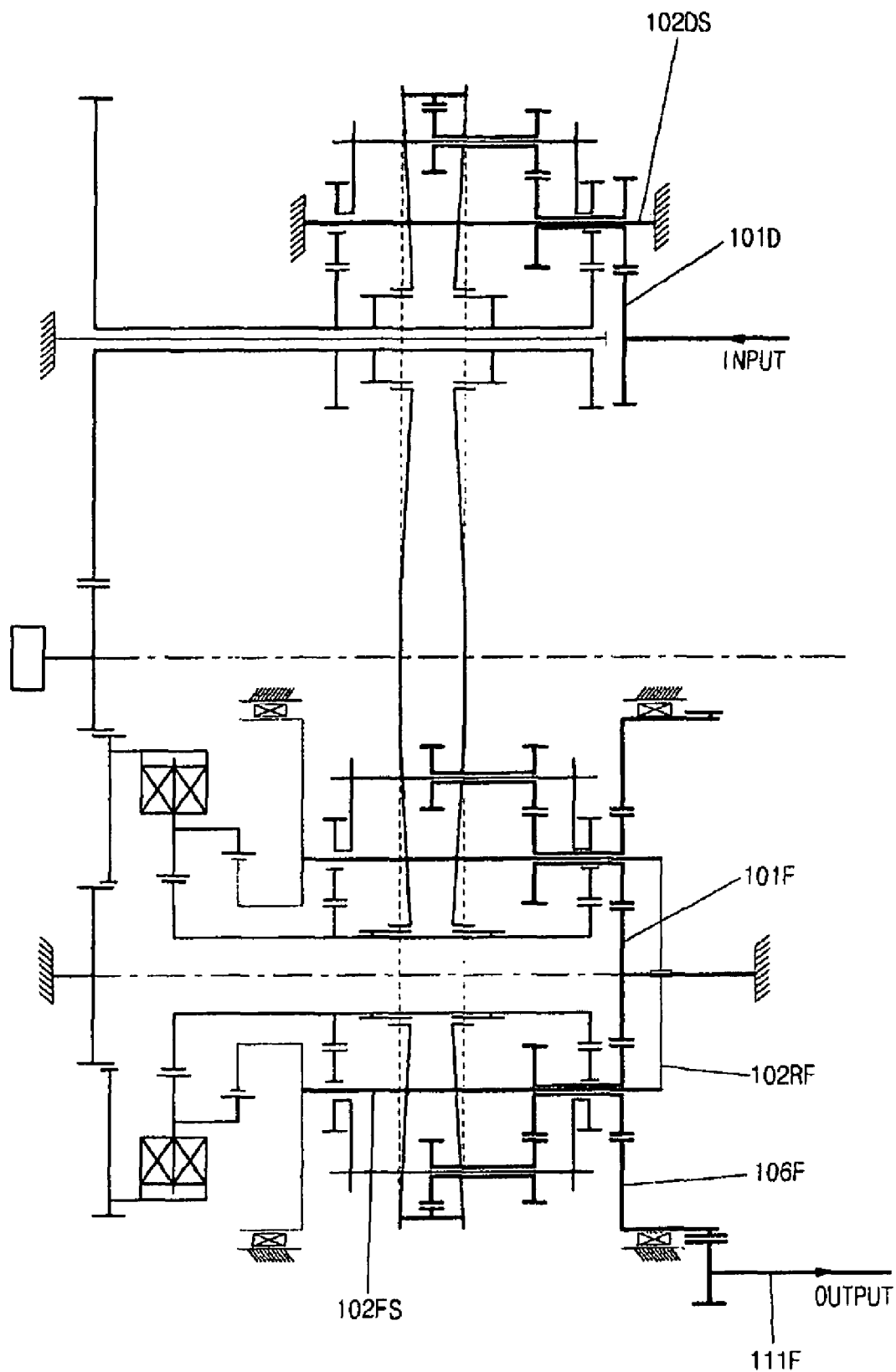

[Fig. 68]
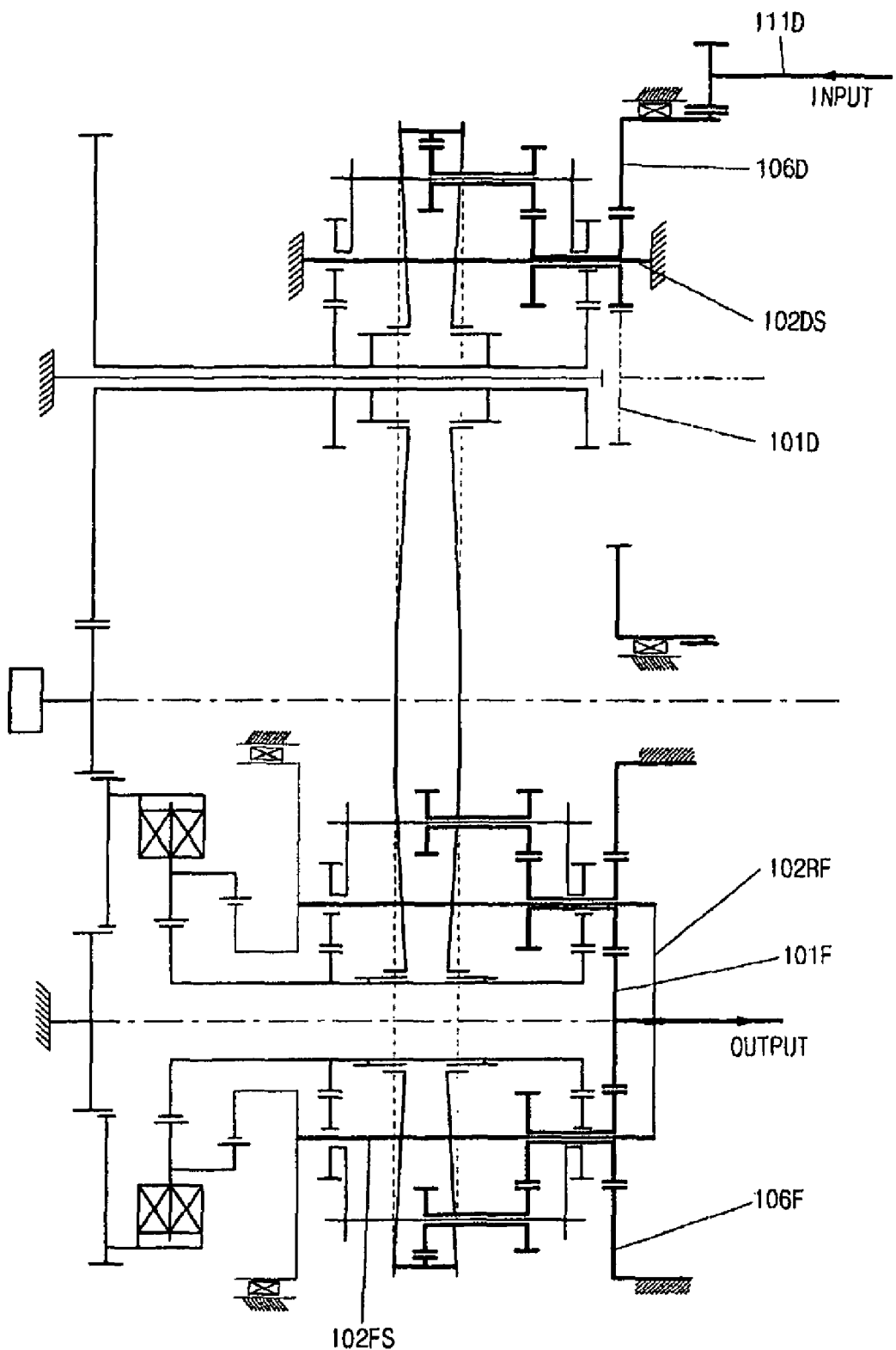

[Fig. 69]
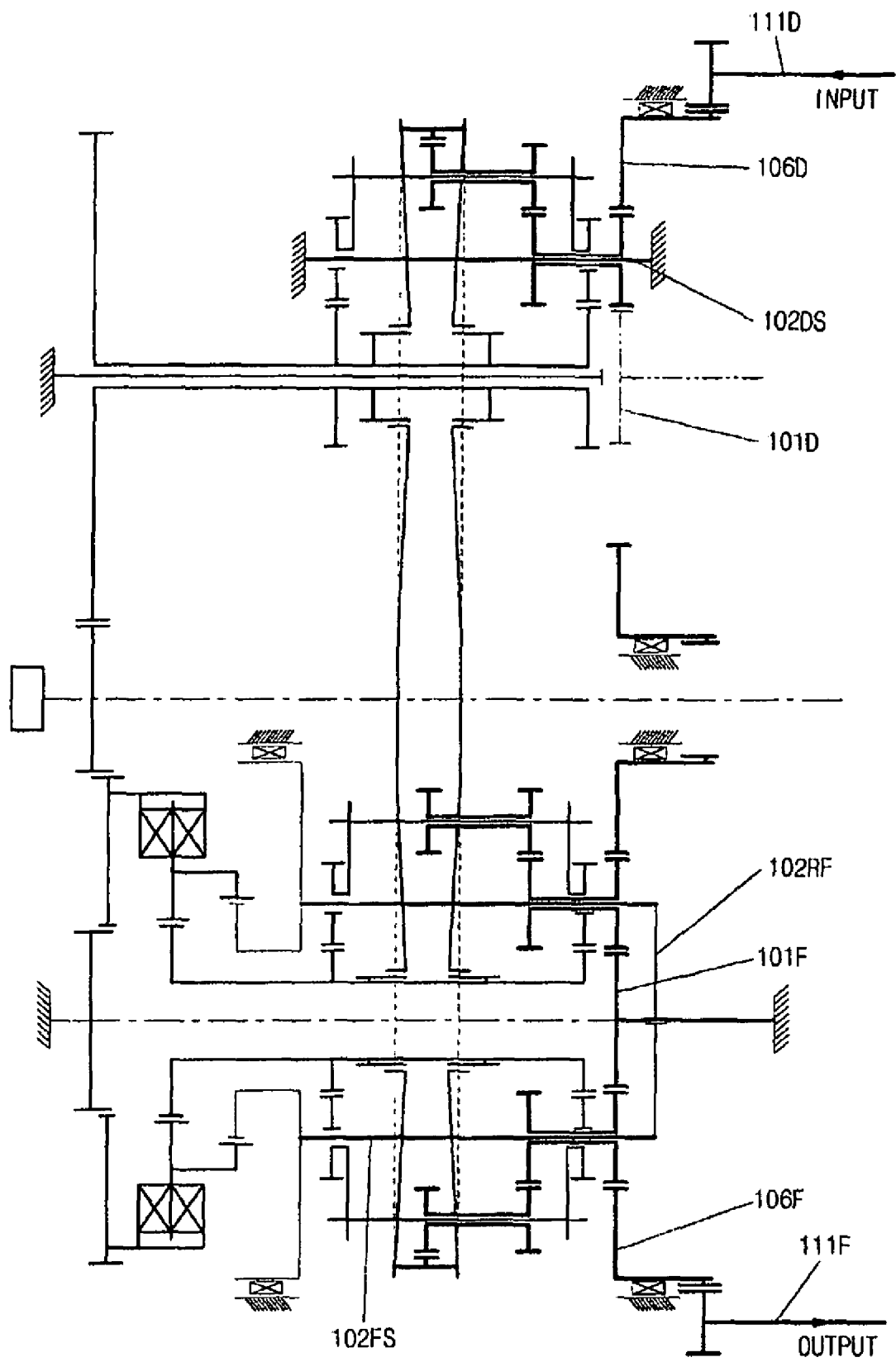

[Fig. 70]
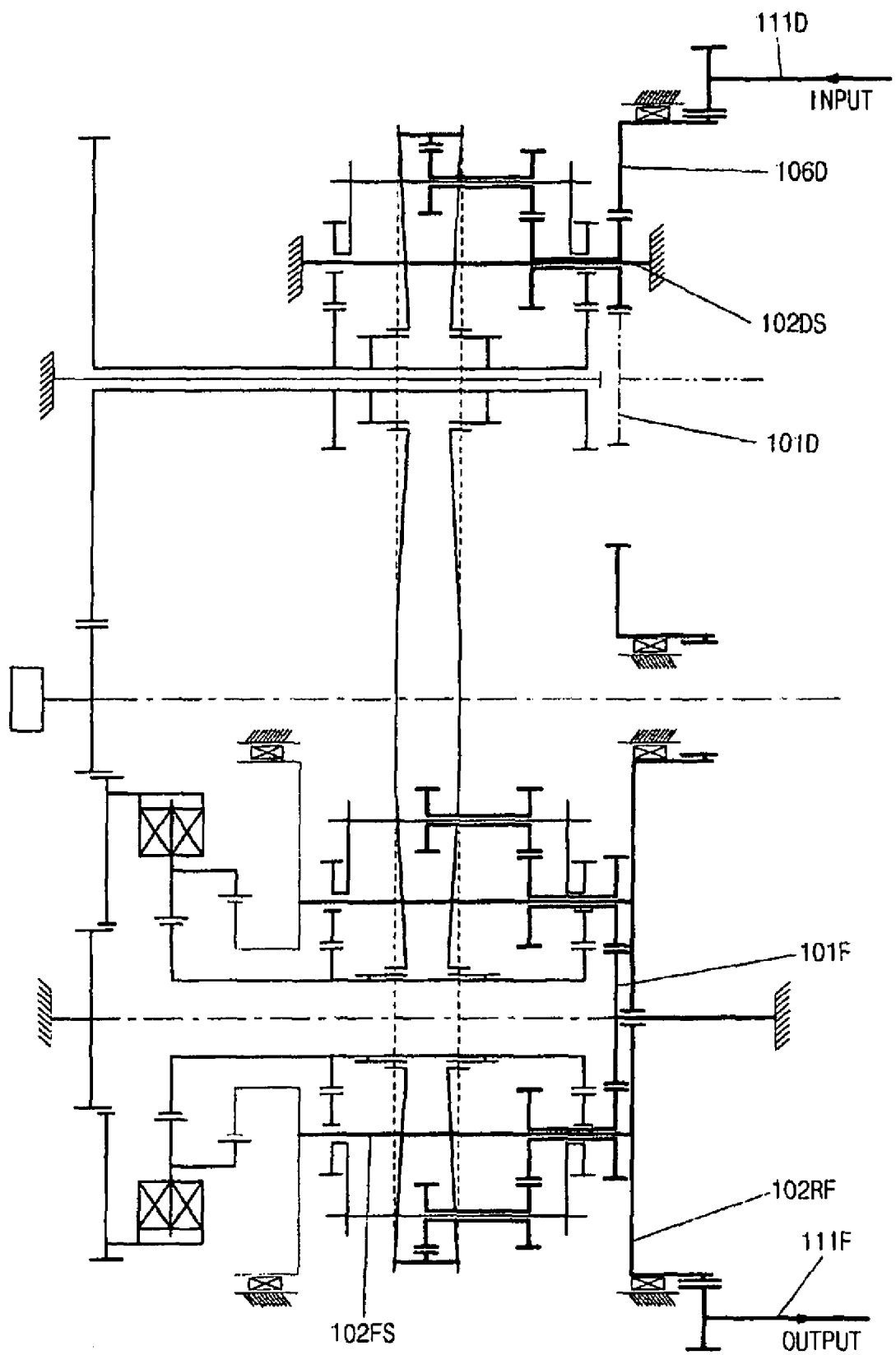

[Fig. 71]
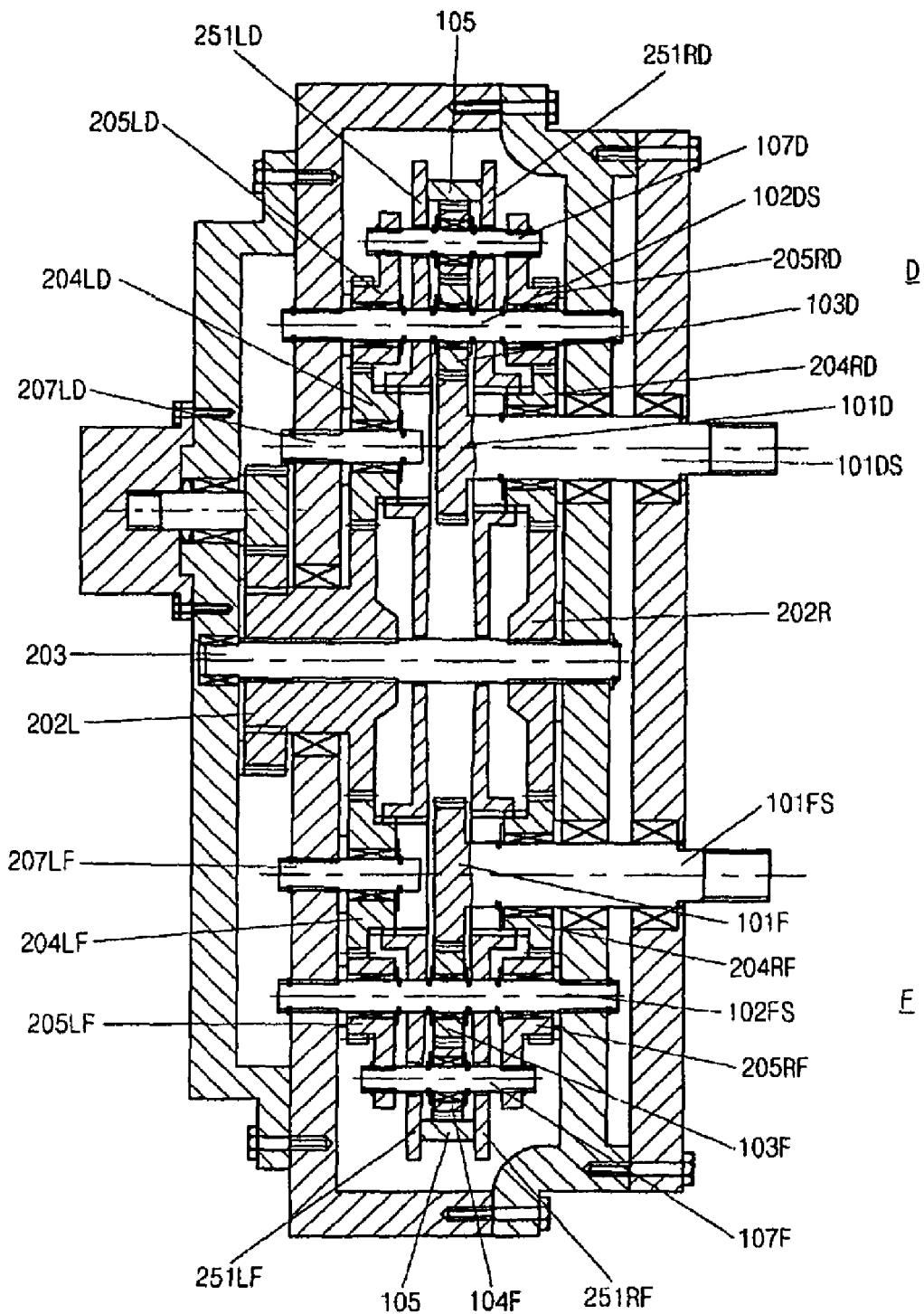

[Fig. 72]
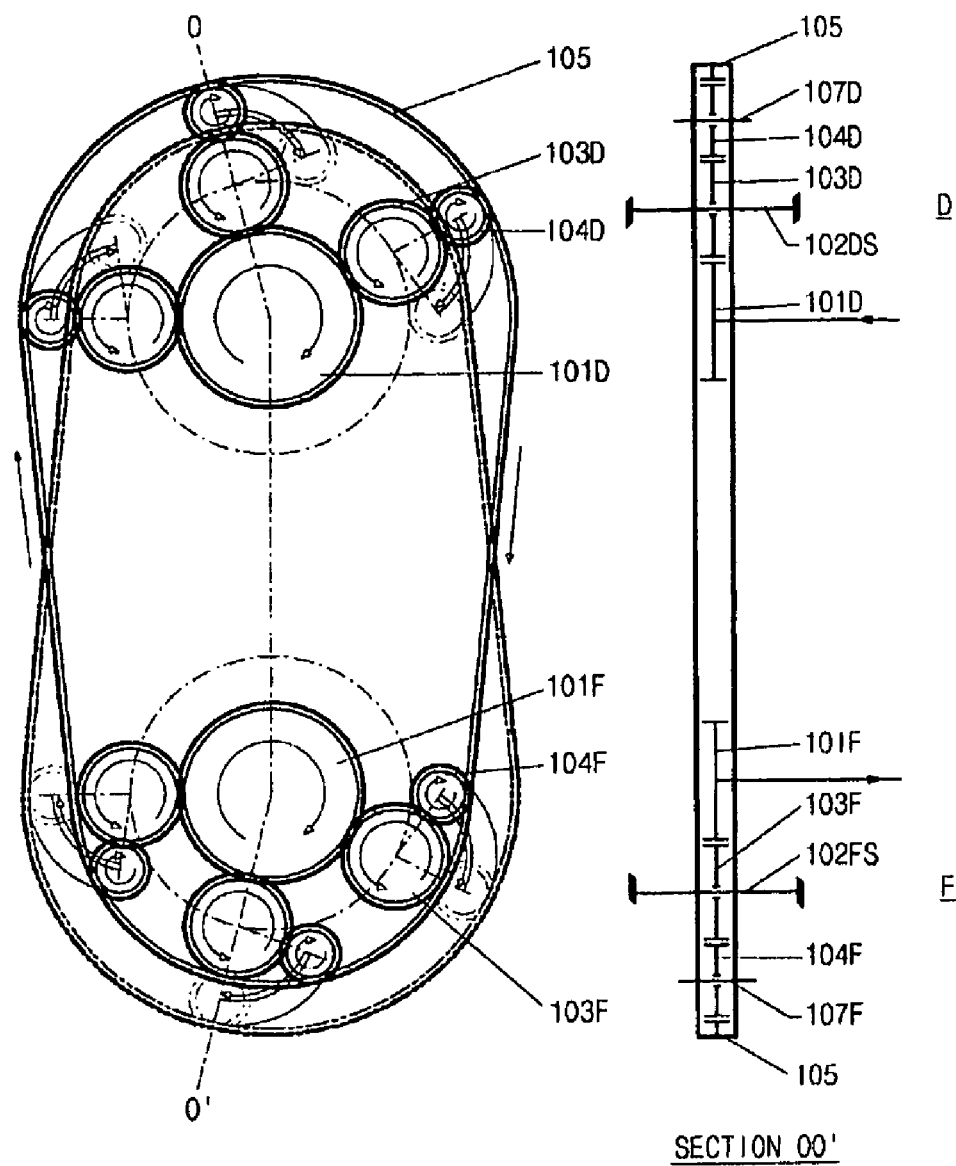
SECTION OO'

[Fig. 73]
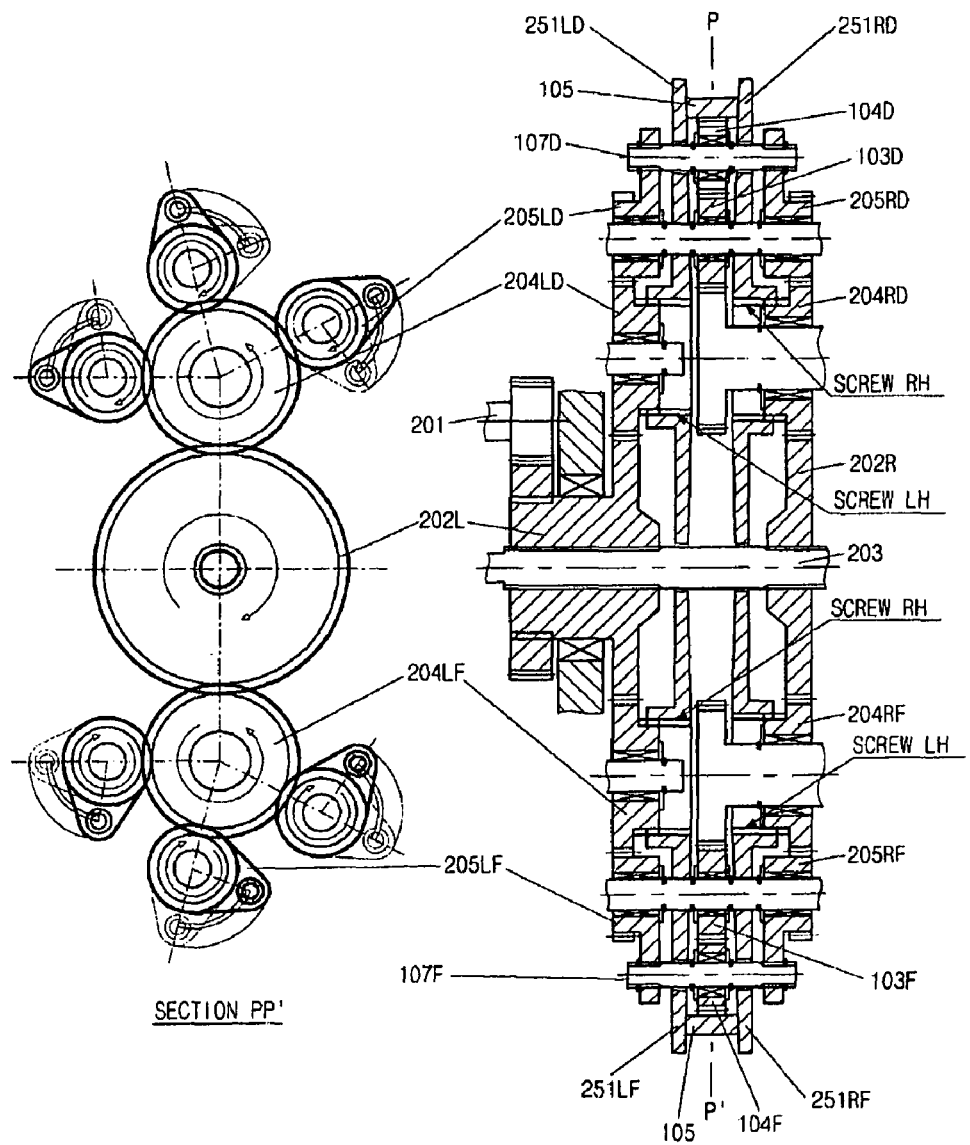

[Fig. 74]
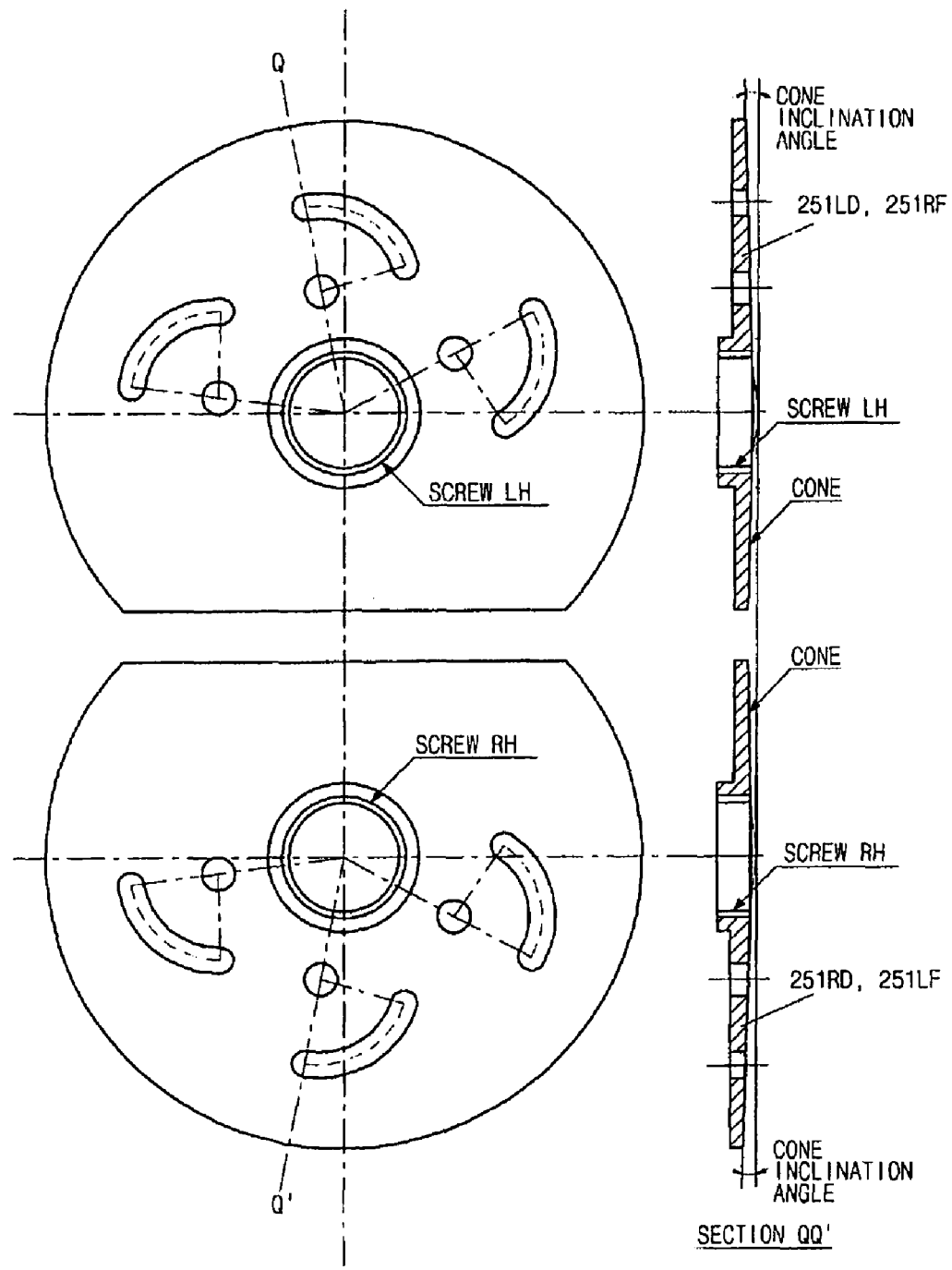

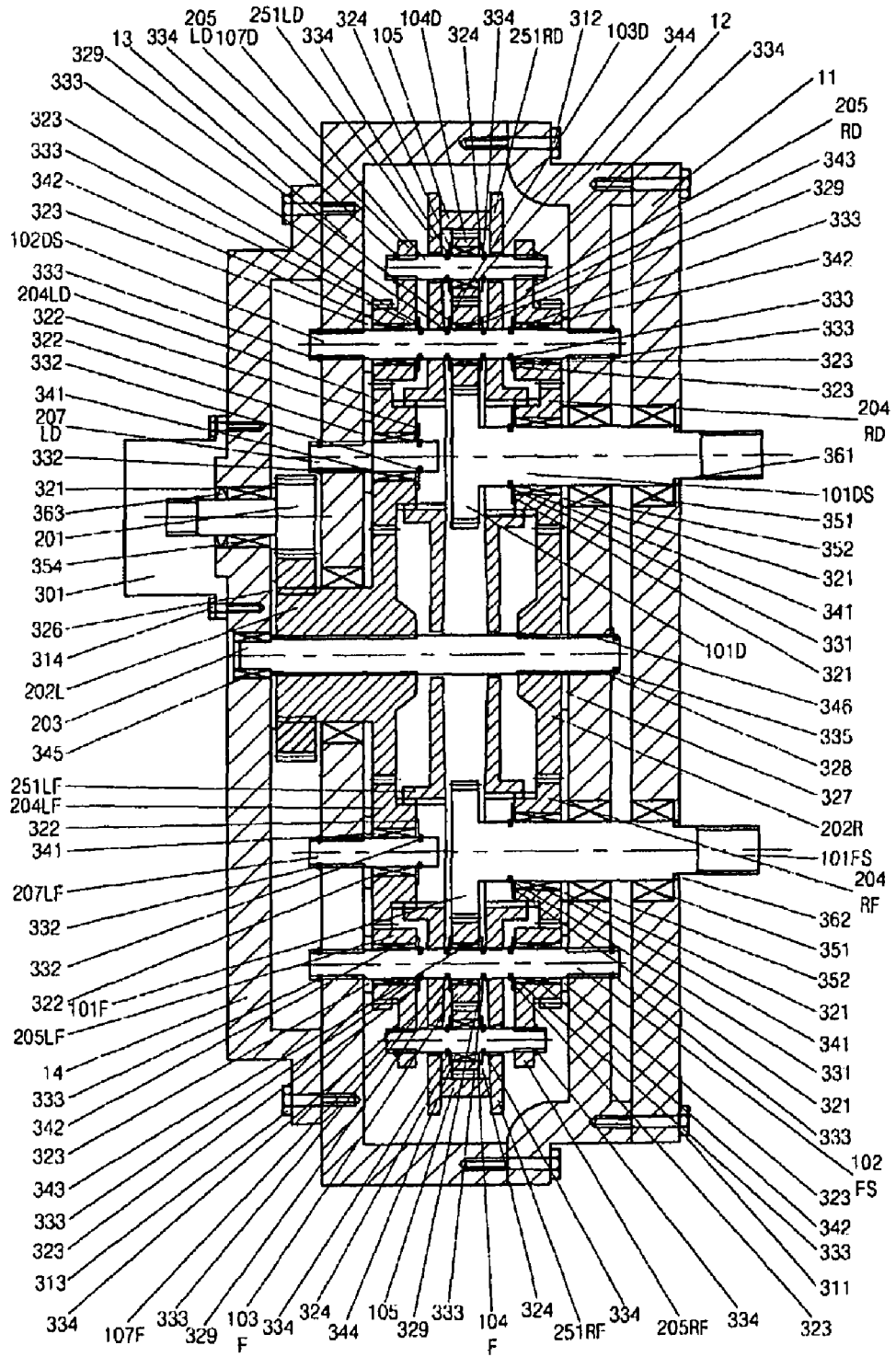
[Fig. 75]

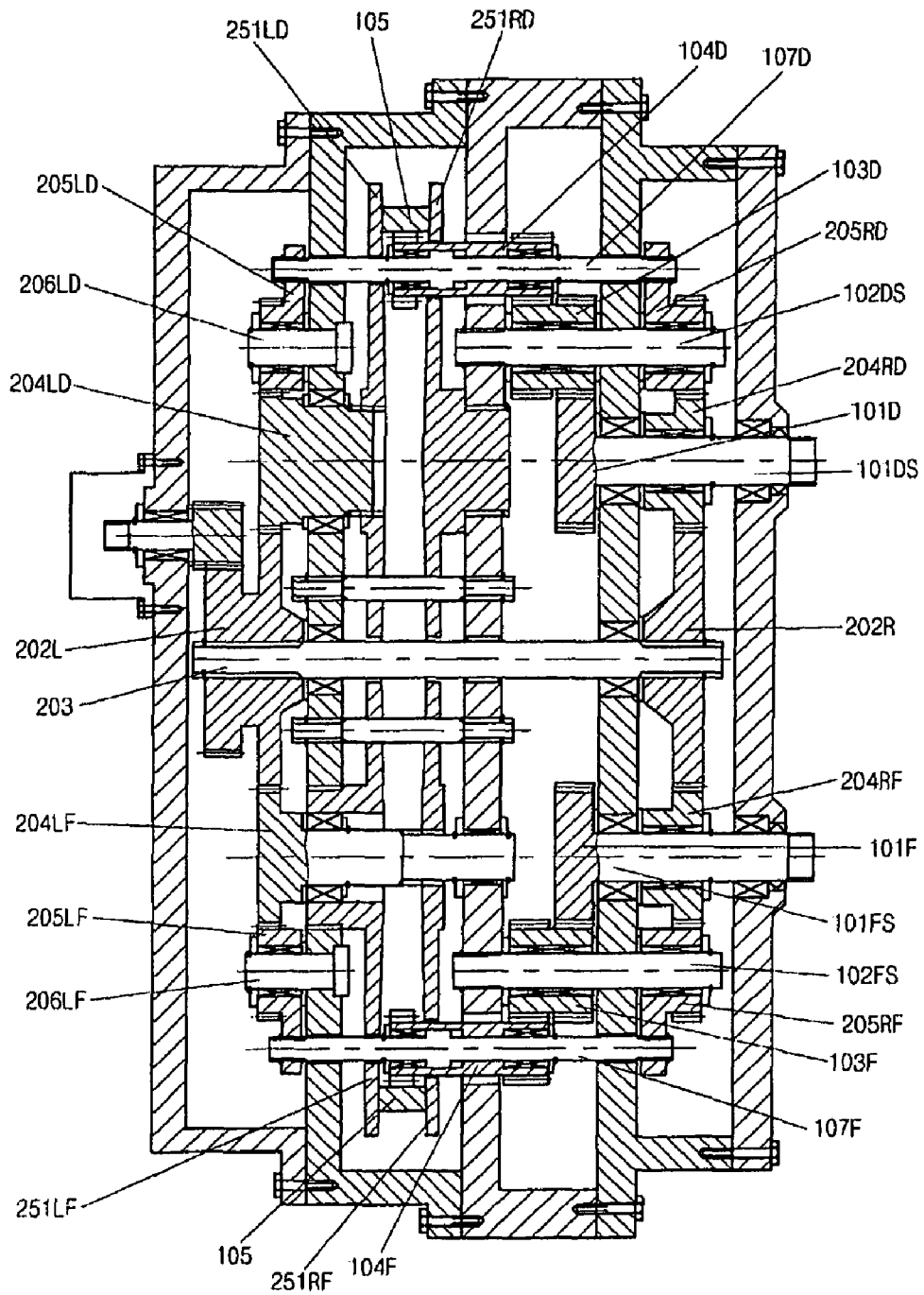
[Fig. 76]

[Fig. 77]
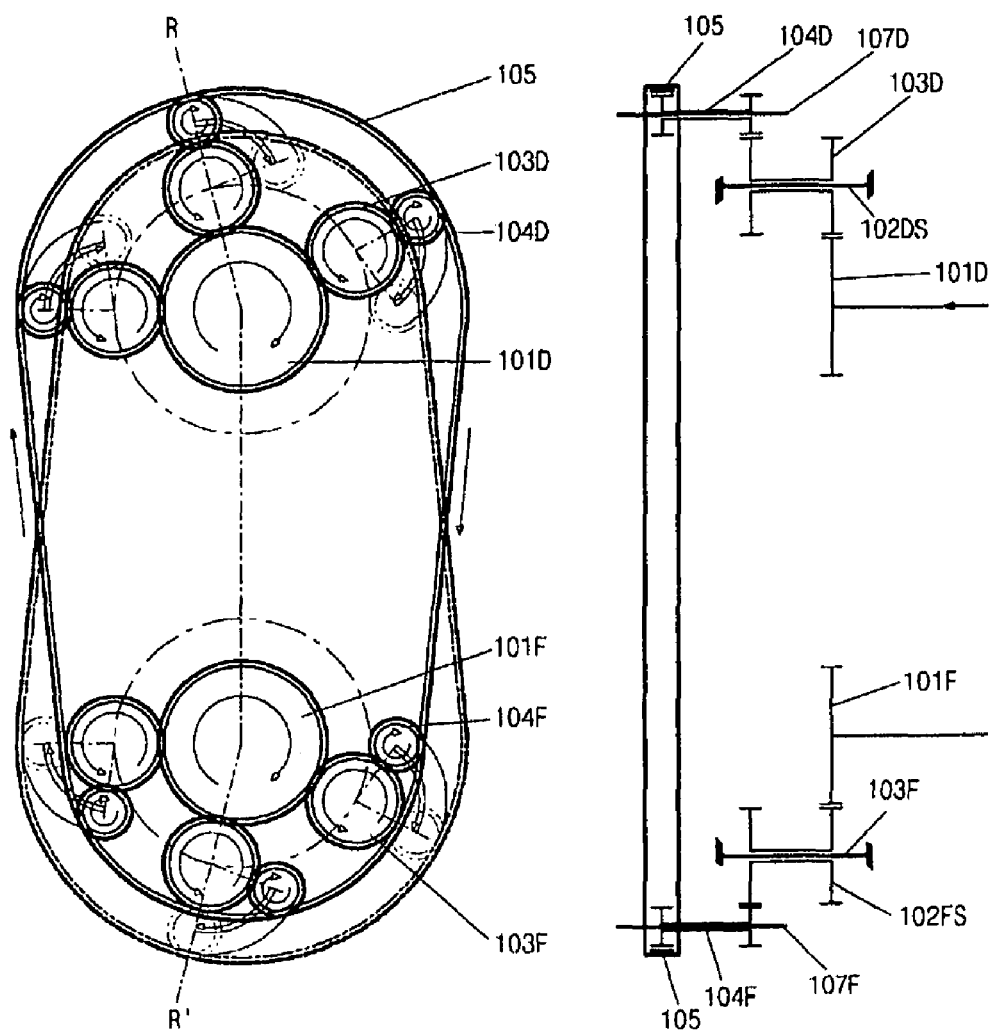
SECTION RR'

[Fig. 78]
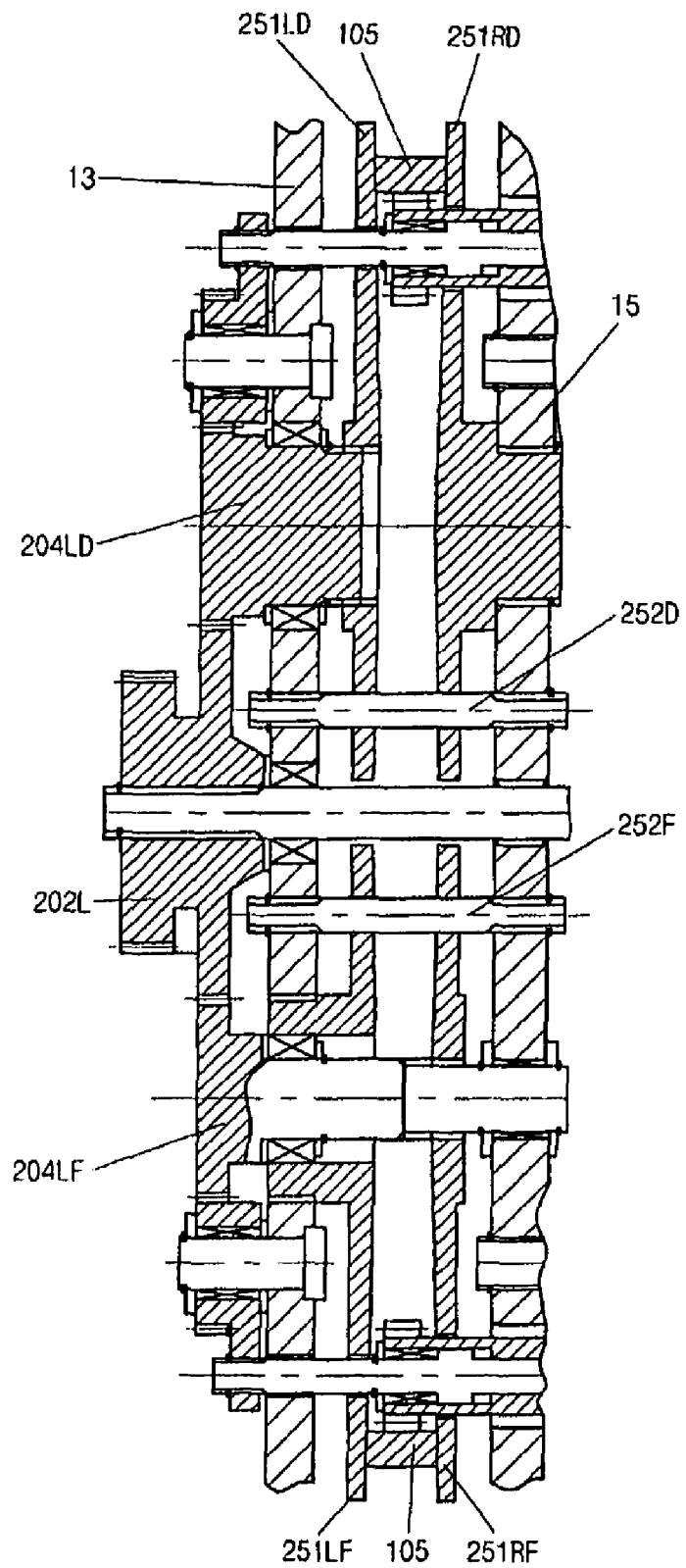

[Fig. 79]
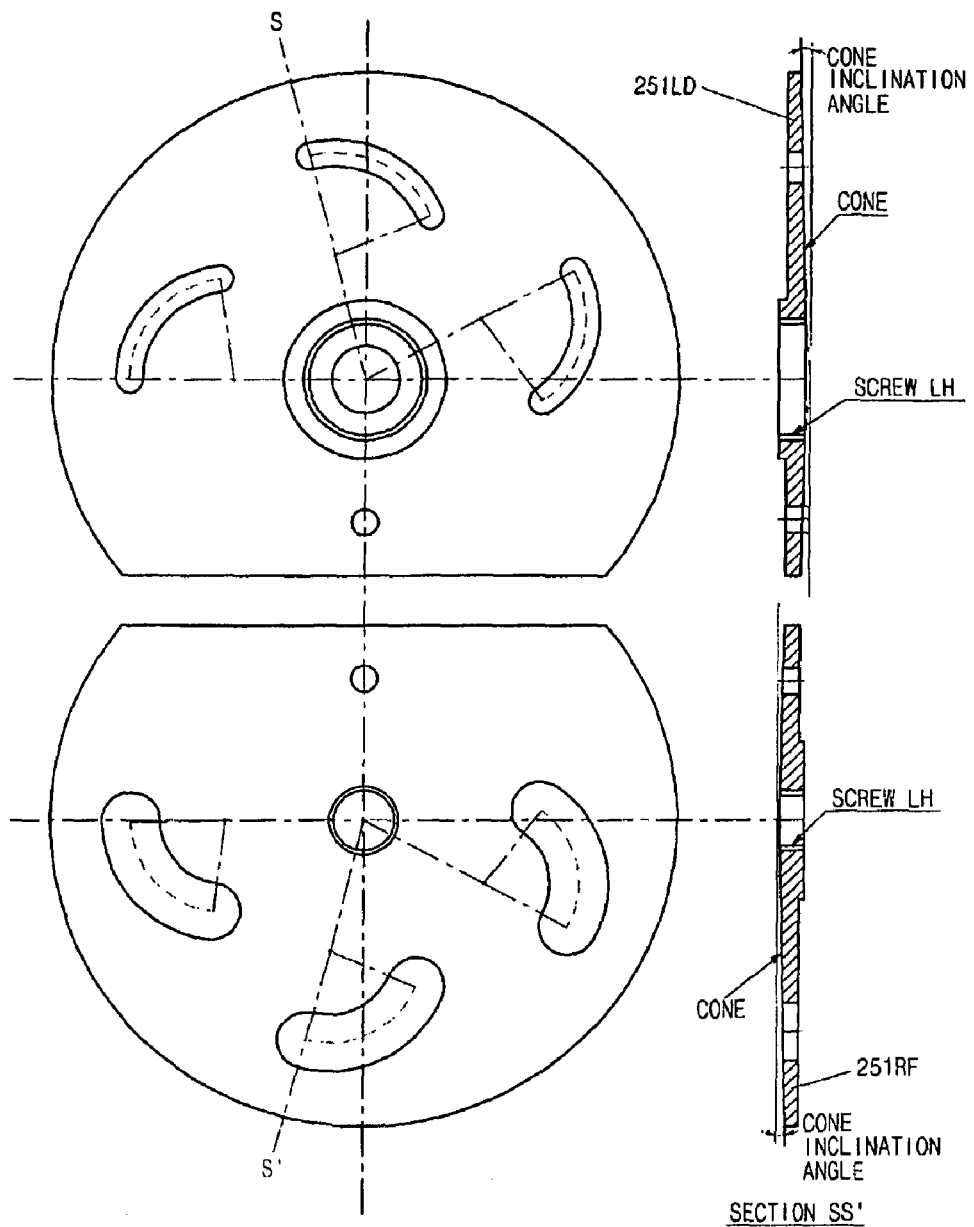

[Fig. 80]
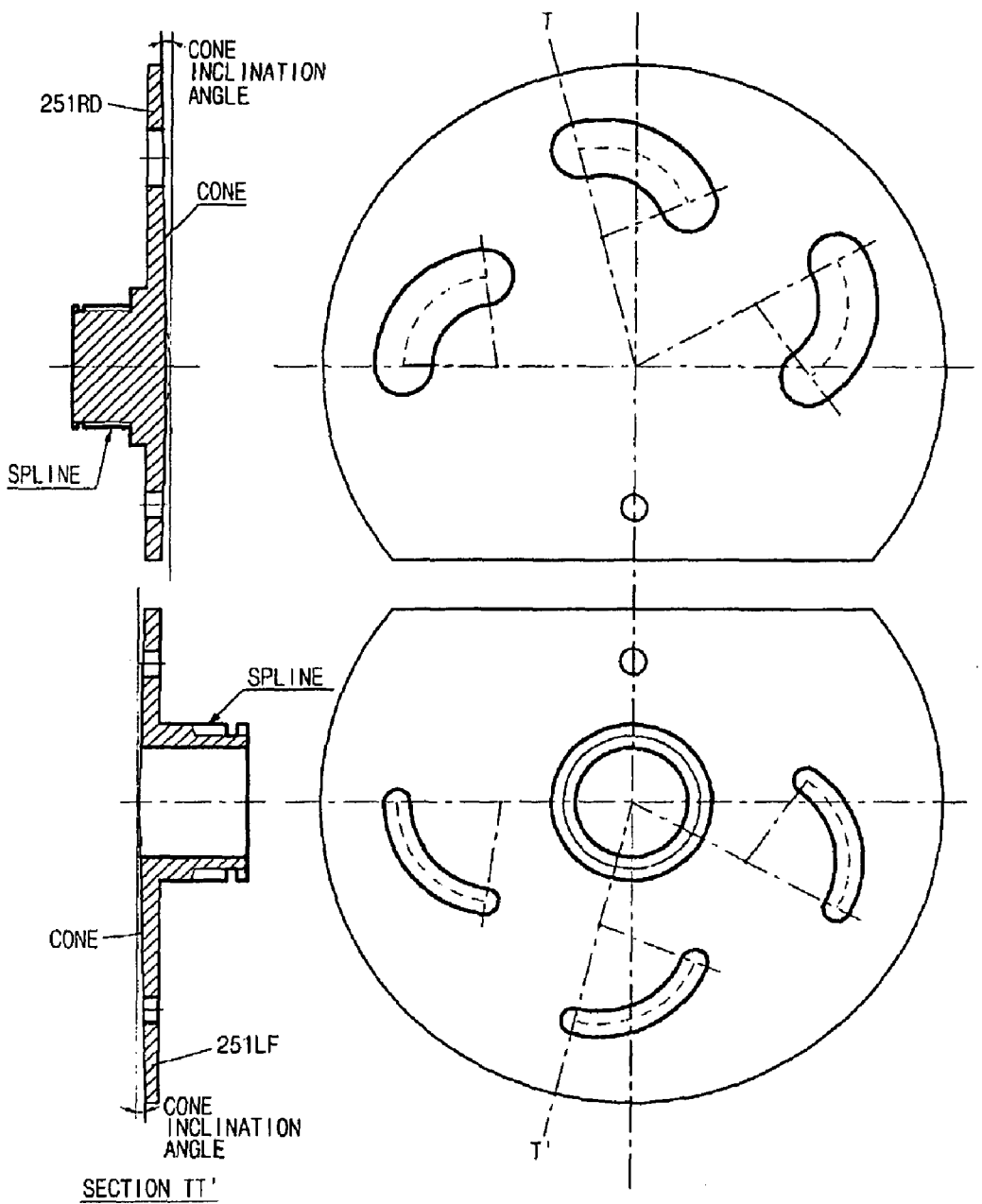

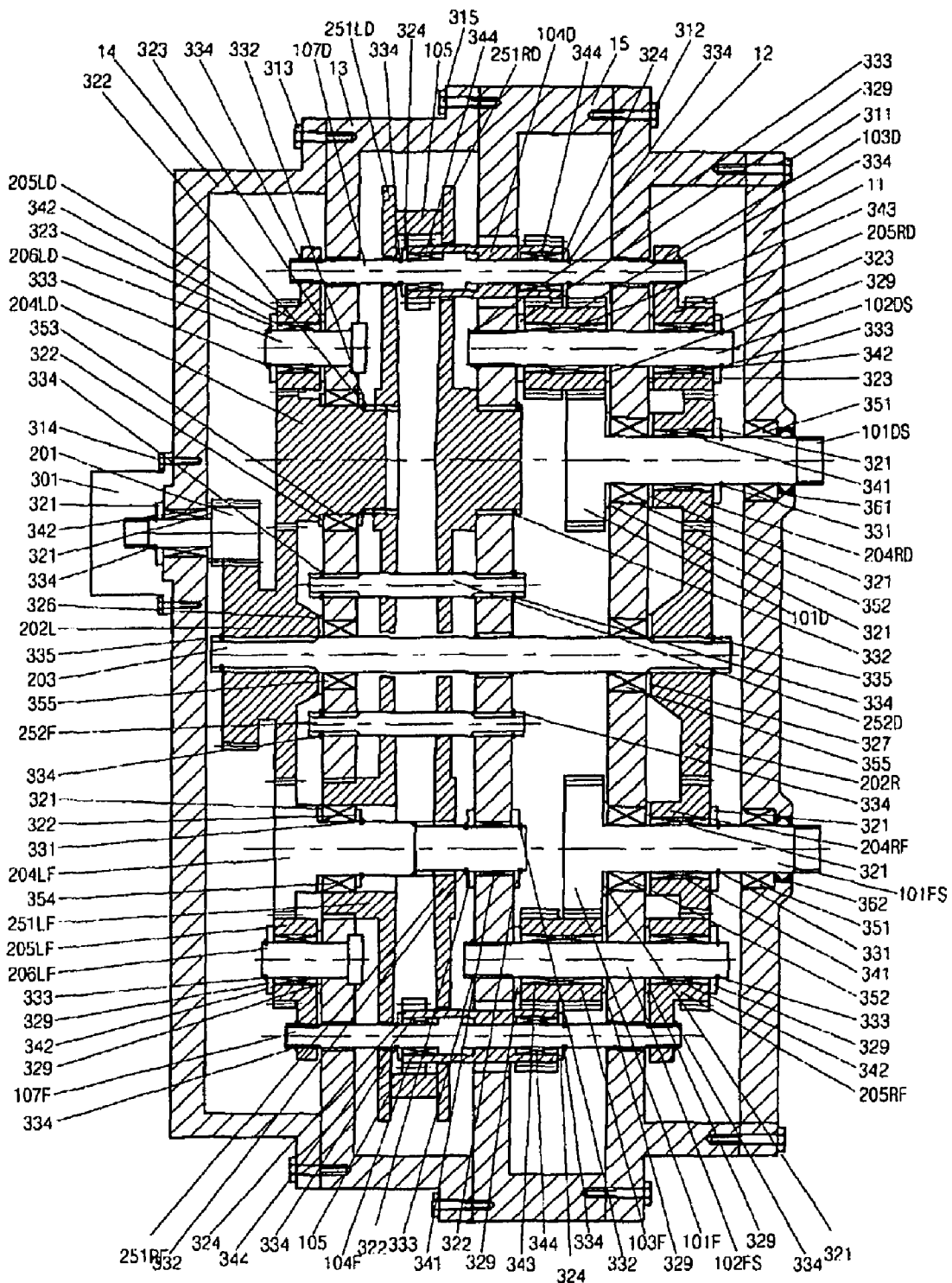
[Fig. 81]

[Fig. 82]
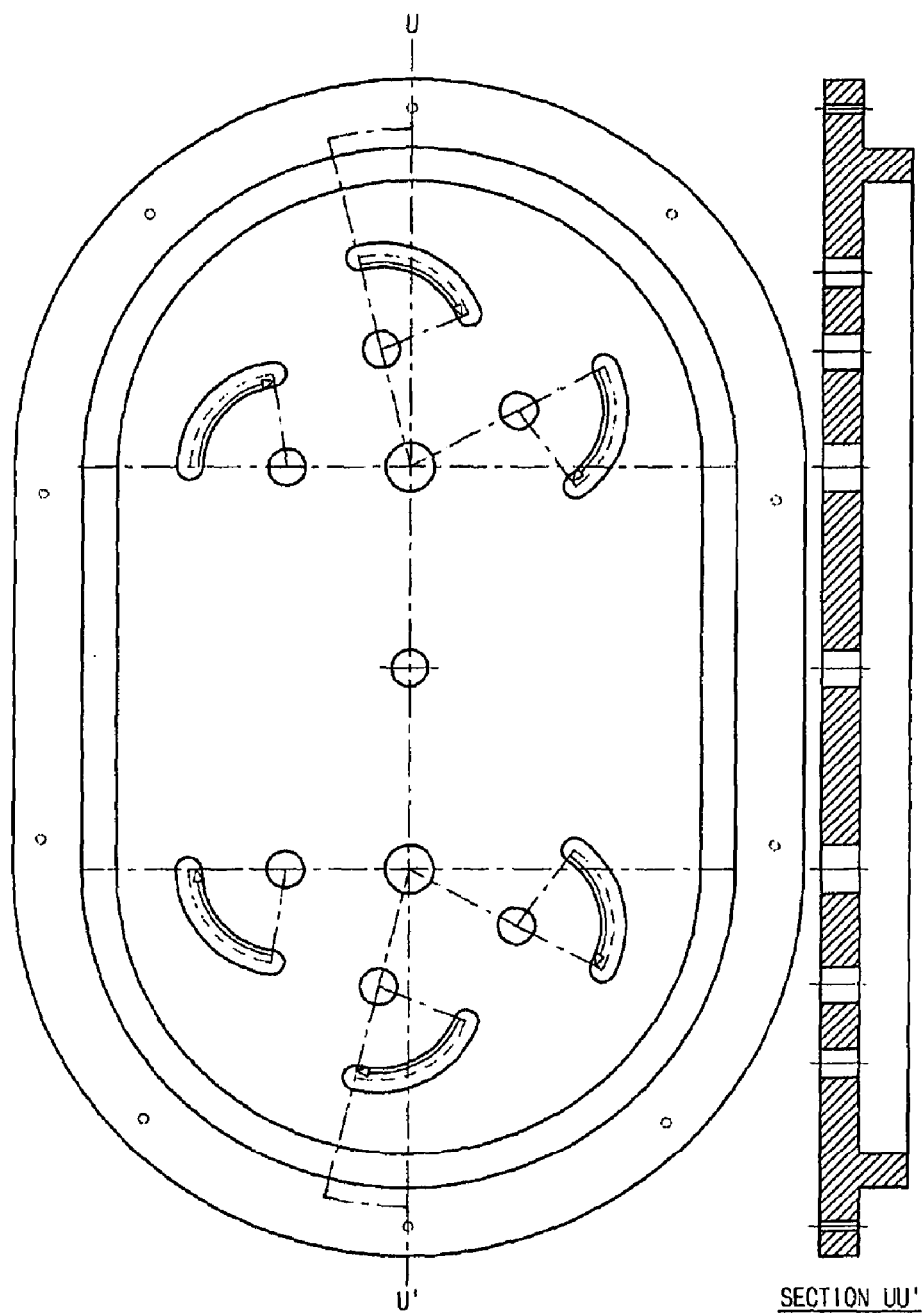
SECTION UU'

[Fig. 83]
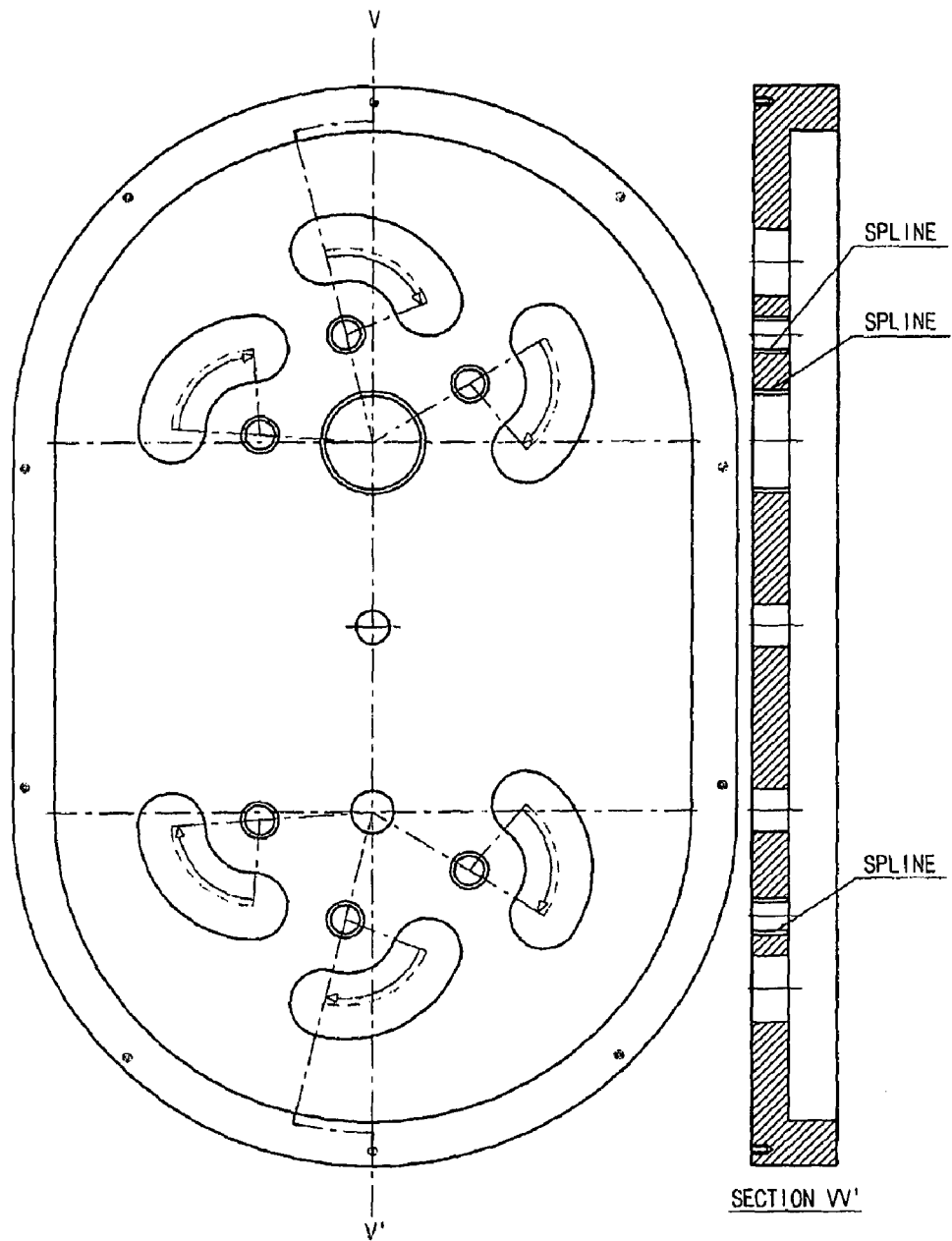

[Fig. 84]
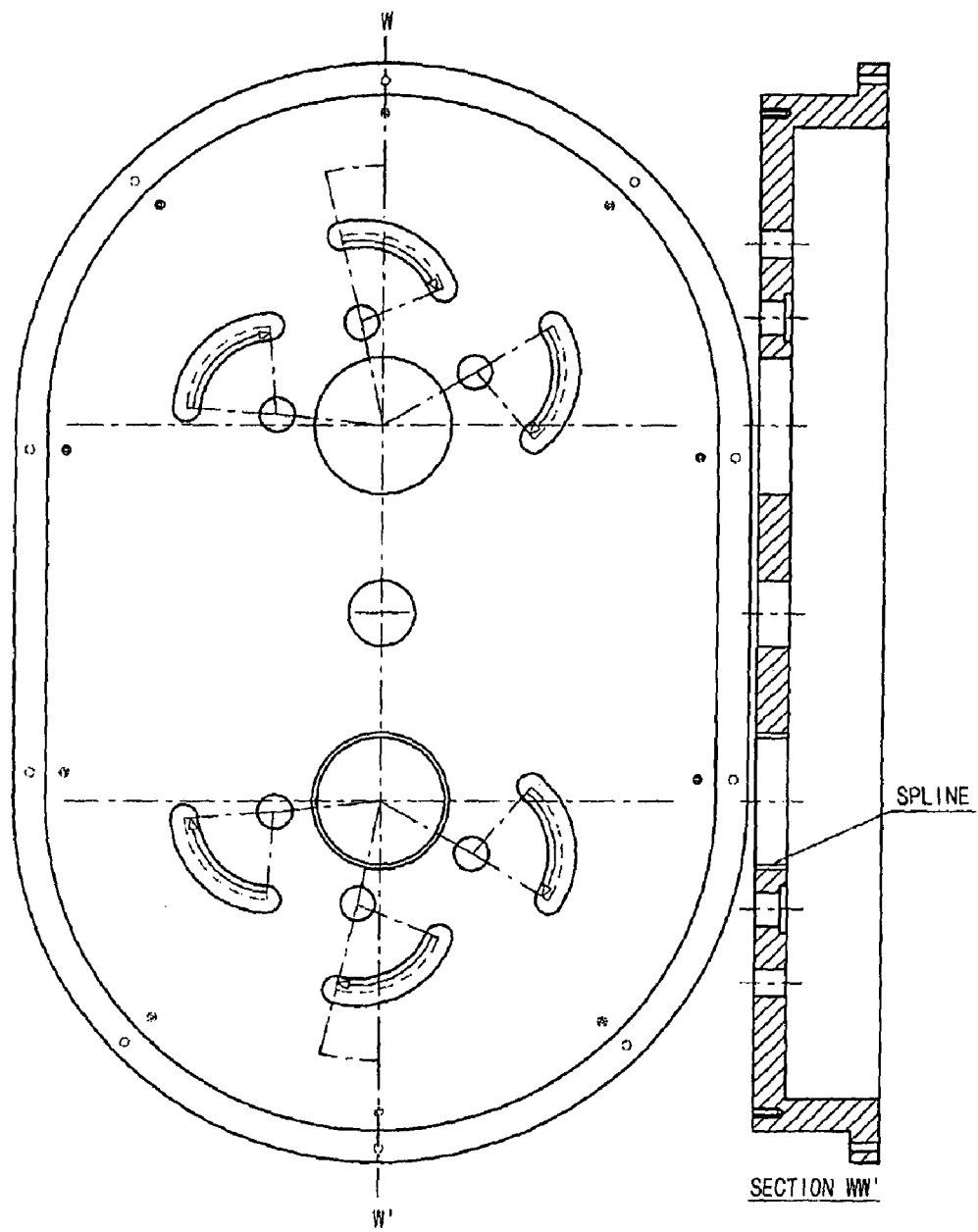

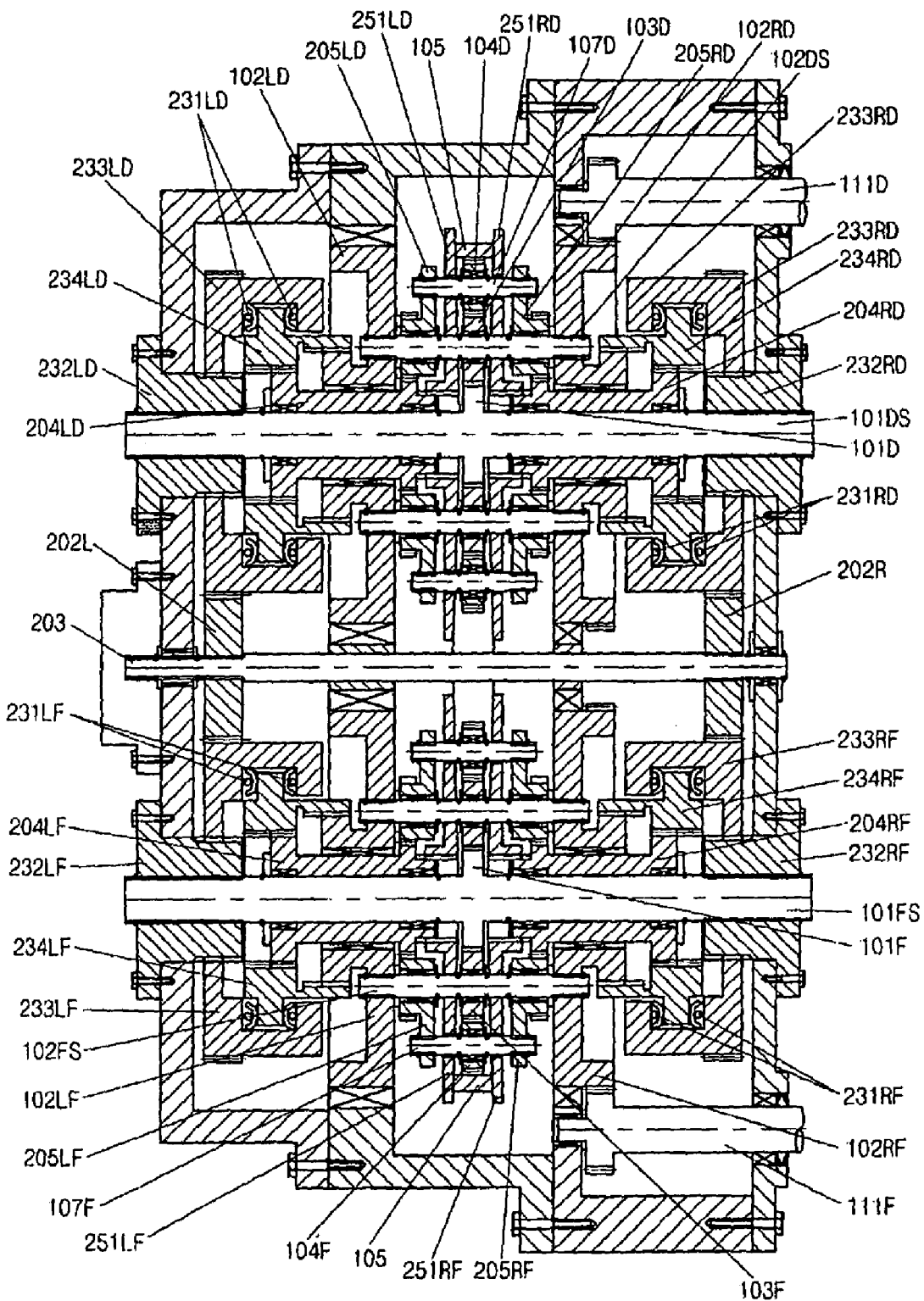
[Fig. 85]

[Fig. 86]
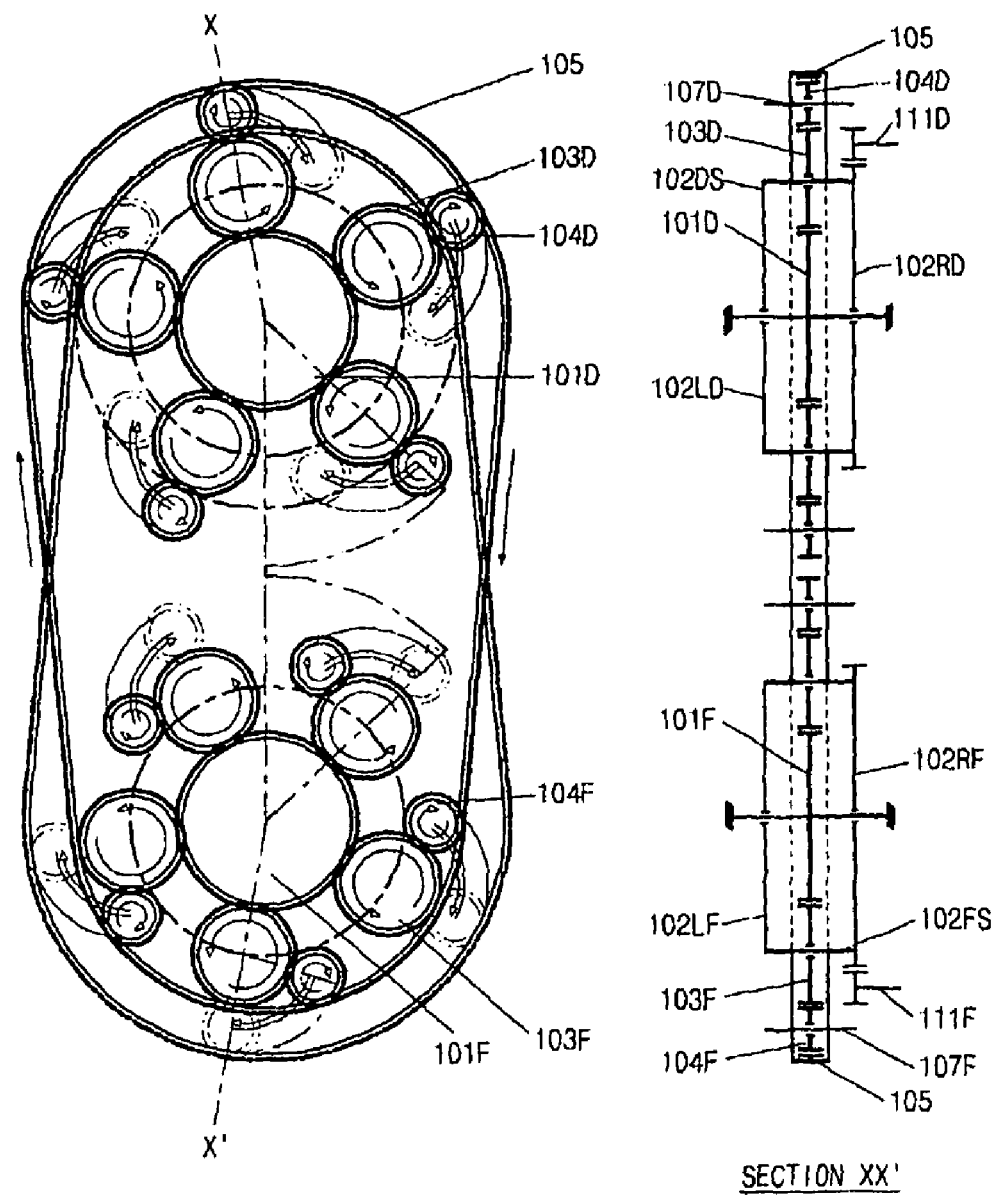
SECTION XX'

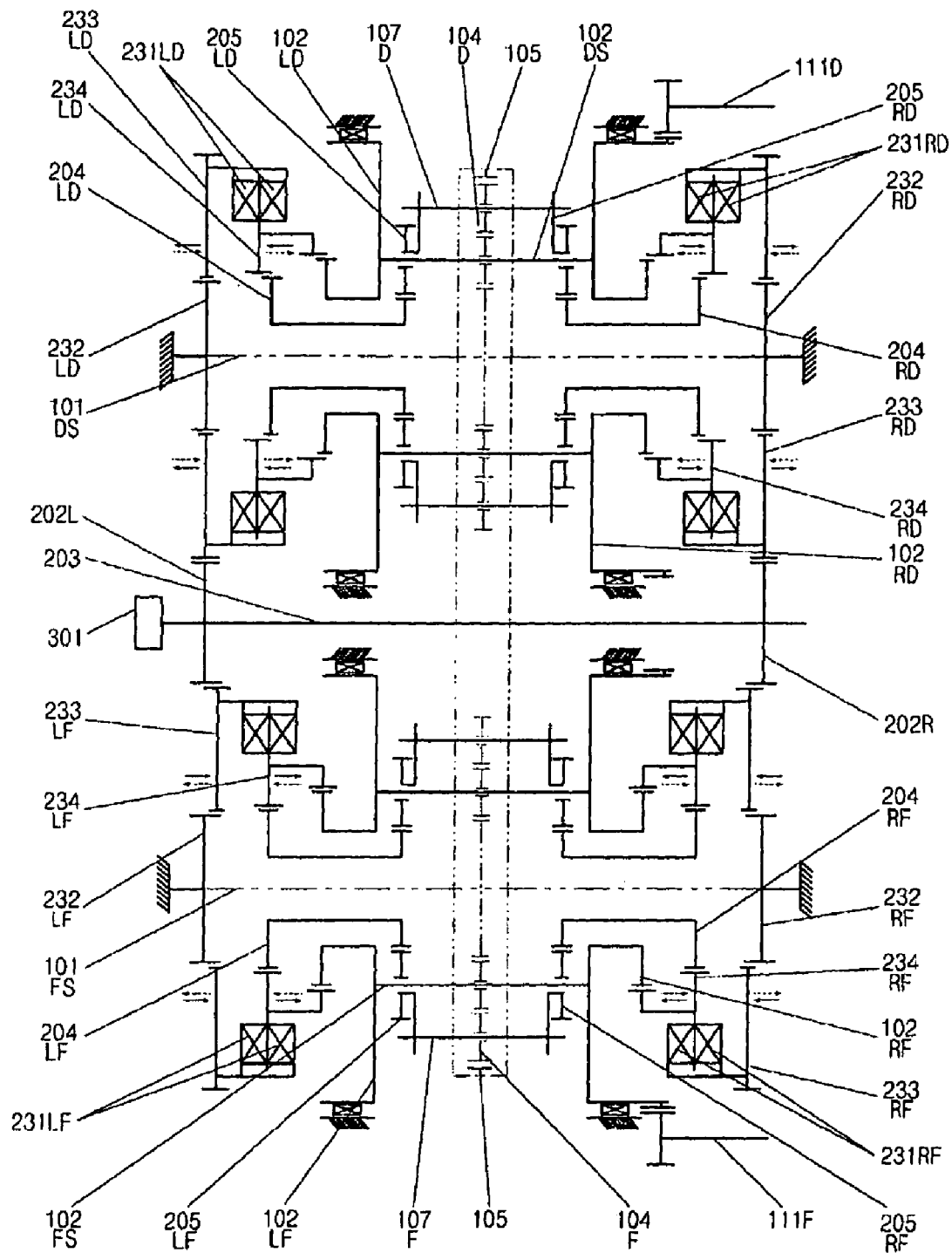
[Fig. 87]

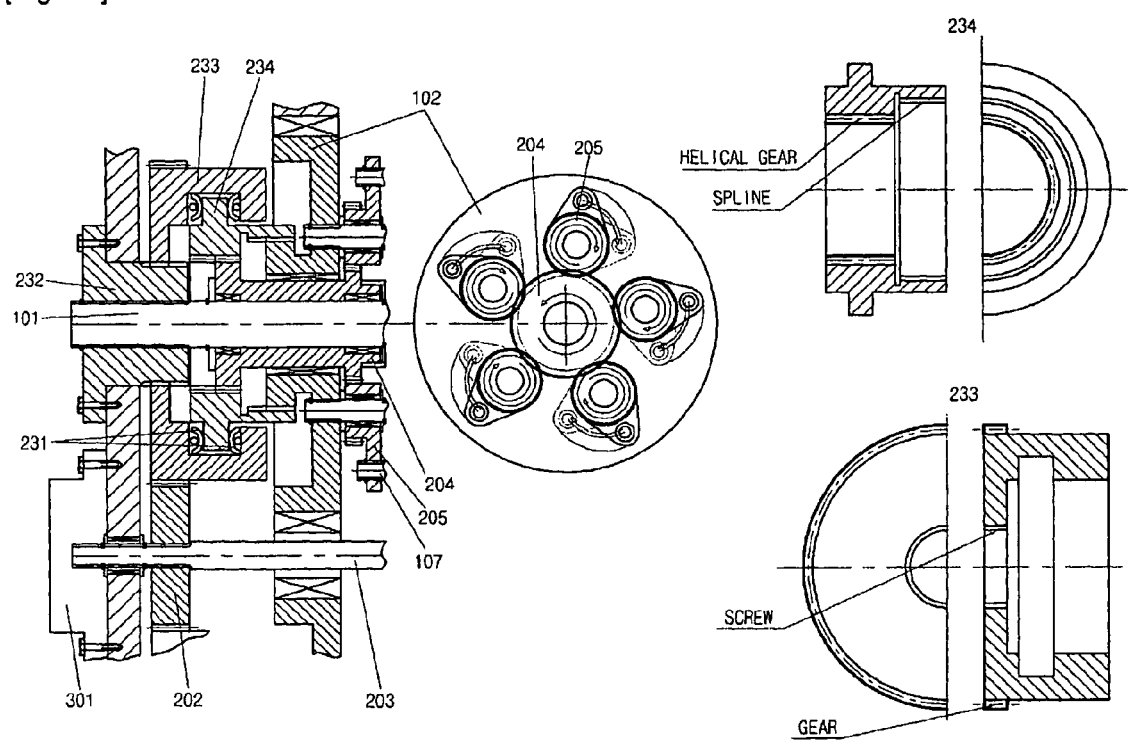
[Fig. 88]

[Fig. 89]
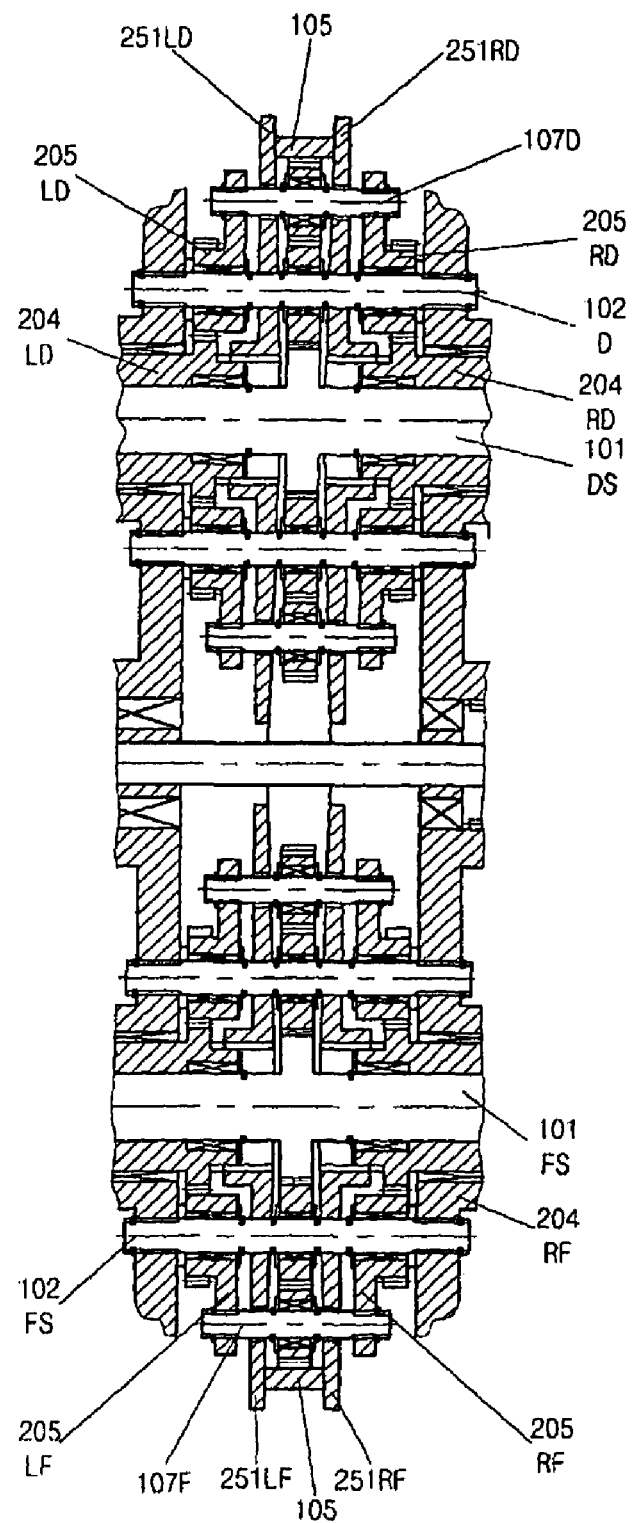

[Fig. 90]
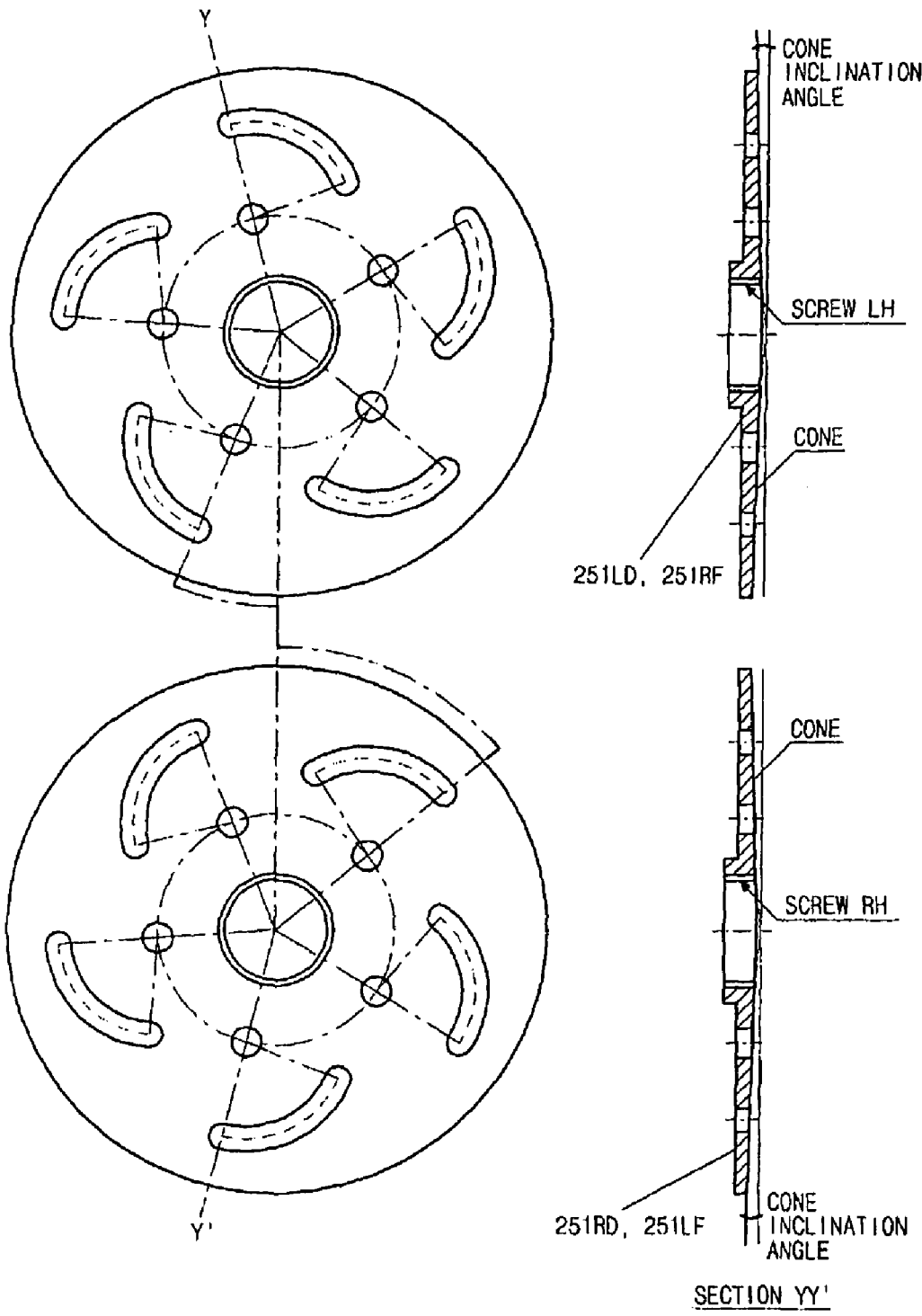

[Fig. 91]
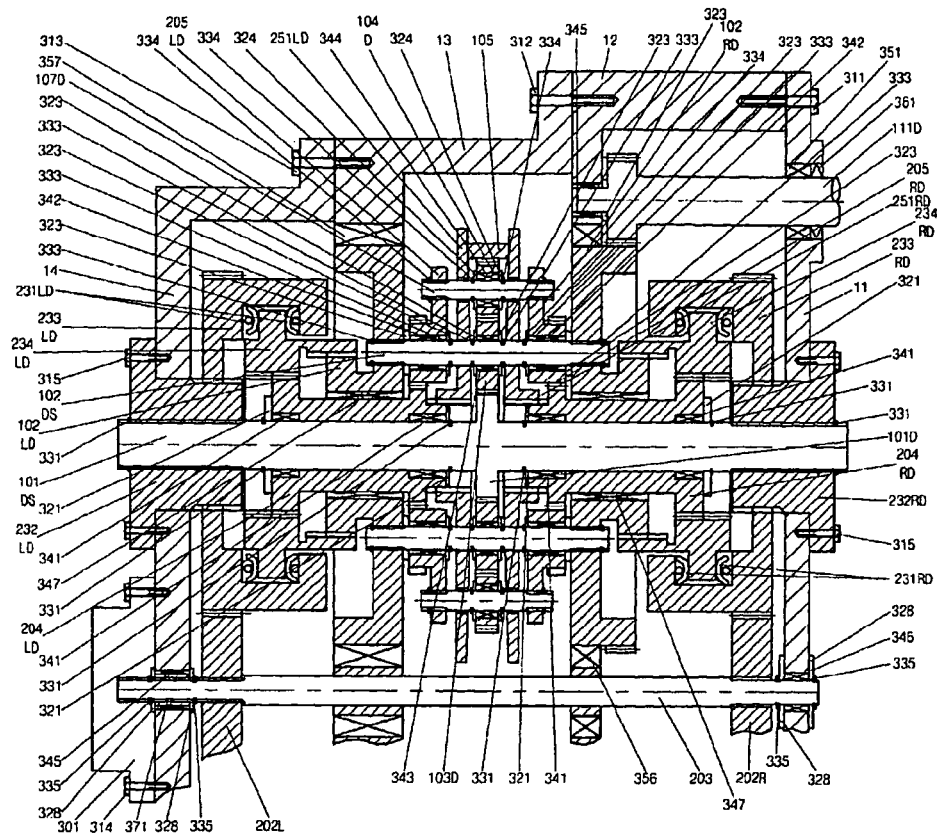
[Fig. 92]
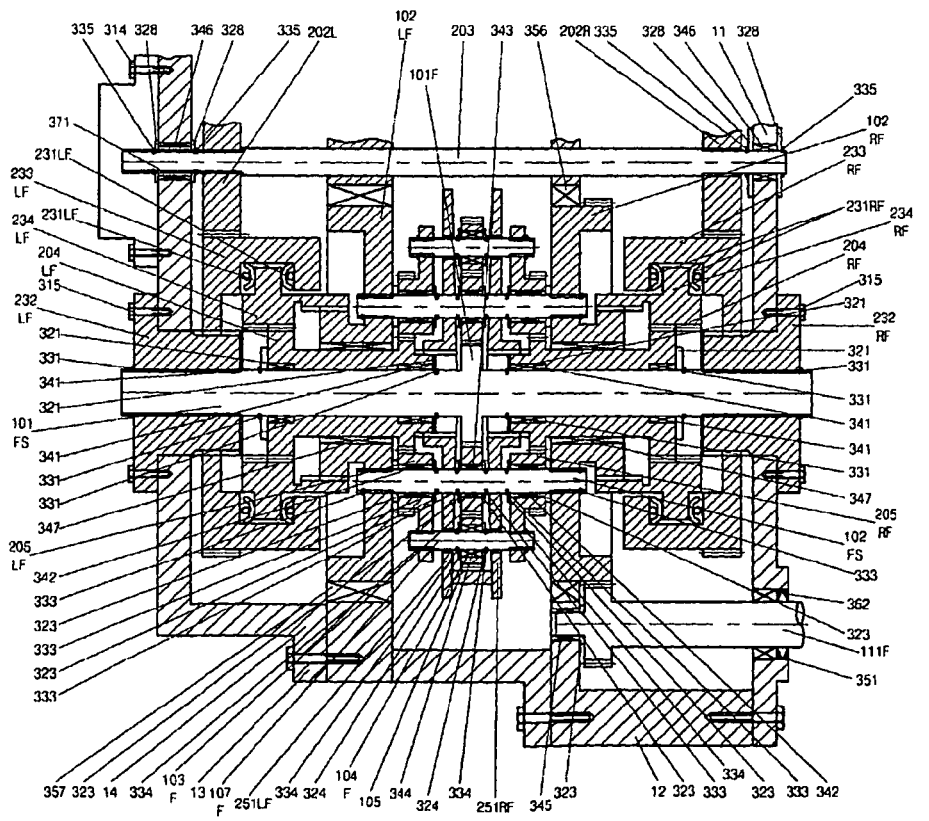

[Fig. 93]
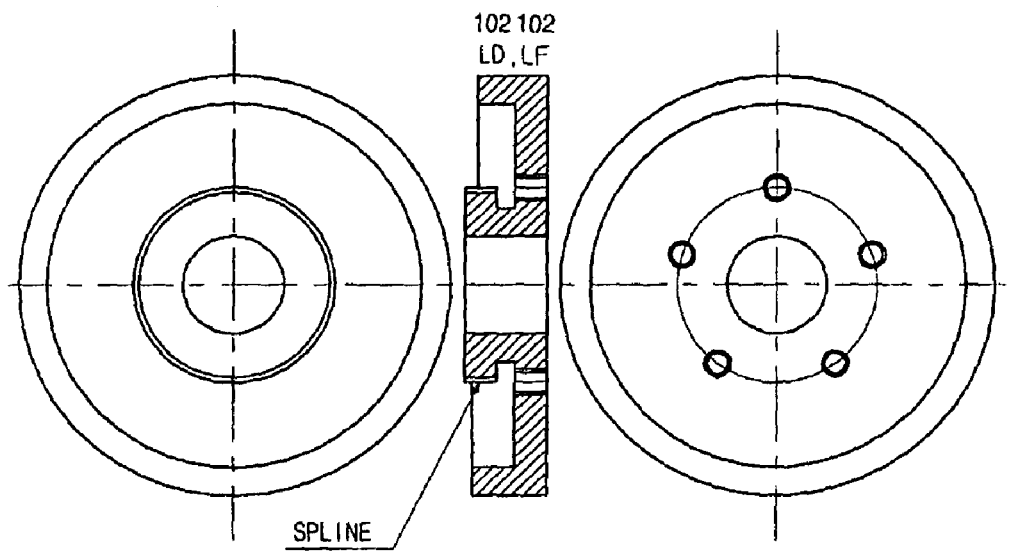
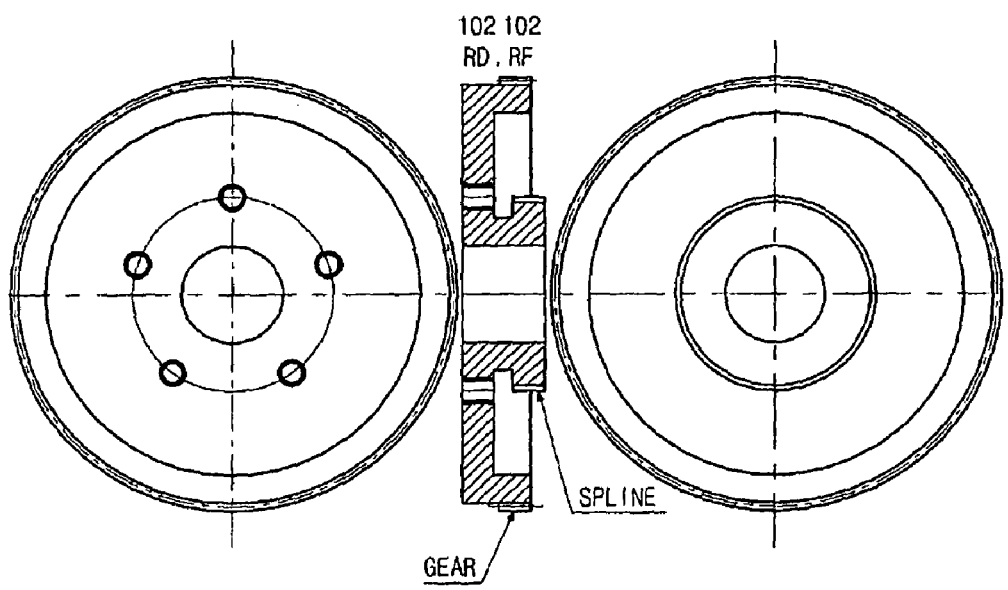

[Fig. 94]
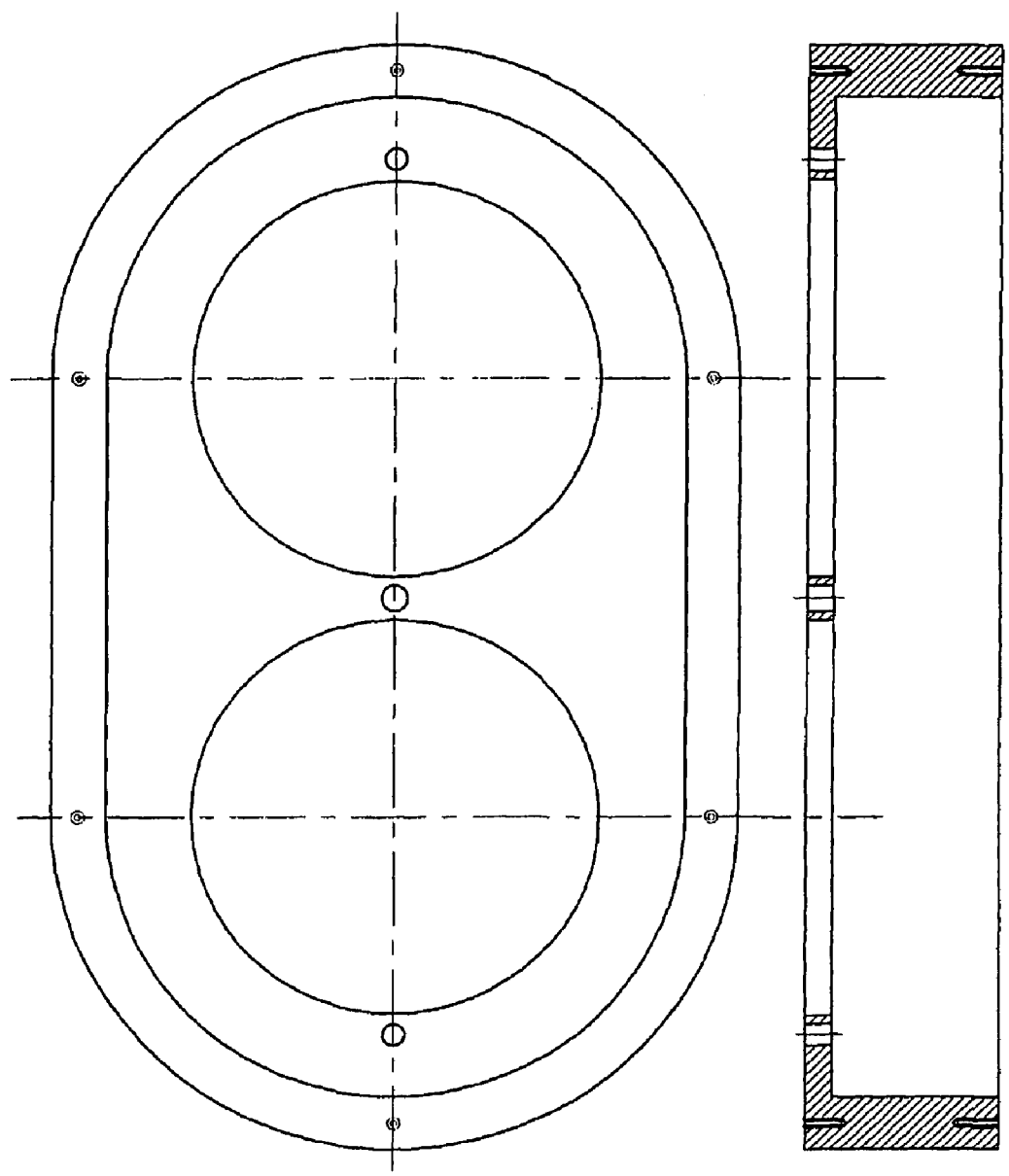

[Fig. 95]
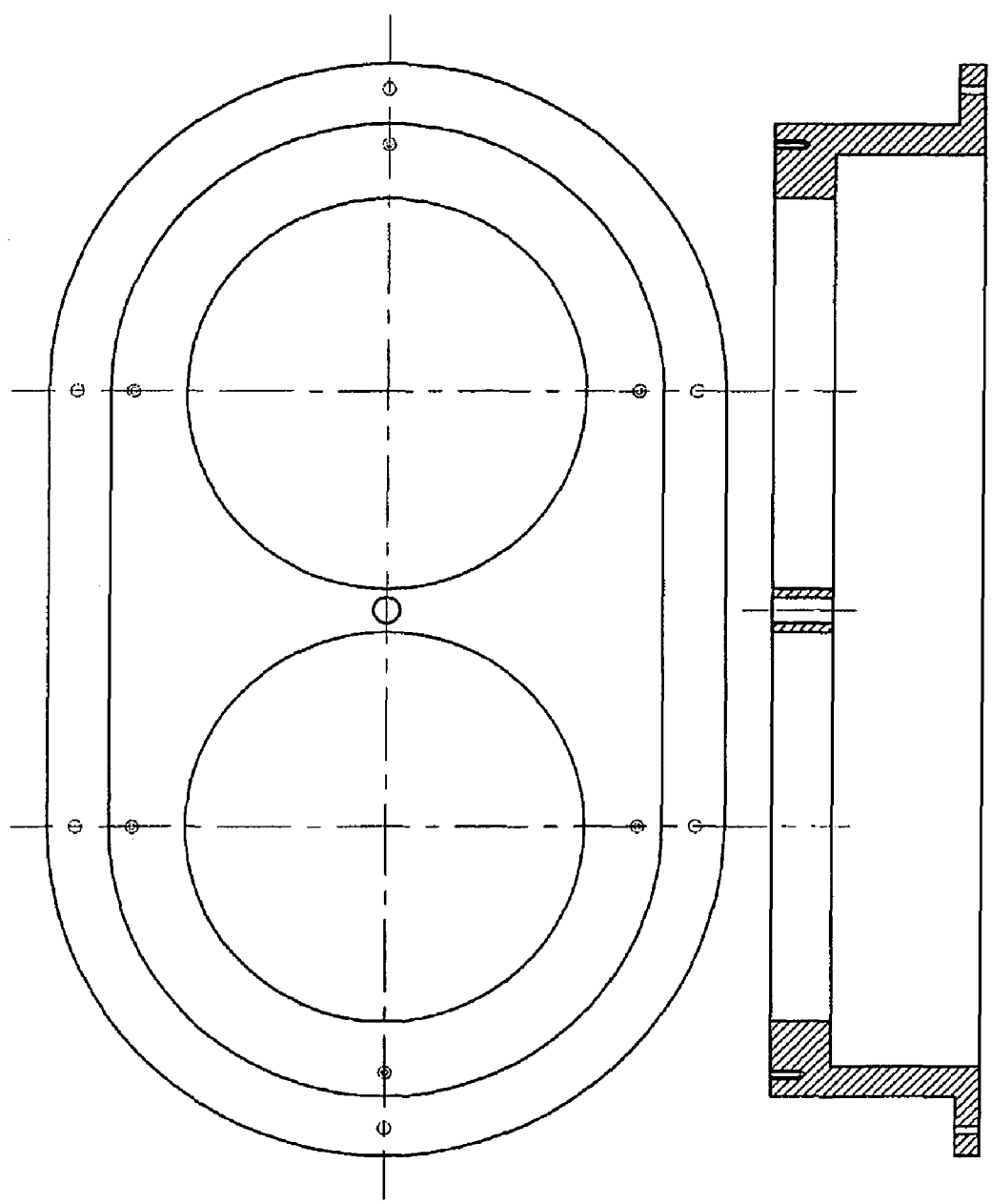

[Fig. 96]
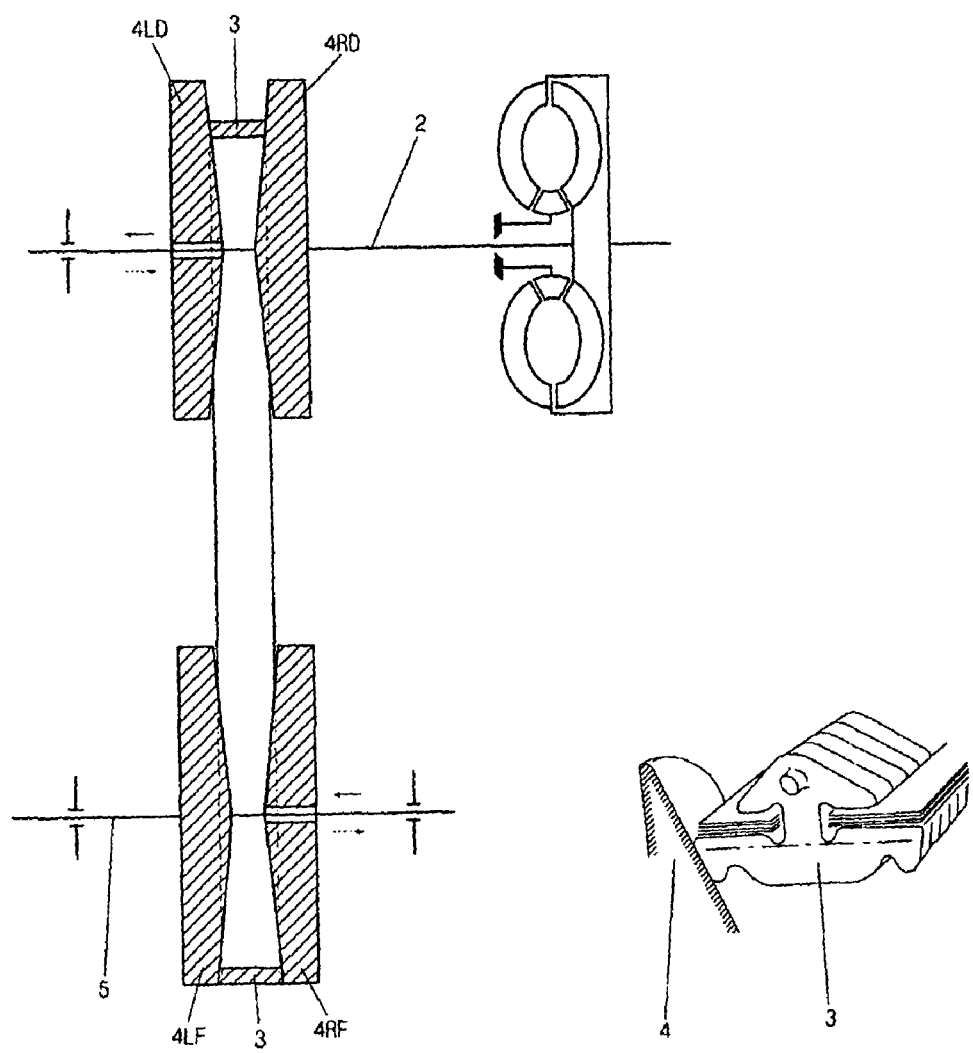

CONTINUOUSLY VARIABLE TRANSMISSION

This application is a National Stage Application of PCT/KR2009/001311, filed Mar. 17, 2009, which claims benefit of Serial No. 10-2008-0025075, filed Mar. 18, 2008 in the Republic of Korea and which applications are incorporated herein by reference. To the extent appropriate, a claim of priority is made to each of the above disclosed applications.

The present invention relates to a continuously variable transmission, and more particularly, to a continuously variable transmission capable of continuously varying the power inputted from an input shaft into an output shaft and being employed in a power transmission requiring a high rotation force.

TECHNICAL FIELD

An existing continuously variable transmission for a vehicle including a metal V-belt (or chain) will now be described with reference to FIG. 96.

It is noted that throughout the detailed description and the drawings some parts are designated by reference numerals appended with characters, such as "L", "R", "D" and "F", in which "L" means "left", "R" means "right", "D" means driving, and "F" means "follower(driven)".

For example, a left driving adjustment sun gear is designated by a reference numeral appended with LD, while a right driven adjustment sun gear is designated by a reference numeral appended with RF. A left direction or a right direction corresponds to a left side or a right side when viewing in the drawing.

A cone portion of a driving pulley is connected to a cone portion of a driven pulley by the metal V belt (or chain). The continuously variable transmission mainly includes a torque converter 1, an input shaft 2, a metal belt or chain 3, pulleys 4RD, 4LD, 4RF and 4LF, and an output shaft 5.

With the construction of the conventional continuously variable transmission, when the left driving pulley 4LD is axially moved in a left direction and the right driven pulley 4RF is axially moved in a left direction, a radius of the belt in the driving unit is reduced, while a radius of the belt in the driven unit is increased. On the contrary, when the left driving pulley 4LD is axially moved in a right direction and the right driven pulley 4RF is axially moved in a right direction, a radius of the belt in the driving unit is increased, while a radius of the belt in the driven unit is reduced. Therefore, the continuously variable transmission is a device to change a speed by adjusting the left driving pulley 4LD and the right driven pulley 4RF.

According to the conventional continuously variable transmission, however, a contact surface between the metal belt or chain 3 and the cone portion of the pulley is worn or slip to decrease a transmitting efficiency. Also, since it is limitedly used for a vehicle of low capacity, the continuously variable transmission is inefficient in case of a transmission device requiring high capacity. In addition, many costs are required to maintain a frictional force and study abrasion resistance material.

BACKGROUND ART

An existing continuously variable transmission for a vehicle including a metal V-belt (or chain) will now be described with reference to FIG. 96.

It is noted that throughout the detailed description and the drawings some parts are designated by reference numerals appended with characters, such as "L", "R", "D" and "F", in which "L" means "left", "R" means "right", "D" means driving, and "F" means "follower(driven)".

For example, a left driving adjustment sun gear is designated by a reference numeral appended with LD, while a right driven adjustment sun gear is designated by a reference numeral appended with RF. A left direction or a right direction corresponds to a left side or a right side when viewing in the drawing.

A cone portion of a driving pulley is connected to a cone portion of a driven pulley by the metal V belt (or chain). The continuously variable transmission mainly includes a torque converter 1, an input shaft 2, a metal belt or chain 3, pulleys 4RD, 4LD, 4RF and 4LF, and an output shaft 5.

With the construction of the conventional continuously variable transmission, when the left driving pulley 4LD is axially moved in a left direction and the right driven pulley 4RF is axially moved in a left direction, a radius of the belt in the driving unit is reduced, while a radius of the belt in the driven unit is increased. On the contrary, when the left driving pulley 4LD is axially moved in a right direction and the right driven pulley 4RF is axially moved in a right direction, a radius of the belt in the driving unit is increased, while a radius of the belt in the driven unit is reduced. Therefore, the continuously variable transmission is a device to change a speed by adjusting the left driving pulley 4LD and the right driven pulley 4RF.

According to the conventional continuously variable transmission, however, a contact surface between the metal belt or chain 3 and the cone portion of the pulley is worn or slip to decrease a transmitting efficiency. Also, since it is limitedly used for a vehicle of low capacity, the continuously variable transmission is inefficient in case of a transmission device requiring high capacity. In addition, many costs are required to maintain a frictional force and study abrasion resistance material.

DISCLOSURE OF INVENTION

Technical Problem

Therefore, the present invention has been made in view of the above-mentioned problems.

An object of the present invention is to provide a continuously variable transmission of high capacity to increase an output of an engine (or rotation force), in which the transmission can be applied without being restricted to the output capacity of the engine, have improved durability and simple construction, and transmit a rotation force in higher efficiency to an output shaft from an input shaft to reduce energy.

Technical Solution

In order to achieve the above and other objects, there is provided a transmission system for transmitting a driving force from a driving unit to a driven unit, according to embodiments of the present invention, which includes:

the driving unit including a driving sun gear; a plurality of driving carrier shafts fixed to a case, a left driving carrier or a right driving carrier; a plurality of first driving planetary gears rotating around the driving carrier shafts and meshed with the driving sun gear; a plurality of second driving planetary gear shafts rotating about the driving carrier shafts by a desired angle; and a plurality of second driving planetary gears rotating around the second driving planetary gear shafts, meshed with the first driving planetary gears, and revolving around the first driving planetary gears by a desired angle;

the driven unit including a driven sun gear; a plurality of driven carrier shafts fixed to a case, a left driven carrier or a right driven carrier; a plurality of first driven planetary gears rotating around the driven carrier shafts and meshed with the driven sun gear; a plurality of second driven planetary gear shafts rotating about the driven carrier shafts by a desired angle; and a plurality of second driven planetary gears rotating around the second driven planetary gear shafts, meshed with the first driven planetary gears, and revolving around the first driven planetary gears by a desired angle; and a transmission element with a tooth portion meshed with the second driving planetary gears and the second driven planetary gears for transmitting the driving force from the driving unit to the driven unit.

Advantageous Effects

With the above construction, the continuously variable transmission of high capacity can increase an output of an engine (or rotation force), in which the transmission can be applied without being restricted to the output capacity of the engine, have improved durability and simple construction, and transmit a rotation force in higher efficiency to an output shaft from an input shaft to reduce energy. More particularly, this invention is widely applied to the industrial machinery etc, as well as the transportation machinery, such as an automobile, a ship, a cultivator, etc.

Also, as first and second planetary gears in a driving unit and a driven unit are used, each rotation radius of the driving and the driven unit can be varied continuously.

BRIEF DESCRIPTION OF DRAWINGS

The foregoing and other objects, features and advantages of the present invention will become more apparent from the following detailed description when taken in conjunction with the accompanying drawings in which:

FIG. 1 is a view depicting a principle of the present invention;

FIG. 2 is a view illustrating a transmission system I according to the present invention;

FIG. 3 is an assembled cross-sectional view of a transmission system according to a first embodiment of the present invention;

FIG. 4 is a view illustrating a transmission system II according to the present invention;

FIG. 5 is a view illustrating a transmission system III according to the present invention;

FIG. 6 is a view illustrating a transmission system IV according to the present invention;

FIG. 7 is an assembled cross-sectional view illustrating a transmission system IV according to a second embodiment of the present invention;

FIG. 8 is a view illustrating a transmission adjustment system P1 according to the present invention;

FIG. 9 is an assembled cross-sectional view of a transmission adjustment system P1 according to a first embodiment of the present invention;

FIG. 10 is a view illustrating a transmission adjustment system P2 according to the present invention;

FIG. 11 is a view illustrating a transmission adjustment system Q1 according to the present invention;

FIG. 12 is an assembled cross-sectional view of a transmission adjustment system Q1 according to a third embodiment of the present invention;

FIG. 13 is a view illustrating a transmission adjustment system Q2 according to the present invention;

FIG. 14 is a view illustrating a transmission adjustment system R1 according to the present invention;

FIG. 15 is a view illustrating a transmission adjustment system R2 according to the present invention;

FIG. 16 is a view illustrating a guide cone system A according to the present invention;

FIG. 17 is an assembled cross-sectional view illustrating a guide cone system A according to a first embodiment of the present invention;

FIG. 18 is a view illustrating parts of a guide cone system A according to the present invention;

FIG. 19 is a view of a guide cone system B according to the present invention;

FIG. 20 is an assembled cross-sectional view of a guide cone system B according to the present invention;

FIG. 21 is a view illustrating parts of a guide cone system B according to the present invention;

FIG. 22 is a view illustrating parts of a guide cone system B according to the present invention;

FIG. 23 is a view of a guide cone system C according to the present invention;

FIG. 24 is an assembled cross-sectional view of a guide cone system C according to a third embodiment of the present invention;

FIG. 25 is a view illustrating parts of a guide cone system C according to the present invention;

FIG. 26 is a view of a guide cone/transmission adjustment system P1A-1 according to the present invention;

FIG. 27 is a view of a guide cone/transmission adjustment system P1A-2 according to the present invention;

FIG. 28 is a view of a guide cone/transmission adjustment system P1B according to the present invention;

FIG. 29 is a view of a guide cone/transmission adjustment system P2A according to the present invention;

FIG. 30 is a view of a guide cone/transmission adjustment system Q1C-1 according to the present invention;

FIG. 31 is a view of a guide cone/transmission adjustment system Q1C-2 according to the present invention;

FIG. 32 is a view of a guide cone/transmission adjustment system Q2C according to the present invention;

FIG. 33 is a view of a guide cone/transmission adjustment system R1AC according to the present invention;

FIG. 34 is a view of a guide cone/transmission adjustment system R2AC-1 according to the present invention;

FIG. 35 is a view of a guide cone/transmission adjustment system R2AC-2 according to the present invention;

FIG. 36 is a view of a continuously variable transmission system (No. 1) according to the present invention;

FIG. 37 is a cross-sectional view of a continuously variable transmission system (No. 1) according to a first embodiment of the present invention;

FIG. 38 is a view of a continuously variable transmission system (No. 2) according to the present invention;

FIG. 39 is a view of a continuously variable transmission system (No. 3) according to the present invention;

FIG. 40 is a view of a continuously variable transmission system (No. 4) according to the present invention;

FIG. 41 is an assembled cross-sectional view of a continuously variable transmission system (No. 4) according to a second embodiment of the present invention;

FIG. 42 is a view of a continuously variable transmission system (No. 5) according to the present invention;

FIG. 43 is a view of a continuously variable transmission system (No. 6) according to the present invention;

FIG. 44 is a view of a continuously variable transmission system (No. 7) according to the present invention;

FIG. 45 is a view of a continuously variable transmission system (No. 8) according to the present invention;

FIG. 46 is a view of a continuously variable transmission system (No. 9) according to the present invention;

FIG. 47 is an assembled cross-sectional view of a continuously variable transmission system (No. 9) according to a third embodiment of the present invention;

FIG. 48 is a view of a continuously variable transmission system (No. 10) according to the present invention;

FIG. 49 is a view of a continuously variable transmission system (No. 11) according to the present invention;

FIG. 50 is a view of a continuously variable transmission system (No. 12) according to the present invention;

FIG. 51 is a view of a continuously variable transmission system (No. 13) according to the present invention;

FIG. 52 is a view of a continuously variable transmission system (No. 14) according to the present invention;

FIG. 53 is a view of a continuously variable transmission system (No. 15) according to the present invention;

FIG. 54 is a view of a continuously variable transmission system (No. 16) according to the present invention;

FIG. 55 is a view of a continuously variable transmission system (No. 17) according to the present invention;

FIG. 56 is a view of a continuously variable transmission system (No. 18) according to the present invention;

FIG. 57 is a view of a continuously variable transmission system (No. 19) according to the present invention;

FIG. 58 is a view of a continuously variable transmission system (No. 20) according to the present invention;

FIG. 59 is a view of a continuously variable transmission system (No. 21) according to the present invention;

FIG. 60 is a view of a continuously variable transmission system (No. 22) according to the present invention;

FIG. 61 is a view of a continuously variable transmission system (No. 23) according to the present invention;

FIG. 62 is a view of a continuously variable transmission system (No. 24) according to the present invention;

FIG. 63 is a view of a continuously variable transmission system (No. 25) according to the present invention;

FIG. 64 is a view of a continuously variable transmission system (No. 26) according to the present invention;

FIG. 65 is a view of a continuously variable transmission system (No. 27) according to the present invention;

FIG. 66 is a view of a continuously variable transmission system (No. 28) according to the present invention;

FIG. 67 is a view of a continuously variable transmission system (No. 29) according to the present invention;

FIG. 68 is a view of a continuously variable transmission system (No. 30) according to the present invention;

FIG. 69 is a view of a continuously variable transmission system (No. 31) according to the present invention;

FIG. 70 is a view of a continuously variable transmission system (No. 32) according to the present invention;

FIG. 71 is an assembled cross-sectional view of a first embodiment of the present invention with major reference numerals being designated;

FIG. 72 is a view of a transmission system I according to the first embodiment;

FIG. 73 is an assembled cross-sectional view illustrating a transmission adjustment system P1 and a guide cone system A according to the first embodiment;

FIG. 74 is a view illustrating parts of a guide cone system A according to the first embodiment;

FIG. 75 is an assembled cross-sectional view of the first embodiment with detailed reference numerals being designated;

FIG. 76 is an assembled cross-sectional view of a second embodiment of the present invention with major reference numerals being designated;

FIG. 77 is a view of a transmission system IV according to the second embodiment;

FIG. 78 is an assembled cross-sectional view of a guide cone system B according to the second embodiment;

FIG. 79 is a view illustrating a left driving guide cone 251LD and a right driven guide cone 251RF in the guide cone system B according to the second embodiment;

FIG. 80 is a view illustrating a right driving guide cone 251RD and a left driven guide cone 251LF in the guide cone system B according to the second embodiment;

FIG. 81 is an assembled cross-sectional view of the second embodiment with detailed reference numerals being designated;

FIG. 82 is a view of a right case 12 according to the second embodiment;

FIG. 83 is a view of a center case 15 according to the second embodiment;

FIG. 84 is a view of a left case 13 according to the second embodiment;

FIG. 85 is an assembled cross-sectional view of a third embodiment of the present invention;

FIG. 86 is a view of a transmission system I according to the third embodiment;

FIG. 87 is a view of a transmission adjustment system Q1 according to the third embodiment;

FIG. 88 is a cross-sectional view of a transmission adjustment system Q1 according to the third embodiment;

FIG. 89 is an assembled cross-sectional view of a guide cone system C according to the third embodiment;

FIG. 90 is a view illustrating parts of a guide cone system C according to the third embodiment;

FIG. 91 is an assembled cross-sectional view of a driving unit according to the third embodiment;

FIG. 92 is an assembled cross-sectional view of a driven unit according to the third embodiment;

FIG. 93 is a view illustrating parts of a carrier according to the third embodiment;

FIG. 94 is a view of a right case 12 according to the third embodiment;

FIG. 95 is a view of a left case 13 according to the third embodiment; and

FIG. 96 is a view schematically illustrating a conventional transmission system.

BEST MODE FOR CARRYING OUT THE INVENTION

A continuously variable transmission system according to embodiments of the present invention will now be described in detail with reference to accompanied drawings.

A principle of the present invention will now be described with reference to FIG. 1.

FIGS. 1(a) and 1(b) schematically show a conventional double pinion planetary gear apparatus.

The double pinion planetary gear apparatus includes one sun gear 101, a plurality of carriers 102, a first planetary gear 103, a second planetary gear 104, and a ring gear 106, in which the sun gear 101 is meshed with the first planetary gear 103, the first planetary gear 103 is meshed with the second planetary gear 104, and the second planetary gear 104 is meshed with the ring gear 106.

In FIGS. 1(a) and 1(b), the sun gear 101 is identical to each other, the first planetary gear 103 is identical to each other, and the second planetary gear 104 is identical to each other.

In FIGS. 1(a) and 1(b), if the position of the second planetary gear 104 is differently set, a radius r2 of a pitch circle of the ring gear 106 in FIG. 1(b) is larger than a radius r1 of a pitch circle of the ring gear 106 in FIG. 1(a), so that the number of teeth of the ring gear in FIG. 1(b) is more than that of the ring gear in FIG. 1(a). If the carrier 102 is stationary and the sun gear 101 is inputted with a driving force to output the driving force to the ring gear 106, a rotation ratio in FIG. 1(a) is larger than that in FIG. 1(b). Therefore, it will be known that the rotation ratio is varied depending upon the position of the second planetary gear 104.

According to the present invention using the principle of the double pinion planetary gear apparatus, one is used as a transmission of a driving unit D which is inputted with the driving force from an engine, while the other is used as a transmission of a driven unit F which outputs the driving force. The driving unit D is coupled to the driven unit F by tying a chain around the second planetary gear 104, instead of the ring gear 106, so that the second planetary gear 104 revolves around the first planetary gear 103 to continuously obtain a shift ratio.

Now, the transmission system I shown in FIG. 1c (afterwards will be described in more details) is described.

A driving unit D includes a plurality of first driving planetary gears 103D and driving carrier shafts 102DS, and a plurality of second driving planetary gears 104D and second driving planetary gear shafts 107D. A driven unit F includes a plurality of first driven planetary gears 103F and driven carrier shafts 102FS, and a plurality of second driven planetary gears 104F and second driven planetary gear shafts 107F.

The first driving planetary gear 103D is turned on the driving carrier shaft 102DS, while the second driving planetary gear 104D meshed with the first driving planetary gear 103D is turned on the second driving planetary gear shaft 107D and revolves around the first driving planetary gear 103D, and thus the revolving radius around the second driving planetary gear 104D is varied. Therefore, a radius of the chain 105 of the driving unit D meshed with the second driving planetary gear 104D is continuously varied to change rotation speed of the chain 105 of the driving unit D.

The second driven planetary gear 104F of the driven unit F receives the driving force from the driving unit D via the meshed chain 105, while the second driven planetary gear 104F is meshed with the first driven planetary gear 103F to be turned on the second driven planetary gear shaft 107F and revolves around the first driven planetary gear 103F. Also, the first driven planetary gear 103F is turned on the driven carrier shaft 102FS. When the second driven planetary gear 104F revolves around the first driven planetary gear 103F, the revolving radius around the second driven planetary gear 104F is varied, and thus the radius of the chain 105 of the driven unit F meshed with the second driven planetary gear 104F is continuously varied to change the rotation speed.

According to the transmission of the present invention, the chain 105 is a transmission element with teeth, such as a chain or belt. The chain is meshed with the second driving planetary gear 104D and the second driven planetary gear 104F to transmit the driving force from the driving unit D to the driven unit F.

In the transmission system shown in FIG. 1c, there is necessary for a system for revolving the second driving planetary gear 104D around the first driving planetary gear 103D and revolving the second driven planetary gear 104F around the first driven planetary gear 103F, in order to obtain a continuous shift ratio, which is referred to as a transmission adjustment system. A system, in which a radius of the chain 105 meshed with the second driving planetary gear 104D and the second driven planetary gear 104F to connect the driving part D with the driven part F is concentric with the radius of the driven unit F, is referred to as a guide cone system. The guide cone system is combined with the transmission adjustment system to constitute a guide cone/transmission adjustment system, and the transmission system is combined with the guide cone/transmission adjustment system to constitute a continuously variable transmission system.

Herein, the transmission system is classified into four kinds, i.e., a transmission system I, a transmission system II, a transmission system III, and a transmission system IV. The transmission adjustment system is classified into six kinds, i.e., a transmission adjustment system P1, a transmission adjustment system P2, a transmission adjustment system Q1, a transmission adjustment system Q2, a transmission adjustment system R1, and a transmission adjustment system R2. The guide cone system is classified into three kinds, i.e., a guide cone system A, a guide cone system B, a guide cone system C. The guide cone/transmission adjustment system is classified into ten kinds, i.e., guide cone/transmission systems P1A-1, P1A-2, P1B, P2A, Q1C-1, Q1C-2, Q2C, R1AC, R2AC-1, and R2AC-2. The continuously variable transmission system is instanced as continuously variable transmission systems No. 1 to No. 32.

Also, as first and second planetary gears in a driving transmission and a driven transmission are used. Each rotation radius of the driving and the driven unit can be varied continuously.

Transmission System

Since a specification of the chain or belt meshed with the second planetary gear and a range of a shift ratio depending upon whether the first planetary gear or second planetary gear is a step or long pinion, i.e., single or double rows-pinion type, the transmission system is classified into a transmission system I, a transmission system II, a transmission system III, and a transmission system IV, which will be described with reference to FIGS. 2 to 7.

Referring to FIG. 2, the transmission system I includes a double pinion planetary gear apparatus consisting of a driving unit D and a driven unit F, in which the driving unit D is coupled to the driven unit F by a transmission element, such as a belt or chain 105 with teeth.

The driving unit D includes a driving sun gear 101D, a driving carrier shaft 102DS which is integrally coupled to a right driving carrier 102RD and a left driving carrier 102LD, a first driving planetary gear 103D, a second driving planetary gear 104D, and a second driving planetary gear shaft 107D. The driving carrier shaft 102DS, the first driving planetary gear 103D, the second driving planetary gear 104D, and the second driving planetary gear shaft 107D can be provided in a plurality of pairs.

The driven unit F includes a driven sun gear 101F, a driven carrier shaft 102FS which is integrally coupled to a right driven carrier 102RF and a left driven carrier 102LF, a first driven planetary gear 103F, a second driven planetary gear 104F, and a second driven planetary gear shaft 107F. The driven carrier shaft 102FS, the first driven planetary gear 103F, the second driven planetary gear 104F, and the second driven planetary gear shaft 107F can be provided in a plurality of pairs.

A power transmission path will be divided into four cases below.

Case 1: The driving carrier shaft 102DS and the driven carrier shaft 102FS are stationary. The driving force is inputted to the driving sun gear 101D, and the driving force is outputted from the driven sun gear 101F.

Case 2: The driving sun gear 101D and the driven sun gear 101F are stationary. The driving force is inputted to the right driving carrier 102RD, and the driving force is outputted from the right driven carrier 102RF.

Case 3: The driving carrier shaft 102DS and the driven sun gear 101F are stationary.

The driving force is inputted to the driving sun gear 101D, and the driving force is outputted from the right driven carrier 102RF.

Case 4: The driving sun gear 101D and the driven carrier shaft 102FS are stationary.

The driving force is inputted to the right driving carrier 102RD, and the driving force is outputted from the driven sun gear 101F.

The Case 1 is applied to the first embodiment of the present invention, as shown in FIG. 3.

The process of transmitting the driving force will now be described.

When the driving sun gear 101D is rotated in a clockwise direction, the first driving planetary gear 103D meshed with the driving sun gear 101D is rotated in a counter-clockwise direction on the driving carrier shaft 102DS, and the second driving planetary gear 104D meshed with the first driving planetary gear 103D is rotated in a clockwise direction on the second driving planetary gear shaft 107D. The chain 105 meshed with the second driving planetary gear 104D and the second driven planetary gear 104F is rotated in a clockwise direction to transmit the driving force from the driving unit D to the driven unit F.

The second driven planetary gear 104F meshed with the chain 105 is rotated in a clockwise direction on the second driven planetary gear shaft 107F, and the first driven planetary gear 103F meshed with the second driven planetary gear 104F is rotated in a counterclockwise direction on the driven carrier shaft 102FS. The driven sun gear 101F meshed with the first driven planetary gear 103F is rotated in a clockwise direction to output the driving force.

The principle of the transmission in the power transmitting process will now be described.

If a radius of the chain 105 meshed with the second driving planetary gear 104D is maximum, and a radius of the chain 105 meshed with the second driven planetary gear 104F is minimum, the rotation speed of the driven output sun gear 101F is maximized. In this instance, if the second driving planetary gear 104D rotating in a clockwise direction on the second driving planetary gear shaft 107D revolves around the first driving planetary gear 103D in a clockwise direction by a desired angle, and simultaneously, the second driven planetary gear 104F rotating in a clockwise direction on the second driven planetary gear shaft 107F revolves around the first driven planetary gear 103F in a clockwise direction by a desired angle, a radius of the chain 105 meshed with the second driving planetary gear 104D is reduced, while a radius of the chain 105 meshed with the second driven planetary gear 104F is increased, so that a rotation speed of the driven sun gear 101F is decreased.

If a radius of the chain 105 meshed with the second driving planetary gear 104D is minimum, and a radius of the chain 105 meshed with the second driven planetary gear 104F is maximum, the rotation speed of the driven sun gear 101F is minimized. In this instance, if the second driving planetary gear 104D meshed with the first driving planetary gear 103D and rotating in a clockwise direction on the second driving planetary gear shaft 107D revolves around the first driving planetary gear 103D in a counterclockwise direction by a desired angle, and simultaneously, the second driven planetary gear 104F meshed with the first driven planetary gear 103F and rotating in a clockwise direction on the second driven planetary gear shaft 107F revolves around the first driven planetary gear 103F in a counterclockwise direction by a desired angle, a radius of the chain 105 meshed with the second driving planetary gear 104D is increased, while a radius of the chain 105 meshed with the second driven planetary gear 104F is reduced, so that a rotation speed of the driven sun gear 101F is changed.

The Case 2 is applied to the third embodiment of the present invention.

The process of transmitting the driving force will now be described.

When the driving sun gear 101D and the driven sun gear 101F are stationary, and the right driving carrier 102RD is rotated by the driving force, the first driving planetary gear 103D meshed with the driving sun gear 101D is rotated around the driving carrier shaft 102DS, and the second driving planetary gear 104D meshed with the driving planetary gear 103D is rotated around the second planetary gear shaft 107D. The chain 105 meshed with the second driving planetary gear 104D is rotated in the same direction as the right driving carrier 102RD to transmit the driving force from the driving unit D to the driven unit F.

The second driven planetary gear 104F meshed with the chain 105 is rotated around the second driven planetary gear shaft 107F, and the first driven planetary gear 103F meshed with the second driven planetary gear 104F is rotated around the driven carrier shaft 102FS. The right driven carrier 102RF is rotated in the same direction as the chain to output the driving force.

The principle of the transmission in the power transmitting process according to the third embodiment is identical to that of the Case 1.

Consequently, the principle of the transmission is identical to each other, irrespective of the power transmitting path.

The transmission system II will now be described with reference to FIG. 4.

The difference between the transmission systems I and II is that the second driving planetary gear 104D and the second driven planetary gear 104F are made of multiple rows of step or long pinions, in which the chain is meshed with each left row of pinion in the second driving planetary gear 104D and the second driven planetary gear 104F which are not meshed with the first driving planetary gear 103D and the first driven planetary gear 103F.

According to the feature of the transmission system II, the chain 105, and the second driving planetary gear 104D and the second driven planetary gear 104F which are meshed with the chain 105 may be provided with various kinds of teeth, and a choice width to a limited condition (e.g., pitch, twist angle or the like) when designing the teeth can be enlarged.

The principle of the transmission and the power transmitting process in the transmission system II are identical to those in the transmission system I.

The transmission system III will now be described with reference to FIG. 5.

The difference between the transmission systems I and III is that the first driving planetary gear 103D and the first driven planetary gear 103F are made of multiple rows of step or long pinions, in which each right row of pinion in the first driving planetary gear 103D is meshed with the driving sun gear 101D and the driving ring gear 106D, while each left row of pinion in the first driving planetary gear 103D being meshed with the second driving planetary gear 104D.

Each right row of pinion in the first driven planetary gear 103F is meshed with the driven sun gear 101F and the driven ring gear 106F, while each left row of pinion in the first driven planetary gear 103F being meshed with the second driven planetary gear 104F.

The chain 105 is meshed with the second driving planetary gear 104D and the second driven planetary gear 104F to transmit the driving force from the driving unit D to the driven unit F.

The functional differences between the transmission systems I and III are as follows.

More specifically, when the second driving planetary gear 104D and the second driven planetary gear 104F revolve around the first driving planetary gear 103D and the first driven planetary gear 103F, respectively, it can prevent the second driving planetary gear 104D and the second driven planetary gear 104F from interfering with the driving sun gear 101D and the driven sun gear 101F, thereby increasing a revolving angle, as compared with that of the transmission system I. Consequently, a range of the shift ratio can be widened by increasing a radius ratio of the chain 105 meshed with the second driving planetary gear 104D and the second driven planetary gear 104F.

By adding the driving ring gear 106D and the driven ring gear 106F, the driving sun gear 101D, the right driving carrier 102RD or the driving ring gear 106D is used as the input, while the driven sun gear 101F, the right driven carrier 102RF or the driven ring gear 106F can be used as the output.

The transmission principle of the transmission system III is identical to that of the transmission system I.

The transmission IV will now be described with reference to FIG. 6.

The transmission system IV is applied to the second embodiment of the present invention, as shown in FIG. 7.

In the transmission system III shown in FIG. 5, a second driving planetary gear 104D and a second driven planetary gear 104F are made of multiple rows of step or long pinions, so that it has features of the transmission system II and the transmission system III.

As compared with the transmission system I, the range of the shift ratio can be extended, and the chain 105, and the second driving planetary gear 104D and the second driven planetary gear 104F which are meshed with the chain 105 can have various shapes of tooth.

The transmission principle of the transmission system IV is identical to that of the transmission system I.

Transmission Adjustment System

Since the transmission adjustment method is varied depending upon rotation or stop of the carrier, the transmission adjustment system is classified into the transmission adjustment system P1, the transmission adjustment system P2, the transmission adjustment system Q1, the transmission adjustment system Q2, the transmission adjustment system R1, and the transmission adjustment system R2, which will be explained with reference to FIGS. 8 to 15.

The transmission adjustment system P1 will now be explained with reference to FIG. 8.

The transmission adjustment system P1 is applied to the first embodiment of the present invention, as shown in FIG. 9, in which the transmission adjustment system is applied to a transmission system with the stationary carrier.

A left adjustment main gear 202L and a right adjustment main gear 202R are integrally coupled to the adjustment main shaft 203. The left adjustment main gear 202L is meshed with a left driving adjustment sun gear 204LD and a left driven adjustment sun gear 204LF, while the right adjustment main gear 202R is meshed with a right driving adjustment sun gear 204RF and a right driven adjustment sun gear 204RF. A left driving flange gear 205LD and a right driving flange gear 205RD are meshed with the left driving adjustment sun gear 204LD and the right driving adjustment sun gear 204RD, respectively. A left driven flange gear 205LF and a right driven flange gear 205RF are meshed with the left driven adjustment sun gear 204LF and the right driven adjustment sun gear 204RF.

The second driving planetary gear shaft 107D is integrally coupled to the left driving flange gear 205LD and the right driving flange gear 205RD, while the second driven planetary gear shaft 107F is integrally coupled to the left driven flange gear 205LF and the right driven flange gear 205RF.

The operation of the transmission adjustment system will now be described.

When the left adjustment main gear 202L is rotated in a clockwise direction, the right adjustment main gear 202R is rotated in a clockwise direction. The left driving adjustment sun gear 204LD and the left driven adjustment sun gear 204LF which are meshed with the left adjustment main gear 202L are rotated in a counter-clockwise direction around the left driving adjustment sun gear shaft 207LD and the left driven adjustment sun gear shaft 207LF. The right driving adjustment sun gear 204RD and the right driven adjustment sun gear 204RF which are meshed with the right adjustment main gear 202R are rotated in a counterclockwise direction around the driving adjustment sun gear shaft 101DS which is integrally coupled to the driving sun gear 101D and the driven adjustment sun gear shaft 101FS which is integrally coupled to the driven sun gear 101F, respectively.

The left driving flange gear 205LD meshed with the left driving adjustment sun gear 204LD is rotated in a clockwise direction around the driving carrier shaft 102DS, and the right driving flange gear 205RD meshed with the right driving adjustment sun gear 204RD is rotated in a clockwise direction around the driving carrier shaft 102DS. The left driving flange gear 205LD and the right driving flange gear 205RD are integrally coupled to the second driving planetary gear shaft 107D to rotate by a desired angle.

The left driven flange gear 205LF meshed with the left driven adjustment sun gear 204LF is rotated in a clockwise direction around the driven carrier shaft 102FS, and the right driven flange gear 205RF meshed with the right driven adjustment sun gear 204RF is rotated in a clockwise direction around the driven carrier shaft 102FS. The left driven flange gear 205LF and the right driven flange gear 205RF are integrally coupled to the second driven planetary gear shaft 107F to rotate by a desired angle.

Consequently, when the left adjustment main gear 202L receiving the driving force is rotated in a clockwise direction, the second driving planetary gear shaft 107D and the second driven planetary gear shaft 107F are rotated in a clockwise direction around the driving carrier shaft 102DS and the driven carrier shaft 102FS by a desired angle, respectively. When the left adjustment main gear 202L is rotated in a counter-clockwise direction, the second driving planetary gear shaft 107D and the second driven planetary gear shaft 107F are rotated in a counterclockwise direction around the driving carrier shaft 102DS and the driven carrier shaft 102FS by a desired angle, respectively.

With the above operation, the second driving planetary gear 104D rotating around the second driving planetary gear shaft 107D and the second driven planetary gear 104F rotating around the second driven planetary gear shaft 107F revolve around the first driving planetary gear 103D and the first driven planetary gear 103F, respectively.

The transmission adjustment system P2 will now be described with reference to FIG. 10.

The transmission adjustment system P2 is applied to a transmission system with a stationary carrier, like the transmission adjustment system P1. Differences between the transmission adjustment systems P1 and P2 are as follows.

The adjustment main shaft 203 and the right adjustment main gear 202 are omitted. Also, the left driving adjustment sun gear 204LD and the right driving adjustment sun gear 204RD are integrally coupled to each other so as to be rotated around the left driving adjustment sun gear shaft 207LD. The left driven adjustment sun gear 204LF and the right driven adjustment sun gear 204RF are integrally coupled to each other so as to be rotated around the left driven adjustment sun gear shaft 207LF.

The operation thereof is identical to that of the transmission adjustment system P1.

The transmission adjustment system Q1 will now be explained with reference to FIG. 11.

The transmission adjustment system Q1 is applied to the third embodiment of the present invention, as shown in FIG. 12, in which the transmission adjustment system is applied to a transmission system with the rotating carrier.

First of all, explaining the construction of the driving unit D, a plurality of driving carrier shafts 102DS are fixed to the left driving carrier 102LD and the right driving carrier 102RD. The left driving flange gear 205LD is rotated around the left side of the driving carrier shaft 102DS, while the right driving flange gear 205RD is rotated around the right side thereof. The left driving flange gear 205LD and the right driving flange gear 205RD are integrally coupled to the second driving planetary gear shaft 107D.

The left driving flange gear 205LD is meshed with the left driving adjustment sun gear 204LD, while the right driving flange gear 205RD is meshed with the right driving adjustment sun gear 204RD.

The rotation center of the left driving adjustment sun gear 204LD and the right driving adjustment sun gear 204RD is identical to that of the carrier 102. A left driving adjustment screw 232LD is fixed to a left end of the center axis, while a right driving adjustment screw 232RD is fixed to a right end thereof.

The left driving adjustment screw 232LD and a left driving adjustment slider 233LD are assembled in a left-handed screw manner, while a right driving adjustment screw 232RD and a right driving adjustment slider 233RD are assembled in a right-handed screw manner. A left driving helical slider 234LD is assembled in the left driving adjustment slider 233LD, with adjustment thrust bearings 231 being positioned on both sides of the left driving helical slider 234LD. A right driving helical slider 234RD is assembled in the right driving adjustment slider 233RD, with the adjustment thrust bearings being positioned on both sides of the right driving helical slider 234LD. When the left driving adjustment slider 233LD and the right driving adjustment slider 233RD are axially moved, the left driving helical slider 234LD and the right driving helical slider 234RD are freely rotated.

The left driving helical slider 234LD and the left driving carrier 102LD are spline-coupled to each other to slide in an axial direction, while the left driving helical slider 234LD and the left driving adjustment sun gear 204LD are meshed with each other in a helical gear type.

The right driving helical slider 234RD and the right driving carrier 102RD are spline-coupled to each other to slide in an axial direction, while the right driving helical slider 234RD and the right driving adjustment sun gear 204RD are meshed with each other in a helical gear type.

When the left driving helical slider 234LD and the right driving helical slider 234RD are moved in an axial direction with respect to the left driving carrier 102LD and the right driving carrier 102RD, respectively, the left driving adjustment sun gear 204LD and the right driving adjustment sun gear 204RD are rotated. In this instance, the rotation direction of the left driving adjustment sun gear 204LD is always identical to that of the right driving adjustment sun gear 204RD.

The driven unit F includes the same construction as that of the driving unit D.

The left adjustment main gear 202L and the right adjustment main gear 202R are fixed to the adjustment main shaft 203. The left adjustment main gear 202L is meshed with the left driving adjustment slider 233LD and the left driven adjustment slider 233LF, while the right adjustment main gear 202R is meshed with the right driving adjustment slider 233RD and the right driven adjustment slider 233RF.

The operation of the transmission adjustment system Q1 will now be described.

When the left adjustment main gear 202L receiving the driving force from a motor 301 is rotated in a clockwise direction, the right adjustment main gear 202R is also rotated in a clockwise direction. The left driving adjustment slider 233LD and the left driven adjustment slider 233LF which are meshed with the left adjustment main gear 202L are rotated in a counterclockwise direction, while the right driving adjustment slider 233RD and the right driven adjustment slider 233RF which are meshed with the right adjustment main gear 202R are rotated in a counterclockwise direction.

In this instance, the left driving adjustment slider 233LD is axially moved in a left direction, while the right driving adjustment slider 233RD is axially moved in a right direction. The left driven adjustment slider 233LF is axially moved in a right direction, while the right driven adjustment slider 233RF is axially moved in a left direction. At the same time, the left driving helical slider 234LD is rotated together with the left driving carrier 102LD, and is axially moved in a left direction. The right driving helical slider 234RD is rotated together with the right driving carrier 102RD, and is axially moved in a right direction. The left driving helical slider 234LD and the left driving adjustment sun gear 204LD which are helically meshed with each other, and the right driving helical slider 234RD and the right driving adjustment sun gear 204RD which are helically meshed with each other rotate the left driving adjustment sun gear 204LD and the right driving adjustment sun gear 204RD in a counterclockwise direction by a twist angle. The left driving flange gear 205LD and the right driving flange gear 205RD which are integrally coupled to the second driving planetary gear shaft 107D are rotated in a clockwise direction.

The left driven helical slider 234LF is rotated together with the left driven carrier 102LF, and is axially moved in a right direction. The right driven helical slider 234RF is rotated together with the right driven carrier 102RF, and is axially moved in a left direction. Thus, the left driven adjustment sun gear 204LF and the right driven adjustment sun gear 204RF are rotated in a counterclockwise direction, and the left driven flange gear 205LF and the right driven flange gear 205RF which are coupled to the second driven planetary gear shaft 107F are rotated in a clockwise direction.

The transmission adjustment system Q2 will now be described with reference to FIG. 13.

Differences between the transmission adjustment system Q2 and the transmission adjustment system Q1 shown in FIG. 11 are as follows.

The right driving adjustment screw 232RD, the right driving adjustment slider 233RD, the right driving helical slider 234RD, and the adjustment thrust bearing 231 are removed from the driving unit D of the transmission adjustment system Q1. Also, the right driven adjustment screw 232RF, the right driven adjustment slider 233RF, the right driven helical slider 234RF, and the adjustment thrust bearing 231 are removed from the driven unit F of the transmission adjustment system Q1. The adjustment main shaft 203 and the right adjustment main gear 202R are removed from the transmission adjustment system Q1.

The right driving adjustment sun gear 204RD is integrally coupled to the left driving adjustment sun gear 204LD, while the right driven adjustment sun gear 204RF is integrally coupled to the left driven adjustment sun gear 204LF.

The operation of the transmission adjustment system Q2 will now be described.

When the left adjustment main gear 202L receiving the driving force from the adjustment motor 301 is rotated in a clockwise direction, the left driving adjustment slider 233LD and the left driven adjustment slider 233LF which are meshed with the left adjustment main gear 202L are rotated in a counterclockwise direction. Since the left driving adjustment slider 233LD and the left driving adjustment screw 232LD are assembled in a left-handed screw manner, the left driving adjustment slider 233LD is axially moved in a left direction. Since the left driven adjustment slider 233LF and the left driven adjustment screw 232LF are assembled in a right-handed screw manner, the left driven adjustment slider 233LF is axially moved in a right direction.

The left driving helical slider 234LD rotating together with the left driving carrier 102LD is axially moved in a left direction by the left driving adjustment slider 233LD. The left driven helical slider 234LF rotating together with the left driven carrier 102LF is axially moved in a right direction by the left driven adjustment slider 233LF.

The left driving adjustment sun gear 204LD which is meshed with the left driving helical slider 234LD in a helical gear type is rotated in a counterclockwise direction by a twist angle of a helical gear.

The left driven adjustment sun gear 204LF which is meshed with the left driven helical slider 234LF in a helical gear type is rotated in a counterclockwise direction by a twist angle of a helical gear.

The left driving adjustment sun gear 204LD and the right driving adjustment sun gear 204RD which are integrally coupled to each other are rotated in a counter-clockwise direction, and simultaneously, the second driving planetary gear shaft 107D which is integrally coupled to the left driving flange gear 205LD and the right driving flange gear 205RD is rotated in a clockwise direction.

Also, the left driven adjustment sun gear 204LF and the right driven adjustment sun gear 204RF which are integrally coupled to each other are rotated in a counter-clockwise direction, and simultaneously, the second driven planetary gear shaft 107F which is integrally coupled to the left driven flange gear 205LF and the right driven flange gear 205RF is rotated in a clockwise direction.

The transmission adjustment system R1 will now be described with reference to FIG. 14.

The transmission adjustment system R1 includes the driving unit D of the transmission adjustment system P2 shown in FIG. 10 and the driven unit F of the transmission adjustment system Q2 shown in FIG. 13, in which one of the driving unit D and the driven unit F has a stationary carrier, and the other has a rotating carrier.

The left adjustment main gear 202L is meshed with both the left driving adjustment sun gear 204LD and the left driven adjustment slider 233LF.

When the left adjustment main gear 202L is rotated in a clockwise direction, the left driving adjustment sun gear 204LD is rotated in a counterclockwise direction, and the right driving adjustment sun gear 204RD integrally coupled to the left driving adjustment sun gear 204LD is rotated in a counterclockwise direction. The left driving flange gear 205LD and the right driving flange gear 205RD which are meshed with the left driving adjustment sun gear 204LD and the right driving adjustment sun gear 204RD, respectively, are integrally coupled to the second driving planetary gear shaft 107D to rotate in a clockwise direction.

When the left adjustment main gear 202L is rotated in a clockwise direction, the driven unit F is operated in the same manner as that of the driven unit F of the transmission adjustment system Q2 shown in FIG. 13.

The transmission adjustment system R2 will now be described with reference to FIG. 15.

Likely to the transmission adjustment system R1, one of the driving unit D and the driven unit F has a stationary carrier, and the other has a rotating carrier.

The transmission adjustment system R2 includes the driving unit D of the transmission adjustment system P1 shown in FIG. 8 and the driven unit F of the transmission adjustment system Q1 shown in FIG. 11. The left adjustment main gear 202L is integrally coupled to the right adjustment main gear 202R by the main adjustment shaft 203, and the left adjustment main gear 202L is also meshed with both the left driving adjustment sun gear 204LD and the left driven adjustment slider 233LF. The right adjustment main gear 202R is meshed with both the right driving adjustment sun gear 204RD and the right driven adjustment slider 233RF.

When the left adjustment main gear 202L is rotated in a clockwise direction, the driving unit D is operated in the same manner as that of the transmission adjustment system P1, while the driven unit F is operated in the same manner as that of the driven unit F of the transmission adjustment system Q1.

Guide Cone System

The guide cone system is to maintain a concentric circle of a rotation radius when a transmission element such as a chain or belt is rotated, and is classified into guide cone systems A to C which are described with reference to FIGS. 16 to 25.

First of all, the guide cone system A will now be described with reference to FIGS. 16 to 18.

The guide cone system A is applied to a transmission system in which the driving carrier shaft 102DS and the driven carrier shaft 102FS are stationary. FIG. 16 shows a left driving guide cone 251LD, a right driving guide cone 251RD, a left driven guide cone 251LF, and a right driven guide cone 251RF, in which the left driving guide cone 251LD is assembled to the left driving adjustment sun gear 204LD, the right driving guide cone 251RD is assembled to the right driving adjustment sun gear 204RD, the left driven guide cone 251LF is assembled to the left driven adjustment sun gear 204LF, and the right driven guide cone 251RF is assembled to the right driven adjustment sun gear 204RF. FIG. 17 is an assembled cross-sectional view illustrating the guide cone system A according to the first embodiment, and FIG. 18 is a view illustrating parts of the guide cone system A.

The guide cone system A will now be described with reference to FIG. 18.

The left driving guide cone 251LD and the right driven guide cone 251RF are provided with a left-handed screw on an inner periphery thereof, while the right driving guide cone 251RD and the left driven guide cone 251LF are provided with a right-handed screw on an inner periphery thereof.

Portions of the guide cones which come in contact with the chain 105 are machined in a cone shape having a certain slope. When the second driving planetary gear shaft 107D or the second driven planetary gear shaft 107F is moved, the guide cones are provided with a plurality of circular arc shape grooves of a certain angle so as to prevent interference of the shaft. The portion assembled to the driving carrier shaft 102DS or the driven carrier shaft 102FS is provided with a guide groove, thereby preventing rotation of the guide cones.

Referring to FIG. 17, the right driving guide cone 251RD is assembled to the right driving adjustment sun gear 204RD in a right-handed screw manner, while the left driving guide cone 251LD is assembled to the left driving adjustment sun gear 204LD in a left-handed screw manner. The guide cones 251RD and 251LD are installed on both sides of the chain 105 of the driving unit D to maintain the radius of the chain 105 and guide it.

Also, the right driven guide cone 251RF is assembled to the right driven adjustment sun gear 204RF in a left-handed screw manner, while the left driven guide cone 251LF is assembled to the left driven adjustment sun gear 204LF in a right-handed screw manner. The guide cones 251RF and 251LF are installed on both sides of the chain 105 of the driven unit F to maintain the radius of the chain 105 and guide it.

When the left adjustment main gear 202L and the right adjustment main gear 202R which are spline-coupled to the adjustment main shaft 203 are rotated in a clockwise direction, the left driving adjustment sun gear 204LD meshed with the left adjustment main gear 202L is rotated in a counterclockwise direction, while the left driving flange gear 205LD meshed with the left driving adjustment sun gear 204LD is rotated in a clockwise direction. The left driving guide cone 251LD assembled to the left driving adjustment sun gear 204LD in a left-handed screw manner is axially moved in a left direction. The right driving adjustment sun gear 204RD meshed with the right adjustment main gear 202R is rotated in a counterclockwise direction, while the right driving flange gear 205RD meshed with the right driving adjustment sun gear 204RD is rotated in a clockwise direction. The right driving guide cone 251RD assembled to the right driving adjustment sun gear 204RD in a right-handed screw manner is axially moved in a right direction.

The left driving flange gear 205LD and the right driving flange gear 205RD are integrally coupled to the second driving planetary gear shaft 107D. The second driving planetary gear shaft 107D is rotated in a clockwise direction, and a radius of the chain 105 of the driving unit D which is meshed with the second driving planetary gear 104D revolving around the second driving planetary gear shaft 107D is reduced. Simultaneously, the right driving guide cone 251RD is axially moved in a right direction, and the left driving guide cone 251LD is axially moved in a left direction, thereby widening a width between two guide cones.

Accordingly, the left driving guide cone 251LD and the right driving guide cone 251RD maintain a radius of the chain 105 in accordance with the radius of the chain 105 of the driving unit D, with a contact width of both sides of the chain 105 being automatically maintained in a desired range.

When the left adjustment main gear 202L and the right adjustment main gear 202R are rotated in a clockwise direction, the left driven adjustment sun gear 204LF meshed with the left adjustment main gear 202L is rotated in a counterclockwise direction, and the left driven flange gear 205LF meshed with the left driven adjustment sun gear 204LF is rotated in a clockwise direction. The left driven guide cone 251LF assembled to the left driven adjustment sun gear 204LF in a right-handed screw manner is axially moved in a right direction. The right driven adjustment sun gear 204RF meshed with the right adjustment main gear 202R is rotated in a counterclockwise direction, and the right driven flange gear 205RF meshed with the right driven adjustment sun gear 204RF is rotated in a clockwise direction. The right driven guide cone 251LF assembled to the right driven adjustment sun gear 204RF in a left-handed screw manner is axially moved in a left direction.

The left driven flange gear 205LF and the right driven flange gear 205RF are coupled to the second driven planetary gear shaft 107F. The second driven planetary gear shaft 107F is rotated in a clockwise direction, and a radius of the chain 105 of the driven unit F which is meshed with the second driven planetary gear 104F revolving around the second driven planetary gear shaft 107F is increased. Simultaneously, the right driven guide cone 251RF is axially moved in a left direction, and the left driven guide cone 251LF is axially moved in a right direction, thereby reducing a width between two guide cones.

Accordingly, the left driven guide cone 251LF and the right driven guide cone 251RF maintain a radius of the chain 105 in accordance with the radius of the chain 105 of the driven unit F, with a contact width of both sides of the chain 105 being automatically maintained in a desired range.

The guide cone system B will now be described with reference to FIGS. 19 to 22.

The guide cone system B is applied to a transmission system in which the driving carrier shaft 102DS and the driven carrier shaft 102FS are stationary. FIG. 19 shows the left driving guide cone 251LD, the right driving guide cone 251RD, the left driven guide cone 251LF, and the right driven guide cone 251RF, in which the right driving guide cone 251RD and the left driven guide cone 251LF are stationary. The left driving guide cone 251LD is assembled to the left driving adjustment sun gear 204LD, and the right driven guide cone 251RF is assembled to the left driven adjustment sun gear 204LF. FIG. 20 is an assembled cross-sectional view of the guide cone system B according to the second embodiment of the present invention, and FIGS. 21 and 22 show the parts of the guide cone system B.

Referring to FIGS. 21 and 22, the left driving guide cone 251LD and the right driven guide cone 251RF are provided with a left-handed screw on an inner periphery thereof.

Portions of the left driving guide cone 251LD, the right driving guide cone 251RD, the left driven guide cone 251LF, and the right driven guide cone 251RF which come in contact with the chain 105 are machined in a cone shape having a certain slope. The left driving guide cone 251LD and the left driven guide cone 251LF are provided with a plurality of circular arc shape grooves of a certain angle with respect to axes of the left driving flange gear shaft 206LD and the left driven flange gear shaft 206LF, respectively. The groove has a size larger than a diameter of the second planetary gear shafts 107D and 107F so as to prevent interference of the second planetary gear shafts 107D and 107F.

The right driving guide cone 251RD and the right driven guide cone 251RF are provided with a plurality of circular arc shape grooves of a desired angle with respect to axes of the driving carrier shaft 102DS and the driven carrier shaft 102FS, respectively. The groove has a size larger than a diameter of the second planetary gears 104D and 104F, so that the second planetary gears 104D and 104F are free from interference when they revolve around the first planetary gears 103D and 103F.

The left driving guide cone 251LD and the right driven guide cone 251RF are provided with a groove, so that they are assembled to a driving guide bar 252D and a driven guide bar 252F to move axially without rotating.

Referring to FIG. 20, the right driving guide cone 251RD is spline-coupled to a center case 15, while the left driving guide cone 251LD is assembled to the left driving adjustment sun gear 204LD in a left-handed screw manner. The right driving guide cone 251RD and the left driving guide cone 251LD are installed on both sides of the chain 105 of the driving unit D to maintain the radius of the chain 105 and guide it.

The left driven guide cone 251LF is spline-coupled to the left case 13, while the right driven guide cone 251RF is assembled to the left driven adjustment sun gear 204LF in a left-handed screw manner. The guide cones 251RF and 251LF are installed on both sides of the chain 105 of the driven unit F to maintain the radius of the chain 105 and guide it.

When the left adjustment main gear 202L is rotated in a clockwise direction, the left driving adjustment sun gear 204LD is rotated in a counterclockwise direction. The left driving guide cone 251LD assembled to the left driving adjustment sun gear 204LD in a left-handed screw manner is axially moved in a left direction. Since the right driving guide cone 251RD is spline-coupled to the center case 15, a width between the left driving guide cone 251LD and the right driving guide cone 251RD is increased.

Accordingly, as a radius of the chain 105 of the driving unit D is varied, the left driving guide cone 251LD and the right driving guide cone 251RD maintain a radius of the chain 105, with a contact width of both sides of the chain 105 being automatically maintained in a desired range.

When the left adjustment main gear 202L is rotated in a clockwise direction, the right driven guide cone 251RF assembled to the left driven adjustment sun gear 204LF in a left-handed screw manner is axially moved in a left direction. Since the left driven guide cone 251LF is spline-coupled to the left case 13, a width between the left driven guide cone 251LF and the right driven guide cone 251RF is reduced.

Accordingly, as a radius of the chain 105 of the driven unit F is varied, the left driven guide cone 251LF and the right driven guide cone 251RF maintain a radius of the chain 105, with a contact width of both sides of the chain 105 being automatically maintained in a desired range.

The guide cone system C will now be described with reference to FIGS. 23 to 25.

FIG. 24 is a view illustrating the assembled state of the guide cone system according to the third embodiment, and FIG. 25 is a view illustrating the parts of the guide cone system C.

The guide cone system C is applied to a transmission system in which the carrier 102 is rotating. As shown in FIG. 23, the left driving guide cone 251LD is assembled to the left driving adjustment sun gear 204LD in a left-handed screw manner, while the right driving guide cone 251RD is assembled to the right driving adjustment sun gear 204RD in a right-handed screw manner, so that the guide cones 251LD and 251RD are installed on both sides of the chain 105 of the driving unit F.

The left driven guide cone 251LF is assembled to the left driven adjustment sun gear 204LF in a right-handed screw manner, while the right driven guide cone 251RF is assembled to the right driven adjustment sun gear 204RF in a left-handed screw manner, so that the guide cones 251LF and 251RF are installed on both sides of the chain 105 of the driven unit F.

As shown in FIG. 25, portions of the guide cones which come in contact with the chain 105 are machined in a cone shape having a certain slope. The guide cones are provided with a plurality of circular arc shape grooves of a certain angle in order to prevent the interference, when the second driving planetary gear shaft 107D or the second driven planetary gear shaft 107F is moved. The portion of the guide cones which is assembled to the driving carrier shaft 102DS or the driven carrier shaft 102FS is provided with a guide groove, so that the guide cones can be axially reciprocated.

Referring to FIG. 24, when the left driving adjustment sun gear 204LD, the right driving adjustment sun gear 204RD, the left driven adjustment sun gear 204LF, and the right driven adjustment sun gear 204RF are simultaneously rotated in a counter-clockwise direction, the left driving flange gear 205LD and the right driving flange gear 205RD are coupled to the second driving planetary gear shaft 107D, and are rotated in a clockwise direction. Thus, a radius of the chain 105 of the driving unit D which is meshed with the second driving planetary gears 104D rotating around the second driving planetary gear shaft 107D is reduced. The left driving guide cone 251LD is axially moved in a left direction, while the right driving guide cone 251RD is axially moved in a right direction, thereby increasing a width between two guide cones. Accordingly, in accordance with a radius of the chain 105 of the driving unit D, the right driving guide cone 251RD and the left driving guide cone 251LD are installed on both sides of the chain 105 of the driving unit D to maintain the radius of the chain 105, with the contact width being constantly maintained.

And, the left driven flange gear 205LF and the right driven flange gear 205RF are integrally coupled to the second driven planetary gear shaft 107F, and are rotated in a clockwise direction. Thus, a radius of the chain 105 of the driven unit F which is meshed with the second driven planetary gears 104F rotating around the second driven planetary gear shaft 107F is increased. The left driven guide cone 251LF is axially moved in a right direction, while the right driven guide cone 251RF is axially moved in a left direction, thereby reducing a width between two guide cones. Accordingly, in accordance with a radius of the chain 105 of the driven unit F, the left driven guide cone 251LF and the right driven guide cone 251RF are installed on both sides of the chain 105 of the driven unit F to maintain the radius of the chain 105, with the contact width being constantly maintained.

Guide Cone/Transmission Adjustment System

The guide cone/transmission adjustment system is classified into the guide cone/transmission adjustment system P1A-1, the guide cone/transmission adjustment system P1A-2, the guide cone/transmission adjustment system P1B, the guide cone/transmission adjustment system P2A, the guide cone/transmission adjustment system Q1C-1, the guide cone/transmission adjustment system Q1C-2, the guide cone/transmission adjustment system Q2C, the guide cone/transmission adjustment system R1AC, the guide cone/transmission adjustment system R2AC-1, and the guide cone/transmission adjustment system R2AC-2, in accordance with the combination manner of the guide cone system and the transmission adjustment system, which will be described hereinafter with reference to FIGS. 26 to 35.

The guide cone/transmission adjustment system P1A-1 will now be described with reference to FIG. 26.

The guide cone/transmission adjustment system P1A-1 includes the combination of the transmission adjustment system P1 shown in FIG. 8 and the guide cone system A shown in FIG. 16.

The left driving adjustment sun gear 204LD and the left driving guide cone 251LD are assembled in a left-handed screw manner, while the right driving adjustment sun gear 204RD and the right driving guide cone 251RD are assembled in a right-handed screw manner. The left driven adjustment sun gear 204LF and the left driven guide cone 251LF are assembled in a right-handed screw manner, while the right driven adjustment sun gear 204RF and the right driven guide cone 251RF are assembled in a left-handed screw manner.

The left adjustment main gear 202L and the right adjustment main gear 202R which are integrally coupled to the adjustment main shaft 203 are rotated in a clockwise direction, the left driving adjustment sun gear 204LD, the right driving adjustment sun gear 204RD, the left driven adjustment sun gear 204LF, the right driven adjustment sun gear 204RF are rotated in a counterclockwise direction. In this instance, the left driving guide cone 251LD is moved in a left direction, while the right driving guide cone 251RD is moved in a right direction, thereby increasing a width between two guide cones. The left driven guide cone 251LF is moved in a right direction, while the right driven guide cone 251RF is moved in a left direction, thereby reducing a width between two guide cones.

The second planetary gear shaft 107D which is integrally coupled to the left driving flange gear 205LD and the right driving flange gear 205RD is rotated in a clockwise direction, so that a radius of the chain 105 which is meshed with the second driving planetary gears 104D rotating around the second driving planetary gear shaft 107D is reduced.

Meanwhile, when the left adjustment main gear 202L and the right adjustment main gear 202R are rotated in a counterclockwise direction, the above operation is carried out in a reverse manner. A width between the left driving guide cone 251LD and the right driving guide cone 251RD is maintained by a width of the chain 105 to maintain a radius of the chain 105 in a circle in the driving unit D.

The second planetary gear shaft 107F which is integrally coupled to the left driven flange gear 205LF and the right driven flange gear 205RF is rotated in clockwise direction, so that a rotation radius of the chain 105 which is meshed with the second driven planetary gears 104F rotating around the second driven planetary gear shaft 107F is increased.

Meanwhile, when the left adjustment main gear 202L and the right adjustment main gear 202R are rotated in a counterclockwise direction, the above operation is carried out in a reverse manner. A width between the left driven guide cone 251LF and the right driven guide cone 251RF is maintained by a width of the chain 105 to maintain a radius of the chain 105 in a circle in the driven unit F.

The guide cone/transmission adjustment system P1A-2 will now be described with reference to FIG. 27.

A difference between the guide cone/transmission adjustment system P1A-2 and the guide cone/transmission adjustment system P1A-1 shown in FIG. 26 is that the left driving guide cone 251LD and the right driving guide cone 251RD are assembled to the left driving adjustment sun gear 204LD, and the left driven guide cone 251LF and the right driven guide cone 251RF are assembled to the left driven adjustment sun gear 204LF.

The left driving guide cone 251LD and the right driven guide cone 251RF are assembled in a left-handed screw manner, while the right driving guide cone 251RD and the left driven guide cone 251LF are assembled in a right-handed screw manner. The operation thereof is identical to that of the guide cone/transmission adjustment system P1A-1.

The guide cone/transmission adjustment system P1B will now be described with reference to FIG. 28.

The guide cone/transmission adjustment system P1B is applied to the second embodiment of the present invention, and includes the combination of the transmission adjustment system P1 shown in FIG. 8 and the guide cone system B shown in FIG. 19.

The right driving guide cone 251RD and the left driven guide cone 251LF are stationary. The left driving guide cone 251LD is assembled to the left driving adjustment sun gear 204LD in a left-handed screw, while the right driven guide cone 251RF is assembled to the left driven adjustment sun gear 204LF in a left-handed screw.

When the left adjustment main gear 202L is rotated in a clockwise direction, the left driving adjustment sun gear 204LD and the left driven adjustment sun gear 204LF are rotated in a counterclockwise direction, and the left driving guide cone 251LD and the right driven guide cone 251RF are axially moved in a left direction. In this instance, a width between the left driving guide cone 251LD and the right driving guide cone 251RD is increased, while a width between the left driven guide cone 251LF and the right driven guide cone 251RF is reduced. When the left adjustment main gear 202L is rotated in a counterclockwise direction, the operation will be carried out in a reverse manner.

Accordingly, a width between the left driving guide cone 251LD and the right driving guide cone 251RD and a width between the left driven guide cone 251LF and the right driven guide cone 251RF are maintained by a width of the chain 105 to maintain a radius of the chain 105 in a circle.

The guide cone/transmission adjustment system P2A will now be described with reference to FIG. 29.

The guide cone/transmission adjustment system P2A includes the combination of the transmission adjustment system P2 shown in FIG. 10 and the guide cone system A shown in FIG. 16.

In the left driving adjustment sun gear 204LD and the right driving adjustment sun gear 204RD which are integrally coupled to each other, the left driving guide cone 251LD is assembled to the left driving adjustment sun gear 204LD in a left-handed screw, while the right driving guide cone 251RD is assembled to the right driving adjustment sun gear 204RD in a right-handed screw. In the left driven adjustment sun gear 204LF and the right driven adjustment sun gear 204RF which are integrally coupled to each other, the left driven guide cone 251LF is assembled to the left driven adjustment sun gear 204LF in a right-handed screw, while the right driven guide cone 251RF is assembled to the right driven adjustment sun gear 204RF in a right-handed screw.

When the left adjustment main gear 202L is rotated in a clockwise direction, the left driving adjustment sun gear 204LD and the right driving adjustment sun gear 204RD are rotated in a counterclockwise direction, the left driving guide cone 251LD is axially moved in a left direction, and the right driving guide cone 251RD is axially moved in a right direction, thereby increasing a width between two guide cones. Simultaneously, the left driven adjustment sun gear 204LF and the right driven adjustment sun gear 204RF are rotated in a counterclockwise direction, the left driven guide cone 251LF is axially moved in a right direction, and the right driven guide cone 251RF is axially moved in a left direction, thereby reducing a width between two guide cones. When the left adjustment main gear 202L is rotated in a counter-clockwise direction, the operation will be carried out in a reverse manner.

The guide cone/transmission adjustment system Q1C-1 will now be described with reference to FIG. 30.

The guide cone/transmission adjustment system Q1C-1 is applied to the third embodiment of the present invention, and also is applied to a transmission system with a rotating carrier, and includes the combination of the transmission adjustment system Q1 shown in FIG. 11 and the guide cone system C shown in FIG. 23.

In the transmission adjustment system Q1, the left driving guide cone 251LD is assembled to the left driving adjustment sun gear 204LD in a left-handed screw, while the right driving guide cone 251RD is assembled to the right driving adjustment sun gear 204RD in a right-handed screw.

The left driven guide cone 251LF is assembled to the left driven adjustment sun gear 204LF in a right-handed screw, while the right driven guide cone 251RF is assembled to the right driven adjustment sun gear 204RF in a left-handed screw.

When the left driving adjustment sun gear 204LD and the right driving adjustment sun gear 204RD are rotated in a counterclockwise direction by the transmission adjustment system Q1, the left driving guide cone 251LD is axially moved in a left direction, and the right driving guide cone 251RD is axially moved in a right direction, thereby increasing a width between two guide cones. When the left driven adjustment sun gear 204LF and the right driven adjustment sun gear 204RF are rotated in a counter-clockwise direction, the left driven guide cone 251LF is axially moved in a right direction, and the right driving guide cone 251RF is axially moved in a left direction, thereby reducing a width between two guide cones.

When the left driving adjustment sun gear 204LD, the right driving adjustment sun gear 204RD, the left driven adjustment sun gear 204LF, and the right driven adjustment sun gear 204RF are rotated in a clockwise direction, the operation will be carried out in a reverse manner.

The guide cone/transmission adjustment system Q1C-2 will now be described with reference to FIG. 31.

The guide cone/transmission adjustment system Q1C-2 includes the transmission adjustment system Q1 and the guide cone system C, and is applied to a transmission system with a rotating carrier.

A difference between the guide cone/transmission adjustment system Q1C-2 and the guide cone/transmission adjustment system Q1C-1 shown in FIG. 30 is as follows.

The left driving guide cone 251LD is assembled to the left driving adjustment sun gear 204LD in a left-handed screw, while the right driving guide cone 251RD is assembled to the left driving adjustment sun gear 204LD in a right-handed screw. The left driven guide cone 251LF is assembled to the left driven adjustment sun gear 204LF in a right-handed screw, while the right driven guide cone 251RF is assembled to the left driven adjustment sun gear 204LF in a left-handed screw.

The operation thereof is identical to that of the guide cone/transmission adjustment system Q1C-1.

The guide cone/transmission adjustment system Q2C will now be described with reference to FIG. 32.

The guide cone/transmission adjustment system Q2C includes the transmission adjustment system Q2 shown in FIG. 13 and the guide cone system C shown in FIG. 23, and is applied to a transmission system with a rotating carrier.

In the left driving adjustment sun gear 204LD and the right driving adjustment sun gear 204RD which are integrally coupled to each other in the transmission adjustment system Q2, the left driving guide cone 251LD is assembled to the left driving adjustment sun gear 204LD in a left-handed screw, while the right driving guide cone 251RD is assembled to the right driving adjustment sun gear 204RD in a right-handed screw. In the left driven adjustment sun gear 204LF and the right driven adjustment sun gear 204RF which are integrally coupled to each other, the left driven guide cone 251LF is assembled to the left driven adjustment sun gear 204LF in a right-handed screw, while the right driven guide cone 251RF is assembled to the right driven adjustment sun gear 204RF in a left-handed screw.

When the left driving adjustment sun gear 204LD and the right driving adjustment sun gear 204RD are rotated in a counterclockwise direction, the left driving guide cone 251LD is axially moved in a left direction, and the right driving guide cone 251RD is axially moved in a right direction, thereby increasing a width between two guide cones.

Also, when the left driven adjustment sun gear 204LF and the right driven adjustment sun gear 204RF are rotated in a counterclockwise direction, the left driven guide cone 251LF is axially moved in a right direction, and the right driving guide cone 251RF is axially moved in a left direction, thereby reducing a width between two guide cones.

The guide cone/transmission adjustment system R1AC will now be described with reference to FIG. 33.

The guide cone/transmission adjustment system R1AC is applied to the transmission adjustment system R1 shown in FIG. 14, and includes the guide cone system A in the driving unit D with the stationary carrier, and the guide cone system C in the driven unit F with the rotating carrier.

In the left driving adjustment sun gear 204LD and the right driving adjustment sun gear 204RD which are integrally coupled to each other in the transmission adjustment system R1, the left driving guide cone 251LD is assembled to the left driving adjustment sun gear 204LD in a left-handed screw, while the right driving guide cone 251RD is assembled to the right driving adjustment sun gear 204RD in a right-handed screw. In the left driven adjustment sun gear 204LF and the right driven adjustment sun gear 204RF which are integrally coupled to each other, the left driven guide cone 251LF is assembled to the left driven adjustment sun gear 204LF in a right-handed screw, while the right driven guide cone 251RF is assembled to the right driven adjustment sun gear 204RF in a left-handed screw. The left adjustment main gear 202L is meshed with the driving adjustment sun gear 204LD and the left driven adjustment slider 233LF.

When the left driving adjustment sun gear 204LD and the right driving adjustment sun gear 204RD are rotated in a counterclockwise direction, the left driving guide cone 251LD is axially moved in a left direction, and the right driving guide cone 251RD is axially moved in a right direction, thereby increasing a width between two guide cones.

Also, when the left driven adjustment sun gear 204LF and the right driven adjustment sun gear 204RF are rotated in a counterclockwise direction, the left driven guide cone 251LF is axially moved in a right direction, and the right driving guide cone 251RF is axially moved in a left direction, thereby reducing a width between two guide cones.

When the left driving adjustment sun gear 204LD, the right driving adjustment sun gear 204RD, the left driven adjustment sun gear 204LF, and the right driven adjustment sun gear 204RF are rotated in a clockwise direction, the operation will be carried out in a reverse manner.

The guide cone/transmission adjustment system R2AC-1 will now be described with reference to FIG. 34.

The guide cone/transmission adjustment system R2AC-1 includes the transmission adjustment system R2 shown in FIG. 15, the guide cone system A in the driving unit D, and the guide cone system C in the driven unit F.

The left driving guide cone 251LD is assembled to the left driving adjustment sun gear 204LD in a left-handed screw, while the right driving guide cone 251RD is assembled to the right driving adjustment sun gear 204RD in a right-handed screw. Also, the left driven guide cone 251LF is assembled to the left driven adjustment sun gear 204LF in a right-handed screw, while the right driven guide cone 251RF is assembled to the right driven adjustment sun gear 204RF in a left-handed screw. The operation thereof is identical to that of the guide cone/transmission adjustment system R1 AC shown in FIG. 33.

The guide cone/transmission adjustment system R2AC-2 will now be described with reference to FIG. 35.

A difference between the guide cone/transmission adjustment system R2AC-2 and the guide cone/transmission adjustment R2AC-1 shown in FIG. 34 is that the right driving guide cone 251RD is assembled to the left driving adjustment sun gear 204LD in a right-handed screw manner, and the right driven guide cone 251RF is assembled to the left driven adjustment sun gear 204LF in a left-handed screw manner. The operation thereof is identical to that of the guide cone/transmission adjustment system R1AC shown in FIG. 33.

Continuously Variable Transmission System

The operation of the continuously variable transmission system may be varied depending upon the combination of the transmission system and the transmission adjustment system, in particular, the coupling method and input/output method of the transmission system and the guide cone/transmission adjustment system. 32 examples (No. 1 to 32) of the continuously variable transmission system are described hereinafter, which are described with reference to FIGS. 36 to 70. Also, three embodiments are described hereinafter in order to facilitate the understanding of the present invention, such as the construction. More specifically, the continuously variable transmission system (No. 1) is the first embodiment, the continuously variable transmission system (No. 4) is the second embodiment, and the continuously variable transmission system (No. 9) is the third embodiment.

The continuously variable transmission system (No. 1) will now be described with reference to FIG. 36.

The continuously variable transmission system (No. 1) according to the first embodiment, as shown in FIG. 37, is the combination of the transmission system I shown in FIG. 2 and the guide cone/transmission adjustment system P1A-1 shown in FIG. 26. The driving carrier shaft 102DS and the driven carrier shaft 102FS are stationary, and the driving force is inputted to the driving sun gear 101D, and is outputted from the driven sun gear 101F.

The continuously variable transmission system (No. 2) shown in FIG. 38, is the combination of the transmission system II shown in FIG. 4 and the guide cone/transmission adjustment system P1A-2 shown in FIG. 27. The driving carrier shaft 102DS and the driven carrier shaft 102FS are stationary, and the driving force is inputted to the driving sun gear 101D, and is outputted from the driven sun gear 101F.

The continuously variable transmission system (No. 3) shown in FIG. 39, is the combination of the transmission system III shown in FIG. 5 and the guide cone/transmission adjustment system P1A-2 shown in FIG. 27, with the driving ring gear 106D and the driven ring gear 106F being omitted from the transmission system. The driving carrier shaft 102DS and the driven carrier shaft 102FS are stationary, and the driving force is inputted to the driving sun gear 101D, and is outputted from the driven sun gear 101F.

The continuously variable transmission system (No. 4) according to the second embodiment, as shown in FIGS. 40 and 41, is the combination of the transmission system IV shown in FIG. 6 and the guide cone/transmission adjustment system P1B shown in FIG. 28, with the driving ring gear 106D and the driven ring gear 106F being omitted from the transmission system. The driving carrier shaft 102DS and the driven carrier shaft 102FS are stationary, and the driving force is inputted to the driving sun gear 101D, and is outputted from the driven sun gear 101F.

The continuously variable transmission system (No. 5) shown in FIG. 42 is the combination of the transmission system III shown in FIG. 5 and the guide cone/transmission adjustment system P1A-2 shown in FIG. 27, with the driving sun gear 101D and the driven sun gear 101F being omitted from the transmission system. The driving carrier shaft 102DS and the driven carrier shaft 102FS are stationary, and the driving force is inputted to the driving ring gear 106D, and is outputted from the driven ring gear 106F.

The continuously variable transmission system (No. 6) shown in FIG. 43 is the combination of the transmission system IV shown in FIG. 6 and the guide cone/transmission adjustment system P1A-2 shown in FIG. 27, with the driving sun gear 101D and the driven sun gear 101F being omitted from the transmission system. The driving carrier shaft 102DS and the driven carrier shaft 102FS are stationary, and the driving force is inputted to the driving ring gear 106D, and is outputted from the driven ring gear 106F.

The continuously variable transmission system (No. 7) shown in FIG. 44 is the combination of the transmission system III shown in FIG. 5 and the guide cone/transmission adjustment system P1A-2 shown in FIG. 27, with the driving ring gear 106D and the driven sun gear 101F being omitted from the transmission system. The driving carrier shaft 102DS and the driven carrier shaft 102FS are stationary, and the driving force is inputted to the driving sun gear 101D, and is outputted from the driven ring gear 106F.

The continuously variable transmission system (No. 8) shown in FIG. 45 is the combination of the transmission system IV shown in FIG. 6 and the guide cone/transmission adjustment system P1A-2 shown in FIG. 27, with the driving ring gear 106D and the driven sun gear 101F being omitted from the transmission system. The driving carrier shaft 102DS and the driven carrier shaft 102FS are stationary, and the driving force is inputted to the driving sun gear 101D, and is outputted from the driven ring gear 106F.

The continuously variable transmission system (No. 9) according to the third embodiment of the present invention, as shown in FIGS. 46 and 47, is the combination of the transmission system I shown in FIG. 2 and the guide cone/transmission adjustment system Q1C-1 shown in FIG. 30. The driving sun gear 101D and the driven sun gear 101F are stationary, and the driving force is inputted to the right driving carrier 102RD, and is outputted from the right driven carrier 102RF.

The continuously variable transmission system (No. 10) shown in FIG. 48 is the combination of the transmission system II shown in FIG. 4 and the guide cone/transmission adjustment system Q1C-2 shown in FIG. 31. The driving sun gear 101D and the driven sun gear 101F are stationary, and the driving force is inputted to the right driving carrier 102RD, and is outputted from the right driven carrier 102RF.

The continuously variable transmission system (No. 11) shown in FIG. 49 is the combination of the transmission system III shown in FIG. 5 and the guide cone/transmission adjustment system Q1C-2 shown in FIG. 31 with the driving ring gear 106D and the driven ring gear 106F being omitted from the transmission system. The driving sun gear 101D and the driven sun gear 101F are stationary, and the driving force is inputted to the right driving carrier 102RD, and is outputted from the right driven carrier 102RF.

The continuously variable transmission system (No. 12) shown in FIG. 50 is the combination of the transmission system IV shown in FIG. 6 and the guide cone/transmission adjustment system Q1C-2 shown in FIG. 31, with the driving ring gear 106D and the driven ring gear 106F being omitted from the transmission system. The driving sun gear 101D and the driven sun gear 101F are stationary, and the driving force is inputted to the right driving carrier 102RD, and is outputted from the right driven carrier 102RF.

The continuously variable transmission system (No. 13) shown in FIG. 51 is the combination of the transmission system III shown in FIG. 5 and the guide cone/transmission adjustment system Q2C shown in FIG. 32. The driving ring gear 106D and the driven ring gear 106F are stationary, and the driving force is inputted to the driving sun gear 101D, and is outputted from the driven sun gear 101F.

The continuously variable transmission system (No. 14) shown in FIG. 52 is the combination of the transmission system III shown in FIG. 5 and the guide cone/transmission adjustment system Q2C shown in FIG. 32. The driving sun gear 101D and the driven sung gear 101F are stationary, and the driving force is inputted to the driving ring gear 106D, and is outputted from the driven ring gear 106F.

The continuously variable transmission system (No. 15) shown in FIG. 53 is the combination of the transmission system III shown in FIG. 5 and the guide cone/transmission adjustment system Q2C shown in FIG. 32. The driving ring gear 106D and the driven sun gear 101F are stationary, and the driving force is inputted to the driving sun gear 101D, and is outputted from the driven ring gear 106F.

The continuously variable transmission system (No. 16) shown in FIG. 54 is the combination of the transmission system IV shown in FIG. 6 and the guide cone/transmission adjustment system Q2C shown in FIG. 32. The driving ring gear 106D and the driven ring gear 106F are stationary, and the driving force is inputted to the driving sun gear 101D, and is outputted from the driven sun gear 101F.

The continuously variable transmission system (No. 17) shown in FIG. 55 is the combination of the transmission system IV shown in FIG. 6 and the guide cone/transmission adjustment system Q2C shown in FIG. 32. The driving sun gear 101D and the driven sun gear 101F are stationary, and the driving force is inputted to the driving ring gear 106D, and is outputted from the driven ring gear 106F.

The continuously variable transmission system (No. 18) shown in FIG. 56 is the combination of the transmission system IV shown in FIG. 6 and the guide cone/transmission adjustment system Q2C shown in FIG. 32. The driving sun gear 101D and the driven ring gear 106F are stationary, and the driving force is inputted to the driving ring gear 106D, and is outputted from the driven sun gear 101F.

The continuously variable transmission system (No. 19) shown in FIG. 57 is the combination of the transmission system I shown in FIG. 2 and the guide cone/transmission adjustment system R2AC-1 shown in FIG. 34. The driving carrier shaft 102DS and the driven sun gear 101F are stationary, and the driving force is inputted to the driving sun gear 101D, and is outputted from the right driven carrier 102RF.

The continuously variable transmission system (No. 20) shown in FIG. 58 is the combination of the transmission system II shown in FIG. 4 and the guide cone/transmission adjustment system R2AC-2 shown in FIG. 35. The driving carrier shaft 102DS and the driven sun gear 101F are stationary, and the driving force is inputted to the driving sun gear 101D, and is outputted from the right driven carrier 102RF.

The continuously variable transmission system (No. 21) shown in FIG. 59 is the combination of the transmission system III shown in FIG. 5 and the guide cone/transmission adjustment system R2AC-2 shown in FIG. 35, with the driving ring gear 106D and the driven ring gear 106F being omitted from the transmission system. The driving carrier shaft 102DS and the driven sun gear 101F are stationary, and the driving force is inputted to the driving sun gear 101D, and is outputted from the right driven carrier 102RF.

The continuously variable transmission system (No. 22) shown in FIG. 60 is the combination of the transmission system III shown in FIG. 5 and the guide cone/transmission adjustment system R1AC shown in FIG. 33, with the driving ring gear 106D being omitted from the transmission system. The driving carrier shaft 102DS and the driven ring gear 106F are stationary, and the driving force is inputted to the driving sun gear 101D, and is outputted from the driven sun gear 101F.

The continuously variable transmission system (No. 23) shown in FIG. 61 is the combination of the transmission system in shown in FIG. 5 and the guide cone/transmission adjustment system R1AC shown in FIG. 33, with the driving ring gear 106D being omitted from the transmission system. The driving carrier shaft 102DS and the driven sun gear 101F are stationary, and the driving force is inputted to the driving sun gear 101D, and is outputted from the driven ring gear 106F.

The continuously variable transmission system (No. 24) shown in FIG. 62 is the combination of the transmission system III shown in FIG. 5 and the guide cone/transmission adjustment system R1AC shown in FIG. 33, with the driving sun gear 101D being omitted from the transmission system. The driving carrier shaft 102DS and the driven sun gear 101F are stationary, and the driving force is inputted to the driving ring gear 106D, and is outputted from the driven ring gear 106F.

The continuously variable transmission system (No. 25) shown in FIG. 63 is the combination of the transmission system III shown in FIG. 5 and the guide cone/transmission adjustment system R1AC shown in FIG. 33, with the driving sun gear 101D and the driven ring gear 106F being omitted from the transmission system. The driving carrier shaft 102DS and the driven sun gear 101F are stationary, and the driving force is inputted to the driving ring gear 106D, and is outputted from the right driven carrier 102RF.

The continuously variable transmission system (No. 26) shown in FIG. 64 is the combination of the transmission system III shown in FIG. 5 and the guide cone/transmission adjustment system R1AC shown in FIG. 33, with the driving sun gear 101D being omitted from the transmission system. The driving carrier shaft 102DS and the driven ring gear 106F are stationary, and the driving force is inputted to the driving ring gear 106D, and is outputted from the driven sun gear 101F.

The continuously variable transmission system (No. 27) shown in FIG. 65 is the combination of the transmission system IV shown in FIG. 6 and the guide cone/transmission adjustment system R2AC-2 shown in FIG. 35, with the driving ring gear 106D and the driven ring gear 106F being omitted from the transmission system. The driving carrier shaft 102DS and the driven sun gear 101F are stationary, and the driving force is inputted to the driving sun gear 101D, and is outputted from the right driven carrier 102RF.

The continuously variable transmission system (No. 28) shown in FIG. 66 is the combination of the transmission system IV shown in FIG. 6 and the guide cone/transmission adjustment system R1AC shown in FIG. 33, with the driving ring gear 106D being omitted from the transmission system. The driving carrier shaft 102DS and the driven ring gear 106F are stationary, and the driving force is inputted to the driving sun gear 101D, and is outputted from the driven sun gear 101F.

The continuously variable transmission system (No. 29) shown in FIG. 67 is the combination of the transmission system IV shown in FIG. 6 and the guide cone/transmission adjustment system R1AC shown in FIG. 33, with the driving ring gear 106D being omitted from the transmission system. The driving carrier shaft 102DS and the driven sun gear 101F are stationary, and the driving force is inputted to the driving sun gear 101D, and is outputted from the driven ring gear 106F.

The continuously variable transmission system (No. 30) shown in FIG. 68 is the combination of the transmission system IV shown in FIG. 6 and the guide cone/transmission adjustment system R1AC shown in FIG. 33, with the driving sun gear 101D being omitted from the transmission system. The driving carrier shaft 102DS and the driven ring gear 106F are stationary, and the driving force is inputted to the driving ring gear 106D, and is outputted from the driven sun gear 101F.

The continuously variable transmission system (No. 31) shown in FIG. 69 is the combination of the transmission system IV shown in FIG. 6 and the guide cone/transmission adjustment system R1AC shown in FIG. 33, with the driving sun gear 101D being omitted from the transmission system. The driving carrier shaft 102DS and the driven sun gear 101F are stationary, and the driving force is inputted to the driving ring gear 106D, and is outputted from the driven ring gear 106F.

The continuously variable transmission system (No. 32) shown in FIG. 70 is the combination of the transmission system IV shown in FIG. 6 and the guide cone/transmission adjustment system R1AC shown in FIG. 33, with the driving sun gear 101D and the driven ring gear 106F being omitted from the transmission system. The driving carrier shaft 102DS and the driven sun gear 101F are stationary, and the driving force is inputted to the driving ring gear 106D, and is outputted from the right driven carrier 102RF.

Embodiment 1

The continuously variable transmission system (No. 1) according to the first embodiment shown in FIG. 36 includes the transmission system I shown in FIG. 2 and the guide cone/transmission adjustment system P1A-1 shown in FIG. 26.

The continuously variable transmission system according to the first embodiment will now be described with reference to FIGS. 71 to 75.

Transmission System

The transmission system I shown in FIG. 2 is applied in this embodiment, in which the driving carrier shaft 102DS and the driven carrier shaft 102FS are stationary, and the driving force is inputted to the driving sun gear 101D and is outputted from the driven sun gear 101F. The transmission system includes, as shown in FIG. 71, the driving sung gear 101D, the driving carrier shaft 102DS, the first driving planetary gear 103D, the second driving planetary gear 104D, the second driving planetary gear shaft 107D, the chain 105, the second driven planetary gear 104F, the second driven planetary gear shaft 107F, the first driven planetary gear 103F, the driven carrier shaft 102FS, and the driven sun gear 101F.

Explaining the principle of transmission with reference to FIG. 72, when the driving sun gear 101D is rotated by the driving force from the engine, the first driving planetary gear 103D meshed with the driving sun gear 101D is rotated around the driving carrier shaft 102DS in a direction opposite to the driving sun gear 101D, and the second driving planetary gear 104D meshed with the first driving planetary gear 103D is rotated in the same direction as the driving sun gear 101D. If the second driving planetary gear shaft 107D is rotated about the driving carrier shaft 102DS by a desired angle, the second driving planetary gear 104D meshed with the first driving planetary gear 103D is rotated around the first driving planetary gear 103D by a desired angle. Also, the chain 105 meshed with the second driving planetary gear 104D is rotated in the same direction as the second driving planetary gear 104D to change a radius of the chain 105 of the driving unit D.

The chain 105 is meshed with the second driving planetary gear 104D and the second driven planetary gear 104F to transmit the driving force from the driving unit D to the driven unit F. The second driven planetary gear 104F receives the driving force from the chain 105, and thus is rotated in the same direction as the rotation direction of the chain 105. When the second driven planetary gear 107F is rotated about the driven carrier shaft 102FS by a desired angle, the second driven planetary gear 104F meshed with the first driven planetary gear 103F is rotated around the first driven planetary gear 103F by a desired angle to change a radius of the chain 105 meshed with the second driven planetary gear 104F.

The first driven planetary gear 103F is always meshed with the second driven planetary gear 104F, and thus is rotated around the driven carrier shaft 102FS in a direction opposite to the second driven planetary gear 104F to transmit the driving force to the driven sun gear 101F meshed with the first driven planetary gear 103F.

Summarizing the principle of transmission according to the first embodiment with reference to FIG. 72, the second driving planetary gear 104D is positioned in order to maximize a radius of the chain 105 of the driving unit D, and the second driven planetary gear 104F is positioned in order to minimize a radius of the chain 105 of the driven unit F. Consequently, the speed of the driven sun gear 101F is maximized. When the second driving planetary gear shaft 107D and the second driven planetary gear shaft 107F are rotated about the driving carrier shaft 102DS and the driven carrier shaft 102FS in the same direction, the second driving planetary gear 104D revolves around the first driving planetary gear 103D, and the second driven planetary gear 104F revolves around the first driven planetary gear 103F. As a result, a radius of the chain 105 meshed with the second driving planetary gear 104D is reduced, and a radius of the chain 105 meshed with the second driven planetary gear 104F is increased, thereby reducing a rotation speed of the output shaft. The second driving planetary gear 104D is positioned in order to minimize a radius of the chain 105 of the driving unit D, while the second driven planetary gear 104F is positioned in order to maximize a radius of the chain 105 of the driven unit F, thereby minimizing a rotation speed of the driven sun gear 101F.

A continuous shift ratio can be obtained by continuously adjusting a revolving direction of the second driving planetary gear 104D and the second driven planetary gear 104F around the first driving planetary gear 103D and the first driven planetary gear 103F.

Transmission Adjustment System

The transmission adjustment system employs the guide cone/transmission adjustment system P1A-1 shown in FIG. 26 including the transmission adjustment system P1 shown in FIG. 8 and the guide cone system A shown in FIG. 16. The transmission adjustment system P1 includes, as shown in FIG. 73, the adjustment input shaft 201, the left adjustment main gear 202L, the right adjustment main gear 202R, the left driving adjustment sun gear 204LD, the left driving adjustment sun gear shaft 207LD, the right driving adjustment sun gear 204RD, the left driving flange gear 205LD, the right driving flange gear 205RD, the left driven adjustment sun gear 204LF, the left driven adjustment sun gear shaft 207LF, the right driven adjustment sun gear 204RF, the left driven flange gear 205LF, and the right driven flange gear 205RF.

In the transmission adjustment system P1, the rotation force inputted from the adjustment motor 301 is transmitted to the left adjustment main gear 202L through the adjustment input shaft 201. When the left adjustment main gear 202L and the right adjustment main gear 202R coupled to adjustment main shaft 203 are rotated in a clockwise direction, the left driving adjustment sun gear 204LD, the right driving adjustment sun gear 204RD, the left driven adjustment sun gear 204LF, and the right driven adjustment sun gear 204RF which are meshed with the left adjustment main gear 202L and the right adjustment main gear 202R, respectively, are rotated in a counter-clockwise direction.

The left driving flange gear 205LD and the right driving flange gear 205RD which are meshed with the left driving adjustment sun gear 204LD and the right driving adjustment sun gear 204RD, respectively, are rotated in a clockwise direction, and simultaneously, the left driven flange gear 205LF and the right driven flange gear 205RF which are meshed with the left driven adjustment sun gear 204LF and the right driven adjustment sun gear 204RF, respectively, are rotated in a clockwise direction.

The second driving planetary gear shaft 107D which is integrally coupled to the left driving flange gear 205LD and the right driving flange gear 205RD, and the second driven planetary gear shaft 107F which is integrally coupled to the left driven flange gear 205LF and the right driven flange gear 205RF are rotated in a clockwise direction by a desired angle.

In this instance, the second driving planetary gear 104D rotating around the second driving planetary gear shaft 107D in the driving unit D is meshed with the first driving planetary gear 103D, and thus revolves around the first driving planetary gear 103D, thereby reducing a radius of the chain 105 meshed with the second driving planetary gear 104D. At the same time, the second driven planetary gear 104F rotating around the second driven planetary gear shaft 107F in the driven unit F is meshed with the first driven planetary gear 103F, and thus revolves around the first driven planetary gear 103F, thereby increasing a radius of the chain 105 meshed with the second driven planetary gear 104F.

Consequently, by adjusting the rotation of the left adjustment main gear 202L and the right adjustment main gear 202R in a clockwise direction, a radius of the chain 105 meshed with the second driving planetary gear 104D in the driving unit D is reduced, and simultaneously, a radius of the chain 105 meshed with the second driven planetary gear 104F in the driven unit F is increased. By adjusting the rotation of the left adjustment main gear 202L and the right adjustment main gear 202R in a counter-clockwise direction, a radius of the chain 105 meshed with the second driving planetary gear 104D in the driving unit D is increased, and simultaneously, a radius of the chain 105 meshed with the second driven planetary gear 104F in the driven unit F is reduced.

Since a radius of the chain 105 in the driving unit D and a radius of the chain 105 in the driven unit F are continuously adjusted, a shift ratio or rotation force required for the power transmission can be continuously obtained.

Guide Cone System A

The guide cone system A is applied to a transmission system with the driving carrier shaft 102DS and the driven carrier shaft 102FS being stationary. FIG. 73 shows a left driving guide cone 251LD, a right driving guide cone 251RD, a left driven guide cone 251LF, and a right driven guide cone 251RF, in which the left driving guide cone 251LD is assembled to the left driving adjustment sun gear 204LD, the right driving guide cone 251RD is assembled to the right driving adjustment sun gear 204RD, the left driven guide cone 251LF is assembled to the left driven adjustment sun gear 204LF, and the right driven guide cone 251RF is assembled to the right driven adjustment sun gear 204RF.

The guide cone system A will now be described with reference to FIGS. 73 and 74.

The left driving guide cone 251LD and the right driven guide cone 251RF are provided with a left-handed screw on an inner periphery thereof, while the right driving guide cone 251RD and the left driven guide cone 251LF are provided with a right-handed screw on an inner periphery thereof.

Portions of the guide cones which come in contact with the chain 105 are machined in a cone shape having a certain slope. When the second driving planetary gear shaft 107D or the second driven planetary gear shaft 107F is moved, the guide cones are provided with a plurality of circular arc grooves of a certain angle so as to prevent interference of the shaft. The portion coupled to the driving carrier shaft 102DS or the driven carrier shaft 102FS is provided with a guide groove, thereby preventing rotation of the guide cones.

The right driving guide cone 251RD is assembled to the right driving adjustment sun, gear 204RD in a right-handed screw manner, while the left driving guide cone 251LD is assembled to the left driving adjustment sun gear 204LD in a left-handed screw manner. The guide cones 251RD and 251LD are installed on both sides of the chain 105 of the driving unit D to maintain the radius of the chain 105.

Also, the right driven guide cone 251RF is assembled to the right driven adjustment sun gear 204RF in a left-handed screw manner, while the left driven guide cone 251LF is assembled to the left driven adjustment sun gear 204LF in a right-handed screw manner. The guide cones 251RF and 251LF are installed on both sides of the chain 105 of the driven unit F to maintain the radius of the chain 105.

When the left adjustment main gear 202L and the right adjustment main gear 202R which are spline-coupled to the adjustment main shaft 203 are rotated in a clockwise direction, the left driving adjustment sun gear 204LD meshed with the left adjustment main gear 202L is rotated in a counter-clockwise direction, while the left driving flange gear 205LD meshed with the left driving adjustment sun gear 204LD is rotated in a clockwise direction. The left driving guide cone 251LD assembled to the left driving adjustment sun gear 204LD in a left-handed screw manner is axially moved in a left direction. The right driving adjustment sun gear 204RD meshed with the right adjustment main gear 202R is rotated in a counterclockwise direction, while the right driving flange gear 205RD meshed with the right driving adjustment sun gear 204RD is rotated in a clockwise direction. The right driving guide cone 251RD assembled to the right driving adjustment sun gear 204RD in a right-handed screw manner is axially moved in a right direction.

The left driving flange gear 205LD and the right driving flange gear 205RD are integrally coupled to the second driving planetary gear shaft 107D. The second driving planetary gear shaft 107D is rotated in a clockwise direction, and a radius of the chain 105 of the driving unit D which is meshed with the second driving planetary gear 104D rotating around the second driving planetary gear shaft 107D is reduced. Simultaneously, the right driving guide cone 251RD is axially moved in a right direction, and the left driving guide cone 251LD is axially moved in a left direction, thereby widening a width between two guide cones.

Accordingly, the left driving guide cone 251LD and the right driving guide cone 251RD maintain a radius of the chain 105 in accordance with the radius of the chain 105 of the driving unit D, with a contact width of both sides of the chain 105 being automatically maintained in a desired range.

When the left adjustment main gear 202L and the right adjustment main gear 202R are rotated in a clockwise direction, the left driven adjustment sun gear 204LF meshed with the left adjustment main gear 202L is rotated in a counterclockwise direction, and the left driven flange gear 205LF meshed with the left driven adjustment sun gear 204LF is rotated in a clockwise direction. The left driven guide cone 251LF assembled to the left driven adjustment sun gear 204LF in a right-handed screw manner is axially moved in a right direction. The right driven adjustment sun gear 204RF meshed with the right adjustment main gear 202R is rotated in a counterclockwise direction, and the right driven flange gear 205RF meshed with the right driven adjustment sun gear 204RF is rotated in a clockwise direction. The right driven guide cone 251RF assembled to the right driven adjustment sun gear 204RF in a left-handed screw manner is axially moved in a left direction.

The left driven flange gear 205LF and the right driven flange gear 205RF are integrally coupled to the second driven planetary gear shaft 107F. The second driven planetary gear shaft 107F is rotated in a clockwise direction, and a radius of the chain 105 of the driven unit F which is meshed with the second driven planetary gear 104F rotating around the second driven planetary gear shaft 107F is increased. Simultaneously, the right driven guide cone 251RF is axially moved in a left direction, and the left driven guide cone 251LF is axially moved in a right direction, thereby reducing a width between two guide cones.

Accordingly, the left driven guide cone 251LF and the right driven guide cone 251RF maintain a radius of the chain 105 in accordance with the radius of the chain 105 of the driven unit F, with a contact width of both sides of the chain 105 being automatically maintained in a desired range.

The construction according to the first embodiment of the present invention will be described with reference to FIG. 75.

First of all, the construction of the driving unit D will now be described.

The first driving planetary gear 103D is meshed with the driving sun gear 101D which is integrally coupled to the driving sun gear shaft 101DS, and the driving sun gear shaft 101DS is supported by a ball bearing 352 inserted in a right case 12 and a ball bearing 351 inserted in a right case cover 11, so that the driving sun gear 101D is freely rotated.

An oil seal 361 is mounted on the outside of the bearing 351 of the right case cover 11 to prevent leakage between the right case cover 11 and the driving sun gear shaft 101DS.

The right driving adjustment sun gear 204RD of a hollow body is mounted on the outer periphery of the driving sun gear shaft 101DS. A needle bearing 341 is interposed between the driving sun gear shaft 101DS and the right driving adjustment sun gear 204RD, so that the driving sun gear shaft 101DS and the right driving adjustment sun gear 204RD are freely rotated. A thrust bearing 321 is positioned on left and right sides of the right driving adjustment sun gear 204RD, and a circlip 331 is inserted into the driving sun gear 101D in the left thrust bearing 321.

The tooth portion of the right driving adjustment sun gear 204RD is meshed with the right driving flange gear 205RD, and the right driving adjustment sun gear 204RD and the right driving guide cone 251RD are assembled by means of a screw. When the right driving adjustment sun gear 204RD is rotated, the right driving guide cone 251RD is axially moved in a left or right direction.

The left driving adjustment sun gear shaft 207LD is spline-coupled to the left case 13 in order to coincide with the center of the driving sun gear 101D, and a circlip 332 is mounted on an end of the left driving adjustment sun gear shaft.

The left driving adjustment sun gear 204LD of a hollow body is mounted on the outer periphery of the left driving sun gear shaft 207LD. A needle bearing 341 is interposed between the left driving sun gear shaft 207LD and the left driving adjustment sun gear 204LD, so that the left driving adjustment sun gear 204LD is freely rotated. A thrust bearing 322 is positioned on left and right sides of the left driving adjustment sun gear 204LD, and a circlip 332 is mounted on the left driving sun gear shaft 207LD in the right thrust bearing 322.

The tooth portion of the left driving adjustment sun gear 204LD is meshed with the left driving flange gear 205LD, and the left driving adjustment sun gear 204LD and the left driving guide cone 251LD are assembled by means of a screw. When the left driving adjustment sun gear 204LD is rotated, the left driving guide cone 251LD is axially moved in a left or right direction.

The driving carrier shaft 102DS is spline-coupled to the right case 12 and the left case 13, and a circlip 333 is mounted on both ends of the driving carrier shaft.

The hollow first driving planetary gear 103D meshed with the driving sun gear 101D is mounted on the outer periphery of the driving carrier shaft 102DS. A needle bearing 343 is interposed between the first driving planetary gear 103D and the driving carrier shaft 102DS, so that the first driving planetary gear 103D is freely rotated. A thrust bearing 329 is positioned on left and right sides of the first driving planetary gear 103D, and a circlip 333 is mounted on the driving carrier shaft 102DS.

The right driving flange gear 205RD of a hollow body is mounted on the right outer periphery of the driving carrier shaft 102DS. A needle bearing 342 is interposed between the driving carrier shaft 102DS and the right driving flange gear 205RD, so that the right driving flange gear 205RD is freely rotated. A thrust bearing 323 is positioned on left and right sides of the right driving flange gear 205RD, and a circlip 333 is mounted on the driving carrier shaft 102DS in the left thrust bearing.

The left driving flange 205LD of a hollow body is mounted on the left outer periphery of the driving carrier shaft 102DS. A needle bearing 342 is interposed between the driving carrier shaft 102DS and the left driving flange gear 205LD, so that the left driving flange gear 205LD is freely rotated. A thrust bearing 323 is positioned on left and right sides of the left driving flange gear 205LD, and a circlip 333 is mounted on the driving carrier shaft 102DS in the right thrust bearing.

The second driving planetary gear shaft 107D is spline-coupled to the left driving flange gear 205LD and the right driving flange gear 205RD, and a clip 334 is mounted on both ends of the second driving planetary gear shaft.

The hollow second driving planetary gear 104D is mounted on the outer periphery of the second driving planetary gear shaft 107D. A needle bearing 344 is interposed between the second driving planetary gear shaft 107D and the second driving planetary gear 104D, so that the second driving planetary gear 104D is freely rotated. A thrust bearing 324 is positioned on left and right sides of the second driving planetary gear 104D, and a circlip 334 is mounted on the second driving planetary gear shaft 107D.

The second driving planetary gear 104D is meshed with the first driving planetary gear 103D, and the chain 105 is meshed with the second driving planetary gear 104D.

The second driving planetary gear 104D is meshed with the first driving planetary gear 103D to receive the rotation force. The second driving planetary gear 104D is rotated around the outer periphery of the second driving planetary gear shaft 107D, and also revolves around the first driving planetary gear 103D when the left driving flange gear 205LD and the right driving flange gear 205RD are rotated by a desired angle. In this instance, a radius of the chain 105 meshed with the second driving planetary gear 104D is changed to perform the shift of the driving unit.

When the chain 105 is rotated around the second driving planetary gear 104D, the right driving guide cone 251RD and the left driving guide cone 251LD are installed on both sides of the chain 105 so that a radius of the chain 105 is maintained at the center thereof.

The construction of the driven unit F will now be described.

The driven sun gear shaft 101FS integrally coupled to the driven sun gear 101F is supported by the ball bearing 352 inserted in the right case 12 and the ball bearing 351 inserted in the right case cover 11, so that the driven sun gear shaft 101FS is freely rotated.

An oil seal 362 is mounted on the outside of the bearing 351 of the right case cover 11 to prevent leakage between the right case cover 11 and the driven sun gear 101F.

The right driven adjustment sun gear 204RF of a hollow body is mounted on the outer periphery of the driven sun gear shaft 101FS. A needle bearing 341 is interposed between the driven sun gear shaft 101FS and the right driven adjustment sun gear 204RF, so that the driven sun gear shaft 101FS and the right driven adjustment sun gear 204RF are freely rotated. The thrust bearing 321 is positioned on left and right sides of the right driven adjustment sun gear 204RF, and the circlip 331 is mounted on the driven sun gear 101F in the left thrust bearing 321.

The tooth portion of the right driven adjustment sun gear 204RF is meshed with the right driven flange gear 205RF, and the right driven adjustment sun gear 204RF and the right driven guide cone 251RF are assembled by means of a screw. When the right driven adjustment sun gear 204RF is rotated, the right driven guide cone 251RF is axially moved in a left or right direction.

The left driven adjustment sun gear shaft 207LF is spline-coupled to the left case 13 in order to coincide with the center of the driven sun gear 101F, and a circlip 332 is mounted on an end of the left driven adjustment sun gear shaft 207LF.

The left driven adjustment sun gear 204LF of a hollow body is mounted on the outer periphery of the left driven sun gear shaft 207LF. A needle bearing 341 is interposed between the left driven sun gear shaft 207LF and the left driven adjustment sun gear 204LF, so that the left driven adjustment sun gear 204LF is freely rotated. A thrust bearing 322 is positioned on left and right sides of the left driven adjustment sun gear 204LF, and a circlip 332 is mounted on left driven sun gear shaft 207LF in the right thrust bearing 322.

The tooth portion of the left driven adjustment sun gear 204LF is meshed with the left driven flange gear 205LF, and the left driven adjustment sun gear 204LF and the left driven guide cone 251LF are assembled by means of a screw. When the left driven adjustment sun gear 204LF is rotated, the left driven guide cone 251LF is axially moved in a left or right direction.

The driven carrier shaft 102FS is spline-coupled to the right case 12 and the left case 13, and the circlip 333 is mounted on both ends of the driven carrier shaft.

The first driven planetary gear 103F meshed with the driven sun gear 101F is assembled to the center portion of the outer periphery of the driven carrier shaft 102FS. A needle bearing 343 is interposed between the driven carrier shaft 102FS and the first driven planetary gear 103F, so that the first driven planetary gear 103F is freely rotated. A thrust bearing 329 is positioned on left and right sides of the first driven planetary gear 103F, and a circlip 333 is mounted on the driven carrier shaft 102FS.

The left driven flange 205LF of a hollow body meshed with the left driven adjustment sun gear 204LF is mounted on the left outer periphery of the driven carrier shaft 102FS. The needle bearing 342 is interposed between the driven carrier shaft 102FS and the left driven flange gear 205LF, so that the left driven flange gear 205LF is freely rotated. The thrust bearing 323 is positioned on left and right sides of the left driven flange gear 205LF, and the circlip 333 is mounted on the driven carrier shaft 102FS.

The right driven flange 205RF of a hollow body meshed with the right driven adjustment sun gear 204RF is mounted on the right outer periphery of the driven carrier shaft 102FS. The needle bearing 342 is interposed between the driven carrier shaft 102FS and the right driven flange gear 205RF, so that the right driven flange gear 205RF is freely rotated. The thrust bearing 323 is positioned on left and right sides of the right driven flange gear 205RF, and the circlip 333 is mounted on the driven carrier shaft 102FS.

The second driven planetary gear shaft 107F is spline-coupled to the left driven flange gear 205LF and the right driven flange gear 205RF, and the clip 334 is mounted on the both ends of the second driven planetary gear shaft.

The second driven planetary gear 104F meshed with the first driven planetary gear 103F is mounted on the outer periphery of the second driven planetary gear shaft 107F. The needle bearing 344 is interposed between the second driven planetary gear shaft 107F and the second driven planetary gear 104F, so that the second driven planetary gear 104F is freely rotated. The thrust bearing 324 is positioned on left and right sides of the second driven planetary gear shaft 107F, and the circlip 334 is mounted on the second driven planetary gear shaft 107F.

The chain 105 is meshed with the second driven planetary gear 104F.

The second driven planetary gear 104F receives the rotation force from the chain 105, and is rotated around the outer periphery of the second driven planetary gear shaft 107F. When the right driven flange gear 205RF and the left driven flange gear 205LF are rotated by a desired angle, the second driven planetary gear 104F revolves around the first driven planetary gear 103F.

In this instance, a radius of the chain 105 meshed with the second driven planetary gear 104F is changed to perform the shift of the driven unit. The second driven planetary gear 104F transmits the rotation force to the first driven planetary gear 103F, and the first driven planetary gear 103F transmits the rotation force to the driven sun gear 101F.

When the chain 105 is rotated around the second driven planetary gear 104F, the right driven guide cone 251RF and the left driven guide cone 251LF come in contact with both sides of the chain 105 so that a radius of the chain 105 is maintained at the center thereof.

At the center of the driving unit D and driven unit F, the needle bearing 345 is inserted into the left case cover 14, while the needle bearing 346 is inserted into the right case 12. The adjustment main shaft 203 is inserted into the needle bearing 345 and the needle bearing 346, so that the adjustment main shaft 203 is freely rotated.

The thrust bearing 328 is mounted on the right end of the adjustment main shaft 203, and the circlip 335 is mounted on the adjustment main shaft 203.

The right adjustment main gear 202R is spline-coupled to the right portion of the adjustment main shaft 203, and the right adjustment main gear 202R is meshed with the right driving adjustment sun gear 204RD and the right driven adjustment sun gear 204RF.

A thrust bearing 327 is mounted on the outer periphery of the adjustment main shaft 203 between the right adjustment main gear 202R and the right case 12.

The left adjustment main gear 202L is spline-coupled to the left portion of the adjustment main shaft 203, and the left adjustment main gear 202L is meshed with the left driving adjustment sun gear 204LD and the left driven adjustment sun gear 204LF.

A thrust bearing 326 is mounted between the left adjustment main gear 202L and the left case 13.

The tooth portion of the left adjustment main gear 202L is meshed with the adjustment input gear 201, and a ball bearing 354 is interposed between the shaft of the adjustment input gear 201 and the left case cover 14. An oil seal 363 is inserted into the left case cover 14 at the left side of the ball bearing 354 to prevent leakage of oil.

The thrust bearing 321 is interposed between the adjustment input gear 201 and the left case cover 14. The adjustment input gear 201 is coupled to the output shaft of the adjustment motor 301 to receive the rotation force.

The right case 12 and the right case cover 11 are assembled by means of a bolt 311, and the right case 12 and the left case 13 are assembled by means of a bolt 312, while the left case 13 and the left case cover 14 are assembled by means of a bolt 313. The adjustment motor 301 is fixed to the left case cover 14 by means of a bolt 314.

Oil is introduced into the case to prevent wearing of elements.

Embodiment 2

The continuously variable transmission system (No. 4) shown in FIG. 40 includes the transmission system IV shown in FIG. 6 and the guide cone/transmission adjustment system P1B shown in FIG. 28.

The continuously variable transmission system according to the second embodiment will now be described with reference to FIGS. 76 to 84.

Transmission System

The transmission system IV shown in FIG. 6 is applied in this embodiment, in which the driving carrier shaft 102DS and the driven carrier shaft 102FS are stationary, and the driving force is inputted to the driving sun gear 101D and is outputted from the driven sun gear 101F. The transmission system includes, as shown in FIG. 76, the driving sung gear 101D, the driving carrier shaft 102DS, the first driving planetary gear 103D, the second driving planetary gear 104D, the second driving planetary gear shaft 107D, the chain 105, the second driven planetary gear 104F, the second driven planetary gear shaft 107F, the first driven planetary gear 103F, the driven carrier shaft 102FS, and the driven sun gear 101F. The first driving planetary gear 103D, the second driving planetary gear 104D, the first driven planetary gear 103F, and the second driven planetary gear 104F are composed of plural rows of step or long pinions which are meshed in plural as shown in drawings.

Explaining the principle of transmission with reference to FIG. 77, when the driving sun gear 101D is rotated by the driving force from the engine, the first driving planetary gear 103D meshed with the driving sun gear 101D is rotated around the stationary driving carrier shaft 102DS in a direction opposite to the driving sun gear 101D, and the second driving planetary gear 104D which is meshed with a left row of pinion in the first driving planetary gear 103D, which is not meshed with the driving sun gear 101D, is rotated in the same direction as the driving sun gear 101D.

The chain 105 with teeth is meshed with the left row of pinion in the second planetary gear 104D which is not meshed with the first driving planetary gear 103D.

If the second driving planetary gear shaft 107D is continuously rotated about the driving carrier shaft 102DS by a desired angle, the second driving planetary gear 104D meshed with the first driving planetary gear 103D revolves around the first driving planetary gear 103D. Also, the chain 105 meshed with the second driving planetary gear 104D is rotated in the same direction as the second driven planetary gear 104F to change a radius of the chain 105 of the driving unit D. The chain 105 is meshed with the second driving planetary gear 104D and the second driven planetary gear 104F to transmit the driving force from the driving unit D to the driven unit F.

The second driven planetary gear 104F receives the driving force from the chain 105, and thus is rotated in the same direction as the rotation direction of the chain 105. If the first driven planetary gear 103F is meshed with the second driven planetary gear 104F, which is not meshed with the chain 105, the first driven planetary gear 103F is rotated in a direction opposite to the second driven planetary gear 104F.

If the driven sun gear 101F is meshed with the right row of pinion in the first driven planetary gear 103F which is not meshed with the second driven planetary gear 104F, the driven sun gear 101F is rotated in the same direction as the driving sun gear 101D.

When the second driven planetary gear shaft 107F is continuously rotated around the driven carrier 102FS by a desired angle, the second driven planetary gear 104F meshed with the first driven planetary gear 103F revolves around the first driven planetary gear 103F to change a radius of the chain 105 meshed with the second driven planetary gear 104F.

The principle of transmission according to the second embodiment is identical to that of the first embodiment, except that the chain 105 meshed with the second driving planetary gear 104D and the second driven planetary gear 104F is free from interference with the first driving planetary gear 103D and the first driven planetary gear 103F to significantly change a radius of the chain 105 of the driving unit D and a radius of the chain 105 of the driven A.

More specifically, it can increase a shift ratio of the driving unit and the driven unit, and can apply various shapes of teeth of the chain 105, the second driving planetary gear 104D and the second driven planetary gear 104F.

Transmission Adjustment System

The transmission adjustment system employs the guide cone/transmission adjustment system P1B shown in FIG. 28 including the transmission adjustment system P1 shown in FIG. 8 and the guide cone system B shown in FIG. 19.

The principle and function of the transmission adjustment according to the second embodiment are identical to those of the transmission adjustment system P1 according to the first embodiment.

The guide cone system B according to the second embodiment will now be described.

The guide cone system B is applied to a transmission system in which the driving carrier shaft 102DS and the driven carrier shaft 102FS are stationary. FIGS. 78 to 80 show the left driving guide cone 251LD, the right driving guide cone 251RD, the left driven guide cone 251LF, and the right driven guide cone 251RF, in which the right driving guide cone 251RD and the left driven guide cone 251LF are stationary. The left driving guide cone 251LD is assembled to the left driving adjustment sun gear 204LD, and the right driven guide cone 251RF is assembled to the left driven adjustment sun gear 204LF.

Referring to FIGS. 79 and 80, the left driving guide cone 251LD and the right driven guide cone 251RF are provided with a left-handed screw on an inner periphery thereof.

Portions of the left driving guide cone 251LD, the right driving guide cone 251RD, the left driven guide cone 251LF, and the right driven guide cone 251RF which come in contact with the chain 105 are machined in a cone shape having a certain slope. The left driving guide cone 251LD and the left driven guide cone 251LF are provided with a plurality of circular arc shape grooves of a certain angle with respect to axes of the left driving flange gear shaft 206LD and the left driven flange gear shaft 206LF, respectively. The groove has a size larger than a diameter of the second planetary gear shafts 107D and 107F so as to prevent interference of the second planetary gear shafts 107D and 107F.

The left driving guide cone 251LD is provided with a groove, so that it is assembled to the driving guide bar 252D to move axially.

The right driving guide cone 251RD and the right driven guide cone 251RF are provided with a plurality of circular arc shape grooves of a desired angle with respect to axes of the driving carrier shaft 102DS and the driven carrier shaft 102FS, respectively. The groove has a size larger than a diameter of the second planetary gears 104D and 104F, so that the second planetary gears 104D and 104F are free from interference when they revolve around the first planetary gear 103D and 103F.

The right driven guide cone 251RF is provided with a groove, so that it is assembled to the driven guide bar 252F to move axially.

Referring to 78, the right driving guide cone 251RD is spline-coupled to a center case 15, while the left driving guide cone 251LD is assembled to the left driving adjustment sun gear 204LD in a left-handed screw manner. The right driving guide cone 251RD and the left driving guide cone 251LD are installed on both sides of the chain 105 of the driving unit D to maintain the radius of the chain 105.

The left driven guide cone 251LF is spline-coupled to the left case 13, while the right driven guide cone 251RF is assembled to the left driven adjustment sun gear 204LF in a left-handed screw manner. The guide cones 251RF and 251LF are installed on both sides of the chain 105 of the driven unit F to maintain the radius of the chain 105.

When the left adjustment main gear 202L is rotated in a clockwise direction, the left driving adjustment sun gear 204LD is rotated in a counterclockwise direction. The left driving guide cone 251LD assembled to the left driving adjustment sun gear 204LD in a left-handed screw manner is axially moved in a left direction. Since the right driving guide cone 251RD is spline-coupled to the center case 15, a width between the left driving guide cone 251LD and the right driving guide cone 251RD is increased.

Accordingly, as a radius of the chain 105 of the driving unit D is varied, the left driving guide cone 251LD and the right driving guide cone 251RD maintain a radius of the chain 105, with a contact width of both sides of the chain 105 being automatically maintained in a desired range.

When the left adjustment main gear 202L is rotated in a clockwise direction, the right driven guide cone 251RF assembled to the left driven adjustment sun gear 204LF in a left-handed screw manner is axially moved in a left direction. Since the left driven guide cone 251LF is spline-coupled to the left case 13, a width between the left driven guide cone 251LF and the right driven guide cone 251RF is reduced.

Accordingly, as a radius of the chain 105 of the driven unit F is varied, the left driven guide cone 251LF and the right driven guide cone 251RF maintain a radius of the chain 105, with a contact width of both sides of the chain 105 being automatically maintained in a desired range.

The construction according to the second embodiment of the present invention will be described with reference to FIG. 81.

First of all, the construction of the driving unit D will now be described.

The first driving planetary gear 103D is meshed with the outer portion of the driving sun gear 101D, and the driving sun gear shaft 101DS integrally formed with the driving sun gear 101D is supported by a ball bearing 352 inserted in a right case 12 and a ball bearing 351 inserted in a right case cover 11, so that the driving sun gear shaft 101DS is freely rotated. The thrust bearing 321 is interposed between the driving sun gear shaft 101DS and the right case 12.

The oil seal 361 is mounted on the outside of the bearing 351 of the right case cover 11 to prevent leakage between the right case cover 11 and the driving sun gear shaft 101DS.

The right driving adjustment sun gear 204RD of a hollow body is mounted on the outer periphery of the driving sun gear shaft 101 DS. A needle bearing 341 is interposed between the driving sun gear shaft 101DS and the right driving adjustment sun gear 204RD, so that the driving sun gear shaft 101DS and the right driving adjustment sun gear 204RD are freely rotated. A thrust bearing 321 is positioned on left and right sides of the right driving adjustment sun gear 204RD, and a circlip 331 is inserted into the driving sun gear 101D in the right thrust bearing 321.

The tooth portion of the right driving adjustment sun gear 204RD is meshed with the right driving flange gear 205RD. The driving carrier shaft 102DS is spline-coupled to the center case 15, and is inserted into the right case 12.

On the outer periphery of the driving carrier shaft 102DS between the center case 15 and the right case 12, the first driving planetary gear 103D is meshed with the driving sun gear 101D. The thrust bearing 329 is provided on left and right sides of the first driving planetary gear 103D, and the needle bearing 343 is interposed between the first driving planetary gear 103D and the driving carrier shaft 102DS.

On the right side of the right case 12, the right driving flange gear 205RD is assembled to the outer periphery of the driving carrier shaft 102DS, and the needle bearing 342 is interposed between the driving carrier shaft 102DS and the driving flange gear 205RD. The thrust bearing 323 is provided on left and right sides of the right driving flange gear 205RD, and a circlip 333 is mounted on the driving carrier shaft 102DS at the right thrust bearing 323.

A ball bearing 353 is mounted on the left case 13 in order to coincide with the center of the driving sun gear 101D, and the left driving adjustment sun gear 204LD is installed in the inner periphery of the ball bearing 353. The thrust bearing 322 is provided on left and right sdies of the ball bearing 353, and a circlip 332 is mounted on the left driving adjustment sun gear 204LD at the right thrust bearing 322.

The left tooth portion of the left driving adjustment sun gear 204LD is meshed with the left driving flange gear 205LD, and the right tooth portion thereof is assembled to the left driving guide cone 251LD by means of a screw. When the left driving adjustment sun gear 204LD is rotated, the left driving guide cone 251LD is axially moved in left and right directions.

The right driving guide cone 251RD is spline-coupled to the center case 15 to coincide with the center of the driving sun gear 101D, and the clip 332 is mounted on the right driving guide cone 251RD.

The left driving flange gear shaft 206LD is fixed to the left case 13 in order to coincide with the center of the driving carrier shaft 102DS. The left driving flange gear 205LD is meshed with the left driving adjustment sun gear 204LD and is assembled to the left driving flange gear shaft 206LD. The needle bearing 342 is interposed between the left driving flange gear shaft 206LD and the left driving flange gear 205LD so that the left driving flange gear 205LD is freely rotated. The thrust bearing 323 is provided on left and right sides of the left driving flange gear 205LD, and the circlip 333 is mounted on the left driving flange gear shaft 206LD at the left thrust bearing 323.

Both ends of the second driving planetary gear shaft 107D are spline-coupled to the left driving flange gear 205LD and the right driving flange gear 205RD, and the circlip 334 is mounted on the both ends.

The right row of pinion in the second driving planetary gear 104D is meshed with the left row of pinion in the first driving planetary gear 103D which is not meshed with the first driving planetary gear 103D and the driving sun gear 101D, and then is assembled to the second driving planetary gear shaft 107D.

The needle bearing 344 is interposed between the second driving planetary gear shaft 107D and the second driving planetary gear 104D, so that the second driving planetary gear 104D is freely rotated. The thrust bearing 324 is provided on left and right sides of the second driving planetary gear 104D, and the circlip 334 is mounted on the second driving planetary gear shaft 107D.

The chain 105 is meshed with the left row of pinion in the second driving planetary gear 104D. The right driving guide cone 251RD is fixed at the right side of the chain 105, and at the left side of the chain 105 the left driving guide cone 251LD is axially moved in left and right directions to maintain a radius of the chain 105.

When the left driving flange gear 205LD and the right driving flange gear 205RD are rotated by a desired angle, the second driving planetary gear 104D and the second driving planetary gear shaft 107D are rotated by a desired angle. The left case 13, the left driving guide cone 251LD, the right driving guide cone 251RD, the center case 15, and the right case 12 are provided with a groove so that the second driving planetary gear 104D and the second driving planetary gear shaft 107D are rotated to be free from the interference.

According to the principle of transmission, the driving sun gear 101D transmits the rotation force to the first driving planetary gear 103D rotating about the driving carrier shaft 102DS, and the second driving planetary gear 104D meshed with the first driving planetary gear 103D is rotated about the second driving planetary gear shaft 107D and revolves around the first driving planetary gear 103D.

In this instance, since a revolving radius of the second driving planetary gear 104D is changed, a radius of the chain 105 meshed with the second driving planetary gear 104D is changed to continuously change a shift ratio of the driving unit.

A difference between the embodiments 1 and 2 is that the right row of pinion in the second planetary gear 104D, which is not meshed with the right row of pinion in the first driving planetary gear 103D and the driving sun gear 101D, is meshed with the left row of pinion in the first driving planetary gear 103D, and thus revolves around the first planetary gear 103D. Since the interference with the second driving planetary gear 104D and the driving sun gear 101D is prevented, a revolving angle of the second driving planetary gear 104D around the first driving planetary gear 103D can be increased. If the revolving angle is increased, a change width of the radius of the chain 105 which is meshed with the second driving planetary gear 104D is increased. That is, a shift range can be increased. The left row of pinion in the second driving planetary gear 104D meshed with the chain 105 is independent of the right row of pinion which is meshed with the first driving planetary gear 103D, so that a kind and design of the chain 105 can be applied to various applications.

The construction of the driven unit F will now be described. The driven sun gear shaft 101FS integrally coupled to the driven sun gear 101F is supported by the ball bearing 352 inserted in the right case 12 and the ball bearing 351 inserted in the right case cover 11, so that the driven sun gear shaft 101FS is freely rotated. The thrust ball bearing 321 is interposed between the driven sun gear shaft 101FS and the right case 12. The right driven adjustment sun gear 204RF of a hollow body is mounted on the outer periphery of the driven sun gear shaft 101FS. A needle bearing 341 is interposed between the driven sun gear shaft 101FS and the right driven adjustment sun gear 204RF, so that the driven sun gear shaft 101 FS and the right driven adjustment sun gear 204RF are freely rotated. The thrust bearing 321 is positioned on left and right sides of the right driven adjustment sun gear 204RF, and the circlip 331 is mounted on the driven sun gear 101F in the left thrust bearing 321.

The left driven guide cone 251LF is spline-coupled to the left case 13 in order to coincide with the center of the driven sun gear 101F, and the needle bearing 341 is inserted into the center case 15.

The ball bearing 354 is inserted into the inside of the left driven guide cone 251LF, and the left driven adjustment sun gear 204LF is interposed into the inner periphery of the ball bearing 354 and the needle bearing 341, so that the left driven adjustment sun gear 204LF is freely rotated.

The thrust bearing 321 is positioned on the left side of the ball bearing 354, while the thrust bearing 322 is positioned on the right side thereof. The circlip 331 is mounted on the left driven adjustment sun gear 204LF at the thrust bearing 322. The thrust bearing 322 is positioned on left and right sides of the needle bearing 341, and the circlip 332 is mounted on the left driven adjustment sun gear 204LF.

The right driven guide cone 251RF is assembled to the left driven adjustment sun gear 204LF by means of a screw. The driven guide bar 252F is spline-coupled to the left case 13 and the center case 15, and the circlip 334 is mounted on both ends thereof. When the left driven adjustment sun gear 204LF is rotated, the right driven guide cone 251RF is not rotated by the driven guide bar 252F, but is moved in a left or right direction.

The driven carrier shaft 102FS is spline-coupled to the center case 15, and is inserted into the right case 12, and the circlip 333 is mounted on the driven carrier shaft 102F.

On the outer periphery of the driven carrier shaft 102FS between the center case 15 and the right case 12, the first driven planetary gear 103F is meshed with the driven sun gear 101F. The thrust bearing 329 is provided on left and right sides of the first driven planetary gear 103F, and the needle bearing 343 is interposed between the first driven planetary gear 103F and the driven carrier shaft 102FS, so that the first driven planetary gear 103F is freely rotated.

On the right side of the right case 12, the hollow right driven flange gear 205RF is assembled to the outer periphery of the driven carrier shaft 102FS, and the needle bearing 342 is interposed between the driven carrier shaft 102FS and the right driven flange gear 205RF, so that the right driven flange gear 205RF is freely rotated. The thrust bearing 329 is provided on left and right sides of the right driven flange gear 205RF, and a circlip 333 is mounted on the driven carrier shaft 102FS at the right thrust bearing 329.

The left driven flange gear shaft 206LF is fixed to the left case 13 in order to coincide with the center of the driven carrier shaft 102FS. The left driven flange gear 205LF is meshed with the left driven adjustment sun gear 204LF and is assembled to the left driven flange gear shaft 206LF. The needle bearing 342 is interposed between the left driven flange gear shaft 206LF and the left driven flange gear 205LF so that the left driven flange gear 205LF is freely rotated. The thrust bearing 329 is provided on left and right sides of the left driven flange gear 205LF, and the circlip 333 is mounted on the left driven flange gear shaft 206LF at the left thrust bearing 323.

Both ends of the second driven planetary gear shaft 107F are spline-coupled to the left driven flange gear 205LF and the right driven flange gear 205RF, and the circlip 334 is mounted on the both ends.

The right row of pinion in the second driven planetary gear 104F is meshed with the left row of pinion in the first driven planetary gear 103F is not meshed with the first driven planetary gear 103F and the driven sun gear 101F, and then is assembled to the second driven planetary gear shaft 107F.

The needle bearing 344 is interposed between the second driven planetary gear shaft 107F and the second driven planetary gear 104F, and the thrust bearing 324 is provided on left and right sides of the second driven planetary gear 104F. The circlip 334 is mounted on the second driven planetary gear shaft 107F.

The chain 105 is meshed with the left row of pinion in the second driven planetary gear 104F. The left driven guide cone 251LF is fixed at the left side of the chain 105, and at the right side of the chain 105 the right driven guide cone 251RF is axially moved in left and right directions to maintain a radius of the chain 105.

When the left driven flange gear 205LF and the right driven flange gear 205RF are rotated by a desired angle, the second driven planetary gear 104F and the second driven planetary gear shaft 107F are rotated by a desired angle. The left case 13, the left driven guide cone 251LF, the right driven guide cone 251RF, the center case 15, and the right case 12 are provided with a groove so that the second driven planetary gear 104F and the second driven planetary gear shaft 107F are rotated to be free from the interference.

According to the principle of transmission, the second driven planetary gear 104F meshed with the chain 105 is rotated about the second driven planetary gear shaft 107F. The second driven planetary gear 104F is meshed with the first driven planetary gear 103F and revolves around the first driven planetary gear 103F. In this instance, a radius of the chain 105 meshed with the second driven planetary gear 104F is changed to perform the shift of the driven unit.

At the center of the driving unit D and driven unit F, the left case 13 is provided with the ball bearing 355, while the right case 12 is provided with the ball bearing 355. The adjustment main shaft 203 is inserted into the ball bearings 355, so that the adjustment main shaft 203 is freely rotated.

The right adjustment main gear 202R is spline-coupled to the right portion of the adjustment main shaft 203, and the circlip 335 is mounted on the adjustment main shaft 203. The right adjustment main gear 202R is meshed with the right driving adjustment sun gear 204RD and the right driven adjustment sun gear 204RF.

A thrust bearing 327 is mounted on the outer periphery of the adjustment main shaft 203 between the right adjustment main gear 202R and the right case 12.

The left adjustment main gear 202L is spline-coupled to the left portion of the adjustment main shaft 203, and the circlip 335 is mounted on the adjustment main shaft 203. The left adjustment main gear 202L is meshed with the left driving adjustment sun gear 204LD and the left driven adjustment sun gear 204LF.

A thrust bearing 326 is mounted between the left adjustment main gear 202L and the left case 13.

The left tooth portion of the left adjustment main gear 202L is meshed with the adjustment input gear 201, and a needle bearing 342 is interposed between the shaft of the adjustment input gear 201 and the left case cover 14. The thrust bearing 321 is mounted on left and right sides of the needle bearing 342, and the circlip 334 is mounted on the shaft of the adjustment input gear 201 at the left thrust bearing 321.

The adjustment input gear 201 is coupled to the output shaft of the adjustment motor 301 to receive the rotation force.

The right case 12 and the right case cover 11 are assembled by means of a bolt 311, while the right case 12 and the center case cover 15 are assembled by means of a bolt 312. The left case 13 and the center case 15 are assembled by means of a bolt 315, while the left case 13 and the left case cover 14 are assembled by means of a bolt 313. The adjustment motor 301 is fixed to the left case cover 14 by means of a bolt 314.

Oil is introduced into the case to prevent wearing of elements.

Embodiment 3

The continuously variable transmission system (No. 9) according to the third embodiment shown in FIG. 46 includes the transmission system I shown in FIG. 2 and the guide cone/transmission adjustment system Q1C-1 shown in FIG. 30.

The continuously variable transmission system according to the third embodiment will now be described with reference to FIGS. 85 to 95.

Transmission System

The transmission system I shown in FIG. 2 is applied in this embodiment, in which the driving sun gear 101D and the driven sun gear 101F are stationary, and the driving force is inputted to the right driving carrier 102RD and is outputted from the right driven carrier 102RF. The transmission system includes, as shown in FIG. 85, the driving sung gear 101D, the driving carrier shaft 102DS, the right driving carrier 102RD, the left driving carrier 102LD, the first driving planetary gear 103D, the second driving planetary gear 104D, the chain 105, the second driving planetary gear shaft 107D, the second driven planetary gear 104F, the second driven planetary gear shaft 107F, the first driven planetary gear 103F, the left driven carrier 102LF, the right driven carrier 102RF, the driven carrier shaft 102FS, the driven sun gear 101F, the input shaft 111D, and the output shaft 111F.

Explaining the principle of transmission with reference to FIG. 86, the input shaft 111D rotates the right driving carrier 102RD by the rotation force outputted from the engine. The driving sun gear 101D is stationary, and the first driving planetary gear 103D is rotated around the driving carrier shaft 102DS. The second planetary gear 104D meshed with the first driving planetary gear 103D is rotated. The chain 105 meshed with the second driving planetary gear 104D is meshed with the second planetary gear 104F to transmit the rotation force to the driven unit F.

By continuously rotating the second driving planetary gear shaft 107D about the driving carrier shaft 102DS by a desired angle, the second driving planetary gear 104D is meshed with the first driving planetary gear 103D and revolves around the first driving planetary gear 103D, so that a radius of the chain 105 meshed with the second driving planetary gear 104D is changed.

The second driven planetary gear 104F meshed with the chain 105 is meshed with the first driven planetary gear 103F, and the driven sun gear 101F is stationary, thereby transmitting the rotation force to the output shaft 111F by the right driven carrier 102RF.

By continuously rotating the second driven planetary gear shaft 107F about the driven carrier shaft 102FS by a desired angle, the second driven planetary gear 104F is meshed with the first driven planetary gear 103F and revolves around the first driven planetary gear 103F, so that a radius of the chain 105 meshed with the second driven planetary gear 104F is changed.

The principle of transmission according to the third embodiment is identical to that according to the first and second embodiments, except that the input shaft 111D drives the carrier 102 of the transmission, and the sun gear 101 of the driving unit D and the driven unit F is stationary, in which the driving force is transmitted to the driven unit F from the driving unit D, and then is transmitted to the output shaft 111F via the carrier 102 of the driven unit F.

Transmission Adjustment System

The transmission adjustment system employs the guide cone/transmission adjustment system Q1C-1 shown in FIG. 30 including the transmission adjustment system Q1 shown in FIG. 11 and the guide cone system C shown in FIG. 23.

The transmission adjustment system Q1 is applied to the transmission system with rotating carrier 102, as shown in FIGS. 87 and 88.

The shift method will now be described with reference to FIG. 88. When the left adjustment main gear 202L is rotated by the rotation force inputted from the adjustment motor 301, the adjustment slider 233 meshed with the left adjustment main gear 202L is rotated. The adjustment slider 233 is coupled to the adjustment screw 232 by means of a screw. When the adjustment slider 233 is rotated by the left adjustment main gear 202L, the adjustment slider 233 is moved in a left or right direction.

The helical slider 234 is assembled in the adjustment slider 233 together with two adjustment thrust bearings 231.

If the adjustment slider 233 is moved in a left or right direction, the helical slider 234 is also moved in a left or right direction. In this instance, the adjustment thrust bearing 231 is installed not to prevent rotation of the helical slider 234.

The connection of the helical slider 234 with the carrier 102 is slid by a spline, and the connection of the helical slider 234 with the adjustment sun gear 204 is composed of a helical gear. When the helical slider 234 is rotated together with the carrier 102 and is moved in a left or right direction, the adjustment sun gear 204 is rotated by the helical gear, and the flange gear 205 meshed with the adjustment sun gear 204 is rotated about the carrier 102. The second planetary gear shaft 107 coupled to the flange gear 205 is rotated around the carrier 102, and the second planetary gear 104 is rotated around the second planetary gear shaft 107, and thus revolves around the first planetary gear 103 meshed with the second planetary gear 104.

The construction and operation of the transmission adjustment system Q1 will now be described with reference to FIG. 87. The rotation force is transmitted to the adjustment main shaft 203 from the adjustment motor 301, and the left adjustment main gear 202L and the right adjustment main gear 202R which are integrally coupled to the adjustment main shaft 203 are rotated. Thus, the left driving adjustment slider 233LD and the left driven adjustment slider 233LF which are meshed with the left adjustment main gear 202L are rotated, and the right driving adjustment slider 233RD and the right driven adjustment slider 233RF which are meshed with the right adjustment main gear 202R are rotated.

In this instance, the adjustment slider 233 is coupled to the adjustment screw 232 by means of a screw, and the adjustment slider 233 is assembled together with the helical slider 234 and two adjustment thrust bearings 231.

When the left adjustment main gear 202L and the right adjustment main gear 202R are rotated, a gap between the left driving slider 233LD and the right driving adjustment slider 233RD is widened, and a gap between the left driven adjustment slider 233LF and the right driven adjustment slider 23RF narrows.

And, a screw direction of the left driving adjustment slider 233LD and the right driving adjustment slider 233RD is opposite to each other, and a screw direction of the left driven adjustment slider 233LF and the right driven adjustment slider 233RF is opposite to each other. A screw direction of the left driving adjustment slider 233LD and the left driven adjustment slider 233LF is opposite to each other.

The helical slider 234 is rotated together with the carrier 102, and is slid in an axial direction to rotate the adjustment sun gear 204, and thus the flange gear 205 meshed with the adjustment sun gear 204.

If the flange gear 205 is rotated, the second planetary gear 104 rotating around the second planetary gear shaft 107 which is integrally coupled to the flange gear 205 is meshed with the first planetary gear 103 and revolves to change a radius of the chain 105 meshed with the second planetary gear 104.

FIG. 89 is a view illustrating the assembled state of the guide cone system C according to the third embodiment, and FIG. 90 is a view illustrating parts of the guide cone system C.

The guide cone system C is applied to a transmission system including the rotating carrier 102. As shown in FIG. 89, the left driving guide cone 251LD is assembled to the left driving adjustment sun gear 204LD in a left-handed screw manner, while the right driving guide cone 251RD is assembled to the right driving adjustment sun gear 204RD in a right-handed screw manner, so that the guide cones 251LD and 251RD are installed on both sides of the chain 105 of the driving unit D.

The left driven guide cone 251LF is assembled to the left driven adjustment sun gear 204LF in a right-handed screw manner, while the right driven guide cone 251RF is assembled to the right driven adjustment sun gear 204RF in a left-handed screw manner, so that the guide cones 251LF and 251RF are installed on both sides of the chain 105 of the driven unit D.

As shown in FIG. 90, portions of the guide cones which come in contact with the chain 105 are machined in a cone shape having a certain slope. The guide cones are provided with a plurality of circular arc shape grooves of a certain angle in order to prevent the interference, when the second driving planetary gear shaft 107D or the second driven planetary gear shaft 107F is moved. The portion of the guide cones which is assembled to the driving carrier shaft 102DS or the driven carrier shaft 102FS is provided with a guide groove, so that the guide cones can be axially reciprocated.

When the left driving adjustment sun gear 204LD, the right driving adjustment sun gear 204RD, the left driven adjustment sun gear 204LF, and the right driven adjustment sun gear 204RF are simultaneously rotated in a counterclockwise direction, the left driving flange gear 205LD and the right driving flange gear 205RD are integrally coupled to the second driving planetary gear shaft 107D, and are rotated in a clockwise direction. Thus, a radius of the chain 105 of the driving unit D which is meshed with the second driving planetary gear 104D rotating around the second driving planetary gear shaft 107D is reduced. The left driving guide cone 251LD is axially moved in a left direction, while the right driving guide cone 251RD is axially moved in a right direction, thereby increasing a width between two guide cones. Accordingly, in accordance with a radius of the chain 105 of the driving unit D, the right driving guide cone 251RD and the left driving guide cone 251LD are installed on both sides of the chain 105 of the driving unit D to maintain the radius of the chain 105, with the contact width being constantly maintained.

And, the left driven flange gear 205LF and the right driven flange gear 205RF are integrally coupled to the second driven planetary gear shaft 107F, and are rotated in a clockwise direction. Thus, a radius of the chain 105 of the driven unit F which is meshed with the second driven planetary gear 104F rotating around the second driven planetary gear shaft 107F is increased. The left driven guide cone 251LF is axially moved in a right direction, while the right driven guide cone 251RF is axially moved in a left direction, thereby reducing a width between two guide cones. Accordingly, in accordance with a radius of the chain 105 of the driven unit F, the left driven guide cone 251LF and the right driven guide cone 251RF are installed on both sides of the chain 105 of the driven unit F to maintain the radius of the chain 105, with the contact width being constantly maintained.

The construction according to the third embodiment will be described with reference to FIGS. 91 and 92.

The construction of the driving unit D will now be described with reference to FIG. 91.

The right driving adjustment screw 232RD is fixed to the right case cover 11 by means of a bolt 315, and the left driving adjustment screw 232LD is fixed to the left case cover 14 by means of a bolt 315 to coincide with the center of the right driving adjustment screw 232RD.

The driving sun gear shaft 101DS integrally coupled to the driving sun gear 101D is spline-coupled to the right driving adjustment screw 232RD and the left driving adjustment screw 232LD, and the circlip 331 is mounted on both ends of the driving sun gear shaft.

The right driving adjustment sun gear 204RD of a hollow body is mounted on the right outer periphery of the driving sun gear shaft 101DS. A needle bearing 341 is interposed between the driving sun gear shaft 101DS and the right driving adjustment sun gear 204RD, and a thrust bearing 321 is positioned on left and right sides of the right driving adjustment sun gear 204RD. The circlip 331 is mounted on the driving sun gear shaft 101DS at the thrust bearing 321 to smoothly rotate the right driving adjustment sun gear 204RD.

The right driving guide cone 251RD is assembled to the left end of the right driving adjustment sun gear 204RD by means of a screw, and the right driving carrier 102RD is interposed between the left and right tooth portions of the right driving adjustment sun gear 204RD. A needle bearing 347 is interposed between an inner periphery of the right driving carrier 102RD and an outer periphery of the right driving adjustment sun gear 204RD. A ball bearing 356 is mounted on the outer periphery of the right driving carrier 102RD, and is inserted into the right case 12 to smoothly rotate the right driving carrier 102RD.

The left driving adjustment sun gear 204LD of a hollow body is mounted on the left outer periphery of the driving sun gear shaft 101DS. A needle bearing 341 is interposed between the driving sun gear shaft 101DS and the left driving adjustment sun gear 204LD, and a thrust bearing 321 is positioned on left and right sides of the left driving adjustment sun gear 204LD. The circlip 331 is mounted on the driving sun gear shaft 101DS at the thrust bearing 321 to smoothly rotate the left driving adjustment sun gear 204LD.

The left driving guide cone 251LD is assembled to the right end of the left driving adjustment sun gear 204LD by means of a screw, and the left driving carrier 102LD is interposed between the left and right tooth portions of the left driving adjustment sun gear 204LD. A needle bearing 347 is interposed between an inner periphery of the left driving carrier 102LD and an outer periphery of the left driving adjustment sun gear 204LD. A ball bearing 357 is mounted on the outer periphery of the left driving carrier 102LD, and is inserted into the left case 13 to smoothly rotate the left driving carrier 102LD.

The driving carrier shaft 102DS is spline-coupled to the right driving carrier 102RD and the left driving carrier 102LD, and the circlip 333 is mounted on both ends of the driving carrier shaft.

The first driving planetary gear 103D of hollow body which is meshed with the driving sun gear 101D is assembled to the center of the outer periphery of the driving carrier shaft 102DS, and the needle bearing 343 is interposed between an inner periphery of the first driving planetary gear 103D and an outer periphery of the driving carrier shaft 102DS. The thrust bearing 323 is positioned on left and right sides of the first driving planetary gear 103D, and the circlip 333 is mounted on the driving carrier shaft 102DS to smoothly rotate the first driving planetary gear 103D.

The right driving flange gear 205RD of hollow body is assembled to the right outer periphery of the driving carrier shaft 102DS, and the needle bearing 342 is interposed between an outer periphery of the driving carrier shaft 102DS and an inner periphery of the right driving flange gear 205RD to smoothly rotate the right driving flange gear 205RD. The thrust bearing 323 is positioned on left and right sides of the right driving flange gear 205RD, and the circlip 333 is mounted on the driving carrier shaft 102DS at the left thrust bearing 323.

The left driving flange gear 205LD of hollow body is assembled to the left outer periphery of the driving carrier shaft 102DS, and the needle bearing 342 is interposed between an outer periphery of the driving carrier shaft 102DS and an inner periphery of the left driving flange gear 205LD to smoothly rotate the left driving flange gear 205LD. The thrust bearing 323 is positioned on left and right sides of the left driving flange gear 205LD, and the circlip 333 is mounted on the driving carrier shaft 102DS at the right thrust bearing 323.

The second driving planetary gear shaft 107D is spline-coupled to the right driving flange gear 205RD and the left driving flange gear 205LD, and the circlip 334 is mounted on both ends of the second driving planetary gear shaft.

The hollow second planetary gear 104D is assembled to the second driving planetary gear shaft 107D, and the needle bearing 344 is interposed between the second driving planetary gear shaft 107D and the second driving planetary gear 104D to smoothly rotate the second driving planetary gear 104D. The thrust bearing 324 is positioned on left and right sides of the second driving planetary gear 104D, and the clip 334 is mounted on the second driving planetary gear shaft 107D. The second driving planetary gear 104D is meshed with the first driving planetary gear 103D, and the chain 105 is meshed with the second driving planetary gear 104D.

The second driving planetary gear 104D is meshed with the first driving planetary gear 103D to receive the rotation force, and is rotated around the outer periphery of the second driving planetary gear shaft 107D. When the left driving flange gear 205LD and the right driving flange gear 205RD are rotated by a desired angle, the second driving planetary gear 104D revolves around the first driving planetary gear 103D. In this instance, a radius of the chain 105 meshed with the second driving planetary gear 104D is changed to perform the shift of the driving unit.

When the chain 105 is rotated around the second driving planetary gear 104D, the right driving guide cone 251RD and the left driving guide cone 251LD come in contact with both sides of the chain 105 so that a radius of the chain 105 is maintained at the center thereof.

The right driving helical slider 234RD is simultaneously meshed with the spline portion of the right driving carrier 102RD and the right helical gear of the right driving adjustment sun gear 204RD.

The right driving adjustment slider 233RD is assembled to the outer periphery of the right driving helical slider 234RD, and a right driving adjustment thrust bearing 231 RD is interposed between the right driving helical slider 234RD and the right driving adjustment slider 233RD. The inner periphery of the right driving adjustment slider 233RD and the outer periphery of the right driving adjustment screw 232RD are assembled by means of a screw.

When the right driving adjustment slider 233RD is rotated, the right driving adjustment slider 233RD is moved in a left or right direction by the screw. When the right driving adjustment slider 233RD is rotated and is moved in a left or right direction, the right driving helical slider 234RD is moved in a left or right direction.

When the driving helical slider 234RD is axially slid in a left or right direction on the spline portion of the right driving carrier 102RD, with the right driving carrier 102RD, the right driving adjustment sun gear 204RD, the right driving flange gear 205RD, and the right driving helical slider 234 revolving around the driving sun gear 101D, the right driving adjustment sun gear 204RD is rotated by a helical angle to rotate the right driving flange gear 205RD.

The needle bearing 345 is inserted into the right case 12, and the ball bearing 351 is inserted into the right case cover 11. The input shaft 111D is assembled to the inner peripheries of the needle bearing 345 and the ball bearing 351, and the input shaft 111D is meshed with the right driving carrier 102RD.

A thrust bearing 323 is mounted on the input shaft 111D, and the oil seal 361 is inserted into the right case cover 11 at the outside of the ball bearing 351 to prevent leakage of the input shaft 111D.

The left driving helical slider 234LD is meshed with the spline portion of the left driving carrier 102LD and the left helical gear of the left driving adjustment sun gear 204LD. The left driving adjustment slider 233LD is assembled to the outer periphery of the left driving helical slider 234LD, and a left driving the adjustment thrust bearing 231LD is interposed between the left driving helical slider 234LD and the left driving adjustment slider 233LD.

The construction of the driven unit F will now be described with reference to FIG. 92.

The right driven adjustment screw 232RF is fixed to the right case cover 11 by means of a bolt 315, and the left driven adjustment screw 232LF is fixed to the left case cover 14 by means of a bolt 315 to coincide with the center of the right driven adjustment screw 232RF.

The driven sun gear shaft 101FS integrally coupled to the driven sun gear 101F is spline-coupled to the right driven adjustment screw 232RF and the left driven adjustment screw 232LF, and the clip 331 is mounted on both ends of the driven sun gear shaft.

The right driven adjustment sun gear 204RF of a hollow body is mounted on the right outer periphery of the driven sun gear shaft 101FS. A needle bearing 341 is interposed between the driven sun gear shaft 101FS and the right driven adjustment sun gear 204RF, and a thrust bearing 321 is positioned on left and right sides of the right driven adjustment sun gear 204RF. The circlip 331 is mounted on the driven sun gear shaft 101FS at the thrust bearing 321 to smoothly rotate the right driven adjustment sun gear 204RF.

The right driven guide cone 251RF is assembled to the left end of the right driven adjustment sun gear 204RF by means of a screw, and the right driven carrier 102RF is interposed between the left and right tooth portions of the right driven adjustment sun gear 204RF. A needle bearing 347 is interposed between an inner periphery of the right driven carrier 102RF and an outer periphery of the right driven adjustment sun gear 204RF. A ball bearing 356 is mounted on the outer periphery of the right driven carrier 102RF, and is inserted into the right case 12 to smoothly rotate the right driven carrier 102RF.

The left driven adjustment sun gear 204LF of a hollow body is mounted on the left outer periphery of the driven sun gear shaft 101FS. A needle bearing 341 is interposed between the driven sun gear shaft 101FS and the left driven adjustment sun gear 204LF, and a thrust bearing 321 is positioned on left and right sides of the left driven adjustment sun gear 204LF. The circlip 331 is mounted on the driven sun gear shaft 101FS at the thrust bearing 321 to smoothly rotate the left driven adjustment sun gear 204LF.

The left driven guide cone 251LF is assembled to the right end of the left driven adjustment sun gear 204LF by means of a screw, and the left driven carrier 102LF is interposed between the left and right tooth portions of the left driven adjustment sun gear 204LF. A needle bearing 347 is interposed between an inner periphery of the left driven carrier 102LF and an outer periphery of the left driven adjustment sun gear 204LF. A ball bearing 357 is mounted on the outer periphery of the left driven carrier 102LF, and is inserted into the left case 13 to smoothly rotate the left driven carrier 102LF.

The driven carrier shaft 102FS is spline-coupled to the right driven carrier 102RF and the left driven carrier 102LF, and the circlip 333 is mounted on both ends of the driven carrier shaft.

The first driven planetary gear 103F of hollow body which is meshed with the driven sun gear 101F is assembled to the center of the outer periphery of the driven carrier shaft 102FS, and the needle bearing 343 is interposed between an inner periphery of the first driven planetary gear 103F and an outer periphery of the driven carrier shaft 102FS. The thrust bearing 323 is positioned on left and right sides of the first driven planetary gear 103F, and the circlip 333 is mounted on the driven carrier shaft 102FS to smoothly rotate the first driven planetary gear 103F.

The right driven flange gear 205RF of hollow body is assembled to the right outer periphery of the driven carrier shaft 102FS, and the needle bearing 342 is interposed between the driven carrier shaft 102FS and the right driven flange gear 205RF to smoothly rotate the right driven flange gear 205RF. The thrust bearing 323 is positioned on left and right sides of the right driven flange gear 205RF, and the circlip 333 is mounted on the driven carrier shaft 102FS at the left thrust bearing 323.

The left driven flange gear 205LF of hollow body is assembled to the left outer periphery of the driven carrier shaft 102FS, and the needle bearing 342 is interposed between an outer periphery of the driven carrier shaft 102FS and an inner periphery of the left driven flange gear 205LF to smoothly rotate the left driven flange gear 205LF. The thrust bearing 323 is positioned on left and right sides of the left driven flange gear 205LF, and the circlip 333 is mounted on the driven carrier shaft 102FS at the right thrust bearing 323.

The second driven planetary gear shaft 107F is spline-coupled to the right driven flange gear 205RF and the left driven flange gear 205LF, and the circlip 334 is mounted on both ends of the driven planetary gear shaft.

The hollow second driven planetary gear 104F which is meshed with the first driven planetary gear 103F is assembled to the second driven planetary gear shaft 107F, and the needle bearing 344 is interposed between the second driven planetary gear shaft 107F and the second driven planetary gear 104F to smoothly rotate the second driven planetary gear 104F. The thrust bearing 324 is positioned on left and right sides of the second driven planetary gear 104F, and the circlip 334 is mounted on the second driven planetary gear shaft 107F. The second driven planetary gear 104F is meshed with the first driven planetary gear 103F, and the chain 105 is meshed with the second driven planetary gear 104F.

The second driven planetary gear 104F receives the rotation force from the chain 105, and is rotated around the outer periphery of the second driven planetary gear shaft 107F. When the left driven flange gear 205LF and the right driven flange gear 205RF are rotated by a desired angle, the second driven planetary gear 104F revolves around the first driven planetary gear 103F. In this instance, a radius of the chain 105 meshed with the second driven planetary gear 104F is changed to perform the shift of the driven unit. The rotational force of the chain 105 is transmitted into the carrier because of the stationary driven sun gear 101F, and is transmitted into the output shaft 111F which is meshed with the right driven carrier 102RF.

When the chain 105 is rotated around the second driven planetary gear 104F, the right driven guide cone 251RF and the left driven guide cone 251LF come in contact with both sides of the chain 105 so that a radius of the chain 105 is maintained at the center thereof.

The right driven helical slider 234RF is simultaneously meshed with the spline portion of the right driven carrier 102RF and the right helical gear of the right driven adjustment sun gear 204RF.

The right driven adjustment slider 233RF is assembled to the outer periphery of the right driven helical slider 234RF, and a right driven adjustment thrust bearing 231RF is interposed between the right driven helical slider 234RF and the right driven adjustment slider 233RF. The inner periphery of the right driven adjustment slider 233RF and the outer periphery of the right driven adjustment screw 232RF are assembled by means of a screw.

When the right driven adjustment slider 233RF is rotated, the driven adjustment slider 233RF is moved in a left or right direction by the screw. When the right driven adjustment slider 233RF is rotated and is moved in a left or right direction, the right driven helical slider 234RF is moved in a left or right direction.

When the driven helical slider 234RF is axially slid in a left or right direction on the spline portion of the right driven carrier 102RF, with the right driven carrier 102RF, the right driven adjustment sun gear 204RF, the right driven flange gear 205RF, and the right driven helical slider 234 revolving around the driven sun gear 101F, the right driven adjustment sun gear 204RF is rotated by a helical angle to rotate the right driven flange gear 205RF.

The needle bearing 345 is inserted into the right case 12, and the ball bearing 351 is inserted into the right case cover 11. The output shaft 111F is assembled to the inner peripheries of the needle bearing 345 and the ball bearing 351, and the output shaft 111F is meshed with the right driven carrier 102RF.

The needle bearing 345 is interposed between the output shaft 111F and the right case 12, and the oil seal 362 is inserted into the right case cover 11 at the outside of the bearing 351 to prevent leakage of the output shaft 111F.

The left driven helical slider 234LF is meshed with the spline portion of the left driven carrier 102LF and the left helical gear of the left driven adjustment sun gear 204LF.

The left driven adjustment slider 233LF is assembled to the outer periphery of the left driven helical slider 234LF, and a left adjustment thrust bearing 231LF is interposed between the left driven helical slider 234LF and the left driven adjustment slider 233LF.

At the center portion of the driving unit D and the driven unit F, the needle bearing 346 is inserted into the left case cover 14, and a bush 371 is inserted into the inside of the needle bearing 346.

The thrust bearing 328 is positioned on left and right sides of the needle bearing 346, and the circlip 335 is mounted on the adjustment main shaft 203.

The right adjustment main gear 202R is spline-coupled to the right of the adjustment main shaft 203, and the left adjustment main gear 202L is splined-coupled to the left thereof.

The adjustment main shaft 203 is inserted into the bush 371 and the needle bearing 346. The right adjustment main gear 202R is meshed with the right driving adjustment slider 233RD and the right driven adjustment slider 233RF, and the left adjustment main gear 202L is meshed with the left driving adjustment slider 233LD and the left driven adjustment slider 233LF.

The needle bearing 346 is interposed between the right case cover 11 and the adjustment main shaft 203, and the bush 371 is inserted into the needle bearing 346.

The thrust bearing 328 is positioned on left and right sides of the needle bearing 346, and the circlip 335 is mounted on the adjustment main shaft 203.

The output of the adjustment motor 301 is coupled to the adjustment main shaft 203 to transmit the rotation force. The right case cover 11 and the right case 12 are fasted by means of a bolt 311, and the left case 13 and the right case 12 are fastened by means of a bolt 312. The left case cover 14 and the left case 13 are fastened by means of a bolt 313, and the adjustment motor 301 is fastened to the left case cover 14 by means of a bolt 314.

While this invention has been described in connection with what is presently considered to be the most practical and preferred embodiments, it is to be understood that the invention is not limited to the disclosed embodiment and the drawings. On the contrary, it is intended to cover various modifications and variations within the spirit and scope of the appended claims.

The invention claimed is:

1. A transmission system for transmitting a driving force from a driving unit to a driven unit, comprising:
the driving unit including a driving sun gear; a plurality of driving carrier shafts fixed to a case, a left driving carrier or a right driving carrier; a plurality of first driving planetary gears rotating about the driving carrier shafts and meshed with the driving sun gear; a plurality of second driving planetary gear shafts rotating about the driving carrier shafts by a desired angle; and a plurality of second driving planetary gears rotating around the second driving planetary gear shafts, meshed with the first driving planetary gears, and revolving around the first driving planetary gears by a desired angle;
the driven unit including a driven sun gear; a plurality of driven carrier shafts fixed to the case, a left driven carrier or a right driven carrier; a plurality of first driven planetary gears rotating about the driven carrier shafts and meshed with the driven sun gear; a plurality of second driven planetary gear shafts rotating about the driven carrier shafts by a desired angle; and a plurality of second driven planetary gears rotating around the second driven planetary gear shafts, meshed with the first driven planetary gears, and revolving around the first driven planetary gears by a desired angle; and
a transmission element with a tooth portion meshed with the second driving planetary gears and the second driven planetary gears for transmitting the driving force from the driving unit to the driven unit.

2. The transmission system as claimed in claim 1, wherein the second driving planetary gear and the second driven planetary gear are of multiple rows of pinions.

3. The transmission system as claimed in claim 2, wherein the driving planetary gear and the driven planetary gear are of multiple rows of pinions, and the transmission system further comprises a driving ring gear and a driven ring gear which are meshed with one row of pinion of the first driving planetary gear and one row of pinion of the first driven planetary gear.

4. A transmission system for transmitting a driving force from a driving unit to a driven unit, comprising:
the driving unit including a driving sun gear; a plurality of driving carrier shafts fixed to a case, a left driving carrier or a right driving carrier; a plurality of first driving planetary gears rotating around the driving carrier shafts and meshed with the driving sun gear; a plurality of second driving planetary gear shafts rotating about the driving carrier shafts by a desired angle; and a plurality of second driving planetary gears of multiple-row pinion type, each right row of pinion of which is meshed with the first driving planetary gears, rotates around the second driving planetary gear shafts, and revolves around the first driving planetary gears by a desired angle;
the driven unit including a driven sun gear; a plurality of driven carrier shafts fixed to the case, a left driven carrier or a right driven carrier; a plurality of first driven planetary gears rotating about the driven carrier shafts and meshed with the driven sun gear; a plurality of second driven planetary gear shafts rotating about the driven carrier shafts by a desired angle; and a plurality of second driven planetary gears of multiple-row pinion type, each right row of pinion of which is meshed with the first driven planetary gears, rotates around the second driven planetary gear shafts, and revolves around the first driven planetary gears by a desired angle right; and
a transmission element with a tooth portion meshed with each left row pinion of the second driving planetary gears and each left row pinion of the second driven planetary gears for transmitting the driving force from the driving unit to the driven unit.

5. A transmission system for transmitting a driving force from a driving unit to a driven unit, comprising:
the driving unit including a driving sun gear; a plurality of driving carrier shafts fixed to a case, a left driving carrier or a right driving carrier; a plurality of first driving planetary gears of multiple-row pinion type, each right of row of pinion of which is meshed with the driving sun gear and rotates around the driving carrier shafts; a plurality of second driving planetary gear shafts rotating about the driving carrier shafts by a desired angle; a plurality of second driving planetary gears being meshed with each left row of pinion of the first driving planetary gears, rotating around the second driving planetary gear shafts, and revolving around the first driving planetary gears by a desired angle; and a driving ring gear meshed with each right row of pinion of the first driving planetary gears which rotate around the driving carrier shaft;
the driven unit including a driven sun gear; a plurality of driven carrier shafts fixed to the case, a left driven carrier or a right driven carrier; a plurality of first driven planetary gears of multiple-row pinion type, each right row of pinion of which is meshed with the driven sun gear and rotates around the driven carrier shafts; a plurality of second driven planetary gear shafts rotating about the driven carrier shafts by a desired angle; a plurality of second driven planetary gears being meshed with each left row pinion of the first driven planetary gears, rotating around the second driven planetary gear shafts, and revolving around the first driven planetary gears by a desired angle; and a driven ring gear meshed with each right row of pinion of the first driven planetary gears which rotate around the driven carrier shaft; and
a transmission element with a tooth portion meshed with the second driving planetary gears and the second driven planetary gears for transmitting the driving force from the driving unit to the driven unit.

6. A transmission system for transmitting a driving force from a driving unit to a driven unit, comprising:
the driving unit including a driving sun gear; a plurality of driving carrier shafts fixed to a case, a left driving carrier or a right driving carrier; a plurality of first driving planetary gears of multiple-row pinion type, each right row of pinion of which is meshed with the driving sun gear and rotates around the driving carrier shafts; a plurality of second driving planetary gear shafts rotating about the driving carrier shafts by a desired angle; a plurality of second driving planetary gears of multiple-row pinion type, each right row of pinion of which is meshed with each left row pinion of the first driving planetary gears, rotates around the second driving planetary gear shafts, and revolves around the first driving planetary gears by a desired angle; and a driving ring gear meshed with each right row of pinion of the first driving planetary gears which rotate around the driving carrier shaft;
the driven unit including a driven sun gear; a plurality of driven carrier shafts fixed to the case, a left driven carrier or a right driven carrier; a plurality of first driven planetary gears of multiple-row pinion type, each right row of pinion of which is meshed with the driven sun gear and rotates around the driven carrier shafts; a plurality of second driven planetary gear shafts rotating about the driven carrier shafts by a desired angle; a plurality of second driven planetary gears of multiple-row pinion type, each right row of pinion of which is meshed with each left row pinion of the first driven planetary gears, rotates around the second driven planetary gear shafts, and revolves around the first driven planetary gears by a desired angle; and a driven ring gear meshed with each right row of pinion of the first driven planetary gears which rotate around the driven carrier shafts; and a transmission element with a tooth portion meshed with each left row of pinion of the second driving planetary gears and each left row of pinion of the second driven planetary gears for transmitting the driving force from the driving unit to the driven unit.

* * * * *